US007685083B2

(12) United States Patent
Fairweather

(10) Patent No.: US 7,685,083 B2

(45) Date of Patent: Mar. 23, 2010

(54) SYSTEM AND METHOD FOR MANAGING KNOWLEDGE

(76) Inventor: John Fairweather, 1649 Wellesley Dr., Santa Monica, CA (US) 90405

( * ) Notice: Subject to any disclaimer, the term of this patent is extended or adjusted under 35 U.S.C. 154(b) by 834 days.

(21) Appl. No.: 11/484,220

(22) Filed: Jul. 10, 2006

(65) Prior Publication Data

US 2007/0112714 A1 May 17, 2007

Related U.S. Application Data

(63) Continuation of application No. 10/357,286, filed on Feb. 3, 2003, now abandoned.

(60) Provisional application No. 60/353,487, filed on Feb. 1, 2002.

(51) Int. Cl.
*G06F 17/00* (2006.01)
*G06N 5/00* (2006.01)

(52) U.S. Cl. ........................................................ 706/45

(58) Field of Classification Search ................... 706/46, 706/45

See application file for complete search history.

(56) References Cited

U.S. PATENT DOCUMENTS

| | | | | |
|---|---|---|---|---|
| 7,096,242 | B2 * | 8/2006 | Wilber | 708/255 |
| 7,103,749 | B2 * | 9/2006 | Fairweather | 711/208 |
| 7,143,087 | B2 * | 11/2006 | Fairweather | 707/3 |
| 7,158,984 | B2 * | 1/2007 | Fairweather | 707/101 |
| 7,191,106 | B2 * | 3/2007 | Minor et al. | 703/2 |
| 7,210,130 | B2 * | 4/2007 | Fairweather | 717/136 |
| 7,240,330 | B2 * | 7/2007 | Fairweather | 717/116 |
| 7,308,449 | B2 * | 12/2007 | Fairweather | 707/10 |
| 7,308,674 | B2 * | 12/2007 | Fairweather | 717/103 |
| 7,328,430 | B2 * | 2/2008 | Fairweather | 717/136 |
| 7,369,984 | B2 * | 5/2008 | Fairweather | 704/8 |
| 7,432,940 | B2 * | 10/2008 | Brook et al. | 345/629 |

OTHER PUBLICATIONS

Intelligent transport systems and effects on road traffic accidents: state of the art Vaa, T.; Penttinen, M.; Spyropoulou, I.; Intelligent Transport Systems, IET vol. 1, Issue 2, Jun. 2007 pp. 81-88 Digital Object Identifier 10.1049/iet-its:20060081.*

Pathway and Network Analysis of Schizophrenia Candidate Genes under Meta-Analysis Linkage Peaks Peilin Jia; Jingchun Sun; Leng Han; Zhongming Zhao; Bioinformatics, Systems Biology and Intelligent Computing, 2009. IJCBS '09. International Joint Conference on Aug. 3-5, 2009 pp. 442-447 Digital Object Identifier 10.1109/IJCBS.2009.63.*

Meta analysis of classification algorithms for pattern recognition So Young Sohn; Pattern Analysis and Machine Intelligence, IEEE Transactions on vol. 21, Issue 11, Nov. 1999 pp. 1137-1144 Digital Object Identifier 10.1109/34.809107.*

Combining multiple microarray studies using bootstrap meta-analysis Barrett, Andrea B.; Phan, John H.; Wang, May D.; Engineering in Medicine and Biology Society, 2008. EMBS 2008. 30th Annual International Conference of the IEEE Aug. 20-25, 2008 pp. 5660-5663 Digital Object Identifier 10.1109/IEMBS.2008.4650498.*

* cited by examiner

*Primary Examiner*—Michael B Holmes
(74) *Attorney, Agent, or Firm*—Stanley J. Gradisar Attorney At Law, LLC; Stanley J. Gradisar

(57) ABSTRACT

An intelligence system is provided that is comprised of several basic components: a system for converting incoming unstructured data into a well described normalized form supported by a dedicated 'mining' language tied intimately to a system ontology; a system for accessing and manipulating data held in memory or in persistent storage in its normalized binary form; an 'ontology' that represents and contains the items and fields necessary for the target system to perform its function; a memory system tied to the ontology; a memory management system for splitting incoming data into those portions to be directed to each container; a query system for querying each container to retrieve portions of composite objects; a UI to display and interact with data within the system; a memory system that forms collections of datums and enables manipulation and exchange of these collections both within the local machine as well as across the network.

24 Claims, No Drawings

SYSTEM AND METHOD FOR MANAGING KNOWLEDGE

CROSS REFERENCE TO RELATED APPLICATION

This applicant is a continuation of application Ser. No. 10/357,286 filed on Feb. 3, 2003, now abandoned titled "A System And Method For Managing Knowledge," which claims the benefit of Provisional Application Ser. No. 60/353,487 filed on Feb. 1, 2002, titled "Integrated Multimedia Intelligence Architecture," both of which are incorporated herein by reference in their entirety for all that is taught and disclosed therein. This application is also related to the following co-pending patent applications which were filed on the same day as application Ser. No. 10/357,286, and filed by the same inventor, and which are incorporated herein by reference in their entirety for all that is taught and disclosed therein: application Ser. No. 10/357,288 filed on Feb. 3, 2003 titled "System And Method For Managing Memory," now U.S. Pat. No. 7,103,749; application Ser. No. 10/357,326 filed on Feb. 3, 2003 titled "Method For Analyzing Data And Performing Lexical Analysis," now U.S. Pat. No. 7,328,430; application Ser. No. 10/357,324 filed on Feb. 3, 2003 titled "System And Method For Parsing Data," now U.S. Pat. No. 7,210,130 application Ser. No. 10/357,325 filed on Feb. 3, 2003 titled "System For Exchanging Binary Data," now U.S. Pat. No. 7,158,984; application Ser. No. 10/357,304 filed on Feb. 3, 2003 titled "System And Method For Managing Collections Of Data On A Network," now U.S. Pat. No. 7,308,449; application Ser. No. 10/357,283 filed on Feb. 3, 2003 titled "Use Of Ontologies For Auto-Generating And Handling Applications, Their Persistent Storage, And User Interfaces," now U.S. Pat. No. 7,240,330; application Ser. No. 11/455,304 filed on Jun. 16, 2006 titled "System And Method For Mining Data," now U.S. Pat. No. 7,533,069, which is a continuation application of application Ser. No. 10/357,290 filed on Feb. 3, 2003 titled "System And Method For Mining Data," now abandoned; application Ser. No. 10/357,284 filed on Feb. 3, 2003 titled "System And Method For Navigating Data," now U.S. Pat. No. 7,555,755; application Ser. No. 10/357,289 filed on Feb. 3, 2003 titled "System And Method For Real Time Interface Translation," now U.S. Pat. No. 7,369,984; application Ser. No. 10/357,259 filed on Feb. 3, 2003 titled "System And Method For Creating A Distributed Network Architecture," now U.S. Pat. No. 7,143,087; and application Ser. No. 10/357,285 filed on Feb. 3, 2003 titled "Data Flow Scheduling Environment With Formalized Pin-Base Interface And Input Pin Triggering By Data Collections, " now U.S. Pat. No. 7,308,674.

BACKGROUND OF THE INVENTION

Historically, a major problem with designing complex knowledge representation systems has been the difficulty of acquiring the necessary data in a structured form that algorithms representing the specific 'application' can process, and thus produce useful results. The traditional solution has been to restrict such systems to applications where the data is available within a database, normally relational and accessed using Structure Query Language (SQL). By applying these restrictions, the system design problem becomes tractable, and many useful but limited and localized calculations can be performed.

In the overwhelming majority of cases, data gets into such a database by manual data entry. This requires a highly structured environment where an operator is led through the process of entering all the necessary fields of the database 'tables' by a user interface (UI) component that has been tailored to the particular application, and which thus embodies the know-how necessary to ensure correct data entry.

In recent years, however, technologies such as B2B suites and XML have emerged to try to facilitate the exchange of information between disparate knowledge representation systems by use of common tags that may be used by the receiving end to identify the content of specific fields. If the receiving system does not understand the tag involved, the corresponding data may be discarded. These systems simply address the problem of converting from one 'normalized' representation to another, (i.e., how do I get it from my relational database into yours?) by use of a tagged, textual, intermediate form (e.g. XML). Such text-based approaches, while they work well for simple data objects, have major shortcomings when it comes to the interchange of complex multimedia and non-flat binary data. At a minimum, an interchange language designed to describe and manipulate binary data must be implemented, but current approaches fail to take this crucial step. Systems that operate in a domain where the source and destination have explicit or implicit knowledge of each other, or in which endpoints, to facilitate and enable interchange, comply with a standardized exchange format, we shall call 'Constrained Systems' (CS). The vast majority of systems in existence today are constrained systems. Despite the 'buzz' associated with the latest data-interchange techniques, such systems and approaches are totally inadequate for addressing the kinds of problems faced by a system, such as an intelligence system, which attempt to monitor and capture streams of unstructured or semi-structured inputs, from the outside world and derive knowledge, computability, and understanding from them.

Once the purpose of a system is broadened to acquisition of unstructured, non-tagged, time-variant, multimedia information (much of which is designed specifically to prevent easy capture and normalization by non-recipient systems), a totally different approach is required. In this arena, many entrenched notions of information science and database methodology must be discarded to permit the problem to be addressed. We shall call systems that attempt to address this level of problem, 'Unconstrained Systems' (UCS). An unconstrained system is one in which the source(s) of data have no explicit or implicit knowledge of, or interest in, facilitating the capture and subsequent processing of that data by the system.

Nowadays, the issue faced by any unconstrained system is not the lack of data but rather the flood of it. Digital information, mountains of it, is available everywhere. It floods the Internet (whose information contents by some estimates doubles every few months now), it fills the airwaves as phone calls, radio and video transmissions, e-mails, faxes, dedicated data feeds, databases, data streams, chat rooms, corporate networks, banking systems, peer-to-peer networks, bulletin boards, web pages, stock markets, telexes, etc. The problem now is that no system can handle the torrent of data that flows through the digital world we have created. The best that can be achieved is to sample some of the current as it washes by, and look for items of interest or significance within it. Even a small sample of such a stream represents a torrent that would overwhelm a conventional constrained system within seconds.

The basic configuration of an intelligence system is that digital data of diverse types flows through the intake pipe and some small quantity is extracted, normalized, and transferred into the system environment and persistent storage. Once in the environment, the data is available for analysis and intelligence purposes. Any intercepted data that is not sampled as it passes the environment intake port, is lost.

The information to be monitored is not just simple text, it is multimedia sounds, images, videos, compound documents etc. It is unstructured. It is multilingual. Most of what occurs in the world, does not do so in English. Information quality varies widely. Much of what is transmitted is garbage, wrong, or simply represents rumor or uninformed opinion. Knowledge of the source of the information must dictate its interpretation. The conventional assumption that the value of a field is exact and can be stored in a single box or cell simply does not apply. Even if the captured data can be regarded as absolute, its interpretation is a matter of opinion among those analysts using the system, and thus its value can be modified depending on the domain or perspective of the user of the data.

Most of the information available on the web is low-grade, unreliable information placed there to further somebody's agenda, not to provide truth. Indeed, most 'reliable' or high grade open-source information comes from publishers of one sort of another, and these people have little or no incentive to place such information on the web given the lack of any workable business model for making money from information so posted. As a result, worthwhile information must be intercepted, or for open-source data 'mined,' from a multitude of other sources, many designed to make such extraction more difficult in order to preserve the publisher's intellectual property. Thus, Lexis/Nexus for example has thousands of high grade databases totaling more than 25 times the total data content of the web at this point, which can be accessed and searched (in a limited manner) only via a subscription account. News and reporting services all have different delivery formats, equipment, and media. An intelligence system must accommodate this diversity of sources as well as providing for custom, intercepted, and private feeds available only to a specific organization. Crawling the web, while enlightening, and certainly an important capability, is not a complete answer to intelligence, to in-depth research and analysis, or to the extraction of meaning. A datum coming from a given source must maintain a reference to that source since this will later determine the reliability placed on that datum should it contribute in any way to an analytical conclusion.

To further complicate the issue of data sources, in intelligence applications, the identity and reliability of the persons involved in an intercept is frequently unknown or questionable. Additionally, the true identity and nature of entities referred to via key phrases or aliases in the intercept may be unknown, and may indeed be the subject of the analyst's investigation. Even known entities are frequently referred to via aliases. Thus, to perform analysis the system must support the concept of partially resolved references to data. That is, aliases to entities or things that have not yet been assigned to a known datum in the system. Thus, if the participants in an exchange refer to the 'client,' it becomes important to establish who that client is. However, since the word 'client' may appear in a myriad of different contexts where it actually refers to completely different entities, we must extend the concept of a source to incorporate the concept of a 'source domain' identified either by the persons involved in the intercept, or by other means. Within this 'domain' the word 'client' is assumed to correspond to a given entity, possibly still unresolved. Outside this domain the word will have other connotations. The underlying architectural substrate must provide for and support this type of ambiguity In a UCS, information is transitory. Once it has been transmitted, intercepted, and has flowed through the pipe, it is gone. It cannot be retrieved later from a web page or database engine. Because the information is transitory, it is essential that any monitoring system be able to identify it as important as it passes through the system intake pipe so that it can be selectively captured from the stream for subsequent analysis. Due to the huge volumes involved, not all data can be stored persistently and so reliable and automated sampling of the passing stream is a prerequisite. Moreover, the answer to any given question varies with time, and spotting these variations and the patterns they represent is the essence of intelligence. Again a conventional database is ill-suited to the demands of such time-variant data.

Rich multimedia data is full of subtleties, contextual overtones, and fine detail that cannot be captured as 'fields,' thus it is essential that data captured for storage and analysis be preserved in its entirety. The integrity of the original data must not be compromised by the conventional process of shredding it into standardized relational fields. To do so may remove the most important ingredient of the data. On the other hand, without some kind of field-like partitioning, no useful computation can be done, so a system must do both. That is, the data may be stored multiple times in different forms and containers. Furthermore, in multimedia data, each aspect of the data is best suited to analysis, search, storage, and distribution by different 'containers.' For example large bodies of text are best handled and searched by inverted file type text engines whereas fixed numeric or descriptive fields rightly belong in a relational database. Image, video, maps, sounds, and other multimedia fields must be stored, distributed and searched using engines, processes, and hardware that are best suited to the needs of the particular type, and thus the system must support a variety of 'containers' targeted at different media types and processes. A fingerprint or face recognizer capability obviously belongs in a different container than relational fields relating to specific fingerprints or images. To attempt to force all such tools into the framework of a common container, presumably a relational database, would be cost-prohibitive and extraordinarily inefficient.

Having taken the step of dispersing aspects of a given data item to the various containers that most effectively deal with those aspects, it becomes obvious that the system must now have the ability to seamlessly and transparently re-assemble those aspects back into the appearance of a unified whole for presentation to the user. Furthermore, the system must now provide a unified framework for querying the various aspects according to the querying concepts that make sense for the aspect involved, reassembling the results of various aspect specific portions of a query into a unified hit-list of results. Thus, for example, a fingerprint query would be specified and then routed to an entirely different container and engine than would other aspects of the same query such as the time period involved, or the physical region within which the search is to be constrained. These latter two aspects should be routed to relational and geographic container/query engines respectively. The need for a unified and extensible, distributed query language becomes readily apparent, as does the need for an auto-generated UI environment capable of smoothly stitching together the various components of whatever data is finally retrieved.

The nature of the intelligence problem is that most of the time you do not know what you are looking for until you find it, often much later. However, when you have identified the significant aspect, it suddenly becomes necessary to do a detailed analysis of all past data to examine the newly significant aspect to see if there are similarities or trends. Thus, the 'data-model' for the system is subject to continuous change on an analyst-by-analyst basis as they pursue divergent lines of inquiry into finding the key to some event of interest. What is needed, then, is a system designed for intelligence purposes that accommodates this behavior. Again, conventional systems fail to address this dynamic data-model issue.

Supposing one could automate the capture of large quantities of the digital world's data stream and deliver it to many analysts whose task was to search the stream for significance and meaning; still the volume of data would overwhelm all but the largest installations. This is because human beings have evolved sensors and mental apparatus to deal with the unique characteristics of information as it is presented to us in the analog world in which we live. In this world, the relevance of information generally falls off exponentially with distance from the observer (both in space and time), and as a consequence all of our senses exhibit a similar falloff. We take advantage of this fact to limit the amount of data we need to process. Furthermore, the same is true of our minds; that is, we are able to apply 'logical thought' only to the one thing that is our current focus. Our senses compete to filter everything we observe (based for the most part on distance or apparent magnitude) so that the most important item is brought to our attention at any given time for processing. When asked to give a description of what has happened to us in the last few minutes, each observer will give a different answer, and that answer actually corresponds to a listing of the mental models that were triggered by the focus, and the order in which they occurred. This frequently yields a very different history to what occurred in actual reality, and accounts for the notorious unreliability of most witnesses.

Unfortunately, in the digital domain, there is no exponential relevance decay phenomenon. Events occurring anywhere in the world may be as relevant to us as those occurring nearby. The analyst is forced to consider anything that may be potentially relevant regardless of spatial, temporal, or conceptual proximity. The result, given the volume of data, is information overload. Moreover, digital information environments such as the web are designed to capture and lead the focus of the person using them, primarily to gamer advertising dollars. Thus, we have all experienced the problem of searching for the answer to something on the web, only to be forced into the focus of the web sites we look at, with the result that eventually, hours later we give up, having failed to find what we were looking for, or more likely, having forgotten entirely what it was in the first place. Again, this effect occurs because the digital domain is not constrained by the same falloff law that our analog world is. Each navigation step may be arbitrarily large, and our minds are poorly equipped to maintain focus, and thus search for meaning or relevance in this environment. Thus, a primary goal of any UCS must be to help the analyst maintain focus and empower him to direct his inquiries based on his analytical goals (see Patent ref. 8). To do this, the system must gather and pre-filter information to present only the most relevant portions while accentuating and visualizing the relationships between adjacent data (spatially, temporally, or conceptually) so that the sensors and mental models we all use can be applied to best advantage to analyze that data for patterns, trends, or anomalies. Such pre-filtering must be completely tailored on a per-analyst basis since the filters must be digital representations of the mental models that particular analyst has built up in order to categorize and thus process events.

In effect, such a UCS must enable the analyst to construct or specify, over time, a digital alter ego which he empowers to be his representative in the torrent of information passing through such a system, and which is authorized to some level to filter and pre-process information, thus leaving the analyst free to make the non-linear leaps and connections that so uniquely characterize human thought. Many attempts have been made in the past to create such avatars, bots, or intelligent agents, mostly by the application of artificial intelligence techniques to specify a rule base that represents, in some way, the thought process of the analyst. Except in restricted domains, all such attempts have largely failed because human thought is not simply the repetitive application of a rule set. Indeed, we still have little idea how to model what we do when we solve a problem, and certainly the techniques we use are unique to each individual and more a result of experience, prejudices and judgment than they are the application of internal rule sets. This inevitably leads us to the conclusion that an architecture for a UCS must through some easy, presumably graphical means, allow each analyst to specify his personal analytical techniques out of whatever building blocks from whatever technical domain or technique he deems relevant. Some kind of visual wiring language where the information passing through the connecting flows represents data gleaned from the captured flow, and the blocks being connected represent limited and specialized processing blocks, is required. Once so specified, an analytical technique must be able to be launched on an automated basis into the intake stream in order to look for matching data to be brought to the attention of interested analysts.

Central to the ability to analyze new information as it passes by us, is the fact that we are essentially the sum of our experiences. It is our ability to build mental models that allow categorization and processing of new information that constitutes what we call intelligence. A critical aspect of this ability is the need for a large and related experience base that can be used to mentally model and predict the outcome of potential actions in order to choose between alternatives. In the digital domain, if we are to analyze a deluge of data, the same is true, that is, only by building up a vast and encompassing history of past events and their consequences can we begin to understand the potential relevance and consequences of new events appearing in the intake pipe. For even a moderately sized UCS, this represents a storage requirement in the Terra-byte or Peta-byte range given the multimedia nature of the inputs. More important however is the fact that due to the diverse nature of the feeds, and because in any practical system for monitoring global events, feeds must be acquired globally, at the source. It becomes apparent that this storage must be distributed, and must be closely tied to the architecture of the acquisition intake. This acquisition server architecture must, of necessity, be distributed given the physical separation of feeds. Further, given the demanding storage and isochronous retrieval requirements of rich media types such as video, it is apparent that deep storage architecture and access must be tailored to exactly match such a distributed server architecture on a per data-type and per-feed basis.

The concept of using the sum of our experiences as a kind of lens with which we view the world is key to understanding why systems claiming to provide such buzzword capabilities as "Asset Management" or "Knowledge Management" are only peripherally related to the intelligence problem itself. An asset or knowledge management (KM) system is engaged in the process of looking inwards into an organization to understand and control what is within. An intelligence system does this also, but then uses the knowledge gained by this experience and examination as a lens to allow interpretation of new information coming from the outside world. In effect, we use what we know and learn about ourselves to help us interpret what we see. In the KM case, the data pool is largely static, structured, and controllable. In the intelligence system case, the pool is simply an eddy in a rushing torrent where control of the torrent is out of the question. KM systems are in reality nothing more than thin veneers over relational databases, an approach that is wholly inadequate to the needs of an unconstrained intelligence architecture.

The purpose of an intelligence system is to facilitate the analysis of captured data and allow the rapid and effective distribution of such analyses to the intelligence consumers (i.e., 'clients') of such a system. Once the system involves multimedia information, the conventional solution of printing out a paper report and hand delivering it to the client becomes wholly inadequate. Multimedia information cannot be well represented on paper, and yet as the saying goes, a picture is worth a thousand words. What then is a video segment or sound recording worth? The truth of the matter is that multimedia data types are able to convey a much richer and more impactful presentation than words alone can. Thus, it is incumbent on such a system to design in the ability to easily create and electronically deliver full multimedia reports to its clients. This means that the report must actually be a working 'application' capable of full interaction with the client, and when necessary retrieval and playback of any multimedia and other components from archival storage within the system. Creation of such reports must be a relatively trivial matter for the analyst(s) involved. Delivery of multimedia reports without the ability for those reports to access data from system storage would not be nearly as effective. Furthermore, by taking this approach, one opens the door to regarding the report as a custom portal for the information consumer client to examine the details of a particular issue, review the backup data that lead to the reports conclusions, and to draw additional conclusions regarding, or obtain additional details relating to, the subject matter as necessary. Thus, an intelligence architecture should be designed to be end-to-end; that is, it must handle every stage of the process from capture, storage, indexing, search, analysis and finally to presentation. Often decision makers or information consumers are unskilled in the use of computers, and so a simpler (possibly hands-off) kiosk or web-portal like end-user mode, in addition to the more extensive normal analytical mode, must be provided. This mode must anticipate the needs for projection on large screens and the likelihood that multiple individuals will be in the audience. Access security, possibly using biometrics is an issue.

In adopting an architectural, rather than an application driven approach to solving the problem of unconstrained systems, a prerequisite is that the architecture provide a complete suite of tools to allow the end user to customize and extend the system by adding new tools and analyses as desired. Any approach to implementing a UCS that is not predicated on allowing the system staff to extend and modify the environment in arbitrary ways will not only be forced to severely constrain what is possible, but will also be so complex to define and subsequently implement that it may never work. Therefore, given that such customization is not only allowed, but encouraged, it is quickly apparent that a matching set of debugging tools must also be provided in order to make such customization practical. The system itself must expose a large and complete Applications Programming Interface (API) to allow development at the low level. Development however, must be possible on at least two levels. For the purposes of software engineers, whose goal is to integrate new capabilities seamlessly into the existing environment, code level support and APIs with detailed documentation is required. As much as possible of the detailed and housekeeping work must be handled automatically within the environment so that code level programmers can focus purely on the algorithm they wish to implement, not on such things as UI, communications, data access etc. For the purposes of analysts, who generally are not programmers, but who nonetheless need to express and specify analytical processes in terms of data flowing between a set of computational blocks, a visual programming language must be provided.

The issue of multilingual data is also a key hurdle to be overcome in any practical intelligence and monitoring system. The reality is that most interesting 'events' first appear in some local, probably non-English source and only later after capture and refinement by others does the information appear in English from another secondary, tertiary, or more indirect source. At each step of this process, 'integrity' and nuances of the original source are degraded and lost. Any practical system must thus be capable of capture at the source and in the language/format of the original. Mechanisms must be developed to handle and process the information in a productive and speedy manner despite the fact that the associated text may not be in English. There may be no time for a full translation during the brief transit period of the data through the system intake pipe. Failure to address this issue would mean all data must be centralized for formal translation prior to processing, and this requirement would obviously clog the intakes of any installed system targeted at even a moderate sized multi-lingual stream.

Non-English languages pose many problems that are trivially addressed in English. Foremost among these problems is the issue of 'stemming' or finding the root word or meaning of a given word. In English, stemming to extract the root word is trivial. One simply chops off common trailing modifiers to obtain the root word. Thus, in an English language search "Teachers" and "Teaching" are both trivially and automatically stemmed to yield the root word "Teach" and it is this that is actually searched (at least in non-trivial text search engines). In other languages, for example Arabic, each word may represent a mini-sentence. Thus, in Arabic "he taught them" or "they taught us" might be represented by single but very distinct words. The root word is not immediately apparent by examining the actual characters since even the characters involved in such mini-sentences are different. Meaningful search in many non-English languages is thus a subject of research since the Roman script derived language concept of a "key word" has little meaning in many other scripts. A key problem that must be addressed by a practical intelligence architecture is therefore how to stem foreign language inputs to allow meaningful word associations and "concept" queries to be made, while still allowing exact match searches where necessary or appropriate. Failure to address this problem makes the system virtually useless for many foreign script systems.

Multilingual requirements impact not only intake processing, but more obviously the user interface to the system, which must have the inherent ability to translate dynamically and on the fly between languages and appearances depending on the language or wishes of a particular user. The process of modifying a software program to appear and behave correctly in another language or script system is known as 'localization,' and is a multi-billion dollar industry and a major headache for all developers of software who wish to target foreign markets. Localization of a software product can take months, requires extensive source code changes or accommodations, and must be repeated (at vast expense) every time a new upgrade is released. One requirement of an unconstrained intelligence system is the ability reduce this localization process to an automatic and instantaneous behavior which is not in any way tied to the code that is generating or handling a particular aspect of the UI. If such a tie in did exist, the ability of the system to adapt globally (i.e., in a multilingual manner) to changes would be hampered by the rate at which localization could take place, and inevitably portions of the system would become inconsistent with other portions.

In any large collection of disparate data, the problem of how to navigate around it effectively becomes critical. We see that in the only successful example of a truly complex system, the Internet, the approach taken to navigation was to implement embedded hyperlinks which transition the users focus to the referenced URL. This works effectively, but is an incredibly manual, restrictive, and error prone business. The website designer must hand-insert the chosen hyperlink to the URL, thereby enforcing his perspective on the user rather than that of the user himself. Worse yet, URLs change continuously and the referencing link then becomes out of date and useless. What is needed in a UCS is the ability to define and enable/disable hyperlink domains on a per-user basis, and to have those hyperlinks automatically applied to every bit of textual data present in the system or displayed to the user. In other words, we need a dynamic hyperlinking architecture under the control of each user, not of the information source. This directly addresses the loss-of-focus issue discussed earlier by allowing the user to define and modify his own hyperlinking environment. The architecture and the UI it presents must provide and automate this facility. When a hyperlink is clicked, the architecture must be able to identify the nature and location of the datum to which that hyperlink refers, and to automatically launch the appropriate display behaviors to show the target datum to the user in the most appropriate manner.

Given a distributed UCS through which large quantities of data will be passing, not only as it is ingested, but also as it is passed between various analytical processes, it is apparent that efficient representation of that data and its relationships in binary form must be supported by the environment. Most data is not ‘flat’, that is it comprises many chunks of variable sized memory which refer to each other via pointer or similar references. As it becomes necessary to pass such data from one process or machine to another, the data must be ‘flattened’ into a single contiguous chunk for transmission and then ‘unflattened’ at the other end into its original form. This process is known as serialization (and de-serialization). All present data interchange environments are forced to perform serialization and de-serialization every time data is exchanged between processes. As the amount of data involved increases, the processing overhead of the serialization/de-serialization cycle begins to dominate until one reaches a practical limit in the amount of data that can be exchanged and the rate of such exchange. Unfortunately, with present day machines this limit is far below what is required for even a moderate UCS. Any architecture for unconstrained systems must therefore find a way to eliminate the serialization problem in its entirety.

The basic questions that are asked of an intelligence system can be summarized as “who”, “what”, “why”, “when”, and “where”. The answers to most of these questions cannot be expressed as a column of numbers or text since the answer itself may not be in the data but must instead be deduced or visualized by the analyst. An unconstrained environment must support the pervasive use of a large and ever expanding set of visualization tools. Certain visualizers should clearly be built into the environment and have commonly accepted appearances. The visualizer to answer the question “where” for example is generally a map and associated Geographic Information System (GIS). The environment must provide such a GIS built-in. Going back to basics, the standard visualizer for displaying the results of a database query is the list, though we may not normally think of this as a visualizer. The environment must provide a basic list capability including the ability to display arbitrary, possibly media rich columns, and to sort on those columns. The basic list must be capable of handling data organized in arbitrary hierarchies. Other environment (or underlying OS) supplied visualizers must exist for the common rich media types (i.e., images, sounds, and video). Complex graph and chart plotting is of course a basic visualization capability and must be built into the environment. The ability to define arbitrary exotic visualizers to aid in detecting patterns, trends, and anomalies must be supported. Since many such visualizers (including any truly useful GIS visualizer), require a 3-D world to express as many connections and nuances as possible, we are lead to the conclusion that the UI environment for the architecture should be based on (or support) a 3-D standard. Given the fact that gaming demands are pushing computer equipment manufacturers to incorporate faster and faster 3-D graphics chips, we must conclude that the UCS UI environment would preferably be based on a 3-D software standard such as OpenGL that, like gaming engines, can take advantage of this hardware.

Focusing for a moment on the needs of a generalized GIS visualizer, consistent with our general UCS principals, it must permit the visualization of positional data in a variety of ways. Unfortunately, most, if not all, standard GIS systems suffer from a serious shortcoming in this regard. The problem is, that in order to be able to render maps in a reasonable time, GIS environments must eliminate the incredibly compute intensive process of performing the necessary projection calculations on every point in the map. These calculations involve 3-D transformations using transcendental functions that for a detailed large scale map are slow on present day commercial hardware. To overcome the problem, GIS systems pre-project their maps, and all map overlays, into a given projection (usually Mercator) so that the rendering of the maps to a client window does not involve the projection calculations. Unfortunately, there are large numbers of possible map projections and each of them has particular utility for visualizing different aspects of the information being projected. High end mapping systems may hold map data in multiple projections, but this requires storage many times that of the basic map data, and cannot in any case cover all possible projections or vantage points. This means for example that when one wishes to switch projections on the fly, or alternately to overlay data in one projection (a satellite image perhaps) on another (Mercator say), one is forced to go through a lengthy re-mapping process first. If multiple overlaid projections are involved the situation becomes untenable. The ideal UCS GIS system should find a way to store/render the data in its raw latitude/longitude format and do the projections on the fly.

In intelligence, the analyst needs the ability to visualize relationships between data, not only along well defined axes (e.g., space and time), but also along arbitrary axes defined by the analyst himself. Examples of such axes might be “Adverse actions towards the US”, or “Activity relating to drugs”. Clearly, the analyst must be provided with a way to define new arbitrary axes, and to specify through some arbitrary computational means, how one should determine the intercepts for a given datum on each of these axes. Once this information is known for a given collection of data, it is relatively easy to see how graphical visualization tools can be used to good effect to look for patterns, trends, and anomalies appearing along or between a particular set of such axes. The architecture must therefore support the ability to define such axes and rapidly determine coefficient vectors for any arbitrary set of data being visualized. Because such axis computation may be computationally expensive, doing it on the fly would drastically reduce visualizer responsiveness. For this reason, the architecture would preferably provide and support the concept of a "vector server" responsible for continuously maintaining and updating coefficients for all data in persistent storage along whatever axes are currently defined. As data is fetched for visualization, the required coefficients can also be rapidly fetched from such a vector server by the visualizer. These coefficients would also form a key part of the solution to maintaining, examining, and acting upon non-explicit relationships between different system datums. It is important to understand that unlike conventional graphing axes, these arbitrary axes are non-orthogonal, each axis may be in some way related to many others. This fact can be taken advantage of to address the basic intelligence problem of not knowing exactly what one is looking for. If we imagine two related axes, one known (A) and one unknown (B), then as part of un-related work, an analyst may see the 'shadow' of a trend or anomaly related to B on the A axis, and may then be motivated to examine the causes behind this shadow, thereby discovering the existence and significance of the hitherto unexplored B axis. By subsequently defining a B axis to the system and then re-examining data in this light, new insights and relationships may become clear. This is a key aspect of the intelligence process that is not well supported by existing systems.

It is essential that the system user interface provided to the analyst take the form of a multimedia 'portal' which can be reconfigured and changed on a per-analyst basis using a simple graphical metaphor. Each analyst may in fact use multiple portals depending on the nature of the task at hand. This capability must be supported by the environment. Portals can be assembled out of any of the building blocks registered with, or provided by, the environment. The other patent applications referenced by this one combined with the technology revealed in Appendix 11 make it clear how this portal capability can be implemented. UI appearance can be drastically varied without any impact on the underlying implementation or building-blocks.

Given the scale of the problem, it is clear that we are talking about a highly distributed architecture, even individual servers must clearly be implemented as distributed clusters. Equipment changes (and breaks), the environment changes, users move and change, as do the preferences of each user over time. It is clear then that the environment must provide extensive support for the re-configuration of any system parameter that might change. Such preferences span the range from the numbers and location of machines making up a given server cluster and the equipment to which they are connected, to the font a user prefers or the color he likes to see buttons displayed in the UI. APIs and interfaces to access, distribute, and manipulate these preferences must also be provided. The goal of an environment should be to support dynamic and on-going reconfiguration of any target installation all the way from a single machine portable demo (if practical), to a worldwide distributed system and all its connected equipment, without the need to change a single line of compiled architectural code. Obviously, this goal is unattainable with most conventional approaches.

Having determined that we need an architecture that supports distributed server clusters, we should further ask ourselves what do we mean by a sever, and what is a client, in such a system. In conventional client/server architectures a server is essentially a huge repository for storing, searching, and retrieving data. Clients tend to be applications or veneers that access or supply server data in order to implement the required system functionality. In an unconstrained intelligence architecture, servers must sample from the torrent of data going though the (virtual) intake pipe. Thus it is clear that unlike the standard model, we will require our servers to automatically and in an unattended manner create and source new normalized data gleaned from the intake pipe and then examine that data to see if it may be of interest to one or more users. We need every server to have a built in client capable of sampling data in the pipe and instantiating it into the server and the rest of persistent storage as necessary. Thus we have little use for a standard 'server' but instead our minimum useful block is a server-client pair. As to the nature of the server portion itself, since each server will specialize in a different kind of multimedia data, and because the handling of each and every multimedia type cannot be defined beforehand, we see that we need a server architecture where the basic behaviors of a server (e.g., talking to a client, access to storage, etc.) are provided by the architecture but at any point where customization to server behaviors may be required, the server must call back to a plug-in API that allows system programmers to define these behaviors. Certain specialized servers will have to interface directly to legacy or specialized external systems and will have to utilize the capabilities of those external systems while still providing behaviors and an interface to the rest of the environment that hides this fact. An example of such an external system that must be masked behind our modified definition of a server might be a face, voice, or fingerprint recognition system. Thus the classic model of a big fat predefined server (a la Oracle etc.) that is purchased "as is" from a vendor, and wherein only the clients to that server can be changed by customer staff, does not apply to a UCS. Furthermore, at any time new servers may be brought on line to the system and must be able to be found and used by the rest of the system as they appear. This requirement combined with our server-client building block starts to blur the line between what is a server and what is a client. Why shouldn't any 'client' machine be able to declare its intent to 'serve' data into the environment, indeed in a large community of analysts, over time this ability is essential if analysts are to be able to build on and reference the work of others. Thus every client must also potentially be a server. The only real distinction we can draw between a mostly-server and a mostly-client is that a server tends to source a lot more data on an on-going basis than does a client. An unconstrained network architecture must therefore be more like a peer-to-peer network than it is a classic client/server model. Application code running within the system should remain unaware of the existence of such things as a relational database or servers in general if such code is to be of any general utility. What we need then is some kind of automatic environment mediated and abstracted tie-in between the definition of the data within the system, and the need to route and access all or part of that data from a distributed set of servers.

Given the intense computational and processing requirements represented by a UCS, it is clear that we cannot afford the overhead or limitations of such cross-platform interpreted languages as Java. The system must therefore be based on one or more underlying OS platforms which are accessed from the environment via direct, efficient, compiled code. Since platforms may change, and differ from each other, the architecture must provide, wherever possible, a platform independent abstraction layer to which API level application programmers can write. The UCS architecture in effect becomes its own operating system (OS), layered on top of a conventional operating system and targeted specifically at providing OS type features related to the requirements of unconstrained systems. Since we must break computation up into large numbers of smaller, autonomous, computing blocks, which exchange data (and messages) through the substrate, it is clear that a highly threaded environment is required. This cannot be a monolithic deterministic application (see Appendix 11).

Because we must pick a given OS architecture, the system should support the ability to deliver to, and interact with, its UI on a variety of client platforms perhaps via a less extensive UI set (such as a web page) or alternatively by interacting through a cross-platform GUI layer.

The analyst workload will of course require the use of a number of other commercial off-the-shelf (COTS) packages. Things like word processors, spreadsheets, Internet browsers, e-mail, sound and video editors, image analysis tools etc. The analyst needs all the same tools that a normal computer user does as well as, and in close conjunction with, the UCS environment. As a practical matter, it is clear then that the choice of platform on which to build an architecture is thus limited to the two consumer level OS platforms available, namely Windows™ and Macintosh™. Any useful UCS architecture must be capable of treating COTS software applications as building blocks in the creation of processes within the system, we do not want to re-invent everything that is provided by all the COTS applications. Thus it must be possible in the architecture to 'wrap' a COTS application in a proxy process that exists within the environment so that the functionality that application provides can be utilized in an automated and scripted manner within the environment. Ease of such application scripting is a consideration in choosing the underlying OS. Given the multimedia nature of the information in an intelligence UCS, excellent and pervasive multimedia capability in the underlying OS platform is obviously crucial. Another consideration is the level and pervasiveness of that OS's (and its COTS applications) support for foreign languages and scripting systems. OS level security is another key factor. Finally, we must consider the range of COTS solutions available on the platform. In the preferred embodiment of the system of this invention, the Macintosh™ platform is considered to be the most appropriate.

While the ability to utilize COTS packages is essential, there are often severe limitations caused by the narrow scripting interface available between distinct applications. For this reason, it is far more desirable to incorporate functionality from existing object libraries providing a rich and complete API. Such commercial object libraries (as well as open-source code) are available to cover a wide range of techniques and capabilities. The need to integrate object-code libraries implies several constraints on the approach taken by the UCS environment as far as encapsulating blocks of compiled functionality (widgets). In particular, because such libraries are built on the underlying OS Toolbox, it is essential that the UCS threaded environment appear to such code as if it were within a stand-alone application. The principal impact of this requirement is on the need for a toolbox abstraction and patching layer, as well as the approach taken to providing a UI windowing environment. Since object libraries involving UI are unaware of the UCS and yet must be integrated into UCS windows, a number of otherwise viable approaches to providing a GUI environment will not work. Given that changes to object libraries are not possible, the UCS GUI environment must take all steps necessary to ensure that non-UCS aware UI code, works un-modified within the UCS windowing environment. This UI sharing environment would preferably be implemented by associating dynamic and overlapping UI 'regions' with small executables such that the scheduling environment switches all UI parameters necessary whenever a given UI-related widget is running.

Security is obviously a major concern in most intelligence-related applications. Given the need to deliver reports and multimedia data to individuals, possibly beyond the confines of the system it is clear that reliance on security via access control alone (i.e., logging on to a Database) is not enough. Security must be built into the data itself. Given the nature of the intelligence cycle where the same item of data may be handled and annotated by many individuals, each of which may have different security privileges, we see that a sophisticated, data-centric approach to security must be supported by the environment.

The analytical process is frequently collaborative, that is it involves the need for multiple analysts to review each others work and interact with a given visualizer or display in order to discuss possible meanings for patterns found. For this reason, it is highly desirable that the UI for the UCS architecture inherently support collaboration such that users of the system residing on different machines can view and interact with a single display/portal in a coordinated manner, perhaps marking it up in a whiteboard-like manner as part of their discussions. Additionally, the ability to perform video-conferences during such sessions greatly enhances the utility of the environment. A system wherein an intelligence consumer can contact the analyst responsible for a given report and interact with both that analyst and the report is obviously far more useful than one that does not. This close interaction is critical to closing the intelligence system OODA loop (see below). Network level support for such conferencing and collaboration will be necessary.

On the subject of change, it is obvious that in any UCS connected to the external world, change is the norm, not the exception. The outside world does not stay still just to make it convenient for us to monitor it. Moreover, in any system involving multiple analysts with divergent requirements, even the data models and requirements of the system itself will be subject to continuous and pervasive change. By most estimates, more than 90% of the cost and time spent on software is devoted to maintenance and upgrade of the installed system to handle the inevitability of change.

Over and above the Bermuda Triangle effect, another software paradigm related phenomenon contributes to our inability to implement complex unconstrained systems. In object oriented programming (OOP) systems (the current wisdom), key emphasis is placed on the advantages of inheriting behaviors from ancestral classes. This removes the need for derived classes to implement basic methods of the class, allowing them to simply modify the methods as appropriate. This technique yields significant productivity improvements in small to medium sized systems, and is ideally suited to addressing some problem domains, notably the problem of constructing user interfaces. However, as size, complexity, and rate of environmental change are scaled beyond these limits, the OOP technique, rather than helping the situation, serves only to aggravate it. Because the implementation of an object becomes a non-localized phenomenon, tendrils of dependency are created between classes, and the ability of others to rapidly examine a piece of code during the maintenance and upgrade portion of the development (the bulk of the actual effort) is made more difficult. OOP systems generally introduce the concept of multiple inheritance to handle the fact that most real world objects are not exactly one kind of thing or another, but are rather mixtures of aspects of many classes. Unfortunately, multiple inheritance only makes the scaling problem worse. The maintainer is forced to examine and internalize the operation of all inherited classes before being able to understand the code and being sure that his change is correct. Worse than this, the 'right' change generally involves changes to the assumptions and implementation of some ancestral class, and this in turn often has a ripple effect on other descendent classes. Eventually, such systems max out at a level of complexity represented roughly by what can fit into a single programmer's brain. While this may be large, it is not large enough to address the complexity of a system for understanding world events, and thus an object oriented approach to attacking such a massive problem is essentially doomed to failure. OOP techniques still rely on the notion of one controlling top-down design. No such design exists in a complex UCS. Since we have said that change is fundamental to the nature of an unconstrained intelligence system, it is obvious that in addition to all the problems detailed above, we must also move to a totally new software paradigm and methodology if we are to succeed in this endeavor.

To summarize the principal issues that lead one to seek a new paradigm to address unconstrained systems, they are as follows:

(a) Change is the norm. The incoming data formats and content will change. The needs and requirements of the analysts using the data will change, and this will be reflected not only in their demands of the UI to the system, but also in the data model and field set that is to be captured and stored by the system.

(b) An unconstrained system can only sample from the flow going through the pipe that is our digital world. It is neither the source nor the destination for that flow, but simply a monitoring station attached to the pipe capable of selectively extracting data from the pipe as it passes by.

(c) The system cannot 'control' the data that impinges on it. Indeed we must give up any idea that it is possible to 'control' the system that the data represents. All we can do is monitor and react to it. This step of giving up the idea of control is one of the hardest for most people, especially software engineers, to take. After all, we have all grown up to learn that software consists of a 'controlling' program which takes in inputs, performs certain predefined computations, and produces outputs. Every installed system we see out there complies with this world view, and yet it is obvious from the discussion above that this model can only hold true on a very localized level in a UCS. The flow of data through the system is really in control. It must trigger execution of code as appropriate depending on the nature of the data itself. That code must be localized and autonomous. It cannot cause or rely upon tendrils of dependency without eventually clogging up the pipe. The concept of data initiating control (or program) execution rather than the other way is alien to most programmers, and yet it becomes fundamental to addressing unconstrained systems. See Appendix II for details.

(d) We cannot in general predict what algorithms or approaches are appropriate to solving the problem of 'understanding the world', the problem is simply too complex. Once again we are thus forced away from our conventional approach of defining processing and interface requirements, and then breaking down the problem into successively smaller and smaller sub-problems. Again, it appears that this uncertainly forces us away from any idea of a 'control' based system and into a model where we must create a substrate through which data can flow and within which localized areas of control flow can be triggered by the presence of certain data. The only practical approach to addressing such a system is to focus on the requirements and design of the substrate and trust that by facilitating the easy incorporation of new plug-in control flow based 'widgets' and their interface to data flowing through the substrate, it will be possible for those using the system to develop and 'evolve' it towards their needs. In essence, the users, knowingly or otherwise, must teach the system how they do what they do as a side effect of expressing their needs to it. Any more direct attempt to extract knowledge from analysts to achieve computability, has in the experience of the author been difficult, imprecise, and in the end contradictory and unworkable. No two analysts will agree completely on the meaning of a set of data, nor will they concur on the correct approach to extracting meaning from data in the first place. Because all such perspectives and techniques may have merit, the system must allow all to co-exist side by side, and to contribute, through a formalized substrate and protocol, to the meta-analysis that is the eventual system output. It is illustrative to note that the only successful example of a truly massive software environment is the Internet itself. This success was achieved by defining a rigid set of protocols (IP, HTML etc.) and then allowing Darwinian-like and unplanned development of autonomous but compliant systems to develop on top of the substrate. A similar approach is required in the design of unconstrained systems.

Any data substrate that is intended to model and understand the real world must, of necessity, imitate it in order to represent it. Just as for our own mental models, simulation must be an integral part of analysis in order to evaluate potentials. This immediately implies that some data can be artificial or predictive while other data may be 'real.' Both must be represented and behave identically within the environment. Furthermore, all data objects within the system must have the potential to have a spatial and temporal position. Many patterns evolve along the time axis and most 'events' involve, or are precipitated by, physical proximity in both space and time between the actors involved. This means that it must be possible to reconstruct the state of a captured datum at any point in time. Failure to embody this concept at the datum level would prevent the substrate from faithfully representing reality, and thus would involve the need to re-introduce complex control programs to supply this aspect. These control based edifices would naturally tend to diverge and thus leach and/or dissipate utility out of the environment rendering it non-uniform and less useful as an interchange medium. A simulation in an unconstrained environment should just be an evolving set of data in which some portion (but not by any means all) is predictive or program generated. Once such artificial data outlives its utility, it must be easily purged from the environment to make way for a new simulation run. It is this failure to treat simulations as an integral part of a UCS that makes them so difficult to develop, and once developed, makes their results out of date, irrelevant and difficult to apply back to the real world. A well designed UCS architecture, in addition to all its other benefits, provides a means whereby simulations can become useful, relevant, and pervasive parts of the intelligence cycle (or indeed any application). This is a radical departure from current day simulation practice.

SUMMARY OF INVENTION

The present system and method meets each of these requirements and provides a robust and flexible system for storing, parsing, analyzing and typed data that is stored in a virtual ontological tree and is later available for retrieval from offline, near line, or cache based storage and is viewed and processed in the language, interface and with the desired hyperlinks associated with the given User over a P2P or client-server architecture in a dynamic fashion and/or based on one or more user profiles. The issues presented herein are fully detailed in the patent applications that have been filed relating to the architecture described and attached hereto as appendices. This application details to the system level approach, in which each of these features are provided in a single UCS system.

The present invention provides the following:

1. A system for converting incoming unstructured data into a well described normalized form. Since the incoming data is multimedia and may represent some data type for which support is provided by the underlying OS platform, this normalized form includes the ability to fully describe and manipulate arbitrarily complex native or non-native binary structures and collections. This support is provided by a dedicated 'mining' language tied intimately to the current system ontology (see appendices 6 and 7).

2. A system for accessing and manipulating data held either in memory or in persistent storage in its normalized binary form so that small executables, or 'widgets', within the system can freely and effectively operate on data types they have never before encountered simply by knowledge of the 'type' of data involved (see appendix 4).
3. An 'ontology' or world model that represents and contains the items and fields necessary for the target system to perform its function. The ontology would preferably fully specify the form of the normalized binary data.
4. A memory system, tied to the ontology, which defines the structure of and access to any persistent storage containers that are required to contain the data.
5. A memory management system for splitting incoming data into those portions to be directed to each container.
6. A query system for querying each container to retrieve portions of such a composite object. Preferably, all database tables and queries are auto-generated from the ontology, thereby eliminating the role of the conventional Database Administrator (DBA).
7. A UI to display and interact with data within the system. In the preferred embodiment, the UI is automatically generated and its behaviors automatically handled by the underlying substrate thus removing this programming burden from the developer (thereby largely eliminating the role of the GUI programmer).
8. A memory system that forms collections of datums, and enables manipulation and exchange of these collections both within the local machine as well as across the network. In the preferred embodiment, such collections support the ability to attach arbitrary tags or annotations to the binary data they contain without in any way altering the binary representation itself. Additionally, the system supports the concept of either null or dirty (i.e., has been changed locally) datum.
9. The means (preferably implemented in software running on a processor) to specify, investigate and manipulate the inheritance of behaviors and fields from ancestral types described in the system ontology.
10. Support for incremental changes to the ontology and automated handling of the implementation and impact of those changes both on persistent storage as well as the UI and other dependant areas.
11. Inherent and pervasive support for the concept of units and their interchangeability. In other words, this system does not leave unit handling to the application logic. Such an approach would make it very difficult to meaningfully and easily exchange data.

For the purposes of this discussion, various appendices will be referenced and are fully incorporated herein. Each of these appendixes describe in detail one embodiment for the various pieces of the UCS system. As will be appreciated, various other functions and approaches could also be used.

The reader is referred to these lower level building-block patent applications as follows:

1) Appendix 1—Flat Memory Model (page 47)
2) Appendix 2—Lexical Analyzer (page 60)
3) Appendix 3—Parser (page 81)
4) Appendix 4—Run-time type system (page 104)
5) Appendix 5—Collections (page 132)
6) Appendix 6—Ontology (page 191)
7) Appendix 7—MitoMine (page 230)
8) Appendix 8—User-centric Hyperlinks (page 257)
9) Appendix 9—User Interface Localization (page 289)
10) Appendix 10—Client/Server and MSS Architecture (page 301)
11) Appendix 11—Data-Flow (page 362)

Process Flow and Related Issues

It is important to understand the intelligence process in more detail before attempting to describe the software architecture to address the problem. A conventional description of the intelligence process would lead one to define a system as a linear flow from inputs (feeds) to outputs (reports) having the following basic stages:

1) Capture
2) Storage, Retrieval & Indexing
3) Search & Monitoring
4) Analysis
5) Presentation While this is a wholly inappropriate way to design a system, and does not reflect the reality of the intelligence process, nonetheless this breakdown gives us a useful framework in which to further examine some of the issues.

Capture

The main issue here is the large number of sources and types of data, each with its own unique requirements. Some of these sources and the associated issues are discussed below:

Video

The robust capture and use of video information presents one of the biggest challenges to a multimedia intelligence architecture. High quality video digitization, storage, and playback places the ultimate test on the server architecture and its associated mass storage subsystem. A great deal of external capture equipment is required including (but not limited to) satellite dishes, tuners, receivers (PAL, SECAM and NTSC—all variants), format converters, video switches, VCRs (multi-format), digitizers, CODECs, satellite tracking systems, de-scramblers, cable feeds etc. It is clear that the system must provide a framework for the definition, reconfiguration, and statusing of all the equipment connected to it. All equipment must be under automatic and transparent control of the system based on capture requests from the users. To this end, the system must provide some kind of TV guide capability with the ability to request programs of interest. Additionally, a 'snapshot' view showing all currently captured channels at the client workstations is required with the means to click on such a snapshot image and immediately request live view and/or capture of the material involved. Video (live or captured) must be streamed across the network to client workstations where it can be viewed and/or edited. This represents not only a massive network load, but also due to the CPU intense nature of the capture, storage, and streaming process, it is clear that a video server cluster will require large numbers of machines to act in unison in order to support realistic client loads. Such a server architecture does not exist in the commercial space and thus must be developed and provided by the UCS architecture. Given a limited pool of equipment available for the capture process, and the differing costs of using a given equipment item to satisfy a user request, it is clear that the environment must provide some form of equipment scheduling capability which attempts to map present and future requests onto the available capture equipment by means of some kind of weighted graph. Equipment item usage cost is determined by how much the available stream capture capacity will be degraded by the use of that item. For example, many older satellites 'wobble' so these and other satellites require active tracking using a moveable dish. Most commercial satellites can be captured by fixed dishes. Assuming that a smaller number of mobile dishes exist than fixed, it is obvious that allocating one such dish to a given capture reduces remaining capacity far more than does the use of a fixed dish with multiple feed-horns and a splitter. The same effect is repeated through the equipment chain that must be created (e.g., format converters, switches etc.) in order to meet any given request. Capture equipment design and wiring needs to anticipate this problem and minimize this degradation effect. For example, use of a cable TV head-end to distribute captured video, removes the blocking implied by use of an analog switch to connect source to digitizer. This is a complex issue and must be closely coordinated with the system design and capabilities. Much equipment relating to video processing is not designed for computer control, and thus the system may have to provide the ability to control such equipment via IR links or whatever other means is provided. A generalized and fully programmable (from within the system) controller interface is required in this case. Massive storage capacity is needed to handle video. A key aspect of making use of video is to be able to determine what is being said during a given segment (e.g., a news report). There are a number of approaches to this problem, firstly, at least of a large number of NTSC transmissions, closed captioned text is provided and equipment is available to capture this. Since we wish to maintain the correspondence between a particular portion of a video and what is being said (to aid in search, retrieval, and playback), we can see that this text 'track' must be stored in parallel with, and using the same time code as, the video itself. The QuickTime™ architecture is ideal for this purpose, since it defines movies to be comprised of one or more tracks each of which can contain different media types. Thus the present system creates as an output to the capture process a movie containing not only the video and sound tracks, but also a text track, and quite possibly later one or more voice-over tracks.

Text to speech, although in its infancy is another approach although this applies less well to foreign languages. The choice of video CODEC is determined by the quality required as well as by the need for real-time symmetric capture and playback, preferably using CPU resources alone, not dedicated cards (which rapidly become obsolete). Storage of multiple video resolutions can significantly reduce the required server resources. Video sources, especially those derived from terrestrial transmissions, must be captured locally, thus it is clear that a 'logical' video subsystem is likely to be physically distributed, possibly globally. Given the streaming nature of video, this implies a number of other challenges relating to streaming, load balancing, and storage. The UCS architecture must support mechanisms whereby all these requirements can be tailored and handled. Much of the video captured (especially in PAL and SECAM formats) will not have a text track and therefore a key aspect of video capture (and indeed any multimedia capture) is the ability to 'tag' the video with other related items (such as news stories) which are more easily associated. The environment must support arbitrary tagging of any datum with any other datum(s) in order to render it 'computable'. A distributed video server and client(s), video snapshot server and client(s), equipment server and client(s), and various other video related technology have been fully implemented based on the technologies revealed in the referenced patent applications, particularly Appendix 10. The details of these implementations and some of the unique features involved will be fully revealed in future patent applications.

News Feeds

News stories and reports form one of the most useful, timely, and easily leveraged forms of open-source feed. News feeds are available in many languages and come in both localized (national) and global varieties. Examples are Reuters, API, BBC etc. Feeds are delivered in a variety of ways including satellite downlinks, analog land-lines, Internet sites, dial-up access, and CD-ROM based delivery. Archival news feeds are usually available for purchase from the publishers although delivery media can be archaic. There is little standardization in format between the feeds although an XML standard for Internet delivery is in its infancy. Multilingual issues abound and normalization can be quite a challenge. Many local feeds have poor quality control over syntactic structure. News feeds are characterized by a relatively low bandwidth with a high semantic content. Storage issues are minimal. For these reasons, the present system provides a news server based on the technologies revealed in appendix 7 and appendix 10 has been fully implemented under the system of this invention.

Photo Wire Feeds

Photo wire feeds are available from many of the same global sources as are news feeds, and delivery platforms span a similar range. Images come in a huge variety of standard (and not so standard) formats and the system must natively handle all of these, or at a minimum convert losslessly to one of them. Images can be quite large and an associated mass storage subsystem is required. Unlike video, isochronous delivery to the client is not required. The concept of an image preview or 'picon' is key to ensuring that full image retrieval is only required for analysis or editing. Images from these sources can form a powerful part of any multimedia presentation. Many sources of photo wires also provide graphics and illustrations which are intended for use in publications supported by the feed. These graphics (e.g., stock charts, topical maps, etc.) can be very helpful in understanding issues and in presenting conclusions. Support for the capture, storage, and retrieval/use of these graphics must also be provided by the environment. Graphic formats are generally different from image formats since they are intended to allow editing of the graphic for incorporation into page-layout and similar applications. The Adobe Illustrator™ format appears to be the most widespread. An Image server based on the technology revealed in patent reference 10 and which is capable of handling all image types discussed herein, has been fully implemented under the system of this invention.

Satellite Imagery

Satellite Imagery is an important part of the intelligence process. Satellite images are essentially just high resolution images which contain additional semantic meaning by virtue of the fact that the 'where' for the image can be computed by knowledge of the satellite parameters and position involved. Thus it is clear that there is a close tie-in between satellite imagery, and the mapping and GIS facility that must be provided by the environment. The environment must be able to automatically project/overlay the image with respect to a map background so that the information it contains can be related back to other data in the system. Satellite images generally contain multiple 'bands' of data for different frequencies and sensors, and these bands can be used or combined to extract additional knowledge regarding the contents of the image. Tools for this purpose must be provided. Commercial satellite imagery comes from a variety of sources including weather satellites, LandSat, SPOT etc. Delivery mechanisms for some (e.g., weather) involve the use of receiving dishes. For others, the imagery is delivered on a variety of media (often tape) or by FTP download. For the most part, satellite imagery is a non-real-time feed. Government agencies may have access to a number of other forms of satellite imagery whose nature and content is not discussed herein.

Specialized Imagery

Particular applications may require support for other specialized forms of imagery with additional semantic meaning. Examples include fingerprints, identification, x-ray images, astronomy, etc. Each of these types essentially requires its own server subsystem to provide extraction and support for the additional semantics. The environment provides for the easy creation of such servers. Most such sources will require a connection to some external equipment or system to provide capture and possibly storage and search of the imagery. In all other ways however, such subsystems are similar to the generic imagery subsystem.

Sounds

Like video, recorded sound can convey a richness and subtlety far beyond that possible with other media types. Because video often includes sound, there is an obvious overlap between the two data types. Sounds come in a number of formats and have widely varying quality levels. Like video, sound must be delivered isochronously to the client, however, data rates are significantly lower though still high enough to require a clustered server and associated mass storage subsystem. Sound sources include phone recordings, covert intercepts, and published media. Like video, a key consideration with sound in order to attain computability, is the ability to convert it into one or more associated text tracks. For this reason, the sound architecture of the present system, like video, uses a time based media framework such as QuickTime™. As with video, voice-overs (or translations) are supported as distinct tracks. Text tracks are, in parallel, routed to the text subsystem to allow associative search. A sound server based on the technology revealed in referenced patent 10 is the preferred embodiment of such a server.

Internet

This source is perhaps the most widespread and the easiest to capture of any of the sources described. Unfortunately, with the exception of a few trusted sites, it is also one of the lowest grade and most misleading sources on which to base any automated calculations. Techniques to crawl or spider the web are widespread and readily available, often built into the underlying OS (e.g., the Macintosh™ 'Sherlock' facility), and because it is web data (i.e., HTML or even better tagged XML) it is designed to facilitate easy capture and use by digital systems. The web contains many invaluable trusted sources for real time data such as news, stock feeds, weather etc. and provided one sticks to these, it forms a key part of monitoring what is going on in the world. The rest of the web data, i.e., the un-trusted bulk of it, must be treated with skepticism much in the manner needed for a covert intercept. That is a 'discriminator' phase is required to determine usefulness and relevance. This having been said, much valuable insight can be obtained from such data, especially if one includes e-mail capture into the equation. Storage requirements for web capture are relatively manageable, and like news feeds it is characterized by high semantic content (once filtered). The key issue for any secure installation, is that mining the web on an automated basis implies a connection between the system and the web itself. This is dangerous and often totally unacceptable, especially in government installations. For this reason, the system provides the ability to control a 'drone' insecure capture capability which then uploads its finds, via a secure path, to the system itself (which may not be physically connected to the web in any way). Such an Internet server based is preferable based on the technology disclosed in Appendix 7 and Appendix 10.

Published Data Sources

Perhaps the highest grade and most reliable of all non-covert sources, published data also comprises the largest single source of any described. There are literally tens of thousands of different database and information publishers, each specializing in particular areas. The total amount of data available is immeasurably larger than the total content of the Internet. Few publishers post any high grade data on the web due to the lack of a business model to do so. Many that have done so have now gone out of business and this process is on-going. Because the livelihood of such sources is predicated on their continuing completeness and quality, published data provides some of the best supplies of background information necessary to populate a system's 'lens' of understanding. Published data sources come in many forms and tend to be expensive. CD-ROMs are now becoming the dominant distribution media although on-line databases such as Lexus/Nexus contain vast amounts of information that can be easily accessed and incorporated into the environment.

The extraction of information from these sources tends to be a non-real-time batch process and requires a parsing process that can parse data on a per-source basis. Because publishers have no interest in facilitating the automated extraction of their intellectual property, this data tends to be in semi-structured formats with all kinds of inconsistent usage, even within the same data source. On-line sources tend to have built-in defenses against automated mining. To extract useful normalized data from these sources therefore, the present invention provides a very powerful, generalized, and robust data mining framework tied to the system data models. The ability to rapidly absorb a new published source and seamlessly integrate it into the system enables the system to react in a focused and informed manner to on-going events. When a particular new issue suddenly becomes critical, as they always do, it is likely that very little information exists in the system on the subject. To empower the analysts to rapidly come up to speed on the issue and make analyses relating to it, the system provides a turnaround time measured in hours or at the most days, to acquire and integrate new published sources. Classic mining techniques and system architectures cannot meet this requirement. The preferred technology for enabling this aspect of the system is described in Appendix 7.

Legacy Systems

All large organizations utilize as part of their operations a number of 'legacy' information processing environments both internal and external. Much of what an organization is, has, and knows is encapsulated in these systems. Such legacy systems do not go away, and often tend to be based on old or antiquated equipment. The present system makes use of the information contained within these systems as part of it's operation. Generally such legacy systems present themselves as databases, usually relational. The ability to access, mine, and source/sink data to/from these legacy systems is often essential to system operation. More specifically, the architecture provides a generalized framework for interfacing to and using such systems through the specification of 'scripts' utilized via an encapsulating UCS server. Ideally, the implementation of a connection to such a legacy system would involve little more than definition of the necessary logical scripts. The SQL language makes this relatively easy although it is often the case that custom code is required in order to implement such a connection. The UCS architecture also provides the means whereby plug-in modules, defined on a per application, per legacy system basis, can be registered within a standard UCS server. In legacy systems, external containers may also be grouped by providing customized functionality specific to a given data type. Thus for example, a connection to a fingerprint recognition system would be treated as a legacy system requiring an encapsulating UCS server. The system and methods disclosed in Appendix 7 and Appendix 10 are sufficient to implement such a custom legacy interfaces.

Manual Data Entry

In certain cases, this may be the only practical means of capturing data, especially data that does not yet exist in the digital domain. The UCS environment also supports the ability to perform manual data entry based on a system ontology. One refinement of this is the provision of a programmable UI scripting capability to provide for the possibility that a process can be written to obtain the data somehow, and enter it not by ontology based mining, but rather by scripted data entry. Once any data (manually entered or otherwise) is in the system, it is also possible to edit and change it and thus the auto-generated UI to the system supports data entry, complete with some level of validity checking, based directly on the system ontology definitions. The preferred ontological framework of the present invention is described in Appendix 6.

Documents

Much textual data exists in the form of word processing documents and this is a legitimate source of data for the system. Word processing documents are generally not just simply plain text, but rather contain embedded formatting and style information mixed in with the actual content. These formats are often proprietary. The final appearance of the document may have more information content to it than would be represented by the textual content alone, and for this reason a compliant system must have the ability to store and retrieve these documents in their original form, possibly for additional modification using the appropriate COTS application. Text held in these proprietary formats may not be directly useable for system functions. For these reasons, the system is able to strip the plain text content out of such documents and normalize it. The existence of scriptable COTS applications, capable of import/export of a variety of text formats makes this practical by creating UCS wrapper servers that script such applications, extract the normalized information by scripting COTS applications (or by dedicated plug-in code), and store/retrieve the full document contents as required. Some of the more common formats include PDF, Word, RTF and others. See appendix 7 for further details of this aspect of the system.

Maps

Full support for the capture, visualization, and creation of maps is also provided by the system. Sources of such mapping data include such government agencies as NIMA, USGS, the US Census and others. Custom specialize maps are often created by dedicated COTS mapping environments. Such environments generally support import/export to/from a number of standard map interchange formats and the UCS map support also includes the ability to input and output from/to some number of such formats. In the case of more global and extensive data such as that from government agencies, the system provides the inherent ability to mine and normalize such data for system mapping purposes. NIMA maps can be obtained for the entire world on CD-ROM sets formatted according to MIL-STD-2407 (Vector map 0 and 1) and the ability to mine and interpret this format is basic to system operation. Targa and similar data are also be natively supported. Detailed world maps require significant amounts of storage at the map server(s) but not more than can be accommodated on the large disks (or raid arrays) available today. Speed of random access to the data stored on these disks is absolutely critical to map server rendering performance and in the most demanding situations, budget permitting, massive fronting RAM disks and preferably also large amounts of system RAM at the server (to allow data internalization) will be required. A compliant map and GIS server is preferably based upon the technology described in Appendix 5 and Appendix 10.

Covert Digital Intercepts

Few organizations outside government intelligence agencies have the resources or legal rights to engage in this kind of activity. For this reason, let us assume the existence of equipment and systems capable of taking a digital stream off a satellite or 'tapped' communications path, de-multiplexing it into its constituent parts, and delivering those parts to the intelligence system either as text or standard multimedia data. A number of significant issues occur once the source of data is an intercept, and these need to be anticipated by the architecture. Firstly, the syntactic and semantic quality of the data is likely to be much lower than for other forms of capture. This is partly because the data was not intended for capture, but also because the de-multiplexing and re-assembly processes will be less than perfect and so some of the data may be partial, corrupt, or unusable. This implies a far greater burden on the robustness of the process used to convert data into its normalized form. If the approach taken is to 'parse' the input in some manner, it now becomes essential that the parser have error recovery and fallback strategies, rather than simply aborting following a syntax error. In this manner, it remains possible to extract and possibly use those portions of the item that are valid while retaining corrupt portions for possible subsequent interpretation by human beings or other processes in the environment. The variety of forms that are likely to be encountered in covert intercepts is significantly greater than for most other feeds and as a result the present invention provides a robust mechanism to decide 'what' a given item represents prior to invoking a parser or parsers to attempt to normalize it. Generally with other feeds, this identification phase is relatively simple. With non-covert feeds (other than the Internet), it is frequently the case that all or most incoming data is captured to persistent storage. With covert feeds, this is seldom the case. Much of the content of a covert feed may be irrelevant, thus the system provides an additional 'phase' in the capture process that is responsible for determining if the item should be kept or discarded. This determination is preferably under the control of the analysts using the system and the specific algorithm used will differ between analysts, data types, and over time. This 'discriminator' phase is closely tied with the concept of 'Interest Profiles' or alerts defined by the analysts and running autonomously in the system servers. See referenced appendix 7 and appendix 10 for details on the technology that is preferably used to implement this functionality.

Others

There are of course an almost infinite number of other possible media types and sources. Examples might include seismic data, monitoring systems of all kinds, stock feeds, scientific experiments etc. The intrinsic ability to add these data types to the ontology and rapidly implement an encapsulating server(s) for acquisition, search and retrieval, is fundamental to the present invention.

Storage, Retrieval & Indexing

The issue of storage and the strategies necessary to effectively index items in storage for rapid retrieval takes on a whole new level of complexity. The main problem is that each different multimedia type implies a different storage and indexing requirement. This means that the conventional approach, i.e., store everything in a relational database system (RDBMS), does not work well.

RDBMS storage is essentially based on the use of grids or matrices to store information. Because each cell in the matrix has a known size, efficient indexed access is possible. An RDBMS system is therefore best suited to the storage, search, and retrieval of small fixed sized fields, especially those that are numeric. For this reason in a UCS environment, RDBMS storage makes most sense when applied to these kinds of fields, not to large text fields or multimedia content. More specifically, because storage is distributed across a number of dissimilar 'containers' of which a RDBMS/SQL container is just one, it is clear that in order to re-assemble a complete multimedia item for display, we need a common unique ID number that can the applied to all containers to retrieve content for an item (see Appendix 6). The RDBMS system is ideal for defining these ID numbers and retrieving the basic fixed sized fields of an item. In the preferred embodiment, RDBMS data tends to be relatively small, and generally fits easily onto a single large disk.

Variable sized text fields are best stored and searched via an inverted-file text engine. In the inverted file approach, for each significant word in the dictionary, the inverted file stores a list of all documents containing that word and the position(s) of that word within the document. Search and retrieval in this system therefore occurs via the inverted file list which is far more efficient than the corresponding brute force keyword scan in an RDBMS. Additionally, because of the inverted file organization, statistical word relationships can be built up from the full set of data in the system and this allows powerful concept type searches which are poorly supported under RDBMS systems. Text stored in an inverted file container tends to be moderately large and may require a RAID array. Furthermore, the inverted file itself is generally best placed on a separate fast disk (array) preferably fronted by a large RAM disk/cache to increase search and query performance (see appendix 10 for additional details).

Video information requires storage capacities many orders of magnitude larger than those described above. Terabyte or petabyte capacities are not uncommon. In addition, the nature of video is that it must be delivered to the client as an isochronous (i.e., constant data rate) stream at a relatively high bandwidth. Furthermore, the CPU load represented by the actual streaming process is considerable, and thus conventional desktop computers are capable of delivering only a small number of high quality video streams at a time. Another key aspect of video is that any given video segment contains a time axis and thus to find and view a relevant portion of the video the ability to tie searchable/indexed information to this time axis is required. For all these reasons, video probably represents the worst case scenario for any UCS storage, indexing and delivery architecture. To address the storage capacity, the present system supports robotic autoloader mass storage using fast random-access media (to minimize wait time to start a play). Media types like CD-ROM and DVD are a natural match. Obviously because these media types have limited sustained data-rates by comparison with fast disk, but more importantly have a relatively long 'seek' period, it is not practical to sustain multiple streams from a single such disk. For this reason, the system also provides automatic disk caching during playback and supports large numbers of media drives into any given area of robotic storage and media duplication. Automated, unattended 'burning' of media and migration from capture cache is also provided and is preferably implemented. Finally, because of the CPU load and the need for isochronous playback, the video server is implemented as a large cluster of machines tightly integrated with the robotic storage so that the 'master' machine can select a 'drone' machine on the basis of current loading (or otherwise), load the media into a drive connected to that drone, and then commands the drone to perform playback. See Appendix 10 for additional details. Indexing implications have been discussed previously under "Capture" above.

Image data can be relatively large and generally requires a robotic autoloader component, however, unlike the video case, there is no isochronous requirement (since image files can be 'downloaded' entirely when accessed) and the need for a large image cluster is reduced. As a result, in the preferred embodiment, the image storage consists of a low resolution 'picon', accessible immediately from server disk storage. This is then combined with a high resolution full image which may require robotic access to retrieve. Many client uses of images can be handled using the picon alone thus avoiding excessive robotic accesses. Indexing in the case of images is straightforward since they are simply referenced via the common unique ID shared between all containers (see Appendix 6 and Appendix 10).

The storage requirements for Maps have been discussed previously under "Capture". Map indexing is totally different form all other forms above in that it is spatial, that is that the map is accessed mainly by spatial position. Unlike other data types described above, maps can be constructed on-the-fly from a map database, and thus the map container is capable of responding to map requests without the need for an 'id'. Specialized maps can also be saved and then referenced, and in this case the unique 'overlays' that customize the 'default' base map overlays are probably best be stored either in the RDBMS container or in other ontology derived storage along with details of the map projection, scale, and other legend elements.

The Internet presents another unique storage situation. In the case of the Internet, indexing is via URL, and the storage device is the Internet itself. Nonetheless, this variant is transparently fitted into the same abstraction as all others described above. Other data types may imply yet more variants of the storage and indexing problem.

It should be noted that the product of many feeds to the system is not a single type as discussed above, but rather some combination of multimedia parts each of which must be routed to the appropriate container but tied back to each other by use of a common unique ID. This dispersal aspect is further discussed in Appendix 6.

Search & Monitoring

One of the primary issues with searching over multiple dissimilar 'containers' is the need to create a framework within which the necessary search plug-ins can be registered with the environment and the corresponding GUI necessary to easily specify such a search can be tied-in to match. As described above, each container presents a different set of search capabilities varying from standard SQL and text searches to such things as voice and image recognition.

The present system provides a two-layer approach to querying and query specification. The lower layer represents the registered search capabilities of each specific container. The 'language' supported by this lower layer is completely open ended in order to permit new media types and search engines to be easily added to the environment. The result of a search conducted at the lower layer is a list of 'hits' (i.e., unique ID, together with relevance and other details if appropriate) that is then passed to the upper query layer. This upper layer has a well defined and preferably limited language, the primary purpose of which is to specify logical combinations of the hit-list results returned by the lower layer modules. Thus the language contains such Boolean operations as AND, OR and NOT. In addition, to support query optimization based on knowledge of the query domain, operators like AND THEN are also supported. The AND THEN operator implies that the query appearing before the operator is performed first and the resulting hit-list is then passed along with the query appearing after the operator. This allows efficient pruning of the search space in the container(s) implementing the second portion of the query. Other operators that would preferably be supported at the upper level include such things as MAX (limit # of hits returned), RELEVANCE (limit relevance returned), ORDER BY, GROUP BY etc. Further details of a system that can provided this functionality is set forth in Appendix 6.

In the preferred embodiment, a querying GUI whose outermost aspect relates to the upper query layer, and within which specialized UI 'pages' can be displayed in order to specify container specific lower level queries is provided. The nature of these UI plug-in modules for well known querying engines such as SQL or inverted text files is fairly straightforward. When the list is broadened to sounds, videos, images, maps etc., however, the variety of UI components embedded within the querying interface in a unified manner becomes quite large. As such, querying and selection via visualizers is tied into the present invention.

Examples of plug-in search engines (accessed via corresponding GUI) include:

a) SQL—basic numerical, date, range, keyword, Boolean etc. search criteria.
b) Text—statistical relatedness, stemming, proximity, multilingual, fuzzy and concept searches.
c) Images—Face recognition, pattern recognition, fingerprints, clustered and similar searches.
d) Video—Searches based on text track, voice recognition, scene analysis, closed caption etc.
e) Maps—topological queries (within, next to, etc.), spatial relationships, terrain features, range, distances, routes, measured paths etc.

As to the issue of monitoring new inputs to the system for compliance with certain criteria, this can be treated as simply an automated query applied to new input. For example, a multi-container query can be defined that returns only those hits that meet our desired criteria and then launches this query into the system to be automatically applied to all new input. This type of automated query will be referred to as an "Interest Profile" (see Appendix 10). The benefits of the two layered query approach now becomes clear because this same mechanism may be applied by combining the 'hits' from parts of an interest profile in order to determine if a globally compliant 'hit' has occurred.

Unfortunately, the business of monitoring new inputs can be considerably more complicated because of the fact that not all algorithms to define a 'match' can be expressed directly to the querying layer. Often, to determine a match the analyst may need to combine a number of different functions. For this reason, the system provides 'widgets', each of which is capable of performing part of the analysis using whatever techniques are appropriate. This means that in addition to distributed queries in the querying language, widgets are preferably distributed that form part of the matching algorithm. The system of the present invention allows as large a range of widgets as possible to be used in defining these analyses. As such, the system provides a distributed framework whereby arbitrary algorithms expressed either as searches or via widget wiring can be placed into the input pipe of the UCS and can result in automated notification of the analyst when the desired match is found. See appendix 10 and 11 for additional details.

Notification to the analyst may be as simple as beeping (or speaking) at his terminal and maintaining a list of pending hits to be viewed. Alternatively, notification could be handled via automated e-mail delivery. Finally, the present invention supports the ability to initiate execution of arbitrary widgets supplied by the user to perform whatever action in necessary when a match occurs. By using this facility, the system can now trigger automated but targeted responses to the occurrence of any given situation. Obviously the nature and scale of these responses is limited only by the imagination of those configuring a particular UCS system. See appendix 10 for details.

Analysis

The thrust of this invention is the infrastructure and architecture necessary to support any combination of analytical tools, and to allow those tools to interact between each other over a common substrate. There are literally thousands of effective analytical tools out there, most of them operating in splendid 'stovepipe' isolation, some small fraction of them available as COTS applications. Such tools can be integrated into a UCS and used in conjunction with others which, in combination with the other features provided by the present invention, can be used with devastating effect. The only 'analytical tools' that would preferably be built in to any UCS is a suite of visualizers, the basic querying tools, and the ability to "wire" these tools and others together into ever more elaborate domain specific algorithms. The UCS architecture preferably facilitates and captures this process using the system and method disclosed in Appendix 11.

Presentation

As discussed previously, the final stage of the intelligence process is to deliver analyses to the intelligence consumer in a form that is multimedia rich, and which can allow that consumer to interact with the analysis in order to examine assumptions and determine if more information is needed. Reports must themselves be active and interactive custom portals relating to a given subject. The creation of such reports must be made easy enough that analysts themselves can accomplish this step. More importantly, reports are not static, that is, once an intelligence consumers needs are sufficiently well understood and algorithms designed to meet those needs have been expressed, it is essential that the system be able to deliver 'today's report on . . . ' to the consumer on an automated basis with no further analyst involvement. This trend is already being seen in web portals that allow limited customization on a per user basis. Obviously, an intelligence system must take this approach to a whole new level. As mentioned previously certain end users will require a simplified 'executive' interface and the present invention provides such an interface. A goal, at least for some consumers, is to allow them to directly express their own interest profiles and to have these (as well as those from analyst initiated profiles) appear in their portals immediately any 'hit' occurs. This closes the intelligence OODA loop (see below) and allows the consumer to determine what additional analyses he needs in a much more timely manner. Through this approach the system can manage the information overload problem that is experienced by the intelligence consumer himself, not just that of the intelligence professionals he tasks. See appendix 10 and 11 for details.

The Intelligence Cycle

In the traditional intelligence cycle, the intelligence consumers make known their needs for information via requests that are passed to the organization that assigns priorities to information requirements. Determination of priorities leads to tasking which results in the various collection mechanisms or agencies taking steps to gather the raw information necessary to pass on to the analysts. After performing whatever analyses best fit the problem domain, the analysts prepare reports, which are then reviewed and coordinated and finally disseminated back to the original intelligence consumer.

The cycle described above represents the best thinking on how intelligence should work from the 1940's and 1950's. The cycle is still utilized today by the government intelligence community. In today's fast moving and information rich environment, such a cycle is unfortunately inadequate to the task of tracking the complexities of unfolding world events. A full description of the problems with such a cycle is beyond the scope of this document, however, the basic problems can be summarized as follows:

a) The cycle is too slow. Indeed it is not clear that it is a cycle at all, since most requests result in just one iteration. The existence of various organizations/bureaucracies in the cycle combined with the time taken for information to pass through the bureaucratic interfaces in the loop mean that the cycle cannot keep up with evolving events.

b) Because it is essentially command driven, the cycle only allows looking into questions that the intelligence consumer already 'knows' to ask. As discussed previously, the reality is that the cycle must support the discovery of things you didn't even know were important. The September 11th attacks provide a perfect example. This top-down approach may have suited a situation where the enemy was known and stable (i.e., USSR), but it does not deal well with today's world where enemies are small, distributed, loosely coupled, change constantly, and can have impacts disproportionate to their size. The intelligence consumer cannot anticipate all possible threats and task the complete cycle to investigate each.

c) The lack of feedback in the cycle between the consumer and the analyst, combined with the inability of the consumer to directly access and examine the backup material leading to analytical conclusions, tends to create a situation where the final product may not meet the consumer's requirements and thus redundant iterations through the cycle with corresponding increases in time and cost are required.

Modern competitive and business intelligence cycles are now based on some derivative of the Boyd cycle (or OODA loop). This cycle was developed by Colonel John Boyd as a result of his studies (and experience) of air-to-air combat in the Korean war. What Boyd discovered was that the main factors that enabled US pilots to consistently win dogfights, were firstly that their F-86 fighter aircraft's canopy was larger than that of the opposing Mig-15's, thus giving a greater field of vision, and secondly, that although the F-86 aircraft was larger and slower, it was more maneuverable (higher roll-rate) thus allowing US pilots to make more frequent adjustments. Boyd was later largely responsible for the design of the F-15 canopy and perhaps more than anyone else, contributed to development and deployment of the F-16. The result of formalizing and abstracting Boyd's insight became a fundamental part of air-force tactics and later of military tactics in general.

The central idea behind the OODA loop is that all thinking entities are executing OODA loops of their own (consciously or otherwise), the key to success in any conflict or competition is therefore either:

a) Being able to cycle around the loop faster than your opponent.

b) Disrupt the opponents OODA loop to cause him to slow down or make mistakes.

c) Alter the tempo and rhythms of your own loop so that the opponent cannot keep up with you.

For a full description of the OODA loop and how it ties in with the intelligence problem, as well as a complete bibliography in this area, see the paper "Avoiding Information Overload Through the Understanding of OODA Loops, A Cognitive Hierarchy and Object-Oriented Analysis and Design" by Dr. R. J. Curts, CDR, USN (Ret.), and Dr. D. E. Campbell, LCDR, USNR-R(Ret.). This paper can be downloaded from www.belisarius.com. This site deals with business intelligence and is heavily focused on the work of Boyd. While this author is not in complete agreement with the paper's assertion that object oriented (OO) techniques provide a practical approach to addressing the issue, the paper does effectively describe the need for a ground-up approach, and a consistent method for representing and storing data.

For this reason, the intelligence cycle itself needs to become a Boyd cycle. The speed with which it is possible to iterate through the loop is critical to success. Moreover, this same OODA loop would preferably be practiced at all levels of the intelligence hierarchy. This need for rapid iteration and recursive loop cycling is a key driver for the end-to-end UCS approach described in this document. By using the present system, the barriers between intelligence consumers and those involved in the intelligence process itself can be broken down, and the rapid feedback loop required can be implemented. Most importantly however, the key lesson of Boyd's teachings is that the ability to rapidly adapt to change is the single most important determinant in any competitive situation. The present system provides a data-flow system that is driven entirely off ontology, allowing almost instantaneous modification and adaptation to changes in the environment. No other approach currently offers this capability, and thus, no other current approach stands any chance of addressing today's critical need in the intelligence community.

A High-Level Intelligence Ontology

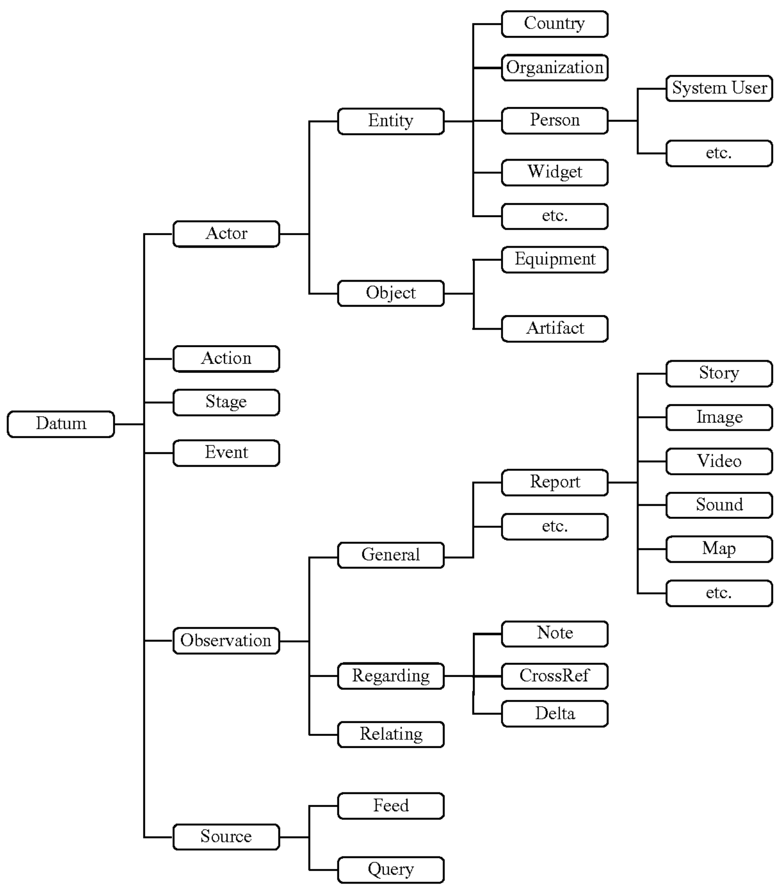

The ontology presented above is an example high-level ontology targeted at intelligence. This is an example and in no way should such an ontology be mandated by the system architecture. A full discussion of this example ontology is given in Appendix 6. For the purpose of deriving some level of meaning from incoming observations, the application of such an ontology can be summarized as follows:

1) Over time, or by pre-loading from published or legacy sources, the system builds up a set of known actors that can be identified by name (or alias) in new input. In addition, the ontology for actions must be populated. At the same time, system input sources are identified and the necessary scripts to convert the contents of those sources into the normalized system ontology (primarily as observations) are developed.

2) Once the stream of observations from feeds is underway, the dictionary of actors and actions can be used to identify which data in the system an observation relates to (i.e., the actors involved), and the kinds of interactions that are occurring between those data (actions). Over time, the system builds up statistics on the relations between various elements of the ontology.

3) Analysts define conceptual axes to the system together with the algorithms necessary to compute axis intercepts. These conceptual axes can now be used to re-cast the data in the system in a new light, looking for trends, relationships and anomalies.

4) Analysts build models for the motives of various entities and to define algorithms for mapping between motives and the actions available to those entities. This allows modeling and prediction to be used as part of the matching process in the input stream. More importantly, system data can now be re-cast and visualized in light of the motive-action models in order to look for patterns in the data that significantly correlate with meeting the motives of specific entities of interest. Since entities rarely announce their intentions beforehand, this ability to interpret incoming data in terms of how it maps to entity motive models is key to finding insights to answer the 'who' and 'why' questions.

5) The process of 'event reconstruction' also occurs. That is, given the observations the system receives, knowledge of the actors involved and models of those actors motives and available action space, the system is able to perform a surface-tension type analysis looking for explanations of the event described that most closely match the motives of one or more of the initiating (i.e., subject, not object) actors involved. By postulating that this is in fact what occurred in the event, it becomes possible to define a pattern in the observations leading up to the event that represent an indicator that a given entity, or entities, are attempting to cause a similar event to occur. Much of this process involves the analyst using the various visualization tools. Alternatively, however, the process can be automated as the analyst expresses the algorithms he believes imply a given motive vector is occurring.

6) Examination/visualization of 'instrumented' events occurring over a period of time against entity-motive models allow the system to reveal trends, patterns, and anomalies in those events. This in turn yields the possibility of identifying hidden entity involvement, known entity 'meta-intent', and ultimately in using that knowledge to predict future behavior. Once future behavior can be predicted to some level of accuracy, the system can allow the intelligence consumer to move from a reactive to a proactive role in order to influence the occurrence (or non-occurrence) of that behavior. Once this point has been reached, the system allows the Boyd-cycle described in the previous section to be iterated over more quickly and thus gives the intelligence consumer a significant advantage over others, this is of course the ultimate goal of any intelligence system.

To present these ontology ideas in a more graphical and perhaps more intuitive way, think of the problem as though it were a particle-physics experiment occurring within an accelerator. In this example, suppose the experiment consists of a target into which is fired a particle beam. The collisions between the beam and the target produce events which emit a set of secondary particles which may be observed using different sensor devices each designed to detect a particular particle type. The data streams resulting from each sensor are fed into a computer for recording and subsequent analysis. Since it is likely that not all particles resulting from the collision are detected, the purpose of the analysis is to use the data gathered to infer exactly what type of event must have occurred during the collision and from that to deduce the nature and behavior of the particles involved. The next stage is then to use this model to predict other events and then search for the signatures of those events in order to confirm the model.

In an intelligence system the situation is very similar although the terminology changes. A number of sensors and other data capture devices capture aspects of an event (or future event). The goal of the system is still to reconstruct what event has occurred by analysis of the observation data streams coming from the various feeds. The variety of feed and sensor types is infinitely larger than in the particle physics case, however, as for the particle physics case, many effects of the event are not observed. The major difference between the two systems is simply the fact that in the intelligence system, the concept of an event is distributed over time and detectable particles are emitted a long time before what is considered "the event". This is simply because the interacting 'particles' are intelligent entities, for which a characteristic is forward planning, and which as a result give off 'signals' that can be analyzed via a UCS in order to determine intent. In the recent September 11th attacks, for example, there were a number of prior indicators (e.g., flight training school attendance) that were consistent with the fact that such an event was likely to happen in the future. The intelligence community failed to recognize the emerging pattern, however, due to the magnitude of the search, correlation, and analysis task. This is exactly the issue addressed using the UCS of the present invention combined with a domain specific ontology and the other capabilities.

From the discussion above, it is clear that a radically different approach is needed to solving the problem of unconstrained systems. The architecture of the present invention is based on the concept of a distributed data-flow driven environment, rather than a conventional control-flow based solution. The form, content, and behavior of the data in the environment is described via an ontology that is specific to the given application. Control and/or data flow based programs (known as widgets) are caused to begin execution by virtue of a matching set of data objects or tokens appearing on the input data-flow pins of the widget. When they complete, they produce a set of resultant data tokens on their outputs that then become part of the environment (persistent or otherwise). Thus, a widget that is capable of processing images would specify at least one input pin of type image such that when an image passed through the intake pipe, it could appear at the widget's input pin and cause it to execute. By contrast, conventional systems allocate execution time to a program without knowledge of what it is actually doing, and it is up to the program itself to seek out and acquire its required inputs. To do this, the program requires detailed knowledge of its environment, and the need for this knowledge reduces the generality of the program and increases the overall rigidity of the system thus making it resistive to change and more likely to develop a 'stovepipe' topology. By adopting the radical approach to attacking the problem, the present invention provides an open-ended architecture on which intelligence and similar applications can be built.

Appendix 1

SYSTEM AND METHOD FOR MANAGING MEMORY

BACKGROUND OF THE INVENTION

The Macintosh Operating system ("OS"), like all OS layers, provides an API where applications can allocate and de-allocate arbitrary sized blocks of memory from a heap. There are two basic types of allocation, viz: handles and pointers. A pointer is a non-relocatable block of memory in heap (referred to as *p in the C programming language, hereinafter "C"), while a handle is a non-relocatable reference to a relocatable block of memory in heap (referred to as **h in C). In general, handles are used in situations where the size of an allocation may grow, as it is possible that an attempt to grow a pointer allocation may fail due to the presence of other pointers above it. In many operating systems (including OS X on the Macintosh) the need for a handle is removed entirely as a programmer may use the memory management hardware to convert all logical addresses to and from physical addresses.

The most difficult aspect of using handle based memory, however, is that unless the handle is 'locked', the physical memory allocation for the handle can move around in memory by the memory manager at any time. Movement of the physical memory allocation is often necessary in order to create a large enough contiguous chunk for the new block size. The change in the physical memory location, however, means that one cannot 'de-reference' a handle to obtain a pointer to some structure within the handle and pass the pointer to other systems as the physical address will inevitably become invalid. Even if the handle is locked, any pointer value(s) are only valid in the current machine's memory. If the structure is passed to another machine, it will be instantiated at a different logical address in memory and all pointer references from elsewhere will be invalid. This makes it very difficult to efficiently pass references to data. What is needed, then, is a method for managing memory references such that a reference can be passed to another machine and the machine would be able to retrieve or store the necessary data even if the physical address of the data has been changed when transferred to the new machine or otherwise altered as a result of changes to the data.

SUMMARY OF THE INVENTION

The following invention provides a method for generating a memory reference that is capable of being transferred to different machine or memory location without jeopardizing access to relevant data. Specifically, the memory management system and method of the present invention creates a new memory tuple that creates both a handle as well as a reference to an item within the handle. In the latter case, the reference is created using an offset value that defines the physical offset of the data within the memory block. If references are passed in terms of their offset value, this value will be the same in any copy of the handle regardless of the machine. In the context of a distributed computing environment, all that then remains is to establish the equivalence between handles, which can accomplished in a single transaction between two communicating machines. Thereafter, the two machines can communicate about specific handle contents simply by using offsets.

The minimum reference is therefore a tuple comprised of the handle together with the offset into the memory block, we shall call such a tuple an 'ET_ViewRef' and sample code used to create such a tuple 100 in C is provided in FIG . 1. Once this tuple has been created, it becomes possible to use the ET_ViewRef structure as the basic relocatable handle reference in order to reference structures internal to the handle even when the handle may move. The price for this flat memory model is the need for a wrapper layer that transparently handles the kinds of manipulations described above during all de-referencing operations, however, even with such a wrapper, operations in this flat memory model are considerably faster that corresponding OS supplied operations on the application heap.

BRIEF DESCRIPTION OF THE FIGURES

FIG. 1 illustrates sample code used to create the minimum reference 'tuple' of the present invention;

FIG. 2 illustrates a drawing convention that is used to describe the interrelationship between sub-layers in one embodiment of the present invention;

FIG. 3 illustrates a sample header block that may be used to practice the present invention;

FIG. 4 illustrates a simple initial state for a handle containing multiple structures;

FIG. 5 illustrates the type of logical relationships that may be created between structures in a handle following the addition of a new structure;

FIG. 6 illustrates a sample of a handle after increasing the size of a given structure within the handle beyond its initial physical memory allocation;

FIG. 7 illustrates the manner in which a handle could be adapted to enable unlimited growth to a given structure within the handle;

FIG. 8 illustrates the handle after performing an undo operation;

FIG. 9 illustrates a handle that has been adapted to include a time axis in the header field of the structures within the handle;

FIG. 10 illustrates the manner in which the present invention can be used to store data as a hierarchical tree; and FIG. 11 illustrates the process for using the memory model to sort structures within a handle.

DETAILED DESCRIPTION

Descriptive Conventions

In order to graphically describe the architectural components and interrelations that comprise the software, this document adopts a number of formalized drawing conventions. In general, any given software aspect is built upon a number of sub-layers. Referring now to FIG. 2, a block diagram is provided that depicts these sub-layers as a 'stack' of blocks. The lowest block is the most fundamental (generally the underlying OS) and the higher block(s) are successive layers of abstraction built upon lower blocks. Each such block is referred to interchangeably as either a module or a package.

The first, an opaque module 200, is illustrated as a rectangular in FIG. 2A. An opaque module 200 is one that cannot be customized or altered via registered plug-ins. Such a form generally provides a complete encapsulation of a given area of functionality for which customization is either inappropriate or undesirable.

The second module, illustrated as T-shaped form 210 in FIG. 2B, represents a module that provides the ability to register plug-in functions that modify its behavior for particular purposes. In FIG. 2A, these plug-ins 220 are shown as 'hanging' below the horizontal bar of the module 210. In such cases, the module 210 provides a complete 'logical' interface to a certain functional capability while the plug-ins 220 customize that functionality as desired. In general, the plug-ins 220 do not provide a callable API of their own. This methodology provides the benefits of customization and flexibility without the negative effects of allowing application specific knowledge to percolate any higher up the stack than necessary. Generally, most modules provide a predefined set of plug-in behaviors so that for normal operation they can be used directly without the need for plug-in registration.

In any given diagram, the visibility of lower layers as viewed from above, implies that direct calls to that layer from higher-level layers above is supported or required as part of normal operation. Modules that are hidden vertically by higher-level modules, are not intended to be called directly in the context depicted.

FIG. 2C illustrates this descriptive convention. Module 230 is built upon and makes use of modules 235, 240, and 245 (as well as what may be below module 245). Module 230, 235 and 240 make use of module 245 exclusively. The functionality within module 240 is completely hidden from higher level modules via module 230,however direct access to modules 250 and 235 (but not 245) is still possible.

In FIG. 2D, the Viewstructs memory system and method 250 is illustrated. The ViewStructs 250 package (which implements the memory model described herein) is layered directly upon the heap memory encapsulation 280 provided by the TBFilters 260, TrapPatches 265, and WidgetQC 270 packages. These three packages 260, 265, 270 form the heap memory abstraction, and provide sophisticated debugging and memory tracking capabilities that are discussed elsewhere. When used elsewhere, the terms ViewStructs or memory model apply only to the contents of a single handle within the heap.

To reference and manipulate variable sized structures within a single memory allocation, we require that all structures start with a standard header block. A sample header block (called an ET_Hdr) may be defined in C programming language as illustrated in FIG. 3. For the purpose of discussing the memory model, we shall only consider the use of ET_Offset fields 310, 320, 330, 340. The word 'flags' 305, among other things, indicates the type of record follows the ET_Hdr. The 'version' 350 and 'date' fields 360 are associated with the ability to map old or changed structures into the latest structure definition, but these fields 350, 360 are not necessary to practice the invention and are not discussed herein.

Referring now to FIG. 4, FIG. 4 illustrates a simple initial state for a handle containing multiple structures. The handle contains two distinct memory structures, structure 410 and structure 420. Each structure is preceded by a header record, as previously illustrated in FIG. 3, which defines its type (not shown) and its relationship to other structures in the handle. As can be seen from the diagram, the 'NextItem' field 310 is simply a daisy chain where each link simply gives the relative offset from the start of the referencing structure to the start of the next structure in the handle. Note that all references in this model are relative to the start of the referencing structure header and indicate the (possibly scaled) offset to the start of the referenced structure header. The final structure in the handle is indicated by a header record 430 with no associated additional data where 'NextItem=0'. By following the 'NextItem' daisy chain it is possible to examine and locate every structure within the handle.

As the figure illustrates, the 'parent' field 340 is used to indicate parental relationships between different structures in the handle. Thus we can see that structure B 420 is a child of structure A 410. The terminating header record 430 (also referred to as an ET_Null record) always has a parent field that references the immediately preceding structure in the handle. Use of the parent field in the terminating header record 430 does not represent a "parent" relationship, it is simply a convenience to allow easy addition of new records to the handle. Similarly, the otherwise meaningless 'moveFrom' field 330 for the first record in the handle contains a relative reference to the final ET_Null. This provides an expedient way to locate the logical end of the handle without the need to daisy chain through the 'nextItem' fields for each structure.

Referring now to FIG. 5, FIG. 5 illustrates the logical relationship between the structures after adding a third structure C 510 to the handle. As shown in FIG. 5, structure C 510 is a child of B 420 (grandchild of A 410). The insertion of the new structure involves the following steps:

1) If necessary, grow the handle to make room for C 510, C's header 520, and the trailing ET_Null record 430;
2) Overwrite the previous ET_Null 430 with the header and body of structure C 510.
3) Set up C's parent relationship. In the illustrated example, structure C 510 is a child of B 420,which is established by pointing the 'parent' field of C's header file 520 to the start of structure B 420.
4) Append a final ET_Null 530, with parent referenced to C's header 520.
5) Adjust the 'MoveFrom' field 330 to reflect the offset of the new terminating ET_Null 530.

In addition to adding structures, the present invention must handle growth within existing structures. If a structure, such as structure B 420,needs to grow, it is often problematic since there may be another structure immediately following the one being grown (structure C 510 in the present illustration). Moving all trailing structures down to make enough room for the larger B 420 is one way to resolve this issue but this solution, in addition to being extremely inefficient for large handles, destroy the integrity of the handle contents, as the relative references within the original B structure 420 would be rendered invalid once such a shift had occurred. The handle would then have to be scanned looking for such references and altering them. The fact that structures A 410,B 420, and C 510 will generally contain relative references over and above those in the header portion make this impractical without knowledge of all structures that might be part of the handle. In a dynamic computing environment such knowledge would rarely, if ever, be available, making such a solution impractical and in many cases impossible.

For these reasons, the header for each structure further includes a moveFrom and moveTo fields. FIG. 6 illustrates the handle after growing B 420 by adding the enlarged B' structure 610 to the end of the handle. As shown, the original B structure 420 remains where it is and all references to it (such as the parent reference from C 510) are unchanged. B 420 is now referred to as the "base record" whereas B' 610 is the "moved record". Whenever any reference is resolved now, the process of finding the referenced pointer address using C code is:

```
src = address of referencing structure header
dst = src + ET_Offset value for the reference
if ( dst->moveTo )
      dst = dst + dst->moveTo       -- follow the move
```

Further whenever a new reference is created, the process of finding the referenced pointer using C code is:

```
src = address of referencing structure header
dst = address of referenced structure header
if ( dst->moveFrom )
      dst = dst + dst->moveFrom;
ref value = dst − src
```

Thus, the use of the moveto and movefrom fields ensures that no references become invalid, even when structures must be moved as they grow.

FIG. 7 illustrates the handle when B 420 must be further expanded into B" 710. In this case the 'moveTo' of the base record 420 directly references the most recent version of the structure, in this example B" 710. Correspondingly, the record B" 710 now has a 'moveFrom' 720 field that references the base record 420.B's moveFrom 720 still refers back to B 420 and indeed if there were more intermediate records between B 420 and B" (such as B' 610 in this example) the 'moveTo' and 'moveFrom' fields for all of the records 420, 610, 710 would form a doubly linked list. Once each of these records 420,610, 710have been linked, it is possible to retrace through all previous versions of a structure using these links. For example, one could find all previous versions of the record starting with B" 710 by following the 'movefrom' field 720 to the base record 420 and then following the 'nextitem' link of each record until a record with a 'moveFrom' referencing the base record 420 is found. Alternatively, and perhaps more reliably, one could look for structures whose 'moveTo' field references record 420 and then work backward through the chain to find earlier versions.

This method, in which the last 'grown' structure moves to the end of the handle, has the beneficial effect that the same structure is often grown many times in sequence and in these cases we can optionally avoid creating a series of intermediate 'orphan' records. References occurring from within the bodies of structures may be treated in a similar manner to those described above and thus by extrapolation one can see that arbitrarily complex collections of cross-referencing structures can be created and maintained in this manner all within a single 'flat' memory allocation.

The price for this flat memory model is the need for a wrapper layer that transparently handles the kinds of manipulations described above during all de-referencing operations, however, even with such a wrapper, operations in this flat memory model are considerably faster that corresponding OS supplied operations on the application heap. Regardless of complexity, a collection of cross-referencing structures created using this approach is completely 'flat' and the entire 'serialization' issue is avoided when passing such collections between processors. This is a key requirement in a distributed data-flow based environment.

In addition to providing the ability to grow and move structures without impacting the references in other structures, another advantage of the 'moveTo'/'moveFrom' approach is inherent support for 'undo'. FIG. 8 illustrates the handle after performing an 'undo' on the change from B' to B". The steps involved for 'undo' are provided below:

```
src = base record (i.e., B)
dst = locate 'moved' record (i.e. B") by following 'moveTo' of base
record
prev = locate last record in handle whose 'moveTo' references dst
src->moveTo = prev − src;
```

The corresponding process for 'redo' (which restores the state to that depicted after B" was first added) is depicted below:

```
src = base record (i.e., B)
dst = locate 'moved' record (i.e. B') by following 'moveTo' of base
record
if ( dst->moveTo )
      nxt = dst + dst->moveTo
src->moveTo = nxt − src;
```

This process works because of the fact that 'moveTo' fields are only followed once when referencing via the base record. The ability to trivially perform undo/redo operations is very useful in situations where the structures involved represent information being edited by the user, it is also an invaluable technique for handling the effects of a time axis in the data.

One method for maintaining a time axis is by using a date field in the header of each structure. In this situation, the undo/redo mechanism can be combined with a 'date' field 910 in the header that holds the date when the item was actually changed. This process is illustrated in FIG. 9 (some fields have been omitted for clarity).

This time axis can also be used to track the evolution of data over time. Rather than using the 'moveTo' fields to handle growing structures, the 'moveTo' fields could be used to reference future iterations of the data. For example, the base record could specify that it stores the high and low temperatures for a given day in Cairo. Each successive record within that chain of structures could then represent the high and low temperatures for a given date 910, 920, 930, 940. By using the 'date' fields 910, 920, 930, 940 in this fashion, the memory system and method can be used to represent and reference time-variant data, a critical requirement of any system designed to monitor, query, and visualize information over time. Moreover, this ability to handle time variance exists within the 'flat' model and thus data can be distributed throughout a system while still retaining variance information. This ability lends itself well to such things as evolving simulations, database record storage and transaction rollback, and animations.

Additionally, if each instance of a given data record represents a distinct version of the data designed for a different 'user' or process, this model can be used to represent data having multiple values depending on context. To achieve this, whatever variable is driving the context is simply used to set the 'moveTo' field of the base record, much like time was used in the example above. This allows the model to handle differing security privileges, data whose value is a function of external variables or state, multiple distinct sources for the same datum, configuration choices, user interface display options, and other multi-value situations.

A 'flags' field could also be used in the header record and can be used to provide additional flexibility and functionality within the memory model. For example, the header could include a 'flag' field that is split into two parts. The first portion could contain arbitrary logical flags that are defined on a per-record type basis. The second portion could be used to define the structure type for the data that follows the header. While the full list of all possible structure types is a matter of implementation, the following basic types are examples of types that may be used and will be discussed herein:

kNullRecord—a terminating NULL record, described above.

kStringRecord—a 'C' format variable length string record.

kSimplexRecord—a variable format/size record whose contents is described by a type-id.

kComplexRecord—a 'collection' element description record (discussed below)

kOrphanRecord—a record that has been logically deleted/orphaned and no longer has any meaning.

By examining the structure type field of a given record, the memory wrapper layer is able to determine 'what' that record is and more importantly, what other fields exist within the record itself that also participate in the memory model, and must be handled by the wrapper layer. The following definition describes a structure named 'kComplexRecord' and will be used to illustrate this method:

```
typedef struct ET_Complex             //      Collection element record
{
    ET_Hdr                                    hdr;         // Standard header
    ...
    ET_Offset /* ET_SimplexPtr   */           valueR;      // value reference
    ET_TypeID                                 typeID;      // ID of this type
    ET_Offset /* ET_ComplexPtr   */           nextElem;    // next elem. link
    ET_Offset /* ET_ComplexPtr   */           prevElem;    // prev. elem. link
    ET_Offset /* ET_ComplexPtr   */           childHdr;    // First child link
    ET_Offset /* ET_ComplexPtr   */           childTail;   // Last child link
} ET_Complex;
```

The structure defined above may be used to create arbitrary collections of typed data and to navigate around these collections. It does so by utilizing the additional ET_Offset fields listed above to create logical relationships between the various elements within the handle.

FIG. 10 illustrates the use of this structure 1010 to represent a hierarchical tree 1020. The ET_Complex structure defined above is sufficiently general, however, that virtually any collection metaphor can be represented by it including (but not limited to) arrays (multi-dimensional), stacks, rings, queues, sets, n-trees, binary trees, linked lists etc. The 'moveTo', 'moveFrom' and 'nextItem' fields of the header have been omitted for clarity. The 'valueR' field would contain a relative reference to the actual value associated with the tree node (if present), which would be contained in a record of type ET_Simplex. The type ID of this record would be specified in the 'typeID' field of the ET_Complex and, assuming the existence of an infrastructure for converting type IDs to a corresponding type and field arrangement, this could be used to examine the contents of the value (which could further contain ET_Offset fields as well).

As FIG. 10 illustrates, 'A' 1025 has only one child (namely 'B' 1030), both the 'childHdr' 1035 and 'childTail' 1040 fields reference 'B' 1030, this is in contrast to the 'childHdr' 1045 and 'childTail' 1070 fields of 'B' 1030 itself which reflect the fact that 'B' 1030 has three children 1050, 1055, 1060. To navigate between children 1050, 1055, 1060, the doubly-linked 'nextItem' and 'prevItem' fields are used. Finally the 'parent' field from the standard header is used to represent the hierarchy. It is easy to see how simply by manipulating the various fields of the ET_Complex structure, arbitrary collection types can be created as can a large variety of common operations on those types. In the example of the tree above, operations might include pruning, grafting, sorting, insertion, rotations, shifts, randomization, promotion, demotion etc. Because the ET_Complex type is 'known' to the wrapper layer, it can transparently handle all the manipulations to the ET_Offset fields in order to ensure referential integrity is maintained during all such operations. This ability is critical to situations where large collections of disparate data must be accessed and distributed (while maintaining 'flatness') throughout a system.

FIG. 11 illustrates the process for using the memory model to "sort" various structures. A sample structure, named ET_String 1100 , could be defined in the following manner (defined below) to perform sorting on variable sized structures:

```
typedef struct ET_String                              // String Structure
{
    ET_Hdr     hdr;                                   // Standard header
    ET_Offset /* ET_StringPtr */ nextString;          // ref. to next string
    ...
    char       theString[ 0 ];                        // C string (size varies)
} ET_String;
```

Prior to the sort, the 'nextString' fields 1110, 1115, 1120, 1125 essentially track the 'nextItem' field in the header, indeed 'un-sort' can be trivially implemented by taking account of this fact. By accessing the strings in such a list by index (i.e., by following the 'nextString' field), users of such a 'string list' abstraction can manipulate collections of variable sized strings. When combined with the ability to arbitrarily grow the string records as described previously (using 'moveTo' and 'moveFrom'), a complete and generalized string list manipulation package is relatively easy to implement. The initial 'Start' reference 1130 in such a list must obviously come from a distinct record, normally the first record in the handle. For example, one could define a special start record format for containers describing executable code hierarchies. The specific implementation of these 'start' records are not important. What is important, however, is that each record type contain a number of ET_Offset fields that can be used as references or 'anchors' into whatever logical collection(s) is represented by the other records within the handle.

The process of deleting a structure in this memory model relates not so much to the fields of the header record itself, but rather to the fields of the full structure and the logical relationships between them. In other words, the record itself is not deleted from physical memory, rather it is logically deleted by removing from all logical chains that reference it. The specific manner in which references are altered to point "around" the deleted record will thus vary for each particular record type. FIG. 12 illustrates the situation after deleting "Dog" 1125 from the string list 1100 and 'C' 1050 from the tree 1020.

When being deleted, the deleted record is generally 'orphaned'. In order to more easily identify the record as deleted, a record may be set to a defined record type, such as 'kOrphanRecord'. This record type could be used during compression operations to identify those records that have been deleted. A record could also be identified as deleted by confirming that it is no longer referenced from any other structure within the handle. Given the complete knowledge that the wrapper layer has of the various fields of the structures within the handle, this condition can be checked with relative ease and forms a valuable double-check when particularly sensitive data is being deleted.

The compression process involves movement of higher structures down to fill the gap and then the subsequent adjustment of all references that span the gap to reduce the reference offset value by the size of the gap being closed during compression. Once again, the fact that the wrapper layer has complete knowledge of all the ET_Offset fields within the structures in the handle make compression a straightforward operation.

The foregoing description of the preferred embodiment of the invention has been presented for the purposes of illustration and description. For example, the term "handle" throughout this description is addressed as it is currently used in the Macintosh OS. This term should not be narrowly construed to only apply to the Macintosh OS, however, as the method and system could be used to enhance any sort of memory management system. The descriptions of the header structures should also not be limited to the embodiments described. While the defined header structures provide examples of the structures that may be used, the plurality of header structures that could in fact be implemented is nearly limitless. Indeed, it is the very flexibility afforded by the memory management system that serves as its greatest strength. For these reasons, this description is not intended to be exhaustive or to limit the invention to the precise form disclosed. Many modifications and variations are possible in light of the above teaching. In particular due to the simplicity of the model, hardware based implementations can be envisaged. It is intended that the scope of the invention be limited not by this detailed description, but rather by the claims appended hereto.

Appendix 2

SYSTEM AND METHOD FOR ANALYZING DATA

BACKGROUND OF THE INVENTION

Lexical analyzers are generally used to scan sequentially through a sequence or "stream" of characters that is received as input and returns a series of language tokens to the parser. A token is simply one of a small number of values that tells the parser what kind of language element was encountered next in the input stream. Some tokens have associated semantic values, such as the name of an identifier or the value of an integer. For example if the input stream was:

```
dst = src + dst->moveFrom
```

After passing through the lexical analyzer, the stream of tokens presented to the parser might be:

```
(tok=1,    string="dst") -- i.e., 1 is the token for identifier
(tok=100, string="=")
(tok=1,string="src")
(tok=101, string="+")
(tok=1,string="dst")
(tok=102, string="->")
(tok=1,string="moveFrom")
```

To implement a lexical analyzer, one must first construct a Deterministic Finite Automaton (DFA) from the set of tokens to be recognized in the language. The DFA is a kind of state machine that tells the lexical analyzer given its current state and the current input character in the stream, what new state to move to. A finite state automaton is deterministic if it has no transitions on input E (epsilon) and for each state, S, and symbol, A, there is at most one edge labeled A leaving S. In the present art, a DFA is constructed by first constructing a Non-deterministic Finite Automaton (NFA). Following construction of the NFA, the NFA is converted into a corresponding DFA. This process is covered in more detail in most books on compiler theory.

In FIG. 1, a state machine that has been programmed to scan all incoming text for any occurrence of the keywords "dog", "cat", and "camel" while passing all other words through unchanged is shown. The NFA begins at the initial state (0). If the next character in the stream is 'd', the state moves to 7, which is a non-accepting state. A non-accepting state is one in which only part of the token has been recognized while an accepting state represents the situation in which a complete token has been recognized. In FIG. 1, accepting states are denoted by the double border. From state 7, if the next character is 'o', the state moves to 8. This process will then repeat for the next character in the stream. If the lexical analyzer is in an accepting state when either the next character in the stream does not match or in the event that the input stream terminates, then the token for that accepting state is returned. Note that since "cat" and "camel" both start with "ca", the analyzer state is "shared" for both possible "Lexemes". By sharing the state in this manner, the lexical analyzer does not need to examine each complete string for a match against all possible tokens, thereby reducing the search space by roughly a factor of 26 (the number of letters in the alphabet) as each character of the input is processed. If at any point the next input token does not match any of the possible transitions from a given state, the analyzer should revert to state 10 which will accept any other word (represented by the dotted lines above). For example if the input word were "doctor", the state would get to 8 and then there would be no valid transition for the 'c' character resulting in taking the dotted line path (i.e., any other character) to state 10. As will be noted from the definition above, this state machine is an NFA not a DFA. This is because from state 0, for the characters 'c' and 'd', there are two possible paths, one directly to state 10, and the others to the beginnings of "dog" and "cat", thus we violate the requirement that there be one and only one transition for each state-character pair in a DFA.

Implementation of the state diagram set forth in FIG. 1 in software would be very inefficient. This is in part because, for any non-trivial language, the analyzer table will need to be very large in order to accommodate all the "dotted line transitions". A standard algorithm, often called 'subset construction', is used to convert an NFA to a corresponding DFA. One of the problems with this algorithm is that, in the worst-case scenario, the number of states in the resulting DFA can be exponential to the number of NFA states. For these reasons, the ability to construct languages and parsers for complex languages on the fly is needed. Additionally, because lexical analysis is occurring so pervasively and often on many systems, lexical analyzer generation and operation needs to be more efficient.

SUMMARY OF INVENTION

The following system and method provides the ability to construct lexical analyzers on the fly in an efficient and pervasive manner. Rather than using a single DFA table and a single method for lexical analysis, the present invention splits the table describing the automata into two distinct tables and splits the lexical analyzer into two phases, one for each table. The two phases consist of a single transition algorithm and a range transition algorithm, both of which are table driven and, by eliminating the need for NFA to DFA conversion, permit the dynamic modification of those tables during operation. A third 'entry point' table may also be used to speed up the process of finding the first table element from state 0 for any given input character (i.e, states 1 and 7 in FIG. 1). This third table is merely an optimization and is not essential to the algorithm. The two tables are referred to as the 'onecat' table and the 'catrange' tables. The onecat table includes records, of type "ET_onecat", that include a flag field, a catalyst field, and an offset field. The catalyst field of an ET_onecat record specifies the input stream character to which this record relates. The offset field contains the positive (possibly scaled) offset to the next record to be processed as part of recognizing the stream. Thus the 'state' of the lexical analyzer in this implementation is actually represented by the current 'onecat' table index. The 'catrange' table consists of an ordered series of records of type ET_CatRange, with each record having the fields 'lstat' (representing the lower bound of starting states), 'hstat' (representing the upper bound of starting states), 'lcat' (representing the lower bound of catalyst character), 'hcat' (representing the upper bound of catalyst character) and 'estat' (representing the ending state if the transition is made).

The method of the present invention begins when the analyzer first loops through the 'onecat' table until it reaches a record with a catalyst character of 0, at which time the 'offset' field holds the token number recognized. If this is not the final state after the loop, the lexical analyzer has failed to recognize a token using the 'onecat' table and must now re-process the input stream using the 'catrange' table. The lexical analyzer loops re-scanning the 'catrange' table from the beginning for each input character looking for a transition where the initial analyzer state lies between the 'lstat' and 'hstat' bounds, and the input character lies between the 'lcat' and 'hcat' bounds. If such a state is found, the analyzer moves to the new state specified by 'estat'. If the table runs out (denoted by a record with 'lstat' set to 255) or the input string runs out, the loop exits.

The invention also provides a built-in lexical analyzer generator to create the catrange and onecat tables. By using a two-table approach, the generation phase is extremely fast but more importantly, it can be incremental, meaning that new symbols can be added to the analyzer while it is running. This is a key difference over conventional approaches because it opens up the use of the lexical analyzer for a variety of other purposes that would not normally be possible. The two-phase approach of the present invention also provides significant advantages over standard techniques in terms of performance and flexibility when implemented in software, however, more interesting applications exist when one considers the possibility of a hardware implementation. As further described below, this invention may be implemented in hardware, software, or both.

BRIEF DESCRIPTION OF THE FIGURES

FIG. 1 illustrates a sample non-deterministic finite automaton.

FIG. 2 illustrates a sample ET_onecat record using the C programming language.

FIG. 3 illustrates a sample ET_catrange record using the C programming language.

FIG. 4 illustrates a state diagram representing a directory tree.

FIG. 5 illustrates a sample structure for a recognizer DB.

FIG. 6 illustrates a sample implementation of the Single Transition Module.

FIG. 7 illustrates the operation of the Single Transition Module.

FIG. 8 illustrates a logical representation of a Single Transition Module implementation.

FIG. 9 illustrates a sample implementation of the Range Transition Module.

FIG. 10 illustrates a complete hardware implementation of the Single Transition Module and the Range Transition Module.

DETAILED DESCRIPTION OF THE PREFERRED EMBODIMENT

The following description of the invention references various C programming code examples that are intended to clarify the operation of the method and system. This is not intended to limit the invention as any number of programming languages or implementations may be used.

The present invention provides an improved method and system for performing lexical analysis on a given stream of input. The present invention comprises two distinct tables that describe the automata and splits the lexical analyzer into two phases, one for each table. The two phases consist of a single transition algorithm and a range transition algorithm. A third 'entry point' table may also be used to speed up the process of finding the first table element from state 0 for any given input character (i.e, states 1 and 7 in FIG. 1). This third table is merely an optimization and is not essential to the algorithm. The two tables are referred to as the 'onecat' table and the 'catrange' tables.

Referring now to FIG. 2, programming code illustrating a sample ET_onecat record 200 is provided. The onecat table includes records, of type "ET_onecat", that include a flag field, a catalyst field, and an offset field. The catalyst field of an ET_onecat record specifies the input stream character to which this record relates. The offset field contains the positive (possibly scaled) offset to the next record to be processed as part of recognizing the stream. Thus the 'state' of the lexical analyzer in this implementation is actually represented by the current 'onecat' table index. The 'onecat' table is a true DFA and describes single character transitions via a series of records of type ET_onecat 200. A variety of specialized flag definitions exist for the flags field 210 but for the purposes of clarity, only 'kLexJump' and 'kNeedDelim' will be considered. The catalyst field 205 of an ET_onecat record 200 specifies the input stream character to which this record relates. The offset field 215 contains the positive (possibly scaled) offset to the next record to be processed as part of recognizing the stream. Thus the 'state' of the lexical analyzer in this implementation is actually represented by the current 'onecat' table index. For efficiency, the various 'onecat' records may be organized so that for any given starting state, all possible transition states are ordered alphabetically by catalyst character.

The basic algorithm for the first phase of the lexical analyzer, also called the onecat algorithm, is provided. The algorithm begins by looping through the 'onecat' table (not shown) until it reaches a record with a catalyst character of 0, at which time the 'offset' field 215 holds the token number recognized. If this is not the final state after the loop, the algorithm has failed to recognize a token using the 'onecat' table and the lexical analyzer must now re-process the input stream from the initial point using the 'catrange' table.

```
ch = *ptr;                                    // 'ptr'
tbl = &onecat[entryPoint[ch]];                // initialize using 3rd table
for ( done = NO;; )
{
tch = tbl->catalyst;
state = tbl->flags;
```

-continued

```
      if ( !*ptr ) done = YES;              // oops! the source string ran
                                            out!
if ( tch == ch )                          // if 'ch' matches catalyst char
{                                               // match found, increment
                                                to next
if ( done ) break;                  // exit if past the terminating
                                    NULL
tbl++;                                    // increment pointer if char
                                          accepted
ptr++;                                    // in the input stream.
ch = *ptr;
}
else if ( tbl->flags & kLexJump)
tbl += tbl->offset;                 // there is a jump alternative available
else break;                                 // no more records, terminate
                                            loop
}
match = !tch && (*ptr is a delimiter ||
!(state & (kNeedDelim+kLexJump)));
           if ( match ) return tbl->offset;     // on success, offset field
                                                holds token#
```

Referring now to FIG. 3, sample programming code for creating an ET_Catrange record 300 is shown. The 'catrange' table (not shown) consists of an ordered series of records of type ET_CatRange 300. In this implementation, records of type ET_CatRange 300 include the fields 'lstat' 305 (representing the lower bound of starting states), 'hstat' 310 (representing the upper bound of starting states), 'lcat' 315 (representing the lower bound of catalyst character), 'hcat' 320 (representing the upper bound of catalyst character) and 'estat' 325 (representing the ending state if the transition is made). These are the minimum fields required but, as described above, any number of additional fields or flags may be incorporated.

A sample code implementation of the second phase of the lexical analyzer algorithm, also called the catrange algorithm, is set forth below.

```
tab = tabl = &catRange[0];
state = 0;
ch = *ptr;
for (;;)
{                                                 // LSTAT byte = 255 ends
                                                  table
if ( tab->lstat == 255 ) break;
else if (( tab->lstat <= state
&& state <= tab->hstat )
&&
( tab->lcat<=ch && ch <= tab->hcat))
{                                             // state in range & input char a
                                              valid catalyst
state = tab->estat; // move to
final state specified
ptr++;                              // accept character
ch = *ptr;
if ( !ch ) break;                   // whoops! the input string ran out
tab = tabl;                         // start again at beginning of table
}
else tab++;                               // move to next record if not end
}
if ( state > maxAccState || *ptr not
a delimiter && *(ptr-l) not a
delimiter )
return bad token error
return state
```

As the code above illustrates, the process begins by looping and re-scanning the 'catRange' table from the beginning for each input character looking for a transition where the initial analyzer state lies between the 'lstat' 305 and 'hstat' 310 bounds, and the input character lies between the 'lcat' 315 and 'hcat' 320 bounds. If such a state is found, the analyzer moves to the new state specified by 'estat' 325. If the table runs out (denoted by a record with 'lstat' set to 255) or the input string runs out, the loop exits. In the preferred embodiment, a small number of tokens will be handled by the 'catRange' table (such an numbers, identifiers, strings etc.) since the reserved words of the language to be tokenized will be tokenized by the 'onecat' phase. Thus, the lower state values (i.e. <64) could be reserved as accepting while states above that would be considered non-accepting. This boundary line is specified for a given analyzer by the value of 'maxAccState' (not shown).

To illustrate the approach, the table specification below is sufficient to recognize all required 'catRange' symbols for the C programming language:

```
0 1 1 a z           <eol> 1 = Identifier
0 1 1 _ _           <eol> more identifier
1 1 1 0 9           <eol> more identifier
0 0 100 ' '         <eol> ' begins character constant
100 100 101 \ \     <eol> a \ begins character escape sequence
101 102 102 0 7     <eol> numeric character escape sequence
101 101 103 x x     <eol> hexadecimal numeric character escape sequence
103 103 103 a f     <eol> more hexadecimal escape sequence
103 103 103 0 9     <eol> more hexadecimal escape sequence
100 100 2 ' '       <eol> ' terminates the character sequence
102 103 2 ' '       <eol> you can have multiple char constants
100 103 100         <eol> 2 = character constant
0 0 10 0 0          <eol> 10 = octal constant
10 10 10 0 7        <eol> more octal constant
0 0 3 1 9           <eol> 3 = decimal number
3 3 3 0 9           <eol> more decimal number
0 0 110 . .         <eol> start of fp number
3 3 4 . .           <eol> 4 = floating point number
10 10 4 . .         <eol> change octal constant to fp #
4 4 4 0 9           <eol> more fp number
110 110 4 . .       <eol> more fp number
3 4 111 e e         <eol> 5 = fp number with exponent
10 10 111 e e       <eol> change octal constant to fp #
111 111 5 0 9       <eol> more exponent
111 111 112 + +     <eol> more exponent
0 0 0 \ \           <eol> continuation that does not belong to anything
111 111 112 - -     <eol> more exponent
112 112 509         <eol> more exponent
5 5 5 0 9           <eol> more exponent
4 5 6 f f           <eol> 6 = fp number with optional float marker
4 5 6 l l           <eol> more float marker
10 10 120 x x       <eol> beginning hex number
120 120 7 0 9       <eol> 7 = hexadecimal number
120 120 7 a f       <eol> more hexadecimal
7 7 7 0 9           <eol> more hexadecimal
7 7 7 a f           <eol> more hexadecimal
7 7 8 l l           <eol> 8 = hex number with L or U specifier
7 7 8 u u           <eol>
3 3 9 l l           <eol> 9 = decimal number with L or U specifier
3 3 9 u u           <eol>
10 10 11 l l        <eol> 11 = octal constant with L or U specifier
10 10 11 u u        <eol>
0 0 130 " "         <eol> begin string constant...
130 130 12 " "      <eol> 12 = string constant
130 130 13 \ \      <eol> 13 = string const with line continuation '\'
13 13 131 0 7       <eol> numeric character escape sequence
131 131 131 0 7     <eol> numeric character escape sequence
13 13 132 x x       <eol> hexadecimal numeric character escape sequence
131 132 12 " "      <eol> end of string
13 13 130           <eol> anything else must be char or escape char
132 132 132 a f     <eol> more hexadecimal escape sequence
132 132 132 0 9     <eol> more hexadecimal escape sequence
130 132 130         <eol> anything else is part of the string
```

In this example, the 'catRange' algorithm would return token numbers 1 through 13 to signify recognition of various C language tokens. In the listing above (which is actually valid input to the associated lexical analyzer generator), the 3 fields correspond to the 'Istat' 305, 'hstat' 310, 'estat' 325, 'Icat' 315 and 'hcat' 320 fields of the ET_CatRange record 300. This is a very compact and efficient representation of what would otherwise be a huge number of transitions in a conventional DFA table. The use of ranges in both state and input character allow us to represent large numbers of transitions by a single table entry. The fact that the table is rescanned from the beginning each time is important for ensuring that correct recognition occurs by arranging the table elements appropriately. By using this two pass approach, we have trivially implemented all the dotted-line transitions shown in the initial state machine diagram as well as eliminating the need to perform the NFA to DFA transformation. Additionally since the 'oneCat' table can ignore the possibility of multiple transitions, it can be optimized for speed to a level not attainable with the conventional NFA->DFA approach.

The present invention also provides a built-in lexical analyzer generator to create the tables described. 'CatRange' tables are specified in the format provided in FIG. 3, while 'oneCat' tables may be specified via application programming interface or "API" calls or simply by specifying a series of lines of the form provided below.

```
[ token# ] tokenString [ . ]
```

As shown above, in the preferred embodiment, a first field is used to specify the token number to be returned if the symbol is recognized. This field is optional, however, and other default rules may be used. For example, if this field is omitted, the last token number +11 may be used instead. The next field is the token string itself, which may be any sequence of characters including whitespace. Finally, if the trailing period is present, this indicates that the 'kNeedDelim' flag (the flags word bit for needs delimiter, as illustrated in FIG. 2) is false, otherwise it is true.

Because of the two-table approach, this generation phase is extremely fast. More importantly, however, the two table approach can be incremental. That is, new symbols can be added to the analyzer while it is running. This is a key difference over conventional approaches because it opens up the use of the lexical analyzer for a variety of other purposes that would not normally be possible. For example, in many situations there is a need for a symbolic registration database wherein other programming code can register items identified by a unique 'name'. In the preferred embodiment, such registries are implemented by dynamically adding the symbol to a 'oneCat' table, and then using the token number to refer back to whatever was registered along with the symbol, normally via a pointer. The advantage of this approach is the speed with which both the insertion and the lookup can occur. Search time in the registry is also dramatically improved over standard searching techniques (e.g., binary search). Specifically, search time efficiency (the "Big O" efficiency) to lookup a given word is proportional to the log (base N) of the number of characters in the token, where 'N' is the number of different ASCII codes that exist in significant proportions in the input stream. This is considerably better than standard search techniques. Additionally, the trivial nature of the code needed to implement a lookup registry and the fact that no structure or code needs to be designed for insertion, removal and lookup, make this approach very convenient.

In addition to its use in connection with flat registries, this invention may also be used to represent, lookup, and navigate through hierarchical data. For example, it may be desirable to 'flatten' a complete directory tree listing with all files within it for transmission to another machine. This could be easily accomplished by iterating through all files and directories in the tree and adding the full file path to the lexical analyzer database of the present invention. The output of such a process would be a table in which all entries in the table were unique and all entries would be automatically ordered and accessible as a hierarchy.

Referring now to FIG. 4, a state diagram representing a directory tree is shown. The directory tree consists of a directory A containing sub-directories B and C and files F1 and F2 and sub-directory C contains F1 and F3. A function, LX_List( ), is provided to allow alphabetized listing of all entries in the recognizer database. When called successively for the state diagram provided in FIG. 6, it will produce the sequence:

"A:", "A:B:", "A:C:", "A:C:F1", "A:C:F3", "A:F1", "A:F2"

Furthermore, additional routines may be used to support arbitrary navigation of the tree. For example, routines could be provided that will prune the list (LX_PruneList( )), to save the list (LX_SaveListContext( )) and restore the list (LX_RestoreListContext( )). The routine LX_PruneList( ) is used to "prune" the list when a recognizer database is being navigated or treated as a hierarchical data structure. In one embodiment, the routine LX_PruneList( ) consists of nothing more than decrementing the internal token size used during successive calls to LX_List( ). The effect of a call to LX_PruneList( ) is to remove all descendant tokens of the currently listed token from the list sequence. To illustrate the point, assume that the contents of the recognizer DB represent the file/folder tree on a disk and that any token ending in ':' is a folder while those ending otherwise are files. A program could easily be developed to enumerate all files within the folder folder "Disk: MyFiles:" but not any files contained within lower level folders. For example, the following code demonstrates how the LX_PruneList( ) routine is used to "prune" any lower level folders as desired:

```
tokSize = 256;                                          // set max file path length
prefix = "Disk:MyFiles:";
toknum = LX_List(theDB,0,&tokSize,0,prefix);            // initialize to start folder path
while ( toknum != -1 )                                  // repeat for all files
{
   toknum = LX_List(theDB,fName,&tokSize,0,prefix);     // list next file name
   if (toknum != -1 )                                   // is it a file or a folder ?
      if ( fName[tokSize-1] == ':' )                    // it is a folder
         LX_PruneList(theDB)                            // prune it and all it's children
      else                                              // it is a file...
         -- process the file somehow
}
```

In a similar manner, the routines LX_SaveListContext( ) and LX_RestoreListContext( ) may be used to save and restore the internal state of the listing process as manipulated by successive calls to LX_List( ) in order to permit nested/recursive calls to LX_List( ) as part of processing a hierarchy. These functions are also applicable to other non-recursive situations where a return to a previous position in the listing/navigation process is desired. Taking the recognizer DB of the prior example (which represents the file/folder tree on a disk), the folder tree processing files within each folder at every level could be recursively walked non-recursively by simply handling tokens containing partial folder paths. If a more direct approach is desired, the recursiveness could be simplified. The following code illustrates one direct and simple process for recursing a tree:

```
void myFunc ( charPtr folderPath )
{
  tokSize = 256;                                          // set max file path length
  toknum = LX__List(theDB,0,&tokSize,0,folderPath);       // initialize to start folder
  while ( toknum != -1 )                                  // repeat for all files
  {
    toknum = LX__List(theDB,fName,&tokSize,0,prefix);     // list next file name
    if (toknum != -1 )                                    // is it a file or a folder ?
      if ( fName[tokSize-1] == ':' )                      // it is a folder
        sprintf(nuPath,"%s%s",folderPath,fName);          // create new folder path
        tmp = LX__SaveListContext(theDB);                 // prepare for recursive listing
        myFunc(nuPath);                                   // recurse!
        LX__RestoreListContext(theDB,tmp);                // restore listing context
      else                                                // it is a file...
        -- process the file somehow
  }
}
```

between delimiter characters (i.e., punctuation etc.) and non-delimiters (i.e., alphanumeric characters), the invention may also include the routines LX_AddDelimiter( ) and LX_SubDelimiter( ). When a recognizer DB is first created by LX_Init( ), the default delimiters are set to match those used by the English language. This set can then be selectively modified by adding or subtracting the ASCII codes of interest. Whether an ASCII character is a delimiter or not is determined by whether the corresponding bit is set in a bit-array 'Dels' associated with the recognizer DB and it is this array that is altered by calls to add or subtract an ASCII code. In a similar manner, determining whether a character is white-space is crucial to determining if a given token should be recognized, particularly where a longer token with the same prefix exists (e.g., Smith and Smithsonian). For this reason, a These routines are only a few of the routines that could be used in conjunction with the present invention. Those in the prior art will appreciate that any number of additional routines could be provided to permit manipulation of the DB and lexical analyzer. For example, the following non-exclusive list of additional routines are basic to lexical analyzer use but will not be described in detail since their implementation may be easily deduced from the basic data structures described above:

LX_Add( )—Adds a new symbol to a recognizer table. The implementation of this routine is similar to LX_Lex( ) except when the algorithm reaches a point where the input token does not match, it then enters a second loop to append additional blocks to the recognizer table that will cause recognition of the new token.

LX_Sub( )—Subtracts a symbol from a recognizer table. This consists of removing or altering table elements in order to prevent recognition of a previously entered symbol.

LX_Set( )—Alters the token value for a given symbol. Basically equivalent to a call to LX_Lex( ) followed by assignment to the table token value at the point where the symbol was recognized.

LX_Init( )—Creates a new empty recognizer DB.

LX_KillDB( )—Disposes of a recognizer DB.

LX_FindToken( )—Converts a token number to the corresponding token string using LX_List( ).

In addition to the above routines, additional routines and structures within a recognizer DB may be used to handle certain aspects of punctuation and white space that may vary between languages to be recognized. This is particularly true if a non-Roman script system is involved, such as is the case for many non-European languages. In order to distinguish second array 'whitespace' is associated with the recognizer DB and is used to add new whitespace characters. For example an Arabic space character has the ASCII value of the English space plus 128. This array is accessed via LX_AddDelimiter( ) and LX_SubDelimiter( ) functions.

A sample structure for a recognizer DB 500 is set forth in FIG. 5. The elements of the structure 500 are as follows: onecatmax 501 (storing the number of elements in 'onecat'), catrangemax 502 (storing number of elements in 'catrange'), lexFlags 503 (storing behavior configuration options), maxToken 504 (representing the highest token number in table), nSymbols 505 (storing number of symbols in table), name 506 (name of lexical recognizer DB 500), Dels 507 (holds delimiter characters for DB), MaxAccState 508 (highest accepting state for catrange), whitespace 509 (for storing additional whitespace characters), entry 510 (storing entry points for each character), onecat 511 (a table for storing single state transitions using record type ET_onecat 200) and catrange 512 (a table storing range transitions and is record type ET_CatRange 400).

As the above description makes clear, the two-phase approach to lexical analysis provides significant advantages over standard techniques in terms of performance and flexibility when implemented in software. Additional applications are enhanced when the invention is implemented in hardware.

Referring now to FIG. 6, a sample implementation of a hardware device based on the 'OneCat' algorithm (henceforth referred to as a Single Transition Module 600 or STM 600) is shown. The STM module 600 is preferably implemented as a single chip containing a large amount of recognizer memory 605 combined with a simple bit-slice execution unit 610, such as a 2610 sequencer standard module and a control input 645. In operation the STM 600 would behave as follows:

1) The system processor on which the user program resides (not shown) would load up a recognizer DB 800 into the recognizer memory 605 using the port 615 formatted as a record of type ET_onecat 200.
2) The system processor would initialize the source of the text input stream to be scanned. The simplest external interface for text stream processing might be to tie the 'Next' signal 625 to an incrementing address generator 1020 such that each pulse on the 'Next' line 625 is output by the STM 600 and requests the system processor to send the next byte of text to the port 630; The contents of the next external memory location (previously loaded with the text to be scanned) would then be presented to the text port 630. The incrementing address generator 1020 would be reset to address zero at the same time the STM 600 is reset by the system processor.

Referring now to FIG. 7, another illustration of the operation of the STM 600 is shown. As the figure illustrates, once the 'Reset' line 620 is released, the STM 600 fetches successive input bytes by clocking based on the 'Next' line 620, which causes external circuitry to present the new byte to input port 630. The execution unit 610 (as shown in FIG. 6) then performs the 'OneCat' lexical analyzer algorithm described above. Other hardware implementations, via a sequencer or otherwise, are possible and would be obvious to those skilled in the art. In the simple case, where single word is to be recognized, the algorithm drives the 'Break' line 640 high at which time the state of the 'Match' line 635 determines how the external processor/circuitry 710 should interpret the contents of the table address presented by the port 615. The 'Break' signal 640 going high signifies that the recognizer (not shown) has completed an attempt to recognize a token within the text 720. In the case of a match, the contents presented by the port 615 may be used to determine the token number. The 'Break' line 640 is fed back internally within theLexical Analyzer Module or 'LAM' (see FIG. 14) to cause the recognition algorithm to re-start at state zero when the next character after the one that completed the cycle is presented.

Referring now to FIG. 8, a logical representation of an internal STM implementation is shown. The fields/memory described by the ET_onecat 200 structure is now represented by three registers 1110, 1120, 1130, two of 8 bits 1110, 1120and one of at least 32 bits 1130 which are connected logically as shown. The 'Break' signal 640 going high signifies that the STM 600 has completed an attempt to recognize a token within the text stream. At this point external circuitry or software can examine the state of the 'Match' line 635 in order to decide between the following actions:

1) If the 'Match' line 635 is high, the external system can determine the token number recognized simply by examining recognizer memory 605 at the address presented via the register 1145.
2) If the 'Match' line 635 is low, then the STM 600 failed to recognize a legal token and the external system may either ignore the result, reset the STM 600 to try for a new match, or alternatively execute the range transition algorithm 500 starting from the original text point in order to determine if a token represented by a range transition exists. The choice of which option makes sense at this point is a function of the application to which the STM 600 is being applied.

The "=?" block 1150, "0?" blocks 1155, 1160, and "Add" block 1170 in FIG. 11 could be implemented using standard hardware gates and circuits. Implementation of the "delim?" block 1165 would require the external CPU to load up a 256*1 memory block with 1 bits for all delimiter characters and 0 bits for all others. Once loaded, the "delim?" block 1165 would simply address this memory with the 8-bit text character 1161 and the memory output (0 or 1) would indicate whether the corresponding character was or was not a delimiter. The same approach can be used to identify white-space characters and in practice a 256*8 memory would be used thus allowing up to 8 such determinations to be made simultaneously for any given character. Handling case insensitive operation is possible via lookup in a separate 256*8 memory block.

In the preferred implementation, the circuitry associated with the 'OneCat' recognition algorithm is segregated from the circuitry/software associated with the 'CatRange' recognition algorithm. The reason for this segregation is to preserve the full power and flexibility of the distinct software algorithms while allowing the 'OneCat' algorithm to be executed in hardware at far greater speeds and with no load on the main system processor. This is exactly the balance needed to speed up the kind of CAM and text processing applications that are described in further detail below. This separation and implementation in hardware has the added advantage of permitting arrangements whereby a large number of STM modules (FIGS. 6 and 7) can be operated in parallel permitting the scanning of huge volumes of text while allowing the system processor to simply coordinate the results of each STM module 600. This supports the development of a massive and scaleable scanning bandwidth.

Referring now to FIG. 9, a sample hardware implementation for the 'CatRange' algorithm 500 is shown. The preferred embodiment is a second analyzer module similar to the STM 600, which shall be referred to as the Range Transition Module or RTM 1200. The RTM module 1200 is preferably implemented as a single chip containing a small amount of range table memory 1210 combined with a simple bit-slice execution unit 1220, such as a 2910 sequencer standard module. In operation the RTM would behave as follows:

1) The system processor (on which the user program resides) would load up a range table into the range table memory 1210 via the port 1225, wherein the range table is formatted as described above with reference to ET_CatRange 300.
2) Initialization and external connections, such as the control/reset line 1230, next line 1235, match line 1240 and break line 1245, are similar to those for the STM 900.
3) Once the 'Reset' line 1230 is released, the RTM 1200 fetches successive input bytes by clocking based on the 'Next' line 1235 which causes external circuitry to present the new byte to port 1250. The execution unit 1220 then performs the 'CatRange' algorithm 500. Other implementations, via a sequencer or otherwise are obviously possible.

In a complete hardware implementation of the two-phase lexical analyzer algorithm, the STM and RTM are combined into a single circuit component known as the Lexical Analyzer Module or LAM 1400.Referring now to FIG. 10, a sample LAM 1400 is shown. The LAM 1400 presents a similar external interface to either the STM 600 or RTM 1200 but contains both modules internally together with additional circuitry and logic 1410 to allow both modules 600, 1200 to be run in parallel on the incoming text stream and their results to be combined. The combination logic 1410 provides the following basic functions in cases where both modules are involved in a particular application (either may be inhibited):

1) The clocking of successive characters from the text stream 1460 via the sub-module 'Next' signals 925, 1235 must be synchronized so that either module waits for the other before proceeding to process the next text character.

2) The external LAM 'Match' signals 1425 and 'Break' signals 1430 are coordinated so that if the STM module 900 fails to recognize a token but the RTM module 1200 is still processing characters, the RTM 1200 is allowed to continue until it completes. Conversely, if the RTM 1200 completes but the STM 600 is still in progress, it is allowed to continue until it completes. If the STM 600 completes and recognizes a token, further RTM 1200 processing is inhibited.

3) An additional output signal "S/R token" 1435 allows external circuitry/software to determine which of the two sub-modules 600, 1200 recognized the token and if appropriate allows the retrieval of the token value for the RTM 1200 via a dedicated location on port 1440. Alternately, this function may be achieved by driving the address latch to a dedicated value used to pass RTM 1200 results. A control line 1450 is also provided.

The final stage in implementing very high performance hardware systems based on this technology is to implement the LAM as a standard module within a large programmable gate array which can thus contain a number of LAM modules all of which can operate on the incoming text stream in parallel. On a large circuit card, multiple gate arrays of this type can be combined. In this configuration, the table memory for all LAMs can be loaded by external software and then each individual LAM is dynamically 'tied' to a particular block of this memory, much in the same manner that the ET_LexHdl structure (described above) achieves in software. Once again, combination logic similar to the combination logic 1410 utilized between STM 600 and RTM 1200 within a given LAM 1400 can be configured to allow a set of LAM modules 1400 to operate on a single text stream in parallel. This allows external software to configure the circuitry so that multiple different recognizers, each of which may relate to a particular recognition domain, can be run in parallel. This implementation permits the development and execution of applications that require separate but simultaneous scanning of text streams for a number of distinct purposes. The external software architecture necessary to support this is not difficult to imagine, as are the kinds of sophisticated applications, especially for intelligence purposes, for which this capability might find application.

Once implemented in hardware and preferably as a LAM module 1400, loaded and configured from software, the following applications (not exhaustive) can be created:

1) Content-addressable memory (CAM). In a CAM system, storage is addressed by name, not by a physical storage address derived by some other means. In other words, in a CAM one would reference and obtain the information on "John Smith" simply using the name, rather than by somehow looking up the name in order to obtain a physical memory reference to the corresponding data record. This significantly speeds and simplifies the software involved in the process. One application area for such a system is in ultra-high performance database search systems, such as network routing (i.e., the rapid translation of domains and IP addresses that occurs during all internet protocol routing) advanced computing architectures (i.e., non-Von Neuman systems), object oriented database systems, and similar high performance database search systems.

2) Fast Text Search Engine. In extremely high performance text search applications such as intelligence applications, there is a need for a massively parallel, fast search text engine that can be configured and controlled from software. The present invention is ideally suited to this problem domain, especially those applications where a text stream is being searched for key words in order to route interesting portions of the text to other software for in-depth analysis. High performance text search applications can also be used on foreign scripts by using one or more character encoding systems, such as those developed by Unicode and specifically UTF-8, which allow multi-byte Unicode characters to be treated as one or more single byte encodings.

3) Language Translation. To rapidly translate one language to another, the first stage is a fast and flexible dictionary lookup process. In addition to simple one-to-one mappings, it is important that such a system flexibly and transparently handle the translation of phrases and key word sequences to the corresponding phrases. The present invention is ideally suited to this task.

Other applications. A variety of other applications based on a hardware implementation of the lexical analysis algorithm described are possible including (but not limited to); routing hierarchical text based address strings, sorting applications, searching for repetitive patterns, and similar applications.

The foregoing description of the preferred embodiment of the invention has been presented for the purposes of illustration and description. Any number of other basic features, functions, or extensions of the foregoing method and systems would be obvious to those skilled in the art in light of the above teaching. For example, other basic features that would be provided by the lexical analyzer, but that are not described in detail herein, include case insensitivity, delimiter customization, white space customization, line-end and line-start sensitive tokens, symbol flags and tagging, analyzer backup, and other features of lexical analyzers that are well-known in the prior art. For these reasons, this description is not intended to be exhaustive or to limit the invention to the precise forms disclosed. It is intended that the scope of the invention be limited not by this detailed description but rather by the claims appended hereto.

Appendix 3

A SYSTEM AND METHOD FOR PARSING DATA

BACKGROUND OF THE INVENTION

The analysis and parsing of textual information is a well-developed field of study, falling primarily within what is commonly referred to as 'compiler theory'. At its most basic, a compiler requires three components, a lexical analyzer which breaks the text stream up into known tokens, a parser which interprets streams of tokens according to a language definition specified via a meta-language such as Backus-Naur Form (BNF), and a code generator/interpreter. The creation of compilers is conventionally a lengthy and off-line process, although certain industry standard tools exist to facilitate this process such as LEX and YACC from the Unix world. There are a large number of textbooks available on the theory of predictive parsers and any person skilled in this art would have basic familiarity with this body of theory.

Parsers come in two basic forms, "top-down" and "bottom-up". Top-down parsers build the parse tree from the top (root) to the bottom (leaves), bottom-up parsers build the tree from the leaves to the root. For our purposes, we will consider only the top-down parsing strategy known as a predictive parser since this most easily lends itself to a table driven (rather than code driven) approach and is thus the natural choice for any attempt to create a configurable and adaptive parser. In general, predictive parsers can handle a set of possible grammars referred to as LL(1) which is a subset of those potentially handled by LR parsers (LL(1) stands for 'Left-to-right, using Leftmost derivations, using at most 1 token look-ahead'). Another reason that a top-down algorithm is preferred is the ease of specifying these parsers directly in BNF form, which makes them easy to understand by most programmers. Compiler generators such as LEX and YACC generally use a far more complex specification methods including generation of C code which must then be compiled, and thus is not adaptive or dynamic. For this reason, bottom-up table driven techniques such as LR parsing (as used by YACC) are not considered suitable.

What is needed is a process that can rapidly (i.e., within seconds) generate a complete compiler from scratch and then apply that compiler in an adaptive manner to new input, the ultimate goal being the creation of an adaptive compiler, i.e., one that can alter itself in response to new input patterns in order to 'learn' to parse new patterns appearing in the input and to perform useful work as a result without the need to add any new compiled code. This adaptive behavior is further described Appendix 1 with respect to a lexical analyzer (referred to in the claims as the "claimed lexical analyzer"). The present invention provides a method for achieving the same rapid, flexible, and extensible generation in the corresponding parser.

SUMMARY OF INVENTION

The present invention discloses a parser that is totally customizable via the BNF language specifications as well as registered functions as described below. The are two principal routines: (a) PS_MakeDB( ), which is a predictive parser generator algorithm, and (b) PS_Parse( ), which is a generic predictive parser that operates on the tables produced by PS_MakeDB( ). The parser generator PS_MakeDB( ) operates on a description of language grammar, and constructs predictive parser tables that are passed to PS_Parse( ) in order to parse the grammar correctly. There are many algorithms that may be used by PS_MakeDB( ) to generate the predictive parser tables, as described in many books on compiler theory. It consists essentially of computing the FIRST and FOLLOW sets of all grammar symbols (defined below) and then using these to create a predictive parser table. In order to perform useful action in response to inputs, this invention extends the BNF language to allow the specification of reverse-polish plug-in operation specifiers by enclosing such extended symbols between '<' and '>' delimiters. A registration API is provided that allows arbitrary plug-in functions to be registered with the parser and subsequently invoked as appropriate in response to a reverse-polish operator appearing on the top of the parser stack. The basic components of a complete parser/interpreter in this methodology are as follows:

The routine PS_Parse( ) itself (described below)

The language BNF and LEX specifications.

A plug-in 'resolver 400' function, called by PS_Parse( ) to resolve new input (described below)

One or more numbered plug-in functions used to interpret the embedded reverse-polish operators.

The 'langLex' parameter to PS_Parse( ) allows you to pass in the lexical analyzer database (created using LX_MakeDB( )) to be used to recognize the target language. There are a number of restrictions on the token numbers that can be returned by this lexical analyzer when used in conjunction with the parser. These are as follows:

1) The parser generator has it's own internal lexical analyzer which reserves token numbers 59 . . . 63 for recognizing certain BNF symbols (described below) therefore these token numbers cannot be used by the target language recognizer. Token numbers from 1 . . . 63 are reserved by the lexical analyzer to represent 'accepting' states in the 'catRange' token recognizer table, these token numbers are therefore not normally used by a lexical analyzer 'oneCat' token recognizer. What this means then is that instead of having capacity for 63 variable content tokens (e.g., names, numbers, symbols etc) in your target language, you are restricted to a maximum of 58 when using the parser.
2) If there are multiple names for a give symbol, then the multiplicity should be restricted to the lexical analyzer description, only one of the alternatives should be used in the parser tables.
3) In order to construct predictive parser tables, it is necessary to build up a 2-dimensional array where one axis is the target language token number and the other axis is the non-terminal symbols of the BNF grammar. The parser-generator is limited to grammars having no more than 256 non-terminal grammar symbols, however in order to avoid requiring MASSIVE amounts of memory and time to compute the parsing table, the number of terminal symbols (i.e., those recognized by the lexical analyzer passed in 'langLex') should be limited to 256 also. This means that the lexical analyzer should never return any token number that is greater than 'kMaxTerminalSym'. For example, token numbers 1.59 are available for use as accepting states for the 'catRange' recognizer while tokens 64.255 are available for use with the 'oneCat' recognizer.

The invention also provides a solution for applications in which a language has token numbers that use the full 32-bits provided by LEX. Immediately after calling the 'langLex' lexical analyzer to fetch the next token in the input stream, PS_Parse( ) calls the registered 'resolver 400' function with a 'no action' parameter, (normally no action is exactly what is required) but this also provides an opportunity to the plug-in code to alter the token number (and token size etc.) to a value that is within the permitted range.

There are also many other aspects of the invention that allow the parser to accept or process languages that are considerably more complex than LL(1). For example, suppose a recognizer is programmed to recognize the names of people (for which there are far more than 256 possibilities) so when a 'no-action' call is initiated, the function PS_SetCurrToken( ) could be used to alter the token number to 58 say. Then in your BNF grammar, you specify a token number of 58 (e.g., <58:Person Name>) wherever you expect to process a name. The token string will be available to the plug-in and resolver 400 functions on subsequent calls and could easily reconstitute the original token number and the plug-in code could be programmed to call 'langLex' using PS_LangLex( ). Other applications and improvements are also disclosed and claimed in this application as described in further detail below.

BRIEF DESCRIPTION OF THE DRAWINGS

FIG. 1 provides a sample BNF specification;

FIG. 2 is a block diagram illustrating a set of operations as performed by the parser of the present invention;

FIG. 3 provides a sample code fragment for a predefined plug-in that can work in conjunction with the parser of the present invention; and FIG. 4 provides sample code for a resolver of the present invention.

Appendix A provides code for a sample Application Programming Interface (API) for the parser of the present invention.

DETAILED DESCRIPTION OF THE PREFERRED EMBODIMENTS

As described above, the parser of this invention utilizes the lexical analyzer described in Appendix 1, and the reader may refer to this incorporated patent application for a more detailed explanation of some of the terms used herein. For illustration purposes, many of the processes described in this application are accompanied by samples of the computer code that could be used to perform such functions. It would be clear to one skilled in the art that these code samples are for illustration purposes only and should not be interpreted as a limitation on the claimed inventions.

The present invention discloses a parser that is totally customizable via the BNF language specifications as well as registered functions as described below. The are two principal routines: (a) PS_MakeDB( ), which is a predictive parser generator algorithm, and (b) PS_Parse( ), which is a generic predictive parser that operates on the tables produced by PS_MakeDB( ). The parser generator PS_MakeDB( ) operates on a description of language grammar, and constructs predictive parser tables that are passed to PS_Parse( ) in order to parse the grammar correctly. PS_MakeDB( ) has the following function prototype:

```
ET_ParseHdl PS_MakeDB     (                  // Make a predictive parser for
PS_Parse( )
      charPtr             bnf,               // I:C string specifying grammar's BNF
      ET_LexHdl              langLex,        // I:Target language lex (from
LX_MakeDB)
      int32                  options,        // I:Various configuration options
      int32                  parseStackSize,// I:Max. depth of parser stack, 0=default
      int32                  evalStackSize // I:Max. depth of evaluation stack, 0=default
                          )                  // R:handle to created DB,
```

The 'bnf' parameter to PS_MakeDB( ) contains a series of lines that specify the BNF for the grammar in the form:

```
non_terminal   ::= production_1 <or> production_2 <or> ...
```

Where production_1 and production_2 consist of any sequence of Terminal (described in lexical analyzer passed in to PS_MakeDB), or Non-Terminal (langLex) symbols provided that such symbols are greater than or equal to 64. Productions may continue onto the next line if required but any time a non-blank character is encountered in the first position of the line, it is assumed to be the start of a new production list. The grammar supplied must be unambiguous and LL(1).

The parser generator uses the symbols ::=, <or>, and <null> to represent BNF productions. The symbols <opnd>, <bkup>, and the variable ('catRange') symbols <@nn:mm[: hint text]> and <nn:arbitrary text> also have special meaning and are recognized by the built in parser-generator lexical analyzer. The parser generator will interpret any sequence of upper or lower case letters (a . . . z) or numbers (0 . . . 9) or the underscore character '_', that begins with a letter or underscore, and which is not recognized by, or which is assigned a token number in the range 1-63 by, the lexical analyzer passed in 'langLex', as a non-terminal grammar symbol (e.g., program, expression, if statement etc.), these symbols are added to the parser generators grammar symbol list (maximum of 256 symbols) and define the set of non-terminals that make up the grammar. There is no need to specify this set, it is deduced from the BNF supplied. One thing that is very important however, is that the first such symbol encountered in the BNF becomes the root non-terminal of the grammar (e.g., program). This symbol is given special meaning by the parser and thus it must appear on the left hand side of the first production specified in the BNF. The <endf> symbol is used to indicate where the expected end of the input string will occur and its specification cannot be omitted from the BNF. Normally, as in the example below <endf> occurs at the end of the root non-terminal production.

Referring now to FIG. 1, a sample BNF specification is provided. This BNF gives a relatively complete description of the C language expression syntax together with enforcement of all operator precedence specified by ANSI and is sufficient to create a program to recognize and interpret C expressions. As FIG. 1 demonstrates, the precedence order may be specified simply by choosing the order in which one production leads to another with the lowest precedence grammar constructs/operators being refined through a series of productions into the higher precedence ones. Note also that many productions lead directly to themselves (e.g., more_statements ::=<null><or> statement more_statements); this is the mechanism used to represent the fact that a list of similar constructs is permitted at this point.

The syntax for any computer language can be described either as syntax diagrams or as a series of grammar productions similar to that above (ignoring the weird '@' BNF symbols for now). Using this syntax, the code illustrated in FIG. 1 could easily be modified to parse any programs in any number of different computer languages simply by entering the grammar productions as they appear in the language's specification. The way of specifying a grammar as illustrated in FIG. 1 is a custom variant of the Backus-Naur Form (or BNF). It is the oldest and easiest to understand means of describing a computer language. The symbols enclosed between '<''>' pairs plus the '::=' symbol are referred to as "meta-symbols". These are symbols that are not part of the language but are part of the language specification. A production of the form (non_terminal ::=production_1 <or> production_2) means that there are two alternative constructs that 'non-terminal' can be comprised or, they are 'production l' or 'production_2'.

The grammar for many programming languages may contain hundreds of these productions, for example, the definition of Algol 60 contains 117. An LL(1) parser must be able to tell at any given time what production out of a series of productions is the right one simply by looking at the current token in the input stream and the non-terminal that it currently has on the top of it's parsing stack. This means, effectively, that the sets of all possible first tokens for each production appearing on the right hand side of any grammar production must not overlap. The parser must be able to look at the token in the input stream and tell which production on the right hand side is the 'right one'. The set of all tokens that might start any given non-terminal symbol in the grammar is known as the FIRST set of that non-terminal. When designing a language to be processed by this package, it is important to ensure that these FIRST sets are not defined consistently. In order to understand how to write productions for an LL(1) parser, it is important to understand recursion in a grammar and the difference between left and right recursion in particular.

Recursion is usually used in grammars to express a list of things separated by some separator symbol (e.g. comma). This can be expressed either as "<A>::=<A>, <B>" or "<A> ::=<B>, <A>". The first form is left recursive the second form is known as right recursive. The production "more_statements ::=<null><or> statement more_statements" above is an example of a right recursive production. Left recursive statements are not permitted because of the risk of looping during parsing. For example, if the parser tries to use a production of the form '<A> ::=<A> anything' then it will fall into an infinite loop trying to expand <A>. This is known as left recursion. Left recursion may be more subtle, as in the pair of productions '<S> ::=<X> a <or> b' and '<X> ::=<S> c <or> d'. Here the recursion is indirect; that is the parser expands '<S>' into '<X> a', then it subsequently expands '<X>' into '<S> c' which gets it back to trying to expand '<S>', thereby creating an infinite loop. This is known as indirect left recursion. All left recursion of this type must be eliminated from grammar before being processed by the parser. A simple method for accomplishing this proceeds as follows: replace all productions of the form '<A>::=<A> anything' (or indirect equivalents) by a set of productions of the form "<A>::=t1 more_t1 <or> . . . <or> tn more_tn" where t1 . . . tn are the language tokens (or non-terminal grammar symbols) that start the various different forms of '<A>'.

A second problem with top down parsers, in general, is that the order of the alternative productions is important in determining if the parser will accept the complete language or not. On way to avoid this problem is to require that the FIRST sets of all productions on the right hand side be non-overlapping. Thus, in conventional BNF, it is permissible to write:

```
expression ::= element <or> element + expression <or> element *
expression
```

To meet the requirements of PS_MakeDB( ) and of an LL(1) parser, this BNF statement may be reformulated into a pair of statements viz:

```
expression::= element rest__of__expression
rest__of__expression ::= <null> <or> + expression <or> * expression
```

As can be seen, the 'element' token has been factored out of the two alternatives (a process known as left-factoring) in order to avoid the possibility of FIRST sets that have been defined more than once. In addition, this process has added a new symbol to the BNF meta-language, the <null> symbol. A <null> symbol is used to indicate to the parser generator that a particular grammar non-terminal is nullable, that is, it may not in fact be present at all in certain input streams. There are a large number of examples of the use of this technique in the BNF grammar illustrated in FIG. 1 such as statement 100 .

The issues above discuss the manner in which LL(1) grammars may be created and used. LL(1) grammars, however, can be somewhat restrictive and the parser of the present invention is capable of accepting a much larger set by the use of deliberate ambiguity. Consider the grammar:

```
operand ::= expression <or> ( address__register )
```

This might commonly occur when specifying assembly language syntax. The problem is that this is not LL(1) since expression may itself start with a '(' token, or it may not, thus when processing operand, the parser may under certain circumstances need to look not at the first, but at the second token in the input stream to determine which alternative to take. Such a parser would be an LL(2) parser. The problem cannot be solved by factoring out the '(' token as in the expression example above because expressions do not have to start with a '('. Thus without extending the language beyond LL(1) the normal parser be unable to handle this situation. Consider however the modified grammar fragment:

```
operand        ::= .... <or> ( expr__or__indir <or> expression
expr__or__indir  ::= Aregister ) <or> expression )
```

Here we have a production for operand which is deliberately ambiguous because it has a multiply defined first set since '(' is in FIRST of both of the last two alternatives. The modified fragment arranges the order of the alternatives such that the parser will take the "(expr_or_indir" production first and should it fail to find an address register following the initial '(' token, the parser will then take the second production which correctly processes "expression)" since expression itself need not begin with a '(' token. If this case were permitted, the parser would have the equivalent of a two token look-ahead hence the language it can accept is now LL(2).

Alternatively, an options parameter 'kIgnoreAmbiguities' could be passed to PS_MakeDB( ) to cause it to accept grammars containing such FIRST set ambiguities. On problem with this approach, however, is that it can no longer verify the correctness of the grammar meaning that the user must ensure that the first production can always be reduced to the second production when such a grammatical trick is used. As such, such a parameter should only be used when the grammar is well-understood.

Grammars can get considerably nastier than LL(2). Consider the problem of parsing the complete set of 68 K assembly language addressing modes, or more particularly the absolute, indirect, pre-decrement and post-increment addressing modes. The absolute and indirect syntax was presented above, however the pre-decrement addressing mode adds the form "–(Aregister)", while the post-increment adds the form "(Aregister)+". An LL(3) parser would be needed to handle the predecrement mode since the parser cannot positively identify the predecrement mode until it has consumed both the leading '-' and '(' tokens in the input stream. An LL(4) parser is necessary to recognize the postincrement form. One option is to just left-factor out the "(Aregister)" for the postincrement form. This approach would work if the only requirement was recognition of a valid assembly syntax. To the extent that the parser is being used to perform some useful function, however, this approach will not work. Instead, this can be accomplished by inserting a reverse polish plug-in operator. The polish plug-in operator calls for the form <@n: m[:hint text]> into the grammar. Whenever the parser is exposed to such an operator on the top of the parsing stack, it calls it in order to accomplish some sort of semantic action or processing. Assuming a different plug-in is called in order to handle each of the different 68 K addressing modes, it is important to know what addressing mode is presented in order to ensure that the proper plug-in is called. In order to do this, the present invention extends the parser language set to be LL(n) where ‘n’ could be quite large.

The parser of the present invention extend the parser language in this fashion by providing explicit control of limited parser back-up capabilities. One way to provide these capabilities is by adding the <bkup> meta-symbol. Backing up a parser is complex since the parsing stack must be repaired and the lexical analyzer backed-up to an earlier point in the token stream in order to try an alternative production. Nonetheless, the PS_Parse( ) parser is capable of limited backup within a single input line by use of the <bkup> flag. Consider the modified grammar fragment:

```
operand       ::= ... <or> ( Aregister <bkup> areg__indirect <or>
abs__or__displ <or> ...
abs__or__displ ::= – ( ARegister <bkup> ) <@1:1> <or>
expression <@1:2>
areg__indirect ::= ) opt__postinc
opt__postinc       ::= <@1:3> <or> + <@1:4>
```

A limited backup is provided through the following methodology. Let us assume that <@1:1> is the handler for the predecrement mode, <@1:2> for the absolute mode, <@1:3> for the indirect mode, and <@1:4> for the postincrement mode. When the parser encounters a ‘(’ token it will push on the “(Aregister <bkup> areg_indirect” production. Whenever the parser notices the presence of the <bkup> symbol in the production being pushed, however, it saves it’s own state as well as that of the input lexical analyzer. Parsing continues and the ‘(’ is accepted. Now lets assume instead that the input was actually an expression so when the parser tries to match the ‘ARegister’ terminal that is now on the top of it’s parsing stack, it fails, Without the backup flag, this is considered a syntax error and the parser aborts. Because the parser has a saved state, however, the parser restores the backup of the parser and lexical analyzer state to that which existed at the time it first encountered the ‘(’ symbol. This time around, the parser causes the production that immediately follows the one containing the <bkup> flag to be selected in preference to the original. Since the lexical analyzer has also been backed up, the first token processed is once again ‘(’ and parsing proceeds normally through “abs_or_displ” to “expression” and finally to invokation of plug-in <@1:2> as appropriate for the absolute mode.

Note that a similar but slightly different sequence is caused by the <bkup> flag in the first production for “abs_or_displ” and that in all cases, the plug-in that is appropriate to the addressing mode encountered will be invoked and no other. Thus, by using explicit ambiguity plus controlled parser backup, the present invention provides a parser capable of recognizing languages from a set of grammars that are considerably larger than those normally associated with predictive parsing techniques. Indeed the set is sufficiently large that it can probably handle practically any computer programming language. By judicious use of the plug-in and resolver 400 architectures described below, this language set can be further extended to include grammars that are not context-free (e.g., English,) and that cannot be handled by conventional predictive parsers.

In order to build grammars for this parser, it is also important to understand is the concept of a FOLLOW set. For any non-terminal grammar symbol X, FOLLOW(X) is the set of terminal symbols that can appear immediately to the right of X in some sentential form. In other words, it is the set of things that may come immediately after that grammar symbol. To build a predictive parser table, PS_MakeDB( ) must compute not only the FIRST set of all non-terminals (which determines what to PUSH onto the parsing stack), but also the FOLLOW sets (which determine when to POP the parsing stack and move to a higher level production). If the FOLLOW sets are not correct, the parser will never pop its stack and eventually will fail. For this reason; unlike for FIRST sets, ambiguity in the FOLLOW sets is not permitted. What this means is that for any situation in a grammar, the parser must be able to tell when it is done with a production by looking at the next token in the input stream (i.e., the first token of the next production). PS_MakeDB( ) will reject any grammar containing ambiguous FOLLOW sets.

Before illustrating how the parser of the present invention can be used to accomplish specific tasks, it is important understand how PS_Parse( ) 205 actually accomplishes the parsing operation. Referring now to FIG. 2, the parsing function of the present invention is shown. PS_Parse( ) 205 maintains two stacks, the first is called the parsing stack 210 and contains encoded versions of the grammar productions specified in the BNF. The second stack is called the evaluation stack 215. Every time the parser accepts/consumes a token in the input stream in the range 1.59, it pushes a record onto this evaluation stack 215. Records on this stack 215 can have values that are either integer, real, pointer or symbolic. When the record is first pushed onto the stack 215, the value is always ‘symbolic’ since the parser itself does not know how to interpret symbols returned by the lexical analyzer 250 that lie in this range. A symbolic table entry 220 contains the token number recognized by the ‘langLex’ lexical analyzer 250, together with the token string. In the language defined in FIG. 1, the token number for identifier is 1 (i.e. line 110) while that for a decimal integer is 3 (i.e., line 115), thus if the parser 205 were to encounter the token stream “A+10”, it would add two symbol records to the evaluation stack 215. The first would have token number 1 and token string “A” and, the second would have token number 3 and token string “10”. At the time the parser 205 processes an additive expression such as “A+10”, it’s parsing (not evaluation) stack 210 would appear as “mult_expr+mult_expr <@0:15>” where the symbol on the left is at the top of the parsing stack 210. As the parser 205 encounters the ‘A’ in the string “A+10”, it resolves mult_expression until it eventually accepts the ‘A’ token, pops it off the parsing stack 210, and pushes a record onto the evaluation stack 215. So now the parsing stack 210 looks like “+mult_expr <@0:15>” and, the evaluation stack 215 contains just one element “[token=1,String=‘A’ ]”. The parser 205 then matches the ‘+’ operator on the stack with the one in the input and pops the parsing stack 210 to obtain “mult_expr<@0:15>”. Parsing continues with the input token now pointing at the 10 until it too is accepted. This process yields a parsing stack 210 of “<@0:15>” and an evaluation stack 215 of “[token=3,String=‘10’][token=1, String=‘A’ ]” where the left hand record is considered to be the top of the stack.

At this point, the parser 205 recognizes that it has exposed a reverse-polish plug-in operator on the top of its parsing stack 210 and pops it, and then calls the appropriate plug-in, which, in this case, is the built in add operation provided by PS_Evaluate( ) 260, a predefined plug-in called plug-in zero 260. When the parser 205 calls plug-in zero 260, the parser 205 passes the value 15 to the plug-in 260. In this specific case, 15 means add the top two elements of the parsing stack, pop the stack by one, and put the result into the new top of stack. This behavior is exactly analogous to that performed by any reverse polish calculator. This means that the top of the evaluation stack 215 now contains the value A+10 and the parser 205 has actually been used to interpret and execute a fragment of C code. Since there is provision for up to 63 application defined plug-in functions, this mechanism can be used to perform any arbitrary processing as the language is parsed. Since the stack 215 is processed in reverse polish manner, grammar constructs may be nested to arbitrary depth without causing confusion since the parser 205 will already have collapsed any embedded expressions passed to a higher construct. Hence, whenever a plug-in is called, the evaluation stack 215 will contain the operands to that plug-in in the expected positions.

To illustrate how a plug-in might look, FIG. 3 provides a sample code fragment from a predefined plug-in that handles the '+' operator (TOF_STACK is defined as 0, NXT_STACK as 1). As FIG. 3 illustrates, this plug-in first evaluates 305 the values of the top two elements of the stack by calling PS_EvalIdent( ). This function invokes the registered 'resolver 400' function in order to convert a symbolic evaluation stack record to a numeric value (see below for description of resolver 400). Next the plug-in must determine 310 the types of the two evaluation stack elements (are they real or integer?). This information is used in a case statement to ensure that C performs the necessary type conversions on the values before they are used in a computation. After selecting the correct case block for the types of the two operands, the function calls PS_SetiValue( ) or PS_SetfValue( ) 315 as appropriate to set the numeric value of the NXT_STACK element of the evaluation stack 215 to the result of adding the two top stack elements. Finally, at the end of the routine, the evaluation stack 215 is popped 220 to move the new top of the stack to what was the NXT_STACK element. This is all it takes to write a reverse polish plug-in operator. This aspect of the invention permits a virtually unlimited number of support routines that could be developed to allow plug-ins to manipulate the evaluation stack 215 in this manner.

Another problem that has been addressed with the plug-in architecture of the present invention is the problem of having the plug-in function determine the number of parameters that were passed to it; for instance, a plug-in would need to know the number of parameters in order to process the C printf( ) function (which takes a variable number of arguments). If a grammar does not force the number of arguments (as in the example BNF above for the production "<opnd> (parameter_list)<@1:1>", then a <opnd> meta-symbol can be added at the point where the operand list begins. The parser 205 uses this symbol to determine how many operands were passed to a plug-in in response to a call requesting this information. Other than this purpose, the <opnd> meta-symbol is ignored during parsing. The <opnd> meta-symbol should always start the right hand side (RHS) of a production in order to ensure correct operand counting. For example, the production:

```
primary        ::= <9:Function> <opnd> ( parameter__list ) <@1:1>
```

Will result in an erroneous operand count at run time, while the production pair below will not:

```
primary            ::= <9:Function> rstof__fn__call <@1:1>
restof__fn__call   ::= <opnd> ( parameter__list )
```

The last issue is how to actually get the value of symbols into the parser 205. This is what the symbols in the BNF of the form "<n:text string>" are for. The numeric value of 'n' must lie between 1 and 59 and it refers to the terminal symbol returned by the lexical analyzer 250 passed in via 'langLex' to PS_MakeDB( ). It is assumed that all symbols in the range 1 . . . 59 represent 'variable tokens' in the target language. That is, tokens whose exact content may vary (normally recognized by a LEX catRange table) in such a way that the string of characters within the token carry additional meaning that allows a 'value' to be assigned to that token. Examples of such variable tokens are identifiers, integers, real numbers etc. A routine known as a 'resolver 400' will be called whenever the value of one of these tokens is required or as each token is first recognized. In the BNF illustrated in FIG. 1, the lexical analyzer 250 supplied returns token numbers 3, 7, 8, 9, 10 or 11 for various types of C integer numeric input; 4, 5, and 6 for various C real number formats; 1 for a C identifier (i.e., non-reserved word); and 2 for a character constant.

Referring now to FIG. 4, a simple resolver 400 which converts these tokens into the numeric values required by the parser 205 (assuming that identifiers are limited to single character values from A . . . Z or a . . . z) is shown. As FIG. 3 illustrates, when called to evaluate a symbol, the resolver 400 determines which type of symbol is involved by the lexical analyzer token returned. It then calls whatever routine is appropriate to convert the contents of the token string to a numeric value. In the example above, this is trivial because the lexical analyzer 250 has been arranged to recognize C language constructs. Hence we can call the C I/O library routines to make the conversion. Once the value has been obtained, the resolver 400 calls the applicable routine and the value is assigned to the designated evaluation stack 215 entry. The resolver 400 is also called whenever a plug-in wishes to assign a value to a symbolic evaluation stack 215 entry by running the 'kResolver Assign' case block code. In this case, the value is passed in via the function parameters and the resolver 400 uses the token string in the target evaluation stack 215 entry to determine how and where to store the value.

The final purpose of the resolver function 400 is to examine and possibly edit the incoming token stream in order to effectively provide unlimited grammar complexity. For example, consider the problem of a generalized query language that uses the parser. It must define a separate sub-language for each different container type that may be encountered in a query. In such a case, a resolver function 400 could be provided that recognizes the beginning of such a sub-language sequence (for example a SQL statement) and modifies the token returned to consume the entire sequence. The parser 205 itself would then not have to know the syntax of SQL but would simply pass the entire SQL statement to the selected plug-in as the token string for the symbol returned by the recognizer. By using this approach, an application using PS_Parse( ) is capable of processing virtually any grammar can be built.

The basic Application Programming Interface (API) to the parser 205 of this invention is given below. The discussion that follows describes the basic purpose of these various API calls. Sample code for many of these functions is provided in Appendix A.

PS_SetParserTag( ), PS_GetParserTag( ). These functions get and permit modification of a number of numeric tag values associated with a parser 205. These values are not used by internal parser 205 code and are available for custom purposes. This is often essential when building custom parsing applications upon this API.

PS_Pop( ), PS_Push( ). The functions pop or push the parser 205 evaluation stack 215 and are generally called by plug-ins.

PS_PushParserState( ), PS_PopParserState( ). Push/Pop the entire internal parser 205 state. This capability can be used to implement loops, procedure calls or other similar interpreted language constructs. These functions may be called within a parser plug-in in order to cause a non-local transfer of the parser state. The entire parser state, including as a minimum the evaluation stack 215, parser stack 210, and input line buffer must be saved/restored.

PS_ParseStackElem( ). This function returns the current value of the specified parsing stack 210 element (usually the top of the stack). This stack should not be confused with the evaluation stack 215 to which most other stack access functions in this API refer. As described above, the parser stack 210 is used internally by the parser 205 for predictive parsing purposes. Values below 64 are used for internal purposes and to recognize complex tokens such as identifiers or numbers, values above 64 tend to be either terminal symbols in the language being parsed, or non-terminals that are part of the grammar syntax definition (>=32256). Plug-ins have no direct control of the parsing stack 210, however they may accomplish certain language tricks by knowing the current top of stack and altering the input stream perceived by the parser 205 as desired.

PS_PopTopOfParseStack( ),PS_PushTopOfParseStack( ). PS_PopTopOfParseStack( ) pops and discards the top of the parsing stack 210 (see PS_TopOfParseStack). This is not needed under normal circumstances, however this technique can be used to discard unwanted terminal symbols off the stack 210 in cases where the language allows these to be optional under certain circumstances too complex to describe by syntax.

PS_WillPopParseStack( ). In certain circumstances, it may be necessary for a parser recognizer function to determine if the current token will cause the existing parser stack 210 to be popped, that is "is the token in the FOLLOW set of the current top of the parse?" This information can be used to terminate specialized modes where the recognizer loops through a set of input tokens returning −3, which causes the parser 205 to bulk consume input. A parameter is also provided that allows the caller to determine where in the parsing stack 210 the search can begin, normally this would be the top of the stack i.e., parameter=0.

PS_IsLegalToken( ). This function can be used to determine if a specific terminal token is a legal starting point for a production from the specified non-terminal symbol. Among other things, this function may be used within resolver 400 functions to determine if a specific token number will cause a parsing error if returned given the current state of the parsing stack. This ability allows resolver 400 functions to adjust the tokens they return based on what the parse state is.

PS_GetProduction( ). This function obtains the parser production that would replace the specified non-terminal on the stack 210, 215 if the specified terminal were encountered in the input. This information can be used to examine future parser 205 behavior given the current parser 205 state and input. The [0] element of each element of the production returned contains the terminal or non-terminal symbol concerned and can be examined using routines like PS_IsPostFixOperator( ).

PS_IsPostFixOperator( ) determines if the specified parse stack element corresponds to the postfix operator specified.

PS_MakeDB( ). This function creates a complete predictive parsing database for use with PS_Parse( ). If successful, returns a handle to the created DB, otherwise returns zero. The algorithm utilized by this function to construct a predictive parser 205 table can be found in any good reference on compiler theory. The parser 205 utilizes a supplied lexical analyzer as described in Appendix 1. When no longer required, the parser 205 can be disposed using PS_KillDB( ).

PS_DisgardToken( ). This function can be called from a resolver 400 or plug-in to cause the current token to be discarded. In the case of a resolver 400, the normal method to achieve this effect is to return −3 as the resolver 400 result, however, calling this function is an alternative. In the case of a plug-in, a call to this function will cause an immediate call to the resolver 400 in order to acquire a new token.

PS_RegisterParser( ), PS_DeRegisterParser( ), PS_ResolveParser( ), PS_CloneDB( ). These routines are all associated with maintaining a cache of recently constructed parsers so that subsequent invocations of parsers for identical languages can be met instantaneously. The details of this cache are not pertinent to this invention.

PS_LoadBNF( ), PS_LoadBlock( ), PS_ListLanguages( ). These routines are all associated with obtaining the BNF specification for a parser 205 from a text file containing a number of such specifications. The details of this process are not pertinent to this invention.

PS_StackCopy( ). This function copies one element of a parser stack 210 to another.

PS_SetStack( ) sets an element of a parsing stack 210 to the designated type and value.

PS_CallBuiltInLex( ). This function causes the parser to move to the next token in the input stream. In some situations, a resolver 400 function may wish to call it's own lexical analyzer prior to calling the standard one, as for example, when processing a programming language where the majority of tokens appearing in the input stream will be symbol table references. By calling it's own analyzer first and only calling this function if it fails to recognize a token, a resolver 400 can save a considerable amount of time on extremely large input files.

PS_GetLineCount( ). This function returns the current line count for the parse. It is only meaningful from within the parse itself (i.e., in a plug-in or a resolver 400 function).

PS_GetStackDepth( ). This function returns the current depth of the parsing evaluation stack. This may be useful in cases where you do not want to pay strict attention to the popping of the stack during a parse, but wish to ensure that it does not overflow by restoring it to a prior depth (by successive PS_Pop( )'s) from a plug-in at some convenient synchronizing grammatical construct.

PS_SetOptions( ), PS_ClrOptions( ), PS_GetOptions( ). The function PS_SetOptions( ) may be used to modify the options for a parse DB (possibly while it is in progress). One application of such a function is to turn on full parse tracing (from within a plug-in or resolver 400) when the line count reaches a line at which you know the parse will fail. PS_ClrOptions performs the converse operation, that is, it clears the parsing options bits specified. The function PS_GetOptions( ) returns the current options settings.

PS_FlagError( ). In addition to invoking an underlying error logging facility if something goes wrong in a plug-in or resolver 400, this routine can be called to force the parser to abort. If this routine is not called, the parse will continue (which may be appropriate if the erroneous condition has been repaired).

PS_ForceReStart( ). This function causes the parse to restart the parse from scratch. It is normally used when plug-ins or resolver 400s have altered the source text as a result of the parsing process, and wish the parser to re-scan in order to force a new behavior. This function does not alter the current lexical analyzer position (i.e., it continues from where it left off). If you wish to do this also you must call PS_SetTokenState( ).

PS_StackType( ) This function gets the contents type of a parser stack element and return the stack element type. PS_GetOpCount( ) gets the number of operands that apply to the specified stack element which should be a plug-in reverse polish operator, it returns the number of operands passed to the plug-in or −1 if no operand list is found. PS_GetValue( ) gets the current value of a parser stack element and returns a pointer to the token string, or NULL if not available.

PS_SetElemFlags( ), PS_ClrElemFlags( ), PS_GetElemFlags( ). The first two routines set or clear flag bits in the stack element flag word. PS_GetElemFlags( ) returns the whole flags word. These flags may be used by resolver 400s and plug-ins to maintain state information associated with elements on the evaluation stack 215.

PS_SetiValue( ), PS_SetfValue( ), PS_SetpValue( ), PS_SetsValue( ). These routines set the current value and type of a parser stack element to the value supplied where:

PS_SetiValue( )—sets the element to a 64 bit integer

PS_SetfValue( )—sets the element to a double

PS_SetpValue( )—sets the element to a pointer value

PS_SetsValue( )—sets the element to a symbol number

PS_GetToken( ). Gets the original token string for a parsing stack element. If the stack element no longer corresponds to an original token (e.g., it is the result of evaluating an expression) then this routine will return NULL, otherwise it will return the pointer to the token string.

PS_AssignIdent( ). This routine invokes the registered identifier resolver 400 to assign a value of the specified type to that identifier; it is normally called by plug-ins in the course of their operation.

PS_EvalIdent( ). This routine invokes the registered identifier resolver 400 to evaluate the specified identifier, and assign the resulting value to the corresponding parser stack element (replacing the original identifier record); it is normally called by plug-ins in the course of their operation. Unlike all other assignments to parser stack elements, the assignment performed by the resolver 400 when called from this routine does not destroy the original value of the token string that is still available for use in other plug-in calls. If a resolver 400 wishes to preserve some kind of token number in the record, it should do so in the tag field that is preserved under most conditions.

PS_SetResolver 400( ), PS_SetPlugIn( ). These two functions allow the registration of custom resolver 400 and plug-in functions as described above. Note that when calling a plug-in, the value of the 'pluginHint' will be whatever string followed the plug-in specifier in the BNF language syntax (e.g., <@1:2:Arbitrary string>). If this optional string parameter is not specified OR if the 'kPreserveBNFsymbols' option is not specified when creating the parser, 'pluginHint' will be NULL. This capability is very useful when a single plug-in variant is to be used for multiple purposes each distinguished by the value of 'pluginHint' from the BNF. One special and very powerful form of this that will be explored in later patents is for the 'pluginHint' text to be the source for interpretation by an embedded parser, that is executed by the plug-in itself.

PS_SetLineFinder( ). Set the line-finder function for a given parser database. Line-finder functions are only required when a language may contain embedded end-of-line characters in string or character constants, otherwise the default line-finder algorithm is sufficient.

PS_SetContextID( ), PS_GetContextID( ). The set function may be called just once for a given parser database and sets the value for the 'aContextID' parameter that will be passed to all subsequent resolver 400 and plug-in calls, and which is returned by the function PS_GetContextID( ). The context ID value may be used by the parser application for whatever purpose it requires, it effectively serves as a global common to all calls related to a particular instance of the parser. Obviously an application may chose to use this value as a pointer to additional storage.

PS_AbortParse( ). This function can be called from a resolver 400 or plug-in to abort a parse that is in progress.

PS_GetSourceContext( ). This function can be used to obtain the original source string base address as well as the offset within that string corresponding to the current token pointer. This capability may be useful in cases where parser 205 recognizers or plug-ins need to see multiple lines of source text in order to operate.

PS_GetTokenState( ), PS_SetTokenState( ). These routines are provided to allow a resolver 400 function to alter the sequence of tokens appearing at the input stream of the parser 205. This technique is very powerful in that it allows the grammar to be extended in arbitrary and non-context-free ways. Callers to these functions should make sure that they set all the three token descriptor fields to the correct value to accomplish the behavior they require. Note also that if resolver 400 functions are going to actually edit the input text (via the token pointer) they should be sure that the source string passed to PS_Parse( ) 205 is not pointing to a constant string but is actually in a handle for which source modification is permissible. The judicious use of token modification in this manner is key to the present invention's ability to extend the language set that can be handled far beyond LL(1).

PS_SetFlags( ), PS_ClrFlags( ), PS_GetFlags( ). Set or clear flag bits in the parsers flag word. PS_GetFlags( ) returns the whole flags word. These flags may be used by resolver 400s and plug-ins to maintain state information.

PS_GetIntegerStackValue( ), PS_GetRealStackValue( ). These functions obtain an integer or real value from the parse evaluation stack 215.

PS_Sprintf( ). This function implements a standard C library sprintf( ) capability within a parser 205 for use by embedded languages where the arguments to PS_Sprintf( ) are obtained from the parser evaluation stack 215. This function is simply provided as a convenience for implementing this common feature.

PS_Parse( ). This function parses an input string according to the grammar provided, as set forth above. Sample code illustrating one embodiment of this function is also provided in Appendix A.

The foregoing description of the preferred embodiments of the invention has been presented for the purposes of illustration and description. For example, the term "parser" throughout this description is addressed as it is currently used in the computer arts related to compiling. This term should not be narrowly construed to only apply to compilers or related technology, however, as the method and system could be used to enhance any sort of data management system. The descriptions of the header structures should also not be limited to the embodiments described. While the sample code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

Appendix 4

A SYSTEM FOR EXCHANGING BINARY DATA

BACKGROUND OF THE INVENTION

In most modern computer environments, such as programming languages, and applications, the programming language compiler itself performs the job of defining data structures and the types and the fields that make them up. That type information is compile-time determined. This approach has the advantage of allowing the compiler itself to detect many common programmer errors in accessing compound data structures rather than allowing such errors to occur at runtime where they are much harder to find. However, this approach is completely inadequate to the needs of a distributed and evolving system since it is impossible to ensure that the code for all nodes on the system has been compiled with a compatible set of type definitions and will therefore operate correctly. The problem is aggravated when systems from different vendors wish to exchange data and information since their type definitions are bound to be different and thus the compiler can give no help in the exchange. In recent years, technologies such as B2B suites and XML have emerged to try to facilitate the exchange of information between disparate knowledge representation systems by use of common tags, which may be used by the receiving end to identify the content of specific fields. If the receiving system does not understand the tag involved, the corresponding data may be discarded. These systems simply address the problem of converting from one 'normalized' representation to another, (i.e., how do I get it from my relational database into yours?) by use of a tagged, textual, intermediate form (e.g. XML). Such text-based markup-language approaches, while they work well for simple data objects, have major shortcomings when it comes to the interchange of complex multimedia and non-flat (i.e., having multiple cross-referenced allocations) binary data. Despite the 'buzz' associated with the latest data-interchange techniques, such systems and approaches are totally inadequate for addressing the kinds of problems faced by a system, such as an intelligence system, which attempt to monitor and capture ever-changing streams of unstructured or semi-structured inputs, from the outside world and derive knowledge, computability, and understanding from the data so gathered. The conversion of information, especially complex and multimedia information to/from a textual form such as XML becomes an unacceptable burden on complex information systems and is inadequate for describing many complex data interrelationships. This approach is the current state of the art. At a minimum, what is needed is an interchange language designed to describe and manipulate typed binary data at run-time. Ideally, this type information will be held in a 'flat' (i.e., easily transmitted) form and ideally is capable of being embedded in the data itself without impact on data integrity. The system would also ideally make use of the power of compiled strongly typed programming languages (such as C) to define arbitrarily interrelated and complex structures, while preserving the ability to use this descriptive power at run-time to interpret and create new types.

SUMMARY OF INVENTION

The present invention provides a strongly-typed, distributed, run-time system capable of describing and manipulating arbitrarily complex, non-flat, binary data derived from type descriptions in a standard (or slightly extended) programming language, including handling of type inheritance. The invention comprises four main components. First, a plurality of databases having binary type and field descriptions. The flat data-model technology (hereinafter "Claimed Database") described in Appendix 1 is the preferred model for storing such information because it is capable of providing a 'flat' (i.e., single memory allocation) representation of an inherently complex and hierarchical (i.e., including type inheritance) type and field set. Second, a run-time modifiable type compiler that is capable of generating type databases either via explicit API calls or by compilation of unmodified header files or individual type definitions in a standard programming language. This function is preferably provided by the parsing technology disclosed in Appendix 2 (hereinafter "Claimed Parser"). Third, a complete API suite for access to type information as well as full support for reading and writing types, type relationships and inheritance, and type fields, given knowledge of the unique numeric type ID and the field name/path. A sample API suite is provided below. Finally, a hashing process for converting type names to unique type IDs (which may also incorporate a number of logical flags relating to the nature of the type). A sample hashing scheme is further described below.

The system of the present invention is a pre-requisite for efficient, flexible, and adaptive distributed information systems.

BRIEF DESCRIPTION OF THE DRAWINGS

FIG. 1 provides a sample implementation of the data structure ET_Field;

FIG. 2 provides a sample code implementation of the data structure ET_Type;

FIG. 3 is a block diagram illustrating a sample type definition tree relating ET_Type and ET_Field data structures; and FIG. 4 provides a sample embodiment of the logical flags that may be used to describe the typeID.

DETAILED DESCRIPTION OF THE INVENTION

The following description provides an overview of one embodiment of the invention. Please refer to the patent application incorporated herein for a more complete understanding of the Claimed Parser and Claimed Database.

All type information can be encoded by using just two structure variants, these are the 'ET_Field' structure, which is used to describe the fields of a given type, and the 'ET_Type' structure, which is used to described the type itself. Referring now to FIG. 1, a sample implementation of the ET_Field structure 100 is provided. The fields in the ET_Field structure are defined and used as follows:

"hdr" 102—This is a standard header record of type ET_Hdr as defined in the Claimed Database patent application.

"typeID" 104—This field, and the union that surrounds it, contain a unique 64-bit type ID that will be utilized to rapidly identify the type of any data item. The method for computing this type ID is discussed in detail below.

"fName" 106—This field contains a relative reference to an ET_String structure specifying the name of the field.

"fDesc" 108—This field may contain a relative reference to an ET_String structure containing any descriptive text associated with the field (for example the contents of the line comments in the type definitions above).

"fieldLink" 110—This field contains a relative reference to the next field of the current type. Fields are thus organized into a link list that starts from the "fieldHDR" 220 field 220 of the type and passes through successive "fieldLink" 110 links 110 until there are no more fields.

"offset" 112—This field contains the byte offset from the start of the parent type at which the field starts. This offset provides rapid access to field values at run-time.

"unitID" 114—This field contains the unique unit ID of the field. Many fields have units (e.g., miles-per-hour) and knowledge of the units for a given field is essential when using or comparing field values.

"bounds" 116—For fields having array bounds (e.g., and array of char[80]), this field contains the first array dimension.

"bounds2" 118—For two dimensional arrays, this field contains the second dimension. This invention is particularly well-adapted for structures of a higher dimensionality than two, or where the connections between elements of a structure is more complex that simple array indexing.

"fScript" 120—Arbitrary and pre-defined actions, functions, and scripts may be associated with any field of a type. These 'scripts' are held in a formatted character string referenced via a relative reference from this field.

"fAnnotation" 122—In a manner similar to scripts, the text field referenced from this field can contain arbitrary annotations associated with the field. The use of these annotations will be discussed in later patents.

"flagIndex" 124—It is often convenient to refer to a field via a single number rather than carrying around the field name. The field index is basically a count of the field occurrence index within the parent type and serves this purpose.

"fEchoField" 126—This field is associated with forms of reference that are not relevant to this patent and is not discussed herein.

"flagIndexTypeID" 128—In cases where a field is embedded within multiple enclosing parent types, the 'flagIndex' value stored in the field must be tagged in this manner to identify which ancestral enclosing type the index refers to.

Referring now to FIG. 2, a sample embodiment of the ET_Type structure 200 is provided. The fields of the ET_Type structure 200 are defined and used as follows:

"hdr" 202—This is a standard header record of type ET_Hdr as defined in the Claimed Database patent application.

"typeID" 204—This field, and the union that surrounds it, contain a unique 64-bit type ID that will be utilized to rapidly identify the type of any data item. The method for computing this type ID is discussed in detail below.

"name" 206—This is a relative reference to a string giving the name of the type.

"edit", "display" 208—These are relative references to strings identifying the "process" to be used to display/edit this type (if other than the default). For example the specialized process to display/edit a color might be a color-wheel dialog rather than a simple dialog allowing entry of the fields of a color (red,green,blue).

"description" 210—This is a relative reference to a string describing the type.

"ChildLink" 212—For an ancestral type from which descendant types inherit, this field gives the relative reference to the next descendant type derived from the same ancestor. Type hierarchies are defined by creating trees of derived types. The header to the list of child types at any level is the "childHdr" field 218, the link between child types is the "ChildLink" field 212. Because types are organized into multiple type databases (as discussed later), there are two forms of such links: the local form and non-local form. The non-local form is mediated by type ID references, not relative references (as for the local form), and involves the fields "childIDLink" 236, "childlDHdr" 238, and "parentID" 240 (which hold the reference from the child type to its parent). The parent reference for the local form is held in the "parent" field of "hdr" 202.

"cTypedef" 216—This field may optionally contain a relative reference to a string giving the C language type definition from which the type was created.

"childHdr" 218—This field contains the header to the list of child types at any level.

"fieldHDR" 220—Fields are organized into a link list that starts from the this field.

"keywords" 222—This field contains a relative reference to a string contain key words by which the type can be looked up.

"bounds" 224, "bounds2" 226—array dimensions as for ET_Field

"size" 228—Total size of the type in bytes.

"color" 230—To facilitate type identification in various situations, types may be assigned inheritable colors.

"fileIndex" 232—used to identify the source file from which the type was created.

"keyTypeID" 234—This field is used to indicate whether this type is designated a "key" type. In a full data-flow based system, certain types are designated 'key' types and may have servers associated with them.

"nextKeyType" 246—This field is used to link key types into a list.

"tScript" 242, "tAnnotation" 244—These fields reference type scripts and annotations as for ET_Field 100.

"maxFieldIndex" 248—This field contains the maximum field index value (see ET_Field 100) contained within the current type.

"numFields" 250—This gives the total number of fields within the current type.

To illustrate the application of these structures 100, 200 to the representation of types and the fields within them, consider the type definitions below whereby the types "Cat" and "Dog" are both descendant from the higher level type "Mammal" (denoted by the "::" symbol similar to C++ syntax).

```
typedef struct Mammal
{
   RGBColor  hairColor;
   int32     gestation;      // in days
} Mammal;
typedef struct Dog::Mammal
{
   int32     barkVol;        // in decibels
} Dog;
```

-continued

```
typedef struct Cat::Mammal
{
  int32         purrVol;            // in decibels
} Cat;
```

Because they are mammals, both Cat and Dog inherit the fields "hairColor" and "gestationPeriod" which means the additional field(s) defined for each start immediately after the total of all inherited fields (from each successive ancestor). Referring now to FIG. 3, this portion of the type definition tree when viewed as a tree of related ET_Type 200 and ET_Field 100 structures is shown. In this diagram, the vertical lines 305 linking the types 315, 320 are mediated via the "childHdr" 218 and "parent" 240 links. The horizontal line 310 linking Dog 320 and Cat 325 is mediated via "ChildLink" 242. Similarly for the field links 330, 335, 340, 345 within any given type, the fields involved are "parentID" 240, "fieldHDR" 220, and "fieldLink" 110. It is thus very obvious how one would navigate through the hierarchy in order to discover say all the fields of a given type. For example, the following sample pseudo code illustrates use of recursion to first process all inherited fields before processing those unique to the type itself.

```
void LoopOverFields (ET_Type *aType)
{
   if ( aType->hdr.parent )
      LoopOverFields(aType->hdr.parent)
   for ( fieldPtr = aType->fieldHdr ; fieldPtr ; fieldPtr =
   fieldPtr->fieldLink )
      -- do something with the field
}
```

Given this simple tree structure in which type information is stored and accessed, it should be clear to any capable software engineer how to implement the algorithms set forth in the Applications Programming Interface (API) given below. This API illustrates the nature and scope of one set of routines that provide full control over the run-time type system of this invention. This API is intended to be illustrative of the types of capabilities provided by the system of this invention and is not intended to be exhaustive. Sample code implementing the following defined API is provided in the attached Appendix A.

The routine TM_CruiseTypeHierarchy( ) recursively iterates through all the subtypes contained in a root type, call out to the provided callback for each type in the hierarchy. In the preferred embodiment, if the function 'callbackFunc' returns −1, this routine omits calling for any of that types sub-types.

The routine TM_Code2TypeDB( ) takes a type DB code (or TypeID value) and converts it to a handle to the types database to which it corresponds (if any). The type system of this invention allows for multiple related type databases (as described below) and this routine determines which database a given type is defined in.

TM_InitATypeDB( ) and TM_TermATypeDB( ) initialize and terminate a types database respectively. Each type DB is simply a single memory allocation utilizing a 'flat' memory model (such as the system disclosed in the Claimed Database patent application) containing primarily records of ET_Type 100 and ET_Field 200 defining a set of types and their interrelationships.

TM_SaveATypeDB( ) saves a types database to a file from which it can be re-loaded for later use.

TM_AlignedCopy( ) copies data from a packed structure in which no alignment rules are applied to a normal output structure of the same type for which the alignment rules do apply. These non-aligned structures may occur when reading from files using the type manager. Different machine architectures and compilers pack data into structures with different rules regarding the 'padding' inserted between fields. As a result, these data structures may not align on convenient boundaries for the underlying processor. For this reason, this function is used to handle these differences when passing data between dissimilar machine architecture.

TM_FixByteOrdering( ) corrects the byte ordering of a given type from the byte ordering of a 'source' machine to that of a 'target' machine (normally 0 for the current machine architecture). This capability is often necessary when reading or writing data from/to files originating from another computer system. Common byte orderings supported are as follows:

kBigEndian—e.g., the Macintosh PowerPC kLittleEndian—e.g., the Intel x86 architecture kCurrentByteOrdering—current machine architecture TM_FindTypeDB( ) can be used to find the TypeDB handle that contains the definition of the type name specified (if any). There are multiple type DBs in the system which are accessed such that user typeDBs are consulted first, followed by system type DBs. The type DBs are accessed in the reverse order to that in which they were defined. This means that it is possible to override the definition of an existing type by defining a new one in a later types DB. Normally the containing typeDB can be deduced from the type ID alone (which contains an embedded DB index), however, in cases where only the name is known, this function deduces the corresponding DB. This routine returns the handle to containing type DB or NULL if not found. This invention allows for a number of distinct type DBs to co-exist so that types coming from different sources or relating to different functional areas may be self contained. In the preferred embodiment, these type DBs are identified by the letters of the alphabet ('A' to 'Z') yielding a maximum of 26 fixed type databases. In addition, temporary type databases (any number) can be defined and accessed from within a given process context and used to hold local or temporary types that are unique to that context. All type DBs are connected together via a linked list and types from any later database may reference or derive from types in an earlier database (the converse is not true). Certain of these type DBs may be pre-defined to have specialized meanings. A preferred list of type DBs that have specialized meanings as follows:

'A'—built-in types and platform Toolbox header files

'B'—GUI framework and environment header files

'C'—Project specific header files

'D'—Flat data-model structure old-versions DB (allows automatic adaption to type changes)

'E'—Reserved for 'proxy' types

'F'—Reserved for internal dynamic use by the environment

'I'—Project specific ontology types

TM_GetTypeID( ) retrieves a type's ID Number when given its name. If aTypeName is valid, the type ID is returned, otherwise 0 is returned and an error is reported. TM_IsKnownTypeName( ) is almost identical but does not report an error if the specified type name cannot be found.

TM_ComputeTypeBaseID( ) computes the 32-bit unique type base ID for a given type name, returning it in the most significant 32-bit word of a 64-bit ET_TypeID 104. The base ID is calculated by hashing the type name and should thus be unique to all practical purposes. The full typeID is a 64-bit quantity where the base ID as calculated by this routine forms the most significant 32 bits while a variety of logical flags describing the type occupy the least significant 32-bits. In order to ensure that there is a minimal probability of two different names mapping onto the same type ID, the hash function chosen in the preferred embodiment is the 32-bit CRC used as the frame check sequence in ADCCP (ANSI X3.66, also known as FIPS PUB 71 and FED-STD-100 3, the U.S. versions of CCITT's X.25 link-level protocol) but with the bit order reversed. The FIPS PUB 78 states that the 32-bit FCS reduces hash collisions by a factor of 10^−5 over the 16-bit FCS. Any other suitable hashing scheme, however, could be used. The approach allows type names to be rapidly and uniquely converted to the corresponding type ID by the system. This is an important feature if type information is to be reliably shared across a network by different machines. The key point is that by knowledge of the type name alone, a unique numeric type ID can be formed which can then be efficiently used to access information about the type, its fields, and its ancestry. The other 32 bits of a complete 64-bit type ID are utilized to contain logical flags concerning the exact nature of the type and are provided in Appendix A.

Given these type flag definitions and knowledge of the hashing algorithm involved, it is possible to define constants for the various built-in types (i.e., those directly supported by the underlying platform from which all other compound types can be defined by accumulation). A sample list of constants for the various built in types is provided in Appendix A.

Assuming that the constant definitions set forth in Appendix A are used, it is clear that the very top of the type hierarchy, the built-in types (from which all other types eventually derive), are similar to that exposed by the C language. Referring now to FIG. 4, a diagrammatic representation of a built-in type is shown (where indentation implies a descendant type). Within the kUniversalType 405, the set of direct descendants includes kVoidType 410,kScalarType 41.5, kStructType 420, kUnionType 425, and kFunctionType 430. kScalarType also includes descendants for handling integers 435, descendants for handling real numbers 440 and descendants for handling special case scalar values 445. Again, this illustrates only one embodiment of built-in types that may be utilized by the present system.

The following description provides a detailed summary of some of the functions that may be used in conjunction with the present invention. This list is not meant to be exhaustive nor or many of these functions required (depending upon the functionality required for a given implementation). The pseudo code associated with these functions is further illustrated in attached Appendix A. It will be obvious to those skilled in the art how these functions could be implemented in code.

Returning now to Appendix A, a function TM_CleanFieldName( ) is defined which provides a standardized way of converting field names within a type into human readable labels that can be displayed in a UI. By choosing suitable field names for types, the system can create "human readable" labels in the corresponding UI. The conversion algorithm can be implemented as follows:

1) Convert underscores to spaces, capitalizing any letter that immediately follows the underscore
2) Capitalize the first letter
3) Insert a space in front of every capitalized letter that immediately follows a lower case letter
4) Capitalize any letter that immediately follows a '.' character (field path delimiter)
5) De-capitalize the first letter of any of the following filler words (unless they start the sentence):
   "an", "and", "of", "the", "or", "is", "as", "a"

So for example:

"aFieldName" would become "A Field Name" as would "a_field_name"

"timeOfDay" would become "Time of Day" as would "time_of_day"

A function, such as TM_AbbreveFieldName( ), could be used to provide a standardized way of converting field names within a type into abbreviated forms that are still (mostly) recognizable. Again, choosing suitable field names for types ensures both human readable labels in the corresponding UI as well as readable abbreviations for other purposes (such as generating database table names in an external relational database system). The conversion algorithm is as follows:

1) The first letter is copied over and capitalized.
2) For all subsequent letters:
   a) If the letter is a capital, copy it over and any 'numLowerCase' lower case letters that immediately follow it.
   b) If the letter follows a space or an underscore, copy it over and capitalize it
   c) If the letter is '.', '[', or ']', convert it (and any immediately subsequent letters in this set) to a single '_' character, capitalize the next letter (if any). This behavior allows this function to handle field paths.
   d) otherwise disgard it So for example:

"aFieldName" would become "AFiNa" as would "a_field_name" if 'numLowerCase' was 1, it would be 'AFieNam' if it were 2

"timeOfDay" would become "TiOfDa" as would "time of day" if 'numLowerCase' was 1, it would be 'TimOfDay' if it were 2

For a field path example:

"geog.city[3].population" would become "Ge_Ci_3_Po" if 'numLowerCase' was 1 Wrapper functions, such as TM_SetTypeEdit( ), TM_SetTypeDisplay( ), TM_SetTypeConverter( ), TM_SetTypeCtypedef( ), TM_SetTypeKeyWords( ), TM_SetType Description( ), and TM_SetTypeColor( ), may be used set the corresponding field of the ET_Type structure 200. The corresponding 'get' functions are simply wrapper functions to get the same field.

A function, TM_SetTypeIcon( ), may be provided that sets the color icon ID associated with the type (if specified). It is often useful for UI purposes to associate an identifiable icon with particular types (e.g., a type of occupation), this icon can be specified using TM_SetTypeIcon( ) or as part of the normal acquisition process. Auto-generated UI (and many other UI context) may use such icons to aid in UI clarity. Icons can also be inherited from ancestral types so that it is only necessary to specify an icon if the derived type has a sufficiently different meaning semantically in a UI context. The function TM_GetTypeIcon( ) returns the icons associated with a type (if any).

A function, such as TM_SetTypeKeyType( ), may be used to associate a key data type (see TM_GetTypeKeyType) with a type manager type. By making this association, it is possible to utilize the full suite of behaviors supported for external APIs such as Database and Client-Server APIs, including creation and communication with server(s) of that type, symbolic invocation, etc. For integration with external APIs, another routine, such as TM_KeyTypeToTypeID( ), may be used to obtain the type manager type ID corresponding to a given key data type. If there is no corresponding type ID, this routine returns zero.

Another function, TM_GetTypeName( ), may be used to get a type's name given the type ID number. In the preferred embodiment, this function returns using the 'aTypeName' parameter, the name of the type.

A function, such as TM_FindTypesByKeyword( ), may be used to search for all type DBs (available from the context in which it is called) to find types that contain the keywords specified in the 'aKeywordList' parameter. If matches are found, the function can allocate and return a handle to an array of type IDs in the 'theIDList' parameter and a count of the number of elements in this array as it's result. If the function result is zero, 'theIDList' is not allocated.

The function TM_GetTypeFileName( ) gets the name of the header file in which a type was defined (if any).

Given a type ID, a function, such as TM_GetParentTypeID( ), can be used to get the ID of the parent type. If the given ID has no parent, an ID of 0 will be returned. If an error occurs, a value of −1 will be returned.

Another function, such as TM_IsTypeDescendant( ), may be used to determine if one type is the same as or a descendant of another. The TM_IsTypeDescendant( ) call could be used to check only direct lineage whereas TM_AreTypesCompatible( ) checks lineage and other factors in determining compatibility. If the source is a descendant of, or the same as, the target, TRUE is returned, otherwise FALSE is returned.

Another set of functions, hereinafter referred to as TM_TypeIsPointer( ), TM_TypeIsHandle( ), TM_TypeIsRelRef( ), TM_TypeIsCollectionRef( ), TM_TypeIsPersistentRef( ), may be used to determine if a typeID represents a pointer/handle/relative etc. reference to memory or the memory contents itself (see typeID flag definitions). The routines optionally return the typeID of the base type that is referenced if the type ID does represent a pointer/handle/ref. In the preferred embodiment, when calling TM_TypeIsPtr( ), a type ID that is a handle will return FALSE so the determination of whether the type is a handle, using a function such as TM_TypeIsHandle( ), could be checked first where both possibilities may occur. The function TM_TypeIs Reference( ) will return true if the type is any kind of reference. This function could also return the particular reference type via a parameter, such as the 'refType' parameter.

Another function, such as TM_TypesAreCompatible( ), may be used to check if the source type is the same as, or a descendant of, the target type. In the preferred embodiment, this routine returns:

+1 If the source type is a descendant of the target type (a legal connection)

−1 If the source type is a group type (no size) and the target is descended from it (also a legal connection)

0 Otherwise (an illegal connection)

If the source type is a 'grouping' type (e.g., Scalar), i.e., it has no size then this routine will return compatible if either the source is ancestral to the target or vice-versa. This allows for data flow connections that are typed using a group to be connected to flows that are more restricted.

Additional functions, such as TM_GetTypeSize( ) and TM_SizeOf( ), could be applied in order to return the size of the specified data type. For example, TM_GetTypeSize( ) could be provided with an optional data handle which may be used to determine the size of variable sized types (e.g., strings). Either the size of the type could be returned or, alternatively, a 0 could be returned for an error. TM_SizeOf( ) could be provided with a similar optional data pointer. It also could return the size of the type or 0 for an error.

A function, such as TM_GetTypeBounds( ), could be programmed to return the array bounds of an array type. If the type is not an array type, this function could return a FALSE indicator instead.

The function TM_GetArrayTypeElementOffset( ) can be used to access the individual elements of an array type. Note that this is distinct from accessing the elements an array field. If a type is an array type, the parent type is the type of the element of that array. This knowledge can be used to allow assignment or access to the array elements through the type manager API.

The function TM_InitMem( ) initializes an existing block of memory for a type. The memory will be set to zero except for any fields which have values which will be initialized to the appropriate default (either via annotation or script calls—not discussed herein). The function TM_NewPtr( ) allocates and initializes a heap data pointer. If you wish to allocate a larger amount of memory than the type would imply, you may specify a non-zero value for the 'size' parameter. The value passed should be TM_GetTypeSize( . . . )+the extra memory required. If a type ends in a variable sized array parameter, this will be necessary in order to ensure the correct allocation. The function TM_NewHdl( ) performs a similar function for a heap data handle. The functions TM_DisposePtr( ) and TM_DisposeHdl( ) may be used to de-allocate memory allocated in this manner.

The function TM_LocalFieldPath( ) can be used to truncate a field path to that portion that lies within the specified enclosing type. Normally field paths would inherently satisfy this condition, however, there are situations where a field path implicitly follows a reference. This path truncation behavior is performed internally for most field related calls. This function should be used prior to such calls if the possibility of a non-local field path exists in order to avoid confusion. For example:

```
typedef struct t1
{
    char     x[16];
} t1;
typedef struct t2
{
    t1      y;
} t2;
then TM_LocalFieldPath(,t2,“y.x[3]”,) would yield the string “y”.
```

Given a type ID, and a field within that type, TM_GetFieldTypeID( ) will return the type ID of the aforementioned field or 0 in the case of an error.

The function TM_GetBuiltInAncestor( ) returns the first built-in direct (i.e., not via a reference) ancestor of the type ID given.

Two functions, hereinafter called TM_GetIntegerValue( ) and TM_GetRealValue( ), could be used to obtain integer and real values in a standardized form. In the preferred embodiment, if the specified type is, or can be converted to, an integer value, the TM_GetIntegerValue( ) would return that value as the largest integer type (i.e., int64). If the specified type is, or can be converted to, a real value, TM_GetRealValue( ) would return that value the largest real type (i.e., long double). This is useful when code does not want to be concerned with the actual integer or real variant used by the type or field. Additional functions, such as TM_SetIntegerValue( ) and TM_SetRealValue( ), could perform the same function in the opposite direction.

Given a type ID, and a field within that type, a function, hereinafter called TM_GetFieldContainerTypeID( ), could be used to return the container type ID of the aforementioned field or 0 in the case of an error. Normally the container type ID of a field is identical to 'aTypeID', however, in the case where a type inherits fields from other ancestral types, the field specified may actually be contributed by one of those ancestors and in this case, the type ID returned will be some ancestor of 'aTypeID'. In the preferred embodiment, if a field path is specified via 'aFieldName' (e.g., field1 . . . field2) then the container type ID returned would correspond to the immediate ancestor of 'field2', that is 'field1'. Often these inner structures are anonymous types that the type manager creates during the types acquisition process.

A function, hereinafter called TM_GetFieldSize( ), returns the size, in bytes, of a field, given the field name and the field's enclosing type; 0 is returned if unsuccessful.

A function, hereinafter called TM_IsLegalFieldPath( ), determines if a string could be a legal field path, i.e., does not contain any characters that could not be part of a field path. This check does not mean that the path actually is valid for a given type, simply that it could be. This function operates by rejecting any string that contains characters that are not either alphanumeric or in the set '[', ']', '_', or '.'. Spaces are allowed only between '[' and ']'.

Given an enclosing type ID, a field name, and a handle to the data, a function, hereinafter known as TM_GetFieldValueH( ), could be used to copy the field data referenced by the handle into a new handle. In the preferred embodiment, it will return the handle storing the copy of the field data. If the field is an array of 'char', this call would append a terminating null byte. That is if a field is "char[4]" then at least a 5 byte buffer must be allocated in order to hold the result. This approach greatly simplifies C string handling since returned strings are guaranteed to be properly terminated. A function, such as TM_GetFieldValueP( ), could serve as the pointer based equivalent. Additionally, a function such as TM_SetFieldValue( ) could be used to set a field value given a type ID, a field name and a binary object. It would also return an error code in an error.

A function, such as TM_SetCStringFieldValue( ), could be used to set the C string field of a field within the specified type. This function could transparently handle logic for the various allowable C-string fields as follows:

1) if the field is a charHdl then:
   a) if the field already contains a value, update/grow the existing handle to hold the new value
   b) otherwise allocate a handle and assign it to the field
2) if the field is a charPtr then:
   a) if the field already contains a value:
      i) if the previous string is equal to or longer than the new one, copy new string into existing pointer
      ii) otherwise dispose of previous pointer, allocate a new one and assign it
   b) otherwise allocate a pointer and assign it to the field
3) if the field is a relative reference then:
   a) this should be considered an error. A pointer value could be assigned to such a field prior to moving the data into a collection in which case you should use a function similar to the TM_SetFieldValue( ) function described above.
4) if the field is an array of char then:
   a) if the new value does not fit, report array bounds error
   b) otherwise copy the value into the array A function, such as TM_AssignToField( ), could be used to assign a simple field to a value expressed as a C string. For example, the target field could be:

a) Any form of string field or string reference;

b) A persistent or collection reference to another type; or c) Any other direct simple or structure field type. In this case the format of the C string given should be compatible with a call to TM_StringToBinary( ) (described above) for the field type involved. The delimiter for TM_StringToBinary( ) is taken to be "," and the 'kCharArrayAsString' option (see TM_BinaryToString) is assumed.

In the preferred embodiment, the assignment logic used by this routine (when the 'kAppendStringValue' is present) would result in existing string fields having new values appended to the end of them rather than being overwritten. This is in contrast to the behavior of TM_SetCStringFieldValue( ) described above. For non-string fields, any values specified overwrite the previous field content with the exception of assignment to the 'aStringH' field of a collection or persistent reference with is appended if the 'kAppendStringValue' option is present. If the field being assigned is a collection reference and the 'kAppendStringValue' option is set, the contents of 'aStringPtr' could be appended to the contents of a string field. If the field being assigned is a persistent reference, the 'kAssignToRefType', 'kAssignToUniqueID' or 'kAssignToStringH' would be used to determine if the typeID, unique ID, or 'aStringH' field of the reference is assigned. Otherwise the assignment is to the name field. In the case of 'kAssignToRefType', the string could be assumed to be a valid type name which is first converted to a type ID. If the field is a relative reference (assumed to be to a string), the contents of 'aStringPtr' could be assigned to it as a (internally allocated) heap pointer.

Given an enclosing type ID, a field name, and a pointer to the data, a function such as TM_SetArrFieldValue( ) could be used to copy the data referenced by the pointer into an element of an array field element into the buffer supplied. Array fields may have one, or two dimensions.

Functions, hereinafter named TM_GetCStringFieldValueB( ), TM_GetCStringFieldValueP( ) and TM_GetCStringFieldValueH( ), could be used to get a C string field from a type into a buffer/pointer/handle. In the case of a buffer, the buffer supplied must be large enough to contain the field contents returned. In other cases the function or program making the call must dispose of the memory returned when no longer required. In the preferred embodiment, this function will return any string field contents regardless of how is actually stored in the type structure, that is the field value may be in an array, via a pointer, or via a handle, it will be returned in the memory supplied. If the field type is not appropriate for a C string, this function could optionally return FALSE and provide an empty output buffer.

Given an enclosing type ID, a field name, and a pointer to the data, the system should also include a function, hereinafter name TM_GetArrFieldValueP( ), that will copy an element of an array field element's data referenced by the pointer into the buffer supplied. Array fields may have one, or two dimensions.

Simple wrapper functions, hereinafter named TM_GetFieldBounds( ), TM_GetFieldOffset( ), TM_GetField Units( ), and TM_GetFieldDescription( ), could be provided in order to access the corresponding field in ET_Field 100 . Corresponding 'set' functions (which are similar) could also be provided.

The function TM_ForAllFieldsLoop( ) is also provided that will iterate through all fields (and sub-fields) of a type invoking the specified procedure. This behavior is commonplace in a number of situations involving scanning the fields of a type. In the preferred embodiment, the scanning process should adhere to a common approach and as a result a function, such as this one, should be used for that purpose. A field action function takes the following form:

| | | |
|---|---|---|
| Boolean myActionFn | ( | // my field action function |
| ET_TypeDBHdl | aTypeDBHdl, | // I: Type DB (NULL to default) |
| ET_TypeID 104 | aTypeID, | // I: The type ID |
| ET_TypeID 104 | aContainingTypeID, | // I: containing Type ID of field |
| anonPtr | aDataPtr, | // I: The type data pointer |
| anonPtr | context, | // IO:Use to pass custom context |
| charPtr | fieldPath, | // I:Field path for field |
| ET_TypeID 104 | aFieldTypeID, | // I:Type ID for field |
| int32 (0 if N/A) | dimension1, | // I:Field array bounds 1 |
| int32 (0 if N/A) | dimension2, | // I:Field array bounds 2 |
| int32 | fieldOffset, | V20 // I:Offset of start of field |
| int32 | options, | // I:Options flags |
| anonPtr | internalUseOnly | // I:For internal use only |
| | ) | // R:TRUE for success |

In this example, fields are processed in the order they occur, sub-field calls (if appropriate) occur after the containing field call. If this function encounters an array field (1 or 2 dimensional), it behaves as follows:

a) The action function is first called once for the entire field with no field indexing specified in the path.

b) If the element type of the array is a structure (not a union), the action function will be invoked recursively for each element with the appropriate element index(es) reflected in the 'fieldPath' parameter, the appropriate element specific value in 'fieldOffset', and 0 for both dimension1 and dimension2.

This choice of behavior for array fields offers the simplest functional interface to the action function. Options are:

kRecursiveLoop—If set, recurses through sub-fields, otherwise one-level only kDataPtrIsViewRef—The 'aDataPtr' is the address of an ET_ViewRef designating a collection element A function, hereinafter referred to as TM_FieldNameExists( ), could be used to determine if a field with the given name is in the given type, or any of the type's ancestral types. If the field is found return it returns TRUE, otherwise it returns FALSE.

A function, hereinafter referred to as TM_GetNumberOfFields( ), may be used to return the number of fields in a given structured type or a −1 in the case of an error. In the preferred embodiment, this number is the number of direct fields within the type, if the type contains sub-structures, the fields of these sub-structures are not counted towards the total returned by this function. One could use another function, such as TM_ForAllFieldsLoop( ), to count fields regardless of level with 'kRecursiveLoop' set true and a counting function passed for 'aFieldFn' (see TM_GetTypeMaxFlagIndex).

Another function, referred to as TM_GetFieldFlagIndex( ), can provide the 'flag index' for a given field within a type. The flag index of a field is defined to be that field's index in the series of calls that are made by the function TM_ForAllFieldsLoop( ) (described above) before it encounters the exact path specified. This index can be utilized as an index into some means of storing information or flags specific to that field within the type. In the preferred embodiment, these indexes include any field or type arrays that may be within the type. This function may also be used internally by a number of collection flag based APIs but may also be used by external code for similar purposes. In the event that TM_ForAllFieldsLoop( ) calls back for the enclosing structure field before it calls back for the fields within this enclosing structure, the index may be somewhat larger than the count of the 'elementary' fields within the type. Additionally, because field flag indexes can be easily converted to/from the corresponding field path (see TM_FlagIndexToFieldPath), they may be a useful way of referring to a specific field in a variety of circumstances that would make maintaining the field path more cumbersome. Supporting functions include the following: TM_FieldOffsetToFlagIndex( ) is a function that converts a field offset to the corresponding flag index within a type; TM_FlagIndexToFieldPath( ) is a function that converts a flag index to the corresponding field path within a type; and the function TM_GetTypeMaxFlagIndex( ) returns the maximum possible value that will be returned by TM_GetFieldFlagIndex( ) for a given type. This can be used for example to allocate memory for flag storage.

Another function, referred to as TM_FieldNamesToIndexes( ), converts a comma separated list of field names/paths to the corresponding zero terminated list of field indexes. It is often the case that the 'fieldNames' list references fields within the structure that is actually referenced from a field within the structure identified by 'aTypeID'. In this case, the index recorded in the index list will be of the referencing field, the remainder of the path is ignored. For this reason, it is possible that duplicate field indexes might be implied by the list of 'fieldNames' and as a result, this routine can also be programmed to automatically eliminate duplicates.

A function, hereinafter name TM_GetTypeProxy( ), could be used to obtain a proxy type that can be used within collections in place of the full persistent type record and which contains a limited subset of the fields of the original type. While TM_GetTypeProxy( ) could take a list of field indexes, the function TM_MakeTypeProxyFromFields( ) could be used to take a comma separated field list. Otherwise, both functions would be identical. Proxy types are all descendant of the type ET_Hit and thus the first few fields are identical to those of ET_Hit. By using these fields, it is possible to determine the original persistent value to which the proxy refers. The use of proxys enables large collections and lists to be built up and fetched from servers without the need to fetch all the corresponding data, and without the memory requirements implied by use of the referenced type(s). In the preferred embodiment, proxy types are formed and used dynamically. This approach provides a key advantage of the type system of this invention and is crucial to efficient operation of complex distributed systems. Proxy types are temporary, that is, although they become known throughout the application as soon as they are defined using this function, they exist only for the duration of a given run of the application. Preferably, proxy types are actually created into type database 'E' which is reserved for that purpose (see above). Multiple proxys may also be defined for the same type having different index lists. In such a case, if a matching proxy already exists in 'E', it is used. A proxy type can also be used in place of the actual type in almost all situations, and can be rapidly resolved to obtain any additional fields of the original type. In one embodiment, proxy type names are of the form:

typeName_Proxy_n

Where the (hex) value of 'n' is a computed function of the field index list.

Another function that may be provided as part of the API, hereinafter called TM_MakeTypeProxyFromFilter( ), can be used to make a proxy type that can be used within collections in place of the full persistent type record and which contains a limited subset of the fields of the original type. Preferably, the fields contained in the proxy are those allowed by the filter function, which examines ALL fields of the full type and returns TRUE to include the field in the proxy or FALSE to exclude the field. For more information concerning proxy types, see the discussion for the function TM_MakeTypeProxyFromFields( ). The only difference between this function and the function TM_MakeTypeProxyFromFields( ) is that TM_MakeTypeProxyFromFields( ) expects a comma separated field list as a parameter instead of a filter function. Another function, TM_IsTypeProxy( ), could be used to determine if a given type is a proxy type and if so, what original persistent type it is a proxy for. Note that proxy type values start with the fields of ET_Hit and so both the unique ID and the type ID being referenced may be obtained more accurately from the value. The type ID returned by this function may be ancestral to the actual type ID contained within the proxy value itself. The type ET_Hit may be used to return data item lists from servers in a form that allows them to be uniquely identified (via the _system and _id fields) so that the full (or proxy) value can be obtained from the server later. ET_Hit is defined as follows:

```
typedef struct ET_Hit                        // list of query hits returned by a
                                             server
{
  OSType          _system;                   // system tag
  unsInt64        _id;                       // local unique item ID
  ET_TypeID 104   _type;                     // type ID
  int32           _relevance;                // relevance value 0..100
} ET_Hit;
```

The function TM_GetNthFieldType( ) gets the type of the Nth field in a structure. TM_GetNthFieldName( ) obtains the corresponding field name and TM_GetNthFieldOffset( ) the corresponding field offset.

Another function that may be included within the API toolset is a function called TM_GetTypeChildren( ). This function produces a list of type IDs of the children of the given type. This function allocates a zero terminated array of ET_TypeID 104's and returns the address of the array in 'aChildIDList'; the type ID's are written into this array. If 'aChildIDList' is specified as NULL then this array is not allocated and the function merely counts the number of children; otherwise 'aChildIDList' must be the address of a pointer that will point at the typeID array on exit. A negative number is returned in the case of an error. In the preferred embodiment, various specialized options for omitting certain classes of child types are supported.

A function, hereinafter referred to as TM_GetTypeAncestors( ), may also be provided that produces a list of type IDs of ancestors of the given type. This function allocates a zero terminated array of ET_TypeID 104 and returns the address of the array in 'ancestralIDs'; the type ID's are written into this array. If 'ancestralIDs' is specified as NULL then this array is not allocated and the function merely counts the number of ancestors; otherwise 'ancestralIDs' must be the address of a pointer that will point at the typeID array on exit. The last item in the list is a 0, the penultimate item is the primal ancestor of the given type, and the first item in the list is the immediate predecessor, or parent, of the given type. The function TM_GetTypeAncestorPath( ) produces a ':' separated type path from a given ancestor to a descendant type. The path returned is exclusive of the type name but inclusive of the descendant, empty if the two are the same or 'ancestorID' is not an ancestor or 'aTypeID'. The function TM_GetInheritanceChain( ) is very similar to TM_GetTypeAncestors( ) with the following exceptions:

(1) the array of ancestor type ids returned is in reverse order with the primal ancestor being in element 0
(2) the base type from which the list of ancestors is determined is included in the array and is the next to last element (array is 0 terminated)
(3) the count of the number of ancestors includes the base type In the preferred embodiment, this function allocates a zero terminated array of ET_TypeID 104's and returns the address of the array in 'inheritanceChainIDs'; the type ID's are written into this array. If 'inheritanceChainIDs' is specified as NULL then this array is not allocated and the function merely counts the number of types in the inheritance chain; otherwise 'inheritanceChainIDs' must be the address of a pointer that will point at the typeID array on exit. The last item in the list is 0, element 0 is the primal ancestor of the base type, and the next to last item in the list is the base type.

The API could also include a function, hereinafter called TM_GetTypeDescendants( ), that is able to create a tree collection whose root node is the type specified and whose branch and leaf nodes are the descendant types of the root. Each node in the tree is named by the type name and none of the nodes contain any data. Collections of derived types can serve as useful frameworks onto which various instances of that type can be 'hung' or alternatively as a navigation and/or browsing framework. The resultant collection can be walked using the collections API (discussed in a later patent). The function TM_GetTypeSiblings( ) produces a list of type IDs of sibling types of the given type. This function allocates a zero terminated array of ET_TypeID 104's and returns the address of the array in 'aListOSibs', the type ID's are written into this array. If 'aListOSibs' is specified as NULL then this array is not allocated and the function merely counts the number of siblings; otherwise 'ancestralIDs' must be the address of a pointer that will point at the typeID array on exit. The type whose siblings we wish to find is NOT included in the returned list. The function TM_GetNthChildTypeID( ) gets the n'th child Type ID for the passed in parent. The function returns 0 if successful, otherwise it returns an error code.

The function TM_BinaryToString( ) converts the contents of a typed binary value into a C string containing one field per delimited section. During conversion, each field in turn is converted to the equivalent ASCII string and appended to the entire string with the specified delimiter sequence. If no delimiter is specified, a new-line character is used. The handle, 'aStringHdl', need not be empty on entry to this routine in which case the output of this routine is appended to whatever is already in the handle. If the type contains a variable sized array as its last field (i.e., stuff[ ]), it is important that 'aDataPtr' be a true heap allocated pointer since the pointer size itself will be used to determine the actual dimensions of the array. In the preferred embodiment, the following specialized options are also available:

kUnsignedAsHex—display unsigned numbers as hex
kCharArrayAsString—display char arrays as C strings
kShowFieldNames—prefix all values by fieldName:
kOneLevelDeepOnly—Do Not go down to evaluate sub-structures:

An additional function, hereinafter referred to as TM_StringToBinary( ), may also be provided in order to convert the contents of a C string of the format created by TM_BinaryToString( ) into the equivalent binary value in memory.

The API may also support calls to a function, hereinafter referred to as TM_LowestCommonAncestor( ), which obtains the lowest common ancestor type ID for the two type IDs specified. If either type ID is zero, the other type ID is returned. In the event that one type is ancestral to the other, it is most efficient to pass it as the 'typeID2' parameter.

Finally, a function, referred to as TM_DefineNewType( ), is disclosed that may be used to define a new type to be added to the specified types database by parsing the C type definition supplied in the string parameter. In the preferred embodiment, the C syntax typedef string is preserved in its entirety and attached to the type definition created so that it may be subsequently recalled. If no parent type ID is supplied, the newly created type is descended directly from the appropriate group type (e.g., structure, integer, real, union etc.) the typedef supplied must specify the entire structure of the type (i.e., all fields). If a parent type ID is supplied, the new type is created as a descendant of that type and the typedef supplied specifies only those fields that are additional to the parental type, NOT the entire type. This function is the key to how new types can be defined and incorporated into the type system at run time and for that reason is a critical algorithm to the present invention. The implementation is based on the parser technology described in Claimed Parser patent application and the lexical analyzer technology (the "Claimed Lexical Analyzer") as provided in Appendix 3. As set forth above, those pending applications are fully incorporated herein. The reader is referred to those patents (as well as the Claimed Database patent application) for additional details. The BNF specification to create the necessary types parser (which interprets an extended form of the C language declaration syntax) is provided in Appendix A. The corresponding lexical analyzer specification is also provided in Appendix A.

As can be seen from the specifications in Appendix A, the types acquisition parser is designed to be able to interpret any construct expressible in the C programming language but has been extended to support additional features. The language symbols associated with these extensions to C are as follows:

script—used to associate a script with a type or field annotation—used to associate an annotation with a type or field @—relative reference designator (like '*' for a pointer)

@@—collection reference designator—

#—persistent reference designator

<on>—script and annotation block start delimiter

<no>—script and annotation block end delimiter

><—echo field specification operator

In order to complete the types acquisition process, a 'resolver' function and at least one plug-in are provided. A pseudo code embodiment of one possible resolver is set forth in Appendix A. Since most of the necessary C language operations are already provided by the built-in parser plug-in zero, the only extension of this solution necessary for this application is the plug-in functionality unique to the type parsing problem itself. This will be referred to as plug-in one and the pseudo code for such a plug in is also provided in Appendix A.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

Appendix 5

SYSTEM AND METHOD FOR MANAGING COLLECTIONS OF DATA ON A NETWORK

BACKGROUND OF THE INVENTION

There are several problems associated with sharing aggregated data in a distributed environment. The primary problems involve: (1) enabling systems to share their "knowledge" of data; (2) enabling storage of data for distribution across the computing environment; and (3) a framework for efficiently creating, persisting, and sharing data across the network. The problem of defining a run-time type system capable of manipulating strongly typed binary information in a distributed environment has been addressed in a previous patent, attached hereto as Appendix 1, hereinafter referred to as the "Types Patent". The second problem associated with sharing data in a distributed environment is the need for a method for creating and sharing aggregate collections of these typed data objects and the relationships between them. A system and method for achieving this is a 'flat', i.e., single contiguous allocation memory model, attached hereto as Appendix 2. This flat model, containing only 'relative' references, permits the data to be shared across the network while maintaining the validity of all data cross-references which are now completely independent of the actual data address in computer memory. The final problem that would preferably be addressed by such a system is a framework within which collections of such data can be efficiently created, persisted, and shared across the network. The goal of any system designed to address this problem should be to provide a means for manipulating arbitrary collections of interrelated typed data such that the physical location where the data is 'stored' is hidden from the calling code (it may in fact be held in external databases), and whereby collections of such data can be transparently and automatically shared by multiple machines on the network thus inherently supporting data 'collaboration' between the various users and processes on the network. Additionally, it should be a primary goal of such a framework that data 'storage' be transparently distributed, that is the physical storage of any given collection may be within multiple different containers and may be distributed across many machines on the network while providing the appearance to the user of the access API, of a single logical collection whose size can far exceed available computer memory.

Any system that addresses this problem would preferably support at least three different 'container' types within which the collection of data can transparently reside (meaning the caller of the API does not need to know how or where the data is actually stored). The first and most obvious is the simple case where the data resides in computer memory as supported by the 'flat' memory model. This container provides maximum efficiency but has the limitation that the collection size cannot exceed the RAM (or virtual) memory available to the process accessing it. Typically on modern computers with 32-bit architectures this puts a limit of around 2-4 GB on the size of a collection. While this is large for many applications, it is woefully inadequate for applications involving massive amounts of data in the terrabye or petabyte range. For this reason, a file-based storage container would preferably be implemented (involving one or more files) such that the user of a collection has only a small stub allocation in memory while all accesses to the bulk of the data in the collection are actually to/from file (possibly memory-cached for efficiency) . Because the information in the flat memory model contains only 'relative' references, it is equally valid when stored and retrieved from file, and this is an essential feature when implementing 'shadow' containers. The file-based approach minimizes the memory footprint necessary for a collection thus allowing a single application to access collections whose total size far exceeds that of physical memory. There is essentially no limit to the size of data that can be manipulated in this manner, however, it generally becomes the case that with such huge data sets, one wants access to, and search of, the data to be a distributed problem, i.e., accomplished via multiple machines in parallel. For this reason, and for reasons of data-sharing and collaboration, a third kind of container, a 'server-based' collection would preferably be supported. Other machines on the network may 'subscribe' to any previously 'published' server-based collection and manipulate it through the identical API, without having to be aware of its possibly distributed server-based nature.

SUMMARY OF INVENTION

The present invention provides an architecture for supporting all three container types. The present invention uses the following components: (1) a 'flat' data model wherein arbitrarily complex structures can be instantiated within a single memory allocation (including both the aggregation arrangements and the data itself, as well as any cross references between them via 'relative' references); (2) a run-time type system capable of defining and accessing binary strongly-typed data; (3) a set of 'containers' within which information encoded according to the system can be physically stored and preferably include a memory resident form, a file-based form, and a server-based form; (4) a client-server environment that is tied to the types system and capable of interpreting and executing all necessary collection manipulations remotely; (5) a basic aggregation structure providing as a minimum a 'parent', 'nextChild', 'previousChild', 'firstChild', and 'lastChild' links or equivalents; and (6) a data attachment structure (whose size may vary) to which strongly typed data can be attached and which is associated in some manner with (and possibly identical to) a containing aggregation node in the collection. The invention enables the creation, management, retrieval, distribution of massively large collections of information that can be shared across a distributed network without building absolute references or even pre-existing knowledge of the data and data structures being stored in such an environment.

The present invention also provides a number of additional features that extend this functionality in a number of important ways. For example, the aggregation models supported by the system and associated API include support for stacks, rings, arrays (multi-dimensional), queues, sets, N-trees, B-trees, and lists and arbitrary mixtures of these types within the same organizing framework including the provision of all the basic operations (via API) associated with the data structure type involved in addition to searching and sorting. The present invention further includes the ability to 'internalize' a non-memory based storage container to memory and thereafter automatically echoing all write actions to the actual container thereby gaining the performance of memory based reads with the assurance of persistence via automated echoing of writes to the external storage container. The present invention also supports server-based publishing of collections contents and client subscription thereto such that the client is transparently and automatically notified of all changes occurring to the server-based collection and is also able to transparently affect changes to that collection thereby facilitating automatic data collaborations between disparate nodes on the network. This invention and other improvements to such invention will be further explained below.

BRIEF DESCRIPTION OF THE FIGURES

FIG. 1 illustrates a sample one-dimensional structure.

FIG. 2 illustrates a generalized N-Tree.

FIG. 3 illustrates a 2*3 two-dimensional array.

FIG. 4 illustrates a sample memory structure of a collection containing 3 'value' nodes.

FIG. 5 illustrates a sample memory structure having various fields including references to other nodes in the collection.

FIG. 6 illustrates a diagrammatic representation of the null and dirty flags of the present invention.

DETAILED DESCRIPTION OF THE PREFERRED EMBODIMENT

For the purposes of this description, the existence of a client-server architecture tied to types via the 'key data type' concept, as disclosed in the Types Patent, such that the location of the server from which a given collection can be obtained will be assumed. The actual physical manifestation of a server-based collection may use any of the three container types described above (i.e., memory, file and server) thus it is possible to construct trees of server-based collections whose final physical form may be file or memory based.

To manipulate any arbitrary collection of related data in a distributed environment, some form of representation of an inherently complex and hierarchical collection of information is required. In the preferred embodiment, a 'flat' (i.e., single memory allocation) form of representation is used. The flat data-model technology attached hereto in Appendix 2. (hereinafter the "Memory Patent") provides the ideal environment for achieving this. In order to understand many of the descriptions below, the reader is referred to the Memory Patent, which is incorporated by reference herein. Just two structure variants based on this model are needed to encode collection and data information, these are the 'ET_Simplex' structure (which is used to hold and access the typed data described via the 'typeID' using the run-time type system described in Appendix 1 attached hereto (hereinafter the "Types Patent")) and the 'ET_Complex' structure (used to describe collections of data elements and the parent/child relationships between them). These two structures are set forth in pseudo code and defined below (in addition to the Memory Patent).

```
typedef struct ET_Simplex                                // Simplex Type record
{ //
  ET_Hdr                         hdr;                    // Standard header
  int32                          size;                   // size of simplex value
(in bytes)
  ET_Offset /* ET_Simplex */     nullFlags;              // !!! ref. to null
```

-continued

```
flags simplex
   ET_Offset /* ET_Simplex */          dirtyFlags;           // !!! ref. to dirty
flags simplex
   long                                notUsed[2];           // spare
   char                                value[NULL_ARR];      // value (actual size
varies)
} ET_Simplex; //
typedef struct ET_Complex                                    // Complex Type record
{ //
   ET_Hdr                              hdr;                  // Standard header
   ET_LexHdl                           recognizer;           // Name recognizer DB
(if applicable)
   Handle                              valueH;               // handle to value of
element
   ET_Offset /* ET_SimplexPtr */       valueR;               // ref to value simplex
   union
   {
      ET_TypeID                        typeID;               // ID of this type
      struct
      {
         unsInt32                      crc;                  // ID viewed as a pair
of integers
         unsInt32                      flags;
      } s;
   } u;
   ET_Offset /* ET_ComplexPtr */       nextElem;             // !!! link to next
element
   ET_Offset /* ET_ComplexPtr */       prevElem;             // !!! link to previous
element
   ET_Offset /* ET_ComplexPtr */       childHdr;             // !!! link to first
child element
   ET_Offset /* ET_ComplexPtr */       childTail;            // !!! link to last
child element
   long                                fromWhich;            // collection type
   int32                               dimension;            // current # of nodes
children
   char                                name[kNodeNameSize];  // element name
   long                                tag;                  // tag value (if used)
   ET_Offset /* ET_StringPtr */        description;          // Description (if
relevant)
   ET_Offset /* ET_StringPtr */        tags;                 // !!! ref. to tags
string
   ET_ElementDestructor                destructorFn;         // Custom destructor
function
   unsInt32 shortCut;                  // Shortcut           sequence (if
any)
   ET_ProcreatorFn                     procreator;           // Procreator function
   long notUsed[3];                    // not used
} ET_Complex;                                                //
```

In the preferred embodiment, the various fields within the ET_Simplex structure are defined and used as follows:

"hdr"—This is a standard header record of type ET_Hdr

"size"—This field holds the size of the 'value' array (which contains the actual typed data) in bytes.

"nullFlags"—This is a relative reference to another ET_Simplex structure containing the null flags array.

"dirtyFlags"—This is a relative reference to another ET_Simplex structure containing the dirty flags array.

"value"—This variable sized field contains the actual typed data value as determined by the 'typeID' field of the parent complex record.

The various fields within the ET_Complex structure are defined and used as follows:

"hdr"—This is a standard header record of type ET_Hdr as

"recognizer"—This field may optionally hold a reference to a lexical analyzer based lookup table used for rapid lookup of a node's descendants in certain types of complex structure arrangements (e.g., a 'set'). The use of such a recognizer is an optimization only.

"valueH"—Through the API described below, it is possible to associate a typed value with a node either by incorporating the value into the collection as a simplex record (referenced via the 'valueR' field), or by keeping the value as a separate heap-allocated value referenced directly from the 'valueH' field. The use of internal values via the 'valueR' field is the default and is preferred, however, some situations may require non-flat reference to external memory, and by use of the 'valueH' field, this is possible.

"valueR"—This field contains a relative reference to the ET_Simplex record containing the value of the node (if any).

"typeID"—This field (if non-zero) gives the type ID of the data held in the associated value record.

"prevElem"—This field holds a relative reference to the previous sibling record for this node (if any).

"nextElem"—This field holds a relative reference to the next sibling record for this node (if any).

"childHdr"—This field holds a relative reference to the first child record for the node (if any).

"childTail"—This field holds a relative reference to the last child record for the node (if any).

"fromWhich"—For a root node, this field holds the complex structure variant by which the descendants of the node are organized. The minimum supported set of such values (which supports most of the basic data aggregation metaphors in common use) is as follows (others are possible):

kFromArray—one dimensional array structure
kFromList—one directional List Structure
kFromStack—Stack structure
kFromQueue—Queue structure
kFromSet—Set Type
kFromBTree—Binary tree
kFromNTree—Generalized Tree with variable branches/node
kFromArrayN—N dimensional array structure "dimension"—Although it is possible to find the number of children of a given node by walking the tree, the dimension field also holds this information. In the case of multi-dimensional array accesses, the use of the dimension field is important for enabling efficient access.

"name"—Each complex node in a collection may optionally be named. A node's name is held in the "name" field. By concatenating names of a node and its ancestors, one can construct a unique path from any ancestral node to any descendant node.

"tag"—This field is not utilized internally by this API and is provided to allow easy tagging and searching of nodes with arbitrary integer values.

"description"—Arbitrary textual descriptions may be attached to any node using this field via the API provided.

"tags"—This string field supports the element tags portion of the API (see below).

"destructorFn"—If a node requires custom cleanup operations when it is destroyed, this can be accomplished by registering a destructor function whose calling address is held in this field and which is guaranteed to be called when the node is destroyed.

"shortcut"—This field holds an encoded version of a keyboard shortcut which can be translated into a node reference via the API. This kind of capability is useful in UI related applications of collections as for example the use of a tree to represent arbitrary hierarchical menus.

"procreator"—This field holds the address of a custom child node procreator function registered via the API. Whenever an attempt is made to obtain the first child of a given node, if a procreator is present, it will first be called and given an opportunity to create or alter the child nodes. This allows "lazy evaluation" of large and complex trees (e.g., a disk directory) to occur only when the user actions actually require the inner structure of a given node to be displayed.

Given the structures described above, it is clear that implementation of a one-dimensional structure is simply a matter of connecting the 'next' and 'prev' links of ET_Complex records and then providing the appropriate operations for the logical type (e.g., push/pop for a stack, queue/dequeue for a queue etc.). One familiar with data structures can readily deduce the actual algorithms involved in implementing all such operations given knowledge of the representation above.

Referring now to FIG. 1, a graphical representation of a sample one-dimensional structure is provided. In this figure, 'root' node 100 contains three child elements 120, 130, 140, all of which have the root node 110 as their direct parent but which are linked 125, 135 as siblings through the 'next' and 'prev' fields.

Referring now to FIG. 2, a graphical representation of a generalized N-Tree is shown. In this figure, the root node 205 has three child nodes 210, 215, 220 and child node 215 in turn has two children 225, 230 with node 230 itself having a single child node 235. It should be readily apparent how this approach can be extended to trees of arbitrary depth and complexity. To handle the representation of multi-dimensional arrays, we would preferably introduce additional 'dimension' nodes that serve to organize the 'leaf' or data-bearing nodes in a manner that can be efficiently accessed via array indexes.

Referring now to FIG. 3, a graphical representation of a 2*3 two-dimensional array is shown. In this figure, the six nodes 320, 325, 330, 335, 340, 345 are the actual data-bearing nodes of the array. The nodes 310, 315 are introduced by the API in order to provide access to each 'row' of 3 elements in the array. In fact a unique feature of the array implementation in this model is that these grouping nodes can be addressed by supplying an incomplete set of indexes to the API (i.e., instead of [n,m] for a 2-D array, specify [n]) which allows operations to be trivially performed on arrays that are not commonly available (e.g., changing row order). It is clear that this approach can be extended to any number of dimensions, thus for a 3-dimensional array [2*3*4], each of the nodes 320, 325, 330, 335, 340, 345 would become a parent/grouping node to a list of four child data-bearing nodes. In order to make array accesses as efficiently as possible, an additional optimization in the case of arrays whose dimensions are known at the time the collection is constructed by taking advantage of knowledge of how the allocation of contiguous node records occurs in the flat memory model. That is the offset of a desired child node for a given dimension can be calculated by "off=index*m*sizeof(ET_Complex)", thus the offset to any node in a multi-dimensional array can be efficiently obtained by recursively applying this calculation for each dimension and summing the results.

In the preferred embodiment, any node in a collection can be designated to be a new root whose 'fromWhich' may vary from that of its parent node (see TC_MakeRoot). This means for example that one can create a tree of arrays of stacks etc. Because this model permits changes to the aggregation model at any root node while maintaining the ability to directly navigate from one aggregation to the next, complex group manipulations are also supported and are capable of being performed very simply.

In order to handle the various types of non-memory storage containers associated with collections in a transparent manner, the present invention preferably includes a minimum memory 'stub' that contains sufficient information to allow access to the actual container. In the preferred embodiment, this 'stub' is comprised of a standard 'ET_TextDB' header record (see the Memory Patent) augmented by additional collection container fields. An example of such a header record in pseudo code follows:

```
typedef struct ET_FileRef                               // file reference structure
{
   short        fileID;                                 // file ID for open file
   ???          fSpec;                                  // file reference (platform
dependant?)
   ???          buff;                                   // file buffering (platform
dependant?)
} ET_FileRef;
typedef struct ET_ComplexServerVariant
{
   char         collectionRef[128];                     // unique string identifying
collection
   OSType       server;                                 // server data type (0 if not
server-based)
} ET_ComplexServerVariant;
typedef union ET_ComplexContainer
{
   ET_FileRef                        file;              // file spec of file-based
mirror file
   ET_ComplexServerVariant           host;              // server container
} ET_ComplexContainer;
typedef struct ET_ComplexObjVariant
{
   ET_Offset /* ET_ComplexPtr */     garbageHdr;        // header to collection
garbage list
   ET_Offset /* ET_ComplexPtr */     rootRec;           // root record of collection
   int32                             options;           // logical options on create
call
   ET_Offset /* ET_HdrPtr */         endRec;            // offset to last container
record
   unsInt64                          tags[8];           // eight available 64-bit tags
   ET_ComplexContainer               container;         // non-memory container
reference
} ET_ComplexObjVariant;
typedef struct ET_TextDBvariant
{
   ET_ComplexObjVariant              complex;           // complex collection variant
   ...                                                  // other variants not
discussed herein
};
typedef struct ET_TextDB                                // Standard allocation header
record
{
   ET_Hdr                            hdr;               // Standard heap data
reference fields
   ET_Offset /* ET_StringPtr */      name;              // ref. to name of database
   ...                                                  // other fields not discussed
herein
   ET_TextDBvariant                  u;                 // variant types
} ET_TextDB;
```

By examining the 'options' field of such a complex object variant (internally to the API), it is possible to identify if a given collection is memory, file, or server-based and, by using the additional fields defined above, it is also possible to determine where the collection resides. One embodiment of a basic code structure which supports implementation of any of the API calls defined below is defined as follows:

```
MyAPIcall (ET_CollectionHdl aCollection,...)
{
   if ( collection is server-based )
   {
      pack necessary parameters into a server command
      send the command to server u.complex.host.server
      unpack the returned results as required
   } else if ( collection is file-based )
   {
      perform identical operations to the memory case but by file I/O
access
      if this collection is published
         echo all changes to any subscribers
```

-continued

```
   } else
   {
      perform the operation on the flat memory model
      if ( the collection has been 'internalized' from file
         echo all changes to the file
      if this collection is published
         echo all changes to any subscribers
   }
}
```

In the memory based case, the code checks to see if the collection is actually an 'internalized' file-based collection (see option 'kInternalizeIfPossible' as defined below) and if so, echoes all operations to the file. This allows for an intermediate state in terms of efficiency between the pure memory-based and the file-based containers in that all read operations on such an internalized collection occur with the speed of memory access while only write operations incur the overhead of file I/O, and this can be buffered/batched as can be seen from the type definitions above. Note also that in both the file and memory based cases, the collection may have been 'published' and thus it may be necessary to notify the subscribers of any changes in the collection. This is also the situation inside the server associated with a server-based collection. Within the server, the collection appears to be file/memory based (with subscribers), whereas to the subscribers themselves, the collection (according to the memory stub) appears to be server-based.

Server-based collections may also be cached at the subscriber end for efficiency purposes. In such a case, it may be necessary to notify the subscribers of the exact changes made to the collection. This enables collaboration between multiple subscribers to a given collection and this collaboration at the data representation level is essential in any complex distributed system. The type of collaboration supported by such a system is far more powerful that the UI-level collaboration in the prior art because it leaves the UI of each user free to display the data in whatever manner that user has selected while ensuring that the underlying data (that the UI is actually visualizing) remains consistent across all clients. This automation and hiding of collaboration is a key feature of this invention. In the preferred embodiment, the UI itself can also be represented by a collection, and thus UI-level collaboration (i.e., when two users screens are synchronized to display the same thing) is also available as a transparent by-product of this approach simply by having one user 'subscribe' to the UI collection of the other.

Referring now to FIG. 4, a sample memory structure of a collection containing 3 'value' nodes is shown. As explained above, the job of representing aggregates or collections of data is handled primarily by the ET_Complex records 405, 410, 415, 420,while that of holding the actual data associated with a given node is handled by the ET_Simplex records 425, 430, 435. One advantage of utilizing two separate records to handle the two aspects is that the ET_Simplex records 425, 430, 435 can be variably sized depending on the typeID of the data within them, whereas the ET_Complex records 405, 410,415, 420 are of a fixed size. By separating the two records, the navigation of the complex records 405, 410,415, 420 is optimized. In the preferred embodiment, the various fields of a given type may also include references to other nodes in the collection either via relative references (denoted by the '@' symbol), collection references (denoted by the '@@' symbol) or persistent references (denoted by the '#' symbol). This means, for example, that one of the fields of a simplex record 425, 430, 435 may in-fact refer to a new collection with a new root node embedded within the same memory allocation as the parent collection that contains it.

Referring now to FIG. 5, a sample memory structure having various fields including references to other nodes in the collection is shown. In this figure, the 'value' of a node 425 represents an organization. In this case, one of the fields is the employees of the organization. This figure illustrates the three basic types of references that may occur between the various ET_Simplex records 425, 430, 435, 525, 530, 535, 540 and ET_Complex records 405, 410, 415, 420,505, 510,515, 520 in a collection. The relative reference '@' occurs between two simplex nodes 525, 540 in the collection, so that if the 'notes' field of a node 525 were an arbitrary length character string, it would be implemented as a relative reference (char @notes) to another simplex record 540 containing a single variable sized character array. This permits the original "Person" record 525 to have fixed size and an efficient memory footprint, while still being able to contain fields of arbitrary complexity within it by relative reference to another node 540. Another use of such a reference might be to a record containing a picture of the individual. This would be implemented in an identical manner (Picture @picture) but the referenced type would be a Picture type rather than a character array.

The collection reference '@@' in record 425 indicates that a given field refers to a collection 500 (possibly hierarchical) of values of one or more types and is mediated by a relative reference between the collection field of record 425 and the root node 505 of an embedded collection 500 containing the referenced items. In the preferred embodiment, this embedded collection 500 is in all ways identical to the outer containing collection 400, but may only be navigated to via the field that references it. It is thus logically isolated from the outermost collection 400. Thus the field declaration "Person @@employees" in record 425 implies a reference to a collection 500 of Person elements. Obviously collections can be nested within each other to an arbitrary level via this approach and this gives incredible expressive power while still maintaining the flat memory model. Thus for example one might reference a 'car', which internally might reference all the main components (engine, electrical system, wheels) that make up the car, which may in turn be built up from collections of smaller components (engine parts, electrical components, etc).

The persistent reference '#', illustrated as a field in record 525, is a singular reference from a field of an ET_Simplex record to an ET_Complex node containing a value of the same or a different type. The reference node can be in an embedded collection 500 or more commonly in an outer collection 400. In this case the 'employer' field of each employee of a given organization (#employer) would be a persistent reference to the employing organization as shown in the diagram. Additional details of handling and resolving collection and persistent references is provided in Appendix 2.

In order to make efficient use of any space freed up by deleted nodes, the collections mechanism can also maintain a garbage list, headed by a field in the collection variant of the base ET_TextDB record. Whenever any record is deleted, it could added into a linked list headed by this field and whenever a new record is allocated the code would first examine the garbage list to find any unused space that most closely fits the needs of the record being added. This would ensure that the collection did not become overly large or fragmented, and to the extent that the ET_Complex nodes and many of the ET_Simplex nodes have fixed sizes, this reclamation of space is almost perfect.

Another key feature of this invention is the concept of 'dirty' and 'null' flags, and various API calls are provided for this purpose (as described below). The need for 'null' flags is driven by the fact that in real world situations there is a difference between a field having an undefined or NULL value and that field having the value zero. In database situations, an undefined value is distinguished from a zero value because semantically they are very different, and zero may be a valid defined value. Similarly, the present invention may use null and dirty flags to distinguish such situations. Referring now to FIG. 6, a diagrammatic representation of the null and dirty flags of the present invention are shown. In this figure, the null and dirty flags are implemented by associating child simplex record 610 with any given simplex for which empty/dirty tracking is required as depicted below. Each flags array is simply a bit-field containing as many bits as there are fields in the associated type and whose dimensions are given by the value of TM_GetTypeMaxFlagIndexo (see Types Patent). If a field 610 has a null value, the corresponding bit in the 'nullFlags' record 611 is set to one, otherwise it is zero. Similarly, if a field 610 is 'dirty', the corresponding bit in the 'dirtyFlags' record 612 is set to one, otherwise it is zero. The requirement for the 'dirty' flag is driven by the need to track what has changed within a given record since it was first instantiated. This comes up particularly when the record is being edited by an associated UI. By examining the dirty flags after such an editing session it is possible to determine exactly which fields need to be updated to external storage such as an associated relational database.

In certain situations, especially those encountered when implementing high performance servers for data held in the collection model, it is necessary to add additional binary descriptive and reference fields to the collection to facilitate efficient navigation (e.g., in an inverted file implementation). The present invention supports this functionality by allowing the ET_Complex record to be extended by an arbitrary number of bytes, hereinafter termed 'extra bytes', within which information and references can be contained that are known only to the server (and which are not shared with clients/subscribers). This is especially useful for security tags and similar information that would preferably be maintained in a manner that is not accessible from the clients of a given collection. This capability would generally need to be customized for any particular server-based implementation.

Another requirement for effective sharing of information across the network is to ensure that all clients to a given collection have a complete knowledge of any types that may be utilized within the collection. Normally subscribers would share a common types hierarchy mediated via the types system (such as that described in the Types Patent. Such a types system, however, could also include the ability to define temporary and proxy types. In the case of a shared collection, this could lead to problems in client machines that are unaware of the temporary type. For this reason, the collections API (as described below) provides calls that automatically embed any such type definitions in their source (C-like) form within the collection. The specialized types contained within a collection could then be referenced from a field of the ET_TextDB header record and simply held in a C format text string containing the set of type definition sources. Whenever code subscribes to a collection, the API automatically examines this field and instantiates/defines all types found in the local context (see TM_DefineNewType described below). Similarly when new types are added to the collection, the updates to this type definition are propagated (as for all other changes except extra-bytes within the collection) and thus the clients of a given collection are kept up to date with the necessary type information for its interpretation.

When sharing and manipulating large amounts of data, it is also often necessary to associate arbitrary textual and typed binary tags with the data held within a collection. Examples of this might be tags associated with UTI appearance, user annotations on the data, etc. This invention fully supports this capability via the "element Tag" API calls provided to access them. In the preferred embodiment, the element tags associated with a given node in the collection are referenced via the 'tags' field of the ET_Complex record which contains a relative reference to a variable sized ET_String record containing the text for the tags. In a manner identical to that used in annotations and scripts (described below), tags could consist of named blocks of arbitrary text delimited by the "<on>" and "<no>" delimiter sequences occurring at the start of a line. The "<on>" delimiter is followed by a string on the same line which gives the name of the tag involved. By convention, all tag names start with the '$' character in order to distinguish them from field names which do not. Some of the API calls below support access to tags as well as fields via dual use of the 'fieldName' parameter. For example, it is possible to sort the elements of a collection based on the associated tags rather than the data within. This can be very useful in some applications involving the manipulation and grouping of information via attributes that are not held directly within the data itself. In an implementation in which the tags are associated with the ET_Complex record, not the ET_Simplex, the collections can be created and can contain and display information without the need to actually define typed values. This is useful in many situations because tags are not held directly in a binary encoding. While this technique has the same undesirable performance penalties of other text-based data tagging techniques such as XML, it also provides all the abilities of XML tagging over and above the binary types mechanism described previously, and indeed the use of standardized delimiters is similar to that found in XML and other text markup languages. In such an implementation, when accessing tag information, the string referenced by the 'tags' field is searched for the named tag and the text between the start and end delimiters stripped out to form the actual value of the tag. By use of a standardized mechanism for converting binary typed values to/from the corresponding text string, tags themselves may be strongly typed (as further illustrated by the API calls below) and this capability could be used extensively for specialized typed tags associated with the data. Tags may also be associated either with the node itself, or with individual fields of the data record the node contains. This is also handled transparently via the API by concatenating the field path with the tag name to create unique field-specific tags where necessary. As will be understood by those skilled in the art, the ability to associate arbitrary additional textual and typed tags with any field of a given data value within the collection allows a wide range of powerful capabilities to be implemented on top of this model.

Appendix A provides a listing of a basic API suite that may be used in conjunction with the collection capability of this invention. This API is not intended to be exhaustive, but is indicative of the kinds of API calls that are necessary to manipulate information held in this model. The following is a brief description of the function and operation of each function listed, from which, given the descriptions above, one skilled in the art would be able to implement the system of this invention.

A function that may be included in the API, hereinafter referred to as TC_SetCollectionName( ), sets the name of a collection (as returned by TC_GetCollectionName) to the string specified. A function that may also be included in the API, hereinafter referred to as TC_GetCouectionName( ), that obtains the name of a collection.

A function that may also be included in the API, hereinafter referred to as TC_FindEOFhandle( ), that finds the offset of the final null record in a container based collection.

A function that may also be included in the API, hereinafter referred to as TC_SetCollectionTag( ) and TC_GetCollectionTag( ), that allow access to and modification of the eight 64-bit tag values associated with every collection. In the preferred embodiment, these tag values are not used internally and are available for custom purposes.

A function that may also be included in the API, hereinafter referred to as TC_SetCollectionFlags( ), TC_ClrCollectionFlags( ), and TC_GetCollectionFlags( ), that would allow access to and modification of the flags associated with a collection.

A function that may also be included in the API, hereinafter referred to as TC_StripRecognizers( ), which strips the recognizers associated with finding paths in a collection. The only effect of this would be to slow down symbolic lookup but would also save a considerable amount of memory.

A function that may also be included in the API, hereinafter referred to as TC_StripCollection( ), strips off any invalid memory references that may have been left over from the source context.

A function that may also be included in the API, hereinafter referred to as TC_OpenContainer( ), opens the container associated with a collection (if any). In the preferred embodiment, once a collection container has been closed using TC_CloseContainer( ), the collection API functions on the collection itself would not be usable until the container has been re-opened. The collection container is automatically created/opened during a call to TC_CreateCollection( ) so no initial TC_OpenContainer( ) call is required.

A function that may also be included in the API, hereinafter referred to as TC_CloseContainer( ), closes the container associated with a collection (if any). In the preferred embodiment, once a collection container has been closed using TC_CloseContainer( ), the collection API functions on the collection itself would not be usable until the container had been re-opened.

A function that may also be included in the API, hereinafter referred to as TC_GetContainerSpec( ), may be used to obtain details of the container for a collection. In the preferred embodiment, if the collection is not container based, this function would return 0. If the container is file-based, the 'specString' variable would be the full file path. If the container is server-based, 'serverSpec' would contain the server concerned and 'specString' would contain the unique string that identifies a given collection of those supported by a particular server.

A function that may also be included in the API, hereinafter referred to as TC_GetDataOffset( ), may be used to obtain the offset (in bytes) to the data associated with a given node in a collection. For example, this offset may be used to read and write the data value after initial creation via TC_ReadData( ) and TC_WriteData( ).

A function that may also be included in the API, hereinafter referred to as TC_GetRecordOffset( ), may be used to obtain the record offset (scaled) to the record containing the data associated with a given node in a collection. This offset may be used in calculating the offset of other data within the collection that is referenced from within a field of the data itself (via a relative, persistent, or collection offset—@, #, or @@). For example if you have a persistent reference field (ET_PersistentRef) from collection element 'sourceElem' within which the 'elementRef' field is non-zero, the element designation for the target element ('targetElem', i.e., a scaled offset from the start of the collection for the target collection node) can be computed as:

targetElem=perfP.elementRef+TC_GetRecordOffset(aCollection,0,0,sourceElem,NO);

The corresponding data offset for the target element would then be:

targetDataOff=TC_GetDataOffset(aCollection,0,0,targetElem);

Functions that may also be included in the API, hereinafter referred to as TC_RelRefToDataOffset( ), TC_DataOffsetToRelRef( ), TC_RelRefToRecordOffset( ), TC_DataToRecordOffset( ), TC_RecordToDataOffset( ), TC_ByteToScaledOffset( ), and TC_ScaledToByteOffset( ), could be used to convert between the "data offset" values used in this API (see TC_GetDataOffset, TC_ReadData, TC_WriteData, and TC_CreateData), and the ET_Offset values used internally to store relative references (i.e., '@' fields). In the preferred embodiment, the routine TC_RefToRecordOffset( ) would be used in cases where the reference is to an actual record rather than the data it contains (e.g., collection element references). Note that because values held in simplex records may grow, it may be the case that the "data offset" and the corresponding "record offset" are actually in two very different simplex records. In on embodiment, the "record offset" always refers to the 'base' record of the simplex, whereas the "data offset" will be in the 'moved' record of the simplex if applicable. For this reason, it is essential that these (or similar) functions are used when accessing collections rather than attempting more simplistic calculations based on knowledge of the structures, as such calculations would almost certainly be erroneous.

A function that may also be included in the API, hereinafter referred to as TC_RelRefToElementDesignator( ), which could be used to return the element designator for the referenced element, given a relative reference from one element in a collection to another.

A function that may also be included in the API, hereinafter referred to as TC_PersRefToElementDesignator( ), which could be used to return the element designator for the referenced element, given a persistent or collection reference (e.g., the elementRef field of either) from the value of one element in a collection to the node element of another.

A function that may also be included in the API, hereinafter referred to as TC_ElementDesignatorToPersRef( ), which, if given an element designator, could return the relative reference for a persistent or collection reference (e.g., the elementRef field of either) from the value of one element in a collection to the node element of another.

A function that may also be included in the API, hereinafter referred to as TC_ValueToElementDesignator( ), given the absolute ET_Offset to a value record (ET_Simplex) within a collection, could be used to return the element designator for the corresponding collection node (element designator). This might be needed, for example, with the result of a call to TC_GetFieldPersistentElement( ).

A function that may also be included in the API, hereinafter referred to as TC_LocalizeRelRefs( ), can be called to achieve the following effect for an element just added to the collection. It is often convenient for relative references (i.e., @fieldName) to be held as pointer values until the time the record is actually added to the collection. At this time the pointer values held in any relative reference fields would preferably be converted to the appropriate relative reference and the original (heap allocated) pointers disposed.

A function that may also be included in the API, hereinafter referred to as TC_ReadData( ), can be used to read the value of a collection node (if any) into a memory buffer. In the preferred embodiment, this routine would primarily be used within a sort function as part of a 'kcFindCPX' (TC_Find) or kSortCPX (TC_Sort) call. The purpose for supplying this call is to allow sort functions to optimize their container access or possibly cache results (using the custom field in the sort record). The collection handle can be obtained from "elementRef.theView" for one of the comparison records, the 'size' parameter is the 'size' field of the record (or less) and the 'offset' parameter is the "u.simplexOff" field. In such a case, the caller would be responsible for ensuring that the 'aBuffer' buffer is large enough to hold 'size' bytes of data.

A function that may also be included in the API, hereinafter referred to as TC_WriteData( ), which could be used to write a new value into an existing node within a collection handle.

A function that may also be included in the API, hereinafter referred to as TC_WriteFieldData( ), which could be used to write a new value into a field of an existing node within a collection handle.

A function that may also be included in the API, hereinafter referred to as TC_CreateData( ), could be used to create and write a new unattached data value into a collection. The preferred way of adding data to a collection is to use TC_SetValue( ). In the case where data within a collection makes a relative reference (i.e, via a '@' field) to other data within the collection, however, the other data may be created using this (or a similar) function.

A function that may also be included in the API, hereinafter referred to as TC_CreateRootNode( ), could be used to create and write a new unattached root node into a collection handle. In the case where data within a collection makes a collection reference (i.e, via a '@@' field) to other data that is to be internalized into the same collection handle, it is preferable to create an entirely separate root node that is not directly part of the parent collection yet lies within the same handle.

A function that may also be included in the API, hereinafter referred to as TC_CreateRecord( ), could be used to create specified structures within a collection, including all necessary structures to handle container based objects and persistent storage. In the preferred embodiment, the primary purpose for using this routine would be to create additional structures within the collection (usually of kSimplexRecord type) that can be referenced from the fields of other collection elements. Preferably, this type of function would only be used to create the following structure types: kSimplexRecord, kStringRecord, kComplexRecord.

A function that may also be included in the API, hereinafter referred to as TC_CreateCollection( ), could be used to create (initialize) a collection, i.e. a container object—such as an array, or a tree, or a queue or stack, or a set—to hold objects of any type which may appear in the Type Manager database. For example, if the collection object is an array, then a size, or a list of sizes, would preferably be supplied. If the collection is of unspecified size, no sizing parameter need be specified. Possible collection types and the additional parameters that would preferably be supplied to create them are as follows:

kFromList—List Structure
kFromStack—Stack structure
kFromQueue—Queue structure
kFromSet—Set
kFromBTree—Binary tree
kFromNTree—Generalized Tree
no additional parameters
kFromArray—one dimensional array structure
dimension1 (int32)—array dimension (as in C)
kFromArrayN—N dimensional array structure
N (int32)—number of dimensions
dimension1 (int32)—array dimension 1 (as in C)
. . .
dimensionN (int32)—array dimension N (as in C)

A function that may also be included in the API, hereinafter referred to as TC_KillReferencedMemory( ), which could be provided in order to clean up all memory associated with the set of data records within a collection. This does not include any memory associated with the storage of the records themselves, but simply any memory that the fields within the records reference either via pointers or handles. Because a collection may contain nested collections to any level, this routine would preferably recursively walk the entire collection hierarchy, regardless of topology, looking for simplex records and for each such record found, would preferably de-allocate any referenced memory. It is assumed that all memory referenced via a pointer or a handle from any field within any structure represents a heap allocation that can be disposed by making the appropriate memory manager call. It is still necessary to call TC_DisposeCollection( ) after making this call in order to clean up memory associated with the collection itself and the records it contains.

A function that may also be included in the API, hereinafter referred to as TC_DisposeCollection( ), which could be provided in order to delete a collection. If the collection is container based, then this call will dispose of the collection in memory but has no effect on the contents of the collection in the container. The contents of containers can only be destroyed by deleting the container itself (e.g., if the container is a file then the file would preferably be deleted).

A function that may also be included in the API, hereinafter referred to as TC_PurgeCollection( ), which could be provided in order to compact a collection by eliminating all unused records. After a long sequence of adds and deletes from a collection, a 'garbage' list of records may build up containing records that are not currently used but which are available for recycling, these records are eliminated by this call. Following a purge, all references to internal elements of the collection may be invalidated since the corresponding record could have moved. It is essential that you re-compute all such internal references after a purge.

A function that may also be included in the API, hereinafter referred to as TC_CloneRecord( ), which could be provided in order to clone an existing record from one node of a collection to another node, possibly in a different collection. Various options allow the cloning of other records referenced by the record being cloned. Resolved persistent and collection references within the record are not cloned and would preferably be re-resolved in the target. If the structure contains memory references and you do not specify 'kCloneMemRefs', then memory references (pointers and handles found in the source are NULL in the target), otherwise the memory itself is cloned before inserting the corresponding reference in the target node. If the 'kCloneRelRefs' option is set, relative references, such as those to strings are cloned (the cloned references are to new copies in the target collection), otherwise the corresponding field is set to zero.

A function that may also be included in the API, hereinafter referred to as TC_CloneCollection( ), which could be provided in order to clone all memory associated with a type manager collection, including all memory referenced from fields within the collection (if 'recursive' is true).

A function that may also be included in the API, hereinafter referred to as TC_AppendCollection( ), which could be provided in order to append a copy of one collection in its entirety to the designated node of another collection. In this manner multiple existing collections could be merged into a single, larger collection. In the preferred embodiment, when merging the collections, the root node of the collection being appended and all nodes below it, are transferred to the target collection with the transferred root node becoming the first child node of non-leaf 'tgtNode' in the target collection.

A function that may also be included in the API, hereinafter referred to as TC_PossessDisPossessCollection( ), which could be provided in order to can be used to possess/dispossess all memory associated with a type manager collection, including all memory referenced from fields within the collection.

A function that may also be included in the API, hereinafter referred to as TC_LowestCommonAncestor( ), which could be provided in order to search the collection from the parental point designated and determine the lowest common ancestral type ID for all elements within.

A function that may also be included in the API, hereinafter referred to as TC_FindFirstDescendant( ), which could be provided in order to search the collection from the parental point designated and find the first valued node whose type is equal to or descendant from the specified type.

A function that may also be included in the API, hereinafter referred to as TC_IsValidOperation( ), which could be provided in order to determine if a given operation is valid for the specified collection.

A function that may also be included in the API, hereinafter referred to as TC_vComplexOperation( ), which is identical to TC_ComplexOperation( ) but could instead take a variable argument list parameter which would preferably be set up in the caller as in the following example:

```
va_list   ap;
Boolean  res;
va_start (ap, aParameterName);
res = TC_vComplexOperation(aCollection,theParentRef,anOperation,
options,&ap);
va_end(ap);
```

A function that may also be included in the API, hereinafter referred to as TC_ComplexOperation( ), which could be provided in order to perform a specified operation on a collection. In the preferred embodiment, the appropriate specific wrapper functions define the operations that are possible, the collection types for which they are supported, and the additional parameters that would preferably be specified to accomplish the operation. Because of the common approach used to implement the various data structures, it is possible to apply certain operations to collection types for which those operations would not normally be supported. These additional operations could be very useful in manipulating collections in ways that the basic collection type would make difficult.

A function that may also be included in the API, hereinafter referred to as TC_Pop( ), which could be provided in order to pop a stack. When applied to a Queue, TC_Pop( ) would remove the last element added, when applied to a List or set, it would remove the last entry in the list or set. When applied to a tree, the tail child node (and any children) is removed. For a stack, the pop action follows normal stack behavior. This function may also be referred to as TC_RemoveRight( ) when applied to a binary tree.

A function that may also be included in the API, hereinafter referred to as TC_Push( ), which could be provided in order to push a stack. When applied to a List or Set, this function would add an element to the end of the list/set. When applied to a tree, a new tail child node would be added. For a stack, the push action follows normal stack behavior.

This function may also be referred to as TC_EnQueue( ) when applied to a queue, or TC_AddRight( ) when applied to a binary tree.

A function that may also be included in the API, hereinafter referred to as TC_Insert( ), could be provided in order to insert an element into a complex collection list.

A function that may also be included in the API, hereinafter referred to as TC_SetExtraBytes( ), could allow the value of the extra bytes associated with a collection element node record (if any) to be set. In the preferred embodiment, the use of this facility is strongly discouraged except in cases where optimization of collection size is paramount. Enlarged collection nodes can be allocated by passing a non-zero value for the 'extraBytes' parameter to TC_Insert( ). This call would create additional empty space after the node record that can be used to store an un-typed fixed sized record which can be retrieved and updated using calls such as TC_GetExtra Bytes( ) and TC_SetExtraBytes( ) respectively. This approach is primarily justified because the additional bytes do not incur the overhead of the ET_Simplex record that normally contains the value of a collection element's node and which is accessed by all other TC_API calls. If data is associated with a node in this manner, a destructure function would preferably be associated with a node to be disposed when the collection is killed, such as making a call to a function such as TC_SetElementDestructor( ).

A function that may also be included in the API, hereinafter referred to as TC_GetExtraBytes( ), which could be provided in order to get the value of the extra bytes associated with a collection element node record (if any). See TC_SetExtraBytes( ) for details.

A function that may also be included in the API, hereinafter referred to as TC_Remove( ), could be provided in order to remove the value (if any) from a collection node.

A function that may also be included in the API, hereinafter referred to as TC_IndexRef( ), could be provided in order to obtain a reference 'ET_Offset' to a specified indexed element (indexes start from 0). This reference can be used for many other operations on collections. When used to access data in a multi-dimensional array, it is essential that all array indexes are specified. However, each 'dimension' of a multi-dimensional array can be separately manipulated using a number of operations (e.g., sort) and thus a partial set of indexes may be used to obtain a reference to the elements of such a dimension (which do not normally contain data themselves, though they could do) in order to manipulate the elements of that dimension. In this manner, a multi-dimensional array can be regarded as a specialized case of a tree. When multiple indexes are used to refer to a tree, later indexes in the list refer to deeper elements of the tree. In such a case, a subset of the indexes should be specified in order to access a given parental node in the tree. Note that in the tree case, the dimensionality of each tree node may vary and thus using such an indexed reference would only make sense if a corresponding element exists.

A function that may also be included in the API, hereinafter referred to as TC_MakeRoot( ), could be provided in order to convert a collection element to the root of a new subordinate collection. This operation can be used to convert a leaf node of an existing collection into the root node of a new subordinate collection. This is the mechanism used to create collections within collections. Non-leaf nodes cannot be converted.

A function that may also be included in the API, hereinafter referred to as TC_Sort( ), could be provided in order to sort the children of the specified parent node according to a sorting function specified in the 'cmpFun' parameter. Sorting may be applied to any collection type, including arrays. Note that the comparison function is passed two references to a record of type 'ET_ComplexSort'. Within these records is a reference to the original complex element, as well as any associated data and the type ID. The 'fromWhich' field of the record will be non-zero if the call relates to a non-leaf node (for example in a tree). The 'kRecursiveOperation' option applies for hierarchical collections.

A function that may also be included in the API, hereinafter referred to as TC_UnSort( ), which could be provided in order to un-sort the children of the specified parent node back into increasing memory order. For arrays, this is guaranteed to be the original element order, however, for other collection types where elements can be added and removed, it does not necessarily correspond since elements that have been removed may be re-cycled later thus violating the memory order property. The 'kRecursiveOperation' option applies for hierarchical collections.

A function that may also be included in the API, hereinafter referred to as TC_SortByField( ), which could be provided in order to sort the children of the specified parent node using a built-in sorting function which sorts based on specified field path which would preferably refer to a field whose type is built-in (e.g., integers, strings, reals, struct etc.) or some descendant of one of these types. Sorting may be applied to any collection type, including arrays. The 'kRecursiveOperation' option applies for hierarchical collections. In the preferred embodiment, if more complex sorts are desired, TC_Sort( ) short should be used and and 'cmpFun' supplied. This function also could also be used to support sorting by element tags (field name starts with '$').

A function that may also be included in the API, hereinafter referred to as TC_DeQueue( ), could be provided in order to de-queue an element from the front of a queue. The operation is similar to popping a stack except that the element comes from the opposite end of the collection. In the preferred embodiment, when applied to any of the other collection types, this operation would return the first element in the collection. This function may also be referred to as TC_RemoveLeft( ) when applied to a binary tree.

A function that may also be included in the API, hereinafter referred to as TC_Next( ), which could be provided in order to return a reference to the next element in a collection given a reference to an element of the collection. If there is no next element, the function would return FALSE.

A function that may also be included in the API, hereinafter referred to as TC_Prev( ), which could be provided in order to return a reference to the previous element in a collection given a reference to an element of the collection. If there is no previous element, the function returns FALSE.

A function that may also be included in the API, hereinafter referred to as TC_Parent( ), which could be provided in order to return a reference to the parent element of a collection given a reference to an element of the collection. In the preferred embodiment, the value passed in the 'theParentRef' parameter is ignored and should thus be set to zero.

A function that may also be included in the API, hereinafter referred to as TC_RootRef( ), could be provided in order to return a reference to the root node of a collection. This (or a similar) call would only be needed if direct root node manipulation is desired which could be done by specifying the value returned by this function as the 'anElem' parameter to another call. Note that root records may themselves be directly part of a higher level collection. The check for this case can be performed by using TC_Parent( ) which will return 0 if this is not true.

A function that may also be included in the API, hereinafter referred to as TC_RootOwner( ), could be provided in order to return a reference to the simplex structure that references the collection containing the element given. In the preferred embodiment, if the element is part of the outermost collection, it is by definition not owned and this function returns false. If the root node is not owned/referenced by a simplex record, this function returns false, otherwise true. If the collection containing 'anElem' contains directly nested collections, this routine will climb the tree of collections until it finds the owning structure (or fails).

A function that may also be included in the API, hereinafter referred to as TC_Head( ), could be provided in order to return a reference to the head element in a collection of a given parent reference. If there is no head element, the function would return FALSE. For a binary tree, TC_LeftChild( ) would preferably be used.

A function that may also be included in the API, hereinafter referred to as TC_Tail( ), could be provided in order to return a reference to the tail element in a collection of a given parent reference. If there is no tail element, the function would return FALSE. For a binary tree, TC_RightChild( ) would preferably be used.

A function that may also be included in the API, hereinafter referred to as TC_Exchange( ), could be provided in order to exchange two designated elements of a collection.

A function that may also be included in the API, hereinafter referred to as TC_Count( ), could be provided in order to return the number of child elements for a given parent. In the preferred embodiment, for non-hierarchical collections, this call would return the number of entries in the collection.

A function that may also be included in the API, hereinafter referred to as TC_SetValue( ), could be provided in order to set the value of a designated collection element to the value and type ID specified.

A function that may also be included in the API, hereinafter referred to as TC_SetFieldValue( ), which could be provided in order to set the value of a field within the specified collection element.

A function that may also be included in the API, hereinafter referred to as TC_GetAnonRefFieldPtr( ), which could be provided in order to obtain a heap pointer corresponding to a reference field (either pointer, handle, or relative). The field value would preferably already have been retrieved into an ET_DataRef buffer. In the case of a pointer or handle reference, this function is trivial, in the case of a relative reference, the function would perform the following:

```
doff=TC_RefToDataOffset(aDataRef->
relativeRef,TC_GetDataOffset(aCollection,0,0,anElem));
    TC_ReadData(aCollection,0,doff,0,&cp,0); return cp;
```

A function that may also be included in the API, hereinafter referred to as TC_GetCStringRefFieldPtr( ), which could be provided in order to obtain the C string corresponding to a reference field (either pointer, handle, or relative). The field value would preferably already have been retrieved into an ET_DataRef buffer. In the case of a pointer or handle reference, this function is trivial, in the case of a relative reference, the function would perform the following:

```
doff=TC_RefToDataOffset(aDataRef->        relativeRef,
    TC_GetDataOffset(aCollection,0,0,anElem));
TC_ReadData(aCollection,0,doff,0,&cp,0); return cp;
```

A function that may also be included in the API, hereinafter referred to as TC_SetCStringFieldValue( ), which could be provided in order to set the C string field of a field within the specified collection element. Ideally, this function would also transparently handle all logic for the various allowable C-string fields as follows:

1) if the field is a charHdl then:
   a) if the field already contains a value, update/grow the existing handle to hold the new value
   b) otherwise allocate a handle and assign it to the field
2) if the field is a charPtr then:
   a) if the field already contains a value.
      i) if the previous string is equal to or longer than the new one, copy new string into existing pointer
      ii) otherwise dispose of previous pointer, allocate a new one and assign it
   b) otherwise allocate a pointer and assign it to the field
3) if the field is a relative reference then:
   a) if the reference already exists, update its contents to bold the new string
   b) otherwise create a new copy of the string in the collection and reference the field to it
4) if the field is an array of char then:
   a) if the new value does not fit, report array bounds error
   b) otherwise copy the value into the array A function that may also be included in the API, hereinafter referred to as TC_AssignToField( ), could be provided in order to assign an arbitrary field within a collection element to a value expressed as a C string. If the target field is a C string of some type, this function behaves similarly to TC_SetCStringFieldValue( ) except that if the 'kAppendStringValue' option is set, the new string is appended to the existing field contents. In all other cases, the field value would preferably be expressed in a format compatible with TM_StringToBinary( ) for the field type concerned and is assigned.

A function that may also be included in the API, hereinafter referred to as TC_GetValue( ), which could be provided in order to get the value and type ID of a designated collection element.

A function that may also be included in the API, hereinafter referred to as TC_GetTypeID( ), could be provided in order to return the type ID of a designated collection element. This function is only a convenience over TC_GetValue( ) in that the type is returned as a function return value (0 is returned if an error occurs)

A function that may also be included in the API, hereinafter referred to as TC_HasValue( ), could be provided in order to determine if a given node in a collection has a value or not. Again, the function would return either a positive or negative indicator in response to such a request.

A function that may also be included in the API, hereinafter referred to as TC_RemoveValue( ), could be provided in order to remove the value (if any) from a collection node.

A function that may also be included in the API, hereinafter referred to as TC_GetFieldValue( ), could be provided in order to get the value of a field within the specified collection element.

A function that may also be included in the API, hereinafter referred to as TC_GetCStringFieldValue( ), could be provided in order to get a C string field from a collection element into an existing buffer. In the preferred embodiment, if the field type is not appropriate for a C string, this function returns FALSE and the output buffer is empty. Preferably, if the field specified is actually some kind of reference to a C string, this function will automatically resolve the reference and return the reesolved string. In the case of a persistent (#) reference, this function would preferably return the name field or the contents of the string handle field if non-NULL. In the case of a collection (@@) reference, this function will preferably return the contents of the string handle field if non-NULL.

A function that may also be included in the API, hereinafter referred to as TC_GetFieldPersistentElement( ), could be provided in order to obtain the element designator corresponding to a persistent reference field. In the preferred embodiment of this function, if the field value has not yet been obtained, this function will invoke a script which causes the referenced value to be fetched from storage and inserted into the collection at the end of a list whose parent is named by the referenced type and is immediately below the root of the collection (treated as a set). Thus, if the referenced type is "Person", then the value will be inserted below "Person" in the collection.

A function that may also be included in the API, hereinafter referred to as TC_GetFieldCollection( ), could be provided in order to obtain the collection offset corresponding to the root node of a collection reference. In the preferred embodiment, if the field collection value has not yet been obtained, this function will invoke a script for the field which causes the referenced values to be fetched from storage and inserted into the referencing collection as a separate and distinct collection within the same collection handle. The collection and element reference of the root node of this collection is returned via the 'collectionRef' parameter.

A function that may also be included in the API, hereinafter referred to as TC_GetPersistentFieldDomain( ), could be provided in order to obtain the collection offset corresponding to the root node of a domain collection for a persistent reference field. If the field domain collection value has not yet been obtained, this function will invoke a script, such as the "$GetPersistentCollection" script, for the field which causes the referenced values to be fetched from storage and inserted into the referencing collection as a separate and distinct collection within the same collection handle. The collection and element reference of the root node of this domain collection is returned via the 'collectionRef' parameter.

A function that may also be included in the API, hereinafter referred to as TC_SetFieldDirty( ), could be provided in order to mark the designated field of the collection element as either 'dirty' (i.e., changed) or clean. By default, all fields start out as being 'clean'. In the preferred embodiment, this function has no effect if a previous call to TC_InitDirtyFlags( ) has not been made in order to enable tracking of clean/dirty for the collection element concerned. Preferably, once a call to TC_InitDirtyFlags( ) has been made, subsequent calls to set the field value (e.g., TC_SetFieldValue) will automatically update the 'dirty' bit so that it in not necessary to call TC_SetFieldDirty( ) explicitly.

A function that may also be included in the API, hereinafter referred to as TC_IsFieldDirty( ), which could be provided in order to return the dirty/clean status of the specified field of a collection element. If dirty/clean tracking of the element has not been enabled using TC_InitDirtyFlags( ), this function returns FALSE.

A function that may also be included in the API, hereinafter referred to as TC_InitDirtyFlags( ), which could be provided in order to set up a designated collection element to track dirty/clean status of the fields within the element. By default, dirty/clean tracking of collection elements is turned off and a call to TC_IsFieldDirty( ) will return FALSE.

A function that may also be included in the API, hereinafter referred to as TC_SetFieldEmpty( ), which could be provided in order to mark the designated field of the collection element as either 'empty' (i.e., value undefined) or non-empty (i.e., value defined). By default all fields start out as being non-empty. In the preferred embodiment, this function has no effect if a previous call to TC_InitEmptyFlags( ) has not been made in order to enable tracking of defined/undefined values for the collection element concerned. Once a call to TC_InitEmptyFlags( ) has been made, subsequent calls to set the field value (e.g., TC_SetFieldValue) will automatically update the 'empty' bit so that it in not necessary to call TC_SetFieldEmpty( ) explicitly.

A function that may also be included in the API, hereinafter referred to as TC_EstablishEmptyDirtyState( ), which could be provided in order to calculate a valid initial empty/dirty settings for the fields of an element. In the preferred embodiment, the calculation would be performed based on a comparison of the binary value of each field with 0. If the field's binary value is 0, then it is assumed the field is empty and not dirty. Otherwise, the field is assumed to be not empty and dirty. If the element already has empty/dirty tracking set up, this function simply returns without modifying anything.

A function that may also be included in the API, hereinafter referred to as TC_IsFieldEmpty( ), which could be provided in order to return the empty/full status of the specified field of a collection element. If empty/full tracking of the element has not been enabled using TC_InitEmptyFlags( ), this function will return FALSE.

A function that may also be included in the API, hereinafter referred to as TC_SetElementTag( ), could be provided in order to add, remove, or replace the existing tag associated with a field of a 'valued' element within a collection, or alternatively if 'aFieldName' is NULL, the tag is associated with the element itself. Unlike annotations and scripts (see the TypeScripts package) that are applied to the definitions of the type or field, tags are associated with node a collection, normally (but not necessarily) a valued node. Tags consist of arbitrary strings, much like annotations. There may be any number of different tags associated with a given record/field. In the preferred embodiment, if the collection concerned is file or server-based, tags will persist from one run to the next and thus form a convenient method of arbitrarily annotating data stored in a collection without formally changing its structure. Tags may also be used extensively to store temporary data/state information associated with collections.

A function that may also be included in the API, hereinafter referred to as TC_GetElementTag( ), which could be provided in order to obtain the tag text associated with a given field within a 'valued' collection element. If the tag name cannot be matched, NULL is returned.

A function that may also be included in the API, hereinafter referred to as TC_SetElementNumericTag( ), which could be provided in order to add, remove, or replace the existing numeric tag associated with a field of a 'valued' element within a collection, or alternatively if 'aFieldName' is NULL, the tag is associated with the element itself (which may have no value). This would provide a shorthand method for accessing numeric tags and uses TC_SetElementTag( ). The 'tagFormat' value would preferably be one of the following predefined tag formats: 'kTagIsInteger','kTagIsIntegerList', 'kTagIsReal', or 'kTagIsRealList'. In the case of integer tags, the ellipses parameter(s) should be a series 'valueCount' 64-bit integers. In the case of real tags, the ellipses parameter(s) should be a series of 'valueCount' doubles.

A function that may also be included in the API, hereinafter referred to as TC_SetElementTypedTag( ), which could be provided in order to add, remove, or replace the existing typed tag associated with a field of a 'valued' element within a collection, or alternatively if 'aFieldName' is NULL, the tag is associated with the element itself (which may have no value). This function provides a shorthand method for accessing typed tags and uses TC_SetElementTag( ). The tag format is set to 'kTagIsTyped'. Preferably, the tag string itself consists of a line containing the type name followed by the type value expressed as a string using TM_BinaryToString ( . . . , kUnsignedAsHex+kCharArrayAsString).

A function that may also be included in the API, hereinafter referred to as TC_GetElementNumericTag( ), which could be provided in order to obtain the existing numeric tag associated with a field of a 'valued' element within a collection, or alternatively if 'aFieldName' is NULL, the tag is associated with the element itself (which may have no value). This provides a shorthand method for accessing numeric tags and uses TC_GetElementTag( ). The 'tagFormat' value would preferably be one of the following predefined tag formats: 'kTagIsInteger','kTagIsIntegerList','kTagIsReal', or 'kTagIsRealList'. In the case of integer tags, the ellipses parameter(s) would be a series 'valueCount' 64-bit integer addresses. In the case of real tags, the ellipses parameter(s) would be a series of 'valueCount' double addresses.

A function that may also be included in the API, hereinafter referred to as TC_GetElemeutTypedTag( ), which could be provided in order to obtain the existing typed tag associated with a field of a 'valued' element within a collection, or alternatively if 'aFieldName' is NULL, the tag is associated with the element itself (which may have no value). This provides a shorthand method for accessing numeric tags and uses TC_GetElementTag( ).

A function that may also be included in the API, hereinafter referred to as TC_GetElementTagList( ), which could be provided in order to obtain a string handle containing an alphabetized list (one per line) of all element tags appearing in or below a given node within a collection.

A function that may also be included in the API, hereinafter referred to as TC_GetAllElementTags( ), which could be provided in order to obtain a character handle containing all element tags associated with a specified element [and field] of a collection. This function may be used to optimize a series of calls to TC_GetElementTag( ) by passing 'aCollection' is NULL to TC_GetElementTag( ) and passing an additional 'charHdl' parameter that is the result of the TC_GetAllElementTags( ) call. This can make a significant difference in cases where a series of different tags need to be examined in succession.

A function that may also be included in the API, hereinafter referred to as TC_InitEmptyFlags( ), which could be provided in order to set up a designated collection element to track empty/full status of the fields within the element. By default, empty/full tracking of collection elements is turned off and a call to TC_IsFieldEmpty( ) will return FALSE if the field value is non-zero, the function will return TRUE otherwise.

A function that may also be included in the API, hereinafter referred to as TC_ShiftTail( ), which could be provided in order to make the designated element the new tail element of the collection and preferably disgards all elements that were after the designated element.

A function that may also be included in the API, hereinafter referred to as TC_ShiftHead( ), which could be provided in order to make the designated element the new head element of the collection and preferably disgards all elements that were before the designated element.

A function that may also be included in the API, hereinafter referred to as TC_RotTail( ), which could be provided in order to make the designated element the new tail element of the collection by rotating the collection without disgarding any other elements. The rotation operation is usually applied to 'Ring' structures.

A function that may also be included in the API, hereinafter referred to as TC_RotHead( ), which could be provided in order to make the designated element the new head element of the collection by rotating the collection without disgarding any other elements.

A function that may also be included in the API, hereinafter referred to as TC_SetName( ), which could be provided in order to assign a name to any member element of a collection. In the preferred embodiment, the element may subsequently be accessed using its name (which would preferably be unique). In essence, this is the basic operation of the 'kFromSet' collection, however, it can be applied and used for any of the other collection types. In the case of a tree element, the name specified would be the name of that node, however, to use the name to access the element using TC_SymbolicRef( ), it is preferable to specify the entire 'path' from the root node where each ancestor is separated from the next by a ':'. Alternatively, the 'kPathRelativeToParent' option can be used to allow the use of partial relative paths. Preferably, names would consist of alphanumeric characters or the '_' character only, and would be less than 31 characters long.

A function that may also be included in the API, hereinafter referred to as TC_GetName( ), which could be provided in order to return the name (if any) of the specified element of a collection. Note that in the case of a tree, the name would refer just to the local node. Preferably, to access the element symbolically, the path which can be obtained using TC_GetPath( ) would be used. The 'aName' buffer should be at least 32 characters long.

A function that may also be included in the API, hereinafter referred to as TC_GetPath( ), which could be provided in order to apply return the full symbolic path (if defined) from the root node to the specified element of a collection in a tree. Preferably, the 'aPath' buffer should be large enough to hold the entire path. The worst case can be calculated using TC_GetDepth( ) and multiplying by 32.

A function that may also be included in the API, hereinafter referred to as TC_SymbolicRef( ), which could be provided in order to obtain a reference to a given element of a collection given its name (see TC_SetName) or in the case of a tree, its full path. Sometimes for certain collections it is more convenient (and often faster) to refer to elements by name rather than any inherent order that they might have. This is the central concept behind the 'kFromSet' collection, however, it may also be applied to any other collection type. An element could also be found via its relative path from some other non-root node in the collection using this call simply by specifying the 'kPathRelativeToParent' which causes 'theParentRef', not the collection root, to be treated as the starting point for the relative path 'aName'.

A function that may also be included in the API, hereinafter referred to as TC_Find( ), which could be provided in order to scan the collection in order by calling the searching function specified in the comparison function parameter. In the preferred embodiment, the comparison function is passed two references, the second is to a record of type 'ET_ComplexSort' which is identical to that used during the TC_Sort( ) call. The first reference would be to a 'srchSpec' parameter. The 'srchSpec' parameter may be the address of any arbitrary structure necessary to specify to the search function how it is to do its search. The 'fromWhich' field of the 'ET_ComplexSort' record will be non-zero if the call relates to a non-leaf node (for example in a tree). The 'kRecursiveOperation' applies for hierarchical collections. The role of the search function is similar to that of the sort function used for TC_Sort( ) calls, that is it returns a result that is above, below, or equal to zero based on comparing the information specified in the 'srchSpec' parameter with that in the 'ET_ComplexSort' parameter. By repeatedly calling this function, one can find all elements in the collection that match a specific condition. In the preferred embodiment, when the 'kRecursiveOperation' option is set, the hits will be returned for the entire tree below the parent node specified according to the search order used internally by this function. Alternatively, the relevant node could be specified as the parent (not the root node) in order to restrict the search to some portion of a tree.

A function that may also be included in the API, hereinafter referred to as TC_FindByID( ), which could be provided in order to use the TC_Find( ) to locate a record within the designated portion of a collection having data whose unique ID field matches the value specified. This function could form the basis of database-like behavior for collections.

A function that may also be included in the API, hereinafter referred to as TC_FindByTag( ), which could be provided in order to make use of TC_Visit( ) to locate a record within (i.e., excluding the parent node) the designated portion of a collection whose tag matches the value specified.

A function that may also be included in the API, hereinafter referred to as TC_FindNextMatchingFlags( ), which could be provided in order to make use of TC_Visit( ) to locate a record within (i.e., excluding the parent/root node) the designated portion of a collection whose flags values match the flag values specified.

A function that may also be included in the API, hereinafter referred to as TC_FindByTypeAndFieldMatch( ), which could be provided in order to make use of TC_Find( ) to locate a record(s) within the designated portion of a collection having data whose type ID matches 'aTypeID' and for which the 'aFieldName' value matches that referenced by 'matchValue'. This is an optimized and specialized form of the general capability provided by TC_Search( ). Preferably, in the case of string fields, a "strcmp( )" comparison is used rather than the full binary equality comparison "memcmp( )" utilized for all other field types. For any more complex search purpose it is preferable to use TC_Search( ) directly. Persistent reference fields may also be compared by ID if possible or name otherwise. For Pointer, Handle, and Relative reference fields, the comparison is performed on the referenced value, not on the field itself. This approach makes it very easy to compare any single field type for an arbitrary condition without having to resort to more sophisticated use of TC_Find( ). In cases where more than one field of a type would preferably be examined to determine a match, particularly when the algorithm required may vary depending on the ontological type involved, the routine TC_FindByTypeAndRecordMatch( ) could be used.

A function that may also be included in the API, hereinafter referred to as TC_FindMatchingElements( ), which could be provided in order to make use of TC_Find( ) to locate a record(s) within the designated portion of a collection having data for which the various fields of the record can be used in a custom manner to determine if the two records refer to the same thing. This routine operates by invoking the script $ElementMatch when it finds potentially matching records, this script can be registered with the ontology and the algorithms involved may thus vary from one type to the next. This function may be used when trying to determine if two records relate to the same item, for example when comparing people one might take account of where they live, their age or any other field that can be used to discriminate including photographs if available. In the preferred embodiment, the operation of the system is predicated on the application code registering comparison scripts that can be invoked via this function. The comparison scripts for other types would necessarily be different.

A function that may also be included in the API, hereinafter referred to as TC_GetUniqueID( ), which could be provided in order to get the unique persistent ID value associated with the data of an element of a collection.

A function that may also be included in the API, hereinafter referred to as TC_SetUniqueID( ), which could be provided in order to set the unique persistent ID value associated with the data of an element of a collection.

A function that may also be included in the API, hereinafter referred to as TC_SetElementDestructor( ), which could be provided in order to set a destructor function to be called during collection tear-down for a given element in a collection. This function would preferably only be used if disposal of the element cannot be handled automatically via the type manager facilities. The destructor function is called before and built-in destructor actions, so if it disposes of memory associated with the element, it would preferably ensure that it alters the element value to reflect this fact so that the built-in destruction process does not duplicate its actions.

A function that may also be included in the API, hereinafter referred to as TC_GetElementDestructor( ), which could be provided in order to get an element's destructor function (if any).

A function that may also be included in the API, hereinafter referred to as TC_GetDepth( ), which could be provided in order to return the relative ancestry depth of two elements of a collection. That is if the specified element is an immediate child of the parent, its depth is 1, a grandchild (for trees) is 2 etc. If the element is not a child of the parent, zero is returned.

A function that may also be included in the API, hereinafter referred to as TC_Prune( ), which could be provided in order to remove all children from a collection. Any handle storage associated with elements being removed would preferably be disposed.

A function that may also be included in the API, hereinafter referred to as TC_AddPath( ), which could be provided in order to add the specified path to a tree. In the preferred embodiment, a path is a series of ':' separated alphanumeric (plus '_') names representing the nodes between the designated parent and the terminal node given. If the path ends in a ':', the terminal node is a non-leaf node, otherwise it is assumed to be a leaf. For example the path "animals:mammals:dogs:fido" would create whatever tree structure was necessary to insert the non-leaf nodes for "animals", "mammals" and "dogs" below the designated parent, and then insert the leaf node "fido" into "dogs". Note that while the parent is normally the root of the tree, another existing non-leaf node of the tree may be specified along with a path relative to that node for the add.

A function that may also be included in the API, hereinafter referred to as TC_Shove( ), which could be provided in order to add a new element at the start of the collection. When applied to a tree, a new head child node is added. When applied to a binary tree, it is preferably to use TC_AddLeft( ).

A function that may also be included in the API, hereinafter referred to as TC_Flip( ), which could be provided in order to reverse the order of all children of the specified parent. The 'kRecursiveOperation' option may also apply.

A function that may also be included in the API, hereinafter referred to as TC_SetFlags( ), which could be provided in order to set or clear one or more of the 16 custom flag values associated with each element of a collection. These flags are often useful for indicating logical conditions or states associated with the element.

A function that may also be included in the API, hereinafter referred to as TC_GetFlags( ), which could be provided in order to get one or more custom flag values associated with each element of a collection.

A function that may also be included in the API, hereinafter referred to as TC_SetReadOnly( ), which could be provided in order to alter the read-only state of a given element of a collection. If an element is read-only, any subsequent attempt to alter its value will fail.

A function that may also be included in the API, hereinafter referred to as TC_IsReadOnly( ), which could be provided in order to determine if a given element of a collection is marked as read-only or not. If an element is read-only, any attempt to alter its value will fail.

A function that may also be included in the API, hereinafter referred to as TC_SetTag( ), which could be provided in order to set the tag value associated with a given element. The tag value (which is a long value) may also be used to store any arbitrary information, including a reference to other storage. In the preferred embodiment, if the tag value represented other storage, it is important to define a cleanup routine for the collection that will be called as the element is destroyed in order to clean up the storage.

A function that may also be included in the API, hereinafter referred to as TC_GetTag( ), which could be provided in order to get the tag value associated with an element of a collection.

A function that may also be included in the API, hereinafter referred to as TC_SetShortCut( ), which could be provided in order to set the shortcut value associated with a given element.

A function that may also be included in the API, hereinafter referred to as TC_SetDescription( ), which could be provided in order to set the description string associated with a given element. The description may also be used to store any arbitrary text information.

A function that may also be included in the API, hereinafter referred to as TC_GetDescription( ), which could be provided in order to get the tag value associated with an element of a collection.

A function that may also be included in the API, hereinafter referred to as TC_CollType( ), which could be provided in order to obtain the collection type (e.g., kFromArray etc.) for a collection A function that may also be included in the API, hereinafter referred to as TC_Visit( ), which could be provided in order to visit each element of a collection in turn. For non-hierarchical collections, this function would be a relatively simple operation. For trees, however, the sequence of nodes visited would need to be set using a variable, such as 'postOrder'. In the preferred embodiment, if 'postOrder' is false, the tree is searched in pre-order sequence (visit the parent, then the children). If it is true, the search would be conducted in post-order sequence (visit the children, then the parent). At each stage in the 'walk', the previous value of 'anelem' could be used by the search to pick up where it left off. To start the 'walk', the variable 'anelem' could be set to zero. The 'walk' would terminate when this function returns FALSE and the value of anElem on output becomes zero. The advantage of using TC_Visit( ) for all collection scans, regardless of hierarchy, is that the same loop will work with hierarchical or non-hierarchical collections. Loops involving operations like TC_Next( ) do not in general exhibit this flexibility. If the 'kRecursiveOperation' option is not set, the specified layer of any tree collection will be traversed as if it was not hierarchical. This algorithm is fundamental to almost all other collection manipulations, and because it is non-trivial, it is further detailed below:

```
Boolean TC_Visit     (                                  // Visit each element of
a collection
        ET_CollectionHdl    aCollection,                // IO:The collection
        int32               options,                    // I:Various logical
options
        ET_Offset           theParentRef,               // I:Parent element
reference
        ET_Offset*          anElem,                     // IO:Previous element
(or 0),next
        Boolean             postOrder                   // I:TRUE/FALSE =
postOrder/preOrder
                    )                                   // R:TRUE for success,
else FALSE
{
  off = *anElem;
  prt = resolve parent reference
  objT = root node 'fromWhich'
  if ( !off )
  {
    off = (prtP->childHdr) ? theParentRef + prtP->childHdr : 0;
```

-continued

```
        if ( off )
        {
          cpxP = resolve off reference
          if ( post && (options & kRecursiveOperation) )
            while ( off && cpxP->childHdr )      // now dive down to any
children
            {
              off = off + cpxP->childHdr;
              cpxP = resolve off reference
            }
        }
      } else
      {
        cpxP = resolve off reference
        noskip = NO;
        if ( post )                               // post-order traversal
        {                                         // at the EOF so only if
we're in
          if ( !cpxP->nextElem && (options & kRecursiveOperation) )
          {                                       // a hierarchy may there
be more
          if ( objT == kFromBTree || objT == kFromNTree || objT ==
kFromArrayN )
          {
            if ( cpxP->hdr.parent )
            {
              off = off + cpxP->hdr.parent;       // climb up next parent
              cpxP = resolve off reference
              if ( (cpxP != kComplexRecord || off == theParentRef ) )
                off = 0;
            } else
              off = 0;
            noskip = YES;                         // parents examined
after children
          } else
            off = 0;
        }
        if ( off && !noskip )
        {
          off = ( cpxP->nextElem ) ? off + cpxP->nextElem : 0;
          if ( off )
          {
            cpxP = resolve off reference
            if ( options & kRecursiveOperation )
              while ( off && cpxP->childlHdr ) // depth 1st dive to
children
              {
                off = off + cpxP->childHdr;
                cpxP = resolve off reference
              }
          }
        }
      } else                                      // pre-order traversal
        if ( cpxP->childHdr && (options & kRecursiveOperation) )
        {
          off = off + cpxP->childHdr;
          cpxP = resolve off reference
        } else
        {
          if ( cpxP->nextElem )
          {
            off = off + cpxP->nextElem;
            cpxP = resolve off reference
          }
          else if ( options & kRecursiveOperation )
          {
            if ( objT == kFromBTree || objT == kFromNTree || objT ==
kFromArrayN )
              for ( ; off && !cpxP->nextElem ; )
              {
                if ( cpxP->hdr.parent )
                {
                  off = off + cpxP->hdr.parent;
                  cpxP = resolve off reference
                } else
                  off = 0;
                if ( off && (record != kComplexRecord || off ==
theParentRef) )
                  off = 0;
```

-continued

```
              }
            else
              off = 0;
            if ( off && cpxP->nextElem )
            {
              off = off + cpxP->nextElem;
              cpxP = resolve off reference
            }
          } else
            off = 0;
        }
      }
    }
  }
```

A function that may also be included in the API, hereinafter referred to as TC_Random( ), could be provided in order to randomize the order of all children of the specified parent. The 'kRecursiveOperation' option applies.

A function that may also be included in the API, hereinafter referred to as TC_HasEmptyFlags( ), could be provided in order to check to see if a designated collection element has tracking set up for empty/non-empty status of the fields within the element.

A function that may also be included in the API, hereinafter referred to as TC_HasDirtyFlags( ), could be provided in order to check to see if a designated collection element has tracking set up for dirty/clean status of the fields within the element.

A function that may also be included in the API, hereinafter referred to as TC_GetSetDirtyFlags( ), could be provided in order to get/set the dirty flags for a given record. This copy might also be used to initialize the flags for another record known to have a similar value. To prevent automatic re-computation of the flags when cloning is intended (since this computation is expensive), it is preferable to use the 'kNoEstablishFlags' option when creating the new record to which the flags will be copied. The buffer supplied in 'aFlagsBuffer' would preferably be large enough to hold all the resulting flags. The size in bytes necessary can be computed as:

bytes=(((TM_GetTypeMaxFlagIndex( )−1)|0x07)+1)>>3;

A function that may also be included in the API, hereinafter referred to as TC_GetSetEmptyFlags( ), could be provided in order to get/set the empty flags for a given record. For example, this copy might be used to initialize the flags for another record known to have a similar value. To prevent automatic re-computation of the flags in cases where such cloning is intended (since this computation Is expensive), it is preferably to use the 'kNoEstablishFlags' option when creating the new record to which the flags will be copied. The buffer supplied in 'aFlagsBuffer' would preferably be large enough to hold all the resulting flags. The size in bytes necessary can be computed as:

bytes=(((TM_GetTypeMaxFlagIndex( )−1)|0x07)+1)>>3;

A function that may also be included in the API, hereinafter referred to as TC_GetServerCollections( ), could be provided in order to obtain a string handle containing an alphabetized series of lines, wherein each line gives the name of a 'named' collection associated with the server specified. These names could be used to open a server-based collection at the client that is tied to a particular named collection in the list (see, for example, TC_OpenContainer).

A function that may also be included in the API, hereinafter referred to as TC_Publish( ), could be provided in order to publish all collections (wake function).

A function that may also be included in the API, hereinafter referred to as TC_UnPublish( ), could be provided in order to un-publish a previously published collection at a specified server thus making it no-longer available for client access. In the preferred embodiment, un-publishing first causes all current subscribers to be un-subscribed. If this process fails, the un-publish process itself is aborted. Once un-published, the collection is removed from the server and any subsequent (erroneous) attempt to access it will fail.

A function that may also be included in the API, hereinafter referred to as TC_Subscribe( ), could be provided in order to subscribe to a published collection at a specified server thus making accessible in the client. A similar effect could be achieved by using TC_CreateCollection( ) combined with the 'kServerBasedCollection' option.

A function that may also be included in the API, hereinafter referred to as TC_Unsubscribe( ), could be provided in order to un-subscribe from a published collection at a specified server. In the preferred embodiment, the collection itself does not go away in the server, un-subscribing merely removes the connection with the client.

A function that may also be included in the API, hereinafter referred to as TC_ContainsTypedef( ), could be provided in order to determine if a typedef for type name given is embedded in the collection. Because collections may be shared, and may contain types that are not known in other machines sharing the collection, such as proxy types that may have been created on the local machine, it is essential that the collection itself contain the necessary type definitions within it. In the preferred embodiment, this logic would be enforced automatically for any proxy type that is added into a collection. If a collection contains other dynamic types and may be shared, however, it is preferable to include the type definition in the collection.

A function that may also be included in the API, hereinafter referred to as TC_AddTypedef( ), could be provided in order to add/embed a typedef for type name in a collection. Because collections may be shared, and may contain types that are not known in other machines sharing the collection, such as proxy types that may have been created on the local machine, it is preferable for the collection itself to store the necessary type definitions within it. In the preferred embodiment, this logic would be enforced automatically for any proxy type that is added into a collection. If a collection contains other dynamic types and may be shared, however, is is preferably to ensure that the type definition is included in the collection by calling this function.

A function that may also be included in the API, hereinafter referred to as TC_BuildTreeFromStrings( ), could be provided in order to create a tree collection and a set of hierarchical non-valued named nodes from a series of strings formatted as for TC_AddPath( ), one per line of input text. The root node itself may not be named. If a collection is passed in, the new collection could attached to the specified node. Alternatively, an entirely new collection could be created and returned with the specified tree starting at the root.

A function that may also be included in the API, hereinafter referred to as TC_RegisterServerCollection( ), could be provided in order to register a collection by name within a server for subsequent non-local access via a server using server-based collections in the clients.

A function that may also be included in the API, hereinafter referred to as TC_DeRegisterServerCollection( ), could be provided in order to deregister a collection by name to prevent subsequent accesses via TC_ResolveServerCollection( ).

One feature that is important in any complete data model is the ability to associate and execute arbitrary code or interpreted script routines whenever certain logical actions are performed on the data of one of its fields. In the system of this invention, this capability is provided by the 'scripts' API (prefix TS_) a portion of which could be implemented as set forth below:

```
Boolean TS_SetTypeAnnotation(                         // Modify annotation for a
given type
            ET_TypeDBHdl    aTypeDBHdl,               // I:Type DB handle (NULL
to default)
            ET_TypeID       aTypeID,                  // I:Type ID
            charPtr         name,                     // I:Annotation name
"$anAnnotation"
            charPtr         annotation                // I:Annotation, NULL to
remove
                                 );                   // R:TRUE for success,
FALSE otherwise
Boolean TS_SetFieldAnnotation(                        // Set field annotation
text
            ET_TypeDBHdl    aTypeDBHdl,               // I:Type DB handle (NULL
to default)
            ET_TypeID       aTypeID,                  // I:Type ID
            charPtr         aFieldName,               // I:Name of the
field/field path
            charPtr         name,                     // I:Annotation name as in
"<on> $name"
            charPtr         anAnnotation,             // I:Text of annotation,
NULL to remove
            ...                                       // I: 'fieldName' could be
sprintf( )
                                 );                   // R:TRUE for success,
FALSE otherwise
charHdl TS_GetTypeAnnotation(                         // Obtain annotation for a
given type
            ET_TypeDBHdl    aTypeDBHdl,               // I:Type DB handle (NULL
to default)
```

-continued

```
        ET_TypeID      aTypeID,         // I:Type ID
        charPtr        name,            // I:Annotation name as in
"<on> $name"
        int32          options,         // I:Various logical
options (see notes)
        ET_ViewRef     *collectionNode,// I:If non-NULL,
collection node
        ET_TypeID      *fromWho         // IO:holds registering
type ID
                       );               // R:Annotation text, NULL
if none
charHdl TS_GetFieldAnnotation(          // Get annotation for a
field
        ET_TypeDBHdl   aTypeDBHdl,      // I:Type DB handle (NULL
to default)
        ET_TypeID      aTypeID,         // I:Type ID
        charPtr        aFieldName,      // I:Name of the
field/field path
        int32          options,         // I:Various logical
options (see notes)
        ET_ViewRef                      *collectionNode,// I:If non-NULL,
collection node
        ET_TypeID      *fromWho,        // IO:holds registering
type ID
        charPtr        name,            // I:Annotation name as in
"<on> $name"
        ...                             // I:'fieldName' may be
sprintf( )
                       );               // R:Annotation text, NULL
if none
#define kNoInheritance     0x01000000   // options - !inherit from
ancest. types
#define kNoRefInherit      0x02000000   // options - !inherit for
ref. fields
#define kNoNodeInherit     0x08000000   // options - !inherit from
ancest. nodes
charHdl TS_GetFieldScript (             // Get script for action
& field
        ET_TypeDBHdl   aTypeDBHdl,      // I:Type DB handle (NULL
to default)
        ET_TypeID      aTypeID,         // I:Type ID
        charPtr        aFieldName,      // I:Name of the
field/field path
        charPtr        anAction,        // I:Action name as in
"<on> anAction"
        int32          options,         // I:Various logical
options (see notes)
        ET_ViewRef     *collectionNode,// I:If non-NULL,
collection node
        ET_TypeID      *fromwho,        // IO:registering type ID
        Boolean        *isLocal,        // IO:TRUE if local
script,else false
        ...                             // I:'aFieldName' may be
sprintf( )
                       );               // R:Action script,NULL if
none
#define kGlobalDefnOnly    0x04000000   // options - only obtain
global def.
Boolean TS_SetTypeScript(               // Set script for action &
type
        ET_TypeDBHdl   aTypeDBHdl,      // I:Type DB handle (NULL
to default)
        ET_TypeID      aTypeID,         // I:Type ID
        charPtr        anAction,        // I:Action name as in
"<on> anAction"
        charPtr        aScript,         // I:Type script/proc, NULL
to remove
        int32          options          // I:Various logical
options (see notes)
                       );               // R:TRUE for success,
FALSE otherwise
#define kLocalDefnOnly     0x00000001   // options - local script
override
#define kProcNotScript     0x00000002   // options - 'aScript' is a
fn. address
```

-continued

```
Boolean TS_SetFieldScript(                          // Set field action script
            ET_TypeDBHdl   aTypeDBHdl,              // I:Type DB handle (NULL
to default)
            ET_TypeID      aTypeID,                 // I:Type ID
            charPtr        aFieldName,              // I:Name of the
field/field path
            charPtr        anAction,                // I:Selector name as in
"<on> anAction"
            charPtr        aScript,                 // I:Field script/proc,
NULL to remove
            int32          options,                 // I:Various logical
options (see notes)
            ...                                     // I:'aFieldName' may be
sprintf( )
            );                                      // R:TRUE for success,
FALSE otherwise
charHdl TS_GetTypeScript(                           // Get type script for
action
            ET_TypeDBHdl   aTypeDBHdl,              // I:Type DB handle (NULL
to default)
            ET_TypeID      aTypeID,                 // I:Type ID
            charPtr        anAction,                // I:Action name as in
"<on> anAction"
            int32          options,                 // I:Various logical
options
(see notes)
            ET_ViewRef     *collectionNode,         // I:If non-NULL,
collection node
            ET_TypeID      *fromWho,                // IO:registering type ID
            Boolean        *isLocal                 // IO:If non-NULL, set TRUE
if local
                              );                    // R:Action script, NULL if
none
EngErr TS_InvokeScript (                            // Invoke a type or field
action script
            ET_TypeDBHdl   aTypeDBHdl,              // I:Type DB handle (NULL
to default)
            ET_TypeID      aTypeID,                 // I:Type ID
            charPtr        aFieldName,              // I:Name of the
field/field path
            charPtr        anAction,                // I:Action name as in
"<on> anAction"
            charPtr        aScript,                 // I:type/field script,NULL
to default
            ET_TypeID        fromWho,               // I:Registering Type id,
or 0
            anonPtr          aDataPtr,              // I:Type data buffer, or
NULL
            ET_CollectionHdl aCollection,           // I:The collection handle,
or NULL
            ET_Offset        offset,                // I:Collection element
reference
            int32          options,                 // I:Various logical
options
            ...                                     // IO:Additional 'anAction'
parameters
                              );                    // R:Zero for success,
FALSE otherwise
#define kSpecializedOptionsMask  0x0000FFFF        // other bits are
predefined
#define kInternalizeResults      0x00010000        // options - value should
be embedded
Boolean TS_RegisterScriptFn(                        // register a script
function
            ET_TypeScriptFn      aScriptFunction,// I:address of script
function
            charPtr        aName                    // I:name of script
function
                           );                       // R:TRUE for success,
FALSE otherwise
```

Every type or type field may also have 'action' scripts (or procedures) associated with it. For example, certain actions could be predefined to equate to standard events in the environment. Actions may also be arbitrarily extended and used as subroutines within other scripts, however, in order to provide a rich environment for describing all aspects of the behavior of a type or any UI associated with it. Such an approach would allow the contents of the type to be manipulated without needing any prior knowledge of the type itself. Type and Field script procedures could have the following calling API, for example (ET_TypeScriptFn):

```
EngErr myScript       (                      // my script procedure
     ET_TypeDBHdl       aTypeDBHdl,     // I:Type DB handle (NULL to
default)
     ET_TypeID            typeID,              // I:Type ID
     charPtr               fieldName,          // I:Field name/path, NULL for type
     charPtr               action,               // I:The script action being invoked
     charPtr               script,                // I:The script text
     anonPtr              dataPtr,             // I:Type data pointer or NULL
     ET_CollectionHdl aCollection,       // I:The collection handle, or NULL
     ET_Offset            offset,               // I:Collection element reference
     va_list               ap                     // I:va_list to additional params.
                          )                           // R:0 for success, else Error number
```

In the case of a script, these parameters can be referred to using $action, $aTypeDBHdl, $typeID, $fieldName and $dataPtr, any additional parameters are referred to by their names as defined in the script itself (the 'ap' parameter is not accessible from a script). Preferably, Scripts or script functions would return zero if successful, an error number otherwise. In the case of a C function implementing the script, the "ap" parameter can be used to obtain additional parameter values using va_arg( ). A number of script actions may also be predefined by the environment to allow registration of behaviors for commonly occurring actions. A sample set of predefined action scripts are listed below (only additional parameters are shown), but many other more specialized scripts may also be used:

$GetPersistentRef(ET_PersistentRef*persistentref) Resolve a persistent reference, once the required data has been loaded (e.g., from a database), the 'memoryRef' or 'elementRef' field should be set to reference the element designator obtained. This corresponds to resolving the 'typeName #id' persistent reference language construct. Note that if the 'id' field of the ET_PersistentRef is zero, the 'name' field will contain a string giving the name of the item required (presumably unique) which the function should then resolve to obtain and fill out the 'id' field, as well as the 'memory/element Ref' field. The contents of the 'stringH' field of 'persistentRef' may contain text extracted during data mining (or from other sources) and this may be useful in resolving the reference. The following options are defined for this script:

kInternalizeResults—the resultant value should be created within the referencing collection kGetNameOnly—Just fetch the name of the reference NOT the actual value $GetCollection(charPtr $filterSpec, charPtr fieldList, ET_CollectionRef*collectionRef) This script builds a type manager collection containing the appropriate elements given the parent type and field name. Once the collection has been built, the 'collection' field value of 'collectionRef' should be set equal to the collection handle (NULL if empty or problem creating it). This normally corresponds to resolving the 'typeName @@collectionName' collection reference language construct. The value of $filterSpec is obtained from the "$FilterSpec" annotation associated with the field (if any). Note also that the contents of the 'stringH' field of 'collectionRef' may also contain text extracted during data mining (or from other sources) and this may be useful in determining how to construct the collection. The value of the 'fieldList' parameter may be set to NULL in order to retrieve all fields of the elements fetched, otherwise it would preferably be a comma separated list of field names required in which case the resulting collection will be comprised of proxy types containing just the fields specified. The 'kInternalizeResults' option may apply to this script.

$GetPersistentCollection(charPtr $filterSpec, charPtr fieldList, ET_PersistentRef*persistentRef) This script/function is similar to "$GetCollection" but would be called only for persistent reference fields. The purpose of this script is to obtain a collection (into the 'members' field of the ET_PersistentRef) of the possible choices for the persistent reference. This can be seen in the UI when the field has a list selection menu next to it to allow setting of new values, clicking on this list selection will result in a call to this script in order to populate the resulting menu. "$filterSpec" and "fieldList" operate in a similar manner to that described for "$GetCollection". The 'kInternalizeResults' option may apply to this script.

$InstantiatePersistentRef (ET_PersistentRef*persistentRef) This script is called in order to instantiate into persistent storage (if necessary) a record for the persistent reference passed which contains a name but no ID. The script should check for the existence of the named Datum and create it if not found. In either case the ID field of the persistent reference should be updated to contain the reference ID. The actions necessary to instantiate values into persistent storage vary from one data type to another and hence different scripts may be registered for each data type. The 'stringH' field of the persistent reference may also contain additional information specific to the fields of the storage to be created. The $SetPersRefInfo( ) function can be used during mining to append to this field. Any string assignment to a persistent reference field during mining results in setting the name sub-field. In the preferred embodiment, this script would clear the 'stringh' field after successful instantiation.

$InstantiateCollection(ETCollectionRef*collectionRef) This script is called in order to instantiate into persistent storage (if necessary) all records implied by the collection field passed. The process is similar to that for "$InstantiatePersistentRef" but the script would preferably be aware of the existence of the 'aStringH' field of the collection reference with may contain a text based list of the implied record names. Any string assignment to a collection field during mining results in appending to the 'stringH' field. This field could also be explicitly set using the $SetPersRefInfo( ) function. In the preferred embodiment, this script would clear the 'stringH' field after successful instantiation.

$DefaultValue(charPtr defaultValue) This script/function allows the default value of a type field to be set. If the field has a "$DefaultValue" annotation this is passed as a parameter to the function, otherwise this parameter is null. In the absence of a "$DefaultValue" script, any "$DefaultValue" annotation found will be passed to TM_StringToBinary(delimiter="\n") which can be used to initialize fields, including structures to any particular value required. The assignment of default values preferably occurs within calls to TM_NewPtr( ), TM_NewHdl( ), or TM_InitMem( ) so type memory would also be allocated using one of these functions if default values are being used. If no default value is specified, the memory is initialized to zero. A field may also be explicitly set to its default value by calling TM_SetFieldToDefault( ).

$Add( ) This script/function is invoked to add a typed record to persistent storage (i.e, database(s)). In most cases the record being added will be within a collection that has been extracted during mining or which has been created manually via operator input.

$UniqueID( ) This script is called to assign (or obtain) the unique ID for a given record prior to adding/updating that record (by invoking $Add) to the database. The purpose of this script it to examine the name field (and any other available fields) of the record to see if a record of the same type and name exists in storage and if it does fill out the ID field of the record, otherwise obtain and fill out a new unique ID. Since the ID field preferably serves as the link between all storage containers in the local system, it is essential that this field is set up prior to any container specific adds and prior to making any $MakeLink script (described below) calls.

$MakeLink(ET_CollectionHdl refCollection,ET_Offset refElement,charPtr reffield) This script is called after $UniqueID and before $Add when processing data in a collection for addition/update to persistent storage. The purpose of this script is to set up whatever cross-referencing fields or hidden linkage table entries are necessary to make the link specified. If the referring field is a persistent reference, it will already have been set up to contain the ID and relative reference to the referred structure. If additional links are required (e.g., as implied by 'echo' fields), however, this script would be used to set them up prior the $Add being invoked for all Datums in the collection.

$SetFieldValue(anonPtr*newvalue,long*context,int32 entry) This script could called whenever the value of a field is altered. Normally setting a field value requires no script in order to implement, however, if a script is specified, it will be called immediately prior to actually copying the new value over with the value of 'entry' set to true. This means that the script could change the 'newValue' contents (or even replace it with a alternate 'newValue' pointer) prior to the copy. After the copy is complete and if 'context' is non-zero, the script may be called again with 'entry' set to false which allows any context stored via 'context' to be cleaned up (including restoring the original 'newValue' if appropriate). Because of this copying mechanism, $SetFieldValue scripts would preferably not alter the field value in the collection, but rather the value that is found in 'newValue'. This script is also a logical place to associate any user interface with the data underlying it so that updates to the UI occur automatically when the data is changed.

$Drag(ControlHandle aControlH,EventRecord*eventP, ET_DragRef*dragRef) This script is called to start a drag.

$Drop(ControlHandle aControlH,ET_DragRef dragRef) This script is called to perform a drop. The options parameter will have bit-0 set true if the call is for a prospective drop, false if the user has actually performed a drop by releasing the mouse button. A prospective drop occurs if the user hovers over a potential drop location, in this case a popup menu may be automatically displayed in order to allow the user to select one of a set of possible drop actions (for example, "copy link", "insert icon" etc). This same menu may also be produced on an actual drop if it is not possible to determine automatically what action is required. The DragAndDrop implementation provides a set of API calls for constructing and handling the drop action menu, $ElementMatch(ET_Offset element,Boolean*match) This script is called to compare two elements to see if they refer to the same item. See TC_FindMatchingElements( ) for details. Preferably, the Boolean result is returned in the 'match' field, true to indicate a match and false otherwise.

Annotations are arbitrarily formatted chunks of text (delimited as for scripts and element tags) that can be associated with fields or types in order to store information for later retrieval from code or scripts. The present invention utilized certain predefined annotations (listed below) although additional (or fewer) annotations may also be defined as desired:

$filterSpec—This annotation (whose format is not necessarily currently defined by the environment itself) is passed to the $GetCollection and $GetPersistentCollection scripts in order to specify the parameters to be used when building the collection.

$tableSpec—This annotation (whose format is not necessarily currently defined by environment itself) is used when creating persistent type storage.

$DefaultValue—See the description under the $DefaultValue script.

$BitMask—This annotation may be used to define and then utilize bit masks associated with numeric types and numeric fields of structures. The format of the annotation determines the appearance in auto-generated UI. For full details, see the description for the function TM_GetTypeBitMaskAnnotation( ).

$ListSpec—In the preferred embodiment, this field annotation consists of a series of lines, each containing a field path within the target type for a collection reference. These field paths can be used to define the type and number of columns of a list control provided by the TypesUI API which will be used to display the collection in the UI. The elements of the $ListSpec list would preferably correspond to valid field paths in the target type.

A function, hereinafter called TS_SetTypeAnnotation( ), could be provided which adds, removes, or replaces the existing "on" condition annotation for a type. This routine may also be used to add additional annotations to or modify existing annotations of a type.

A function, hereinafter called TS_SetFieldAnnotation( ), could be provided which adds, removes, or replaces the existing annotation associated with a field. This routine may also be used to add additional annotations to or modify existing annotations of a type field. Preferably, annotations always apply globally. In such an embodiment, annotations could be divided into annotation types so that multiple independent annotations can be attached and retrieved from a given field.

A function, hereinafter called TS_GetTypeAnnotation( ), could be provided which obtains the annotation specified for the given type (if any). In the preferred embodiment, the following options are supported:

kNoInheritance—dont inherit from ancestral types etc.

kNoNodeInherit—dont inherit from ancestral nodes in the collection

A function, hereinafter called TS_GetFieldAnnotation( ), could be provided which obtains the annotation text associated with a given field and annotation type. If the annotation and annotation type cannot be matched, NULL is returned. In the preferred embodiment, options include:

kNoInheritance—dont inherit from ancestral types etc.

kNoNodeInherit—dont inherit from ancestral nodes in the collection kNoRefInherit—dont inherit for reference fields A function, hereinafter called TS_GetFieldScript( ), could be provided which obtains the script associated with a given field and action. If the script and action cannot be matched, NULL is returned. Preferably, the returned result would be suitable for input to the function TS_DoFieldActionScript( ). Note that field scripts may be overridden locally to the process using TS_SetFieldScript( ). If this is the case, the 'is Local' parameter (if specified) will be set true. Local override scripts that wish to execute the global script and modify the behavior may also obtain the global script using this function with 'globalDefnOnly' set TRUE, and execute it using TS_DoFieldActionScript( ). If the script return actually corresponds to an action procedure not a script then the script contents will simply contain an '=' character followed by a single hex number which is the address of the procedure to be called. This is also valid input to TS_DoFieldActionScript( ) which will invoke the procedure. If the 'inherit' parameter is TRUE, upon failing to find a script specific to the specified field, this function will attempt to find a script of the same name associated with the enclosing type (see TM_GetTypeActionScript) or any of its ancestors. This means that it is possible to specify default behaviors for all fields derived from a given type in one place only and then only override the default in the case of specific field where this is necessary. If the field is a reference field, a script is only invoked if it is directly applied to the field itself, all other script inheritance is suppressed. In the preferred embodiment, the following options would be supported:

kNoInheritance—dont inherit from ancestral types etc.

kNoNodeInherit—dont inherit from ancestral nodes in the collection kNoRefInherit—dont inherit for reference fields kGlobalDefnOnly—only obtain global definition, ignore local overrides The search order when looking for field scripts is as follows:

1) Look for a field script associated with the field itself.

2) If 'inherit' is TRUE:

A) If 'aFieldName' is a path (e.g., field1.field2.field3), for each and every ancestral field in turn (from the leaf node upwards—2,1 in the example above):

a) If there is an explicit matching field script (no-inheritance) associated with that field, use it B) If the field is a 'reference' field (i.e., *,**,@,@@, or #), search the referred to type for a matching type script C) Search the enclosing type ('aTypeID') for a matching type script.

A function, hereinafter called TS_SetTypeScript( ), could be proceeded which adds, removes, to or replaces the existing "on" condition action code within an existing type script. For example, this routine could be used to add additional behaviors to or modify existing behaviors of a type. In the preferred embodiment, if the 'kLocalDefnOnly' option is set, the new action script definition applies within the scope of the current process but does not in any way modify the global definition of the type script. The ability to locally override a type action script is very useful in modifying the behavior of certain portions of the UI associated with a type while leaving all other behaviors unchanged. If the 'kProcNotScript' option is set, 'aScript' is taken to be the address of a procedure to invoke when the script is triggered, rather than a type manager script. This approach allows arbitrary code functionality to be tied to types and type fields. While the use of scripts is more visible and flexible, for certain specialized behaviors, the use of procedures is more appropriate.

A function, hereinafter called TS_SetFieldScript( ), could be provided which adds, removes, or replaces the existing "on" condition action code within an existing field script. For example, this routine may be used to add additional behaviors to or modify existing behaviors of a type field. If the 'kLocalDefnOnly' option is set, the new action script definition applies within the scope of the current process, it does not in any way modify the global definition of the field's script. As explained above, this ability to locally override a field action script is very useful in modifying the behavior of certain portions of the UI associated with a field while leaving all other behaviors unchanged. If the 'kProcNotScript' option is set, 'aScript' is taken to be the name of a script function to invoke when the script is triggered, rather than an actual type manager script. This allows arbitrary code functionality to be tied to types and type fields. Script functions can be registered using TS_RegisterScriptFn( ).

A function, hereinafter called TS_GetTypeScript( ), could be provided which obtains the script associated with a given type and action. If the type and action cannot be matched, NULL is returned. Preferably, the returned result would be suitable for input to the function TS_DoTypeActionScript( ). Note that in the preferred embodiment type scripts may be overridden locally to the process using TS_SetTypeScript( ). If this is the case, the 'is Local' parameter (if specified) will be set true. Local override scripts that wish to execute the global script and modify the behavior somehow can obtain the global script using this function with 'kGlobalDefnOnly' option set, and execute it using TS_DoTypeActionScript( ). If the script return actually corresponds to an action procedure not a script then the script contents will simply contain an '=' character followed by a single hex number which is the address of the procedure to be called. This is also valid input to TS_DoTypeActionScript( ) which will invoke the procedure. If the 'kNoInheritance' option is not set, upon failing to find a script specific to the type, this function will attempt to find a script of the same name associated with the enclosing type or any of its ancestors. Using this function, it is possible to specify default behaviors for all types (and fields—see TM_GetFieldActionScript) derived from a given type in one place only and then only override the default in the case of specific type/field where this is necessary. Options for this function are identical as described with respect to the function TS_GetFieldScript( ).

A function, hereinafter called TS_InvokeScript( ), could be provided which invokes the specified field action script or script function. Note that because the 'fieldScript' parameter is explicitly passed to this function, it is possible to execute arbitrary scripts on a field even if those scripts are not the script actually associated with the field (as returned by TS_GetFieldScript). This capability makes the full power of the type scripting language available to program code whilst allowing arbitrary script or script function extensions as desired. Unlike most field related functions in this API, this function does not necessarily support sprintf( ) type field expansion because the variable arguments are used to pass parameters to the scripts. When invoking a type action script without knowledge of the field involved, the 'aFieldName' parameter should be set to NULL. A function, hereinafter called function TS_RegisterScriptFn( ), could also be provided which could be used to register a script function symbolically so that it can be invoked if encountered within a field or type script. In the preferred embodiment, when TS_InvokeFieldActionScript( ) encounters a script beginning with an '=' character and of the form "=scriptFnName" where "scriptFnName" has been registered previously using this procedure, it resolves "scriptFnName" to obtain the actual function address and then invokes the function.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

Appendix 6

SYSTEM AND METHOD FOR AUTOMATIC GENERATION OF SOFTWARE PROGRAMS

BACKGROUND OF THE INVENTION

In any complex information system that accepts unstructured or semi-structured input (such as an intelligence system) for the external work, it is obvious that change is the norm, not the exception. Media and data streams are often modified and otherwise constantly change making it difficult to monitor them. Moreover, in any system involving multiple users with divergent requirements, even the data models and requirements of the system itself will be subject to continuous and pervasive change. By some estimates, more than 90% of the cost and time spent on software is devoted to maintenance and upgrade of the installed system to handle the inevitability of change. Even our most advanced techniques for software design and implementation fail miserably as the system is scaled or is otherwise changed. The reasons for this failure arise, at least in part, from the very nature of accepted software development practice/process.

Referring now to FIG. 1, the root of the problem with the current software development process, which we shall call the "Software Bermuda Triangle" effect, is shown. Conventional programming wisdom holds that during the design phase of an information processing application, programming teams should be split into three basic groups. The first group is labeled DBA (for Database Administrator) 105. These individuals 105 are experts in database design, optimization, and administration. This group 105 is tasked with defining the database tables, indexes, structures, and querying interfaces based initially on requirements, and later, on requests primarily from the applications group. These individuals 105 are highly trained in database techniques and tend naturally to pull the design in this direction, as illustrated by the small outward pointing arrow. The second group is the Graphical User Interface (GUI) group 110. The GUI group 110 is tasked with implementing a user interface to the system that operates according the customer's expectations and wishes and yet complies exactly with the structure of the underlying data (provided by the DBA group 105) and the application(s) behavior (as provided by the Apps group 115). The GUI group 110 will have a natural tendency to pull the design in the direction of richer and more elaborate user interfaces. Finally the applications group 115 is tasked with implementing the actual functionality required of the system by interfacing with both the DBA and the GUI and related Applications Programming Interfaces (APIs). This group 115, like the others 105, 110 tends to pull things in the direction or more elaborate system specific logic. Each of these groups tends to have no more than a passing understanding of the issues and needs of the other groups. Thus during the initial design phase, assuming a strong project and software management process rigidly enforces design procedures, a relatively stable triangle is formed where the strong connections 120, 125, 130 enforced between each group by management are able to overcome the outward pull of each member of the triangle. Assuming a stable and unchanging set of requirements, such a process stands a good chance of delivering a system to the customer on time.

The problem, however, is that while correct operation has been achieved by each of the three groups 110, 105, 115 in the original development team, significant amounts of undocumented application, GUI, and Database specific knowledge has likely been embedded into all three of the major software components. In other words, this process often produces a volatile system comprised of these subtle and largely undocumented relationships just waiting to be triggered. After delivery (the bulk of the software life cycle), in the face of the inevitable changes forced on the system by the passage of time, the modified system begins to break down to yield a new "triangle" 150. Unfortunately, in many cases, the original team that built the system has disbanded and knowledge of the hidden dependencies is gone. Furthermore, system management is now in a monitoring mode only meaning that instead of having a rigid framework, each component of the system is now more likely to "drift". This drift is graphically represented by the dotted lines 155, 160, 165. During maintenance and upgrade phases, each change hits primarily one or two of the three groups. Time pressures, and the new development environment, mean that the individual tasked with the change (probably not an original team member) tends to be unaware of the constraints and naturally pulls outward in his particular direction. The binding forces have now become much weaker and more elastic while the forces pulling outwards have become much stronger. A steady supply of such changes impacting this system could well eventually break it apart. In such a scenario, the system will grind to a halt or become unworkable or un-modifiable. The customer must either continue to pay progressively more and more outrageous maintenance costs (swamping the original development costs), or must start again from scratch with a new system and repeat the cycle. The latter approach is often much cheaper than the former. This effect is central to why software systems are so expensive. Since change of all kinds is particularly pervasive in an intelligence system, any architecture for such systems would preferably address a way to eliminate this "Bermuda Triangle" effect.

Since application specific logic and it's implementation cannot be eliminated, what is needed is a system and environment in which the 'data' within the system can be defined and manipulated in terms of a world model or Ontology, and for which the DBA and GUI portions of the programming tasks can be specified and automatically generated from this Ontology thereby eliminating the triangle effect (and the need for the associated programming disciplines). Such an approach would make the resultant system robust and adaptive to change.

SUMMARY OF INVENTION

The present invention provides a system capable of overcoming this effect and provides a system that is both robust and adaptive to change. The preferred base language upon which this system is built is the C programming language although other languages may be used. In the standard embodiment using the C programming language, the present invention is composed of the following components:

a) Extensions to the language that describe and abstract the logic associated with interacting with external 'persistent' storage (i.e., non-memory based). Standard programming languages do not provide syntax or operators for manipulating persistent storage and a formalization of this capability is desirable. This invention provides these extensions and the "extended" language is henceforth referred to as C*. C*, in addition to being a standard programming language, is also an ontology definition language (ODL).

b) Extensions to the C* language to handle type inheritance. In an ontology based system, the world with which the system interacts is broken down based on the kinds of things that make up that world, and by knowledge of the kind of thing involved, it becomes possible to perform meaningful calculations on that object without knowledge of the particulars of the descendant type. Type inheritance in this context therefore more accurately means ancestral field inheritance (as will be described later).

c) Extensions to the C* language to allow specification of the GUI content and layout.

d) Extensions to the C* language to allow specification and inheritance of scriptable actions on a per-field and per-type basis. Similar extensions to allow arbitrary annotations associated with types and fields are also provided.

e) A means whereby the data described in the C* language can be translated automatically into generating the corresponding tables and fields in external databases and the queries and actions necessary to access those databases and read/write to them. This aspect of the invention enables dynamic creation of databases as data is encountered f) A high level ontology designed to facilitate operation of the particular application being developed. In the examples below and in: the preferred embodiment, the application being developed will address the problem of 'intelligence' i.e., the understanding of 'events' happening in the world in terms of the entities involved, their motives, and the disparate information sources from which reports are obtained.

g) A means to tie types and their access into a suite of federated type or container/engine specific servers responsible for the actual persistence of the data.

A necessary prerequisite for tackling the triangle problem is the existence of a run-time accessible (and modifiable) types system capable of describing arbitrarily complex binary structures and the references between them. In the preferred embodiment, the invention uses the system has been previously described in Appendix 1 (hereinafter, the "Types Patent"). Another prerequisite is a system for instantiating, accessing and sharing aggregates of such typed data within a standardized flat memory model and for associating inheritable executable and/or interpreted script actions with any and all types and fields within such data. In the preferred embodiment, the present invention uses the system and method that is described in Appendix 2 (hereinafter, the "Memory Patent"). The material presented in these two patents are expressly incorporated herein. Additional improvements and extensions to this system will also be described below and many more will be obvious to those skilled in the art.

BRIEF DESCRIPTION OF THE FIGURES

FIG. 1 shows the root of the problem with the current software development process, which we shall call the "Software Bermuda Triangle" effect.

FIG. 2 shows a sample query-building user interface (UI).

FIG. 3 shows a sample user interface providing access to the fields within the type "country."

FIG. 4 shows a sample user interface providing access to a free format text field within the type "country."

FIG. 5 shows a sample user interface providing access to a fixed sized text field within the type "country."

FIG. 6A shows an example of how a short text field or numeric field (such as those handled by the RDBMS container described above) might be displayed in a control group.

FIG. 6B shows one method for displaying a date in a control group.

FIG. 6C shows an example of an Islamic Hijjrah calendar being displayed.

FIG. 7A shows the illustrated control group of how one might display and interact with a persistent reference field ('#').

FIG. 7B shows an example of one way that a collection reference field ('@@') might be displayed in an auto-generated user interface.

FIG. 8 shows one possible method for displaying variable sized text fields (referenced via the char @ construct).

FIG. 9 shows the manner in which an image reference (Picture @picture) field could be displayed in an auto-generated user interface.

FIG. 10 shows a sample screen shot of one possible display of the Country record in the same UI layout theme described above (most data omitted).

FIG. 11 shows a sample embodiment of the geography page within Country.

FIG. 12 shows a sample embodiment of the second sub-page of the geography page within country.

FIG. 13 shows an example of one part of a high-level ontology targeted at intelligence is shown.

DETAILED DESCRIPTION OF THE INVENTION

As described above, a necessary prerequisite for tackling the triangle problem is the existence of a run-time accessible (and modifiable) types system capable of describing arbitrarily complex binary structures and the references between them. In the preferred embodiment, the invention uses the system described in the Types Patent. Another prerequisite is a system for instantiating, accessing and sharing aggregates of such typed data within a standardized flat memory model and for associating inheritable executable and/or interpreted script actions with any and all types and fields within such data. In the preferred embodiment, the present invention uses the system and method that is described in the Memory Patent. The material presented in these two patents are expressly incorporated herein and the functions and features of these two systems will be assumed for the purposes of this invention.

As an initial matter, it is important to understand some of the language extensions that are needed in order to create an Ontology Description Language (ODL). In the preferred embodiment, the following operators/symbols are added to the basic C language (although other symbols and syntax are obviously possible without changing the basic nature of the approach) in order to provide basic support for the items described herein:

script—used to associate a script with a type or field annotation—used to associate an annotation with a type or field @—relative reference designator (like '*' for a pointer)

@@—collection reference designator

#—persistent reference designator

<on>—script and annotation block start delimiter
<no>—script and annotation block end delimiter
><—echo field specification operator
:—type inheritance Additionally, the syntax for a C type definition has been extended to include specification of the "key data-type" associated with a given ontological type as follows:

typedef struct X 'XXXX' { . . . };

Where the character constant 'XXXX' specifies the associated key data-type. The persistent reference designator '#' implies a singular reference to an item of a named type held in external storage. Such an item can be referenced either by name or by unique system-wide ID and given this information, the underlying substrate is responsible for obtaining the actual data referenced, adding it to the collection, and making the connection between the referencing field and the newly inserted data by means of a relative reference embedded within the persistent reference structure. Preferably, the binary representation of a persistent reference field is accomplished using a structure of type 'ET_PersistentRef' as defined below:

```
typedef struct ET_UniqueID
{
   OSType              system;                   // system id is
                                                 32 bits
   unsInt64            id;                       // local id is 64 bits
} ET_UniqueID;
typedef struct ET_PersistentRef
{
   ET_CollectionHdl    members;                  // member collection
   charHdl             stringH;                  // String containing
mined text
   ET_TypeID           aTypeID;                  // type ID
   ET_Offset           elementRef;               // rel. ref. to data
if !fetched)
   ET_Offset           memberRef;                // rel. ref. to
member coll. (or NULL)
   anonPtr             memoryRef;                // pointer to type
data (NULL if N/A)
   ET_UniqueID         id;                       // unique ID
   char                name[kPersRefNameSize];   // name of reference
} ET_PersistentRef, *ET_PersistentRefPtr;
```

The type ET UniqueID consists of a two part 96-bit reference where the 64-bit 'id' field refers to the unique ID within the local 'system' which would normally be a single logical installation such as for a particular corporation or organization. Multiple systems can exchange data and reference between each other by use of the 32-bit 'system' field of the unique ID. The 'members' field of an ET_PersistentRef is used by the system to instantiate a collection of the possible items to which the reference is being made and this is utilized in the user interface to allow the user to pick from a list of possibilities. Thus for example if the persistent reference were "Country #nationality" then the member collection if retrieved would be filled with the names of all possible countries from which the user could pick one which would then result in filling in the additional fields required to finalize the persistent reference.

In normal operation, either the name or ID and type is known initially and this is sufficient to determine the actual item in persistent storage that is being referenced which can then be fetched, instantiated in the collection and then referenced using the 'elementRef' field. The contents of the 'stringH' field are used during data mining to contain additional information relating to resolving the reference. The 'aTypeID' field initially takes on the same value as the field type ID from which the reference is being made, however, once the matching item has been found, a more specific type ID may be assigned to this field. For example if the referencing field were of the form "Entity #owner" (a reference to an owning entity which might be a person, organization, country etc.) then after resolution, the 'aTypeID' field would be altered to reflect the actual sub-type of entity, in this case the actual owning entity. The 'memoryRef' field might contain a heap data reference to the actual value of the referenced object in cases where the referenced value is not to become part of the containing collection for some reason. Normally however, this field is not needed.

As an example of how the process of generating and then resolving a persistent reference operates, imagine the system has just received a news story referring to an individual who's name is "X", additionally from context saved during the mining process, the system may know such things as where "X" lives and this information could be stored in the 'stringH' field. At the time the reference to "X" is instantiated into persistent storage, a search is made for a person named "X" and, should multiple people called "X" be found in the database, the information in 'stringH' would be used in a type dependent manner to prune the list down to the actual "X" that is being referenced. At this point the system-wide ID for the specific individual "X" is known (as is whatever else the system knows about X) and thus the 'id' field of the reference can be filled out and the current data for "X" returned and referenced via "elementRef". If no existing match for "X" is found, a new "Person" record for "X" is created and the unique ID assigned to that record is returned. Thus it can be seen that, unlike a memory reference in a conventional programming language, a persistent reference may go through type specific resolution processes before it can be fully resolved. This need for a 'resolution' phase is characteristic of all references to persistent storage.

Like a persistent reference, the collection reference '@@' involves a number of steps during instantiation and retrieval. In the preferred embodiment, a collection reference is physically (and to the C* user transparently) mediated via the 'ET_CollectionRef' type as set forth below:

```
typedef struct ET_CollectionRef
{
   ET_CollectionHdl   collection;   // member collection
   charHdl            stringH;      // String containing mined text
   ET_TypeID          aTypeID;      // collection type ID (if any)
   ET_Offset          elementRef;   // relative reference to collection
                                    root
   ET_StringList      cList;        // collection member list (used for
                                    UI)
} ET_CollectionRef, *ET_CollectionRefPtr;
```

The first four fields of this structure have identical types and purposes to those of the ET_PersistentRef structure, the only difference being that the 'collection' field in this structure references the complete set of actual items that form part of the collection. The 'cList' field is used internally for user interface purposes. The means whereby the collections associated with a particular reference can be distinguished from those relating to other similar references is related to the meaning and use of the 'echo field' operator '><'. The following extracts from an actual ontology based on this system serve to reveal the relationship between the '><' operator and persistent storage references:

```
typedef struct Datum        'DTUM'                          // Ancestral type of all
pers. storage
{
   NumericID                hostID;                         // unique Host system ID
(0=local)
   unsInt64                 id;                             // unique ID
   char                     name[256];                      // full name of this
Datum
   char                     datumType[32];                  // the type of the datum
   NumericID                securityLevel;                  // security level
   char                     updatedBy[30];                  // person
updating/creating this Datum
   Date                     dateEntered;                    // date first entered
   Date                     dateUpdated;                    // date of last update
   Feed                     #source;                        // information source
for this Datum
   Language                 #language;                      // language for this
Datum record
   struct
{
      NoteRegarding         @@notes >< regarding;           // Notes regarding this
Datum
      NoteRelating          @@relatedTo >< related;         // Items X-referencing
this Datum
      NoteRelating          @@relatedFrom >< regarding;     // Items X-referencing
this Datum
      GroupRelation         @@relatedToGroup >< related;// Groups X-referencing
this Datum
      GroupRelation         @@relatedFromGroup >< regarding;// Groups X-
referencing Datum
      Delta                 @@history >< regarding;         // Time history of
changes to Datum
      Category              @@membership;                   // Groupings Datum is a
member of
      char                  @sourceNotes;                   // notes information
source (s)
      unsInt64              sourceIDref;                    // ID reference in
original source
   } notes;
   Symbology                #symbology;                     // symbology used
   Place                    #place;                         // 'where' for the datum
(if known)
} Datum , *DatumPtr;
typedef struct NoteRelating:Observation 'CXRF'              // Relationship between
two datums
{
   Datum                    #regarding >< notes.relatedFrom; // 'source' item
   char                     itemType[64];                   // Datum type for
regarding item
   Datum                    #related >< notes.relatedTo;    // 'target' item
   char                     relatedType[64];                // Datum type for
related item
   RelationType             #relationType;                  // The type of the
relationship
   Percent                  relevance;                      // strength of
relationship (1..100)
   char                     author[128];                    // Author of the StickIt
Relating note
   char                     title[256];                     // Full Title of StickIt
Relating note
   char                     @text;                          // descriptive text and
notes
} NoteRelating;
```

In the preferred embodiment, 'Datum' is the root type of all persistent types. That is, every other type in the ontology is directly or indirectly derived from Datum and thus inherits all of the fields of Datum. The type 'NoteRelating' (a child type of Observation) is the ancestral type of all notes (imagine them as stick-it notes) that pertain to any other datum. Thus an author using the system may at any time create a note with his observations and opinions regarding any other item/datum held in the system. The act of creating such a note causes the relationships between the note and the datum to which it pertains to be written to and persisted in external storage. As can be seen, every datum in the system contains within its 'notes' field a sub-field called 'relatedFrom' declared as "NoteRelating @@relatedFrom >< regarding". This is interpreted by the system as stating that for any datum, there is a collection of items of type 'NoteRelating' (or a derived type) for which the 'regarding' field of each 'NoteRelating' item is a persistent reference to the particular Datum involved. Within each such 'NoteRelating' item there is a field 'relating' which contains a reference to some other datum that is the original item that is related to the Datum in question. Thus the 'NoteRelating' type is serving in this context as a bi-directional link relating any two items in the system as well as associating with that relationship a 'direction', a relevance or strength, and additional information (held in the @text field which can be used to give an arbitrary textual description of the exact details of the relationship). Put another way, in order to discover all elements in the 'relatedFrom' collection for a given datum, all that is necessary is to query storage/database for all 'NoteRelating' items having a 'regarding' field which contains a reference to the Datum involved. All of this information is directly contained within the type definition of the item itself and thus no external knowledge is required to make connections between disparate data items. The syntax of the C* declaration for the field, therefore, provides details about exactly how to construct and execute a query to the storage container(s)/database that will retrieve the items required. Understanding the expressive power of this syntax is key to understanding how it is possible via this methodology to eliminate the need for a conventional database administrator and/or database group to be involved in the construction and maintenance of any system built on this methodology.

As can be seen above, the 'regarding' field of the 'NoteRelating' type has the reverse 'echo' field, i.e., "Datum #regarding >< notes.relatedFrom;". This indicates that the reference is to any Datum or derived type (i.e., anything in the ontology) and that the "notes.relatedFrom" collection for the referenced datum should be expected to contain a reference to the NoteRelating record itself. Again, it is clear how, without any need for conventional database considerations, it is possible for the system itself to perform all necessary actions to add, reference, and query any given 'NoteRelating' record and the items it references. For example, the 'notes.relatedTo' field of any datum can reference a collection of items that the current datum has been determined to be related to. This is the other end of the 'regarding' link discussed above. As the type definitions above illustrate, each datum in the present invention can be richly cross referenced from a number of different types (or derivatives). More of these relationship types are discussed further herein.

For the purposes of illustrating how this syntax might translate into a concrete system for handling references and queries, it will assumed in the discussion below that the actual physical storage of the data occurs in a conventional relational database. It is important to understand, however, that nothing in this approach is predicated on or implies, the need for a relational database. Indeed, relational databases are poorly suited to the needs of the kinds of system to which the technology discussed is targeted and are not utilized in the preferred embodiment. All translation of the syntax discussed herein occurs via registered script functions (as discussed further in the Collections Patent) and thus there is no need to hard code this system to any particular data storage model so that the system can be customized to any data container or federation of such containers. For clarity of description, however, the concepts of relational database management systems (RDBMS) and how they work will be used herein for illustration purposes.

Before going into the details of the behavior of RDBMS plug-in functions, it is worth examining how the initial connection is made between these RDBMS algorithms and functions and this invention. As mentioned previously, this connection is preferably established by registering a number of logical functions at the data-model level and also at the level of each specific member of the federated data container set. The following provides a sample set of function prototypes that could apply for the various registration processes:

```
Boolean DB_SpecifyCallBack (          // Specify a persistent storage
callback
        short        aFuncSelector,          // I:Selector for
the logical function
        ProcPtr   aCallBackFn            // I:Address of the
callback function
                                       )          // R:TRUE for success, FALSE
otherwise
#define kFnFillCollection          1    // ET_FillCollectionFn -
              // Fn. to fill collection with data for a given a hit
list
#define kFnFetchRecords            2    // ET_FetchRecordsFn -
              // Fn. to query storage and fetch matching records to
colln.
#define kFnGetNextUniqueID         3    // ET_GetUniqueIdFn -
              // Fn. to get next unique ID from local persistent
storage
#define kFnStoreParsedDatums       4    // ET_StoreParsedDatumsFn -
              // Fn. to store all extracted data in a collection
#define kFnWriteCollection         5    // ET_WriteCollectionFn -
              // Fn. to store all extracted data in a collection
#define kFnDoesIdExist             6    // ET_DoesIdExistFn -
              // Fn. to determine if a given ID exists in
persistent storage
#define kFnRegisterID              7    // ET_RegisterIDFn -
              // Fn. to register an ID to persistent storage
#define kFnRemoveID                8    // ET_RemoveIDFn -
              // Fn. to remove a given ID from the ID/Type
registery
#define kFnFetchRecordToColl       9    // ET_FetchRecordToCollFn -
              // Fn. Fetch a given persistent storage item into a
colln.
#define kFnFetchField              10   // ET_FetchFieldFn -
              // Fn. Fetch a single field from a single persistent
record
#define kFnApplyChanges            11   // ET_ApplyChangesFn -
              // Fn. to apply changes
```

-continued

```
#define kFnCancelChanges          12    // ET_CancelChangesFn -
              // Fn. to cancel changes
#define kFnCountTypeItems         13    // ET_CountItemsFn -
              // Fn. to count items for a type (and descendant
types)
#define kFnFetchToElements        14    // ET_FetchToElementsFn -
              // Fn. to fetch values into a specified set of
elements/nodes
#define kFnRcrsvHitListQuery      15    // ET_RcrsvHitListQueryFn -
              // Fn. create a hit list from a type and it's
descendants
#define kFnGetNextValidID         16    // ET_GetNextValidIDFn -
              // Fn. to find next valid ID of a type after a given
ID
Boolean DB_DefineContainer (            // Defines a federated
container
     charPtr                 name             // I: Name of container
              );                              // R: Error code (0 = no
error)
Boolean DB_DefinePluginFunction(        // Defines container plugin
fn.
     charPtr                 name,              // I: Name of container
     int32                   functionType,    // I: Which function type
     ProcPtr            functionAddress       // I: The address of
                                              the function
              );                              // R: Void
#define kCreateTypeStorageFunc      29        // Create storage
                                              for a container
#define kInsertElementsFunc                30 // insert container data
#define kUpdateRecordsFromElementsFunc     31 // update container from data
#define kDeleteElementsFunc                32 // delete elements from
container
#define kFetchRecordsToElementsFunc        33 // fetch container data
#define kInsertCollectionRecordFunc        34 // insert container data to
elements
#define kUpdateCollectionRecordFunc        35 // update collection from
container
#define kDeleteCollectionRecordFunc        36 // delete collection record
#define kFetchRecordsToCollectionFunc      37 // fetch container record to
colln.
#define kCheckFieldType                    38 // determine if field is
container's
```

In this embodiment, whenever the environment wishes to perform any of the logical actions indicated by the comments above, it invokes the function(s) that have been registered using the function DB_SpecifyCallBack( ) to handle the logic required. This is the first and most basic step in disassociating the details of a particular implementation from the necessary logic. At the level of specific members of a federated collection of storage and querying containers, another similar API allows container specific logical functions to be registered for each container type that is itself registered as part of the federation. So for example, if one of the registered containers were a relational database system, it would not only register a 'kCreateTypeStorageFunc' function (which would be responsible for creating all storage tables etc. in that container that are necessary to handle the types defined in the ontology given) but also a variety of other functions. The constants for some of the more relevant plug-ins at the container level are given above. For example, the 'kCheckFieldType' plug-in could be called by the environment in order to determine which container in the federation will be responsible for the storage and retrieval of any given field in the type hierarchy. If we assume a very simple federation consisting of just two containers, a relational database, and an inverted text search engine, then we could imagine that the implementation of the 'kCheckFieldType' function for these two would be something like that given below:

```
// Inverted file text engine:
Boolean DTX_CheckFieldType     (                          // Field belongs
to 'TEXT' ?
        ET_TypeID   aTypeID,                              // I: Type ID
        charPtr     fieldname                             // I: Field name
                                   )                      // R: Error code
(0 = no error)
{
   ET_TypeID        fType,baseType;
   int32            rType;
   Boolean          ret;
   fType = TM_GetFieldTypeID(NULL, aTypeID, fieldName);
   ret = NO;
```

-continued

```
   if ( TM_TypeIsReference(NULL, fType, &rType, &baseType) && baseType ==
kInt8Type &&
         (rType == kPointerRef || rType == kHandleRef || rType ==
kRelativeRef) )
      ret = YES;
   return ret;
}
// Relational database:
Boolean DSQ_CheckFieldType    (                          // Field belongs
to 'RDBM' ?
         ET_TypeID    aTypeID,                           // I: Type ID
         charPtr      fieldname                          // I: Field name
                                  )                      // R: Error code
(0 = no error)
{
   ET_TypeID         fType, baseT;
   int32             refT;
   Boolean           ret;
   fType = TM_GetFieldTypeID(NULL,
aTypeID, fieldname);
   ref = TM_TypeIsReference(NULL,
fType,&refT,&baseT);
   ret = NO;
   if ( ref && refT == kPersistentRef )                  // We'll handle
pers. Refs.
      ret = YES;
   else if ( !ref && (                                   // We do:
      TM_IsTypeDescendant(NULL, fType, kInt8Type) ||     // char arrays,
      fType == TM_GetTypeID(NULL, "Date") ||             // Dates,
      TM_IsTypeDescendant(NULL,fType,kIntegerNumbersType) ||  // Integers and
      TM_IsTypeDescendant(NULL,fType,kRealNumbersType) ) )    //
Floating point #'s
      ret = YES;
   return ret;
}
```

As the pseudo-code above illustrates, in this particular federation, the inverted text engine lays claim to all fields that are references (normally '@') to character strings (but not fixed sized arrays of char) while the relational container lays claim to pretty much everything else including fixed (i.e., small sized) character arrays. This is just one possible division of responsibility is such a federation, and many others are possible. Other containers that may be members of such federations include video servers, image servers, map engines, etc. and thus a much more complex division of labor between the various fields of any given type will occur in practice. This ability to abstract away the various containers that form part of the persistent storage federation, while unifying and automating access to them, is a key benefit of the system of this invention.

Returning to the specifics of an RDBMS federation member, the logic associated with the 'kCreateTypeStorageFunc' plug-in for such a container (assuming an SQL database engine such as Oracle) might look similar to that given below:

```
static EngErr DSQ_CreateTypeStorage(       // Build SQL
tables
           ET_TypeID          theType      // I: The type
                          )                // R: Error Code
(0 = no error)
{
   char      sqlStatement[256], filter[256];
   err = DSQ_CruiseTypeHierarchy(theType,DSQ_CreateTypeTable);
   sprintf(filter,                         // does linkage
table exist?
         "owner=(select username from all_users where user_id=uid) and "
         "table_name='LINKAGE_TABLES$'");
   if (#records found("all_tables", filter))    // If not, then
```

-continued

```
create it!
   {
      sprintf(sqlStatement, "create table LINKAGE_TABLES$
         (DYN_NAME varchar2(50),ACT_NAME varchar2(50))
         tablespace data");
      err = SQL_ExecuteStatement(0, sqlStatement, NULL, 0, NULL);
   }
   err = DSQ_CruiseTypeHierarchy(theType,
   DSQ_CreateLinkageTables);
   ... any other logic required
   return (err);
}
```

In this example, the function DSQ_CruiseType Hierarchy( ) simply recursively walks the type hierarchy beginning with the type given down and calls the function specified. The function DSQ_CreateTypeTable( ) simply translates the name of the type (obtained from TM_GetTypeName) into the corresponding Oracle table name (possibly after adjusting the name to comply with constraints on Oracle table names) and then loops through all of the fields in the type determining if they belong to the RDBMS container and if so generates the corresponding table for the field (again after possible name adjustment). The function DSQ_CreateLinkageTables( ) creates anonymous linkage tables (based on field names involved) to handle the case where a field of the type is a collection reference, and the reference is to a field in another type that is also a collection reference echoing back to the original field. After this function has been run for all types in the ontology, it is clear that the external relational database now contains all tables and linkage tables necessary to implement any storage, retrieval and querying that may be implied by the ontology. Other registered plug-in functions for the RDBMS container such as query functions can utilize knowledge of the types hierarchy in combination with knowledge of the algorithm used by DSQ_CreateTypeStorage( ), such as knowledge of the name adjustment strategy, to reference and query any information automatically based on type.

Note that some of the reference fields in the example above do not contain a '><' operator which implies that the ontology definer does not wish to have the necessary linking tables appear in the ontology. An example of such a field (as set forth above) is "Category @@membership". This field can be used to create an anonymous linkage table based on the type being referenced and the field name doing the referencing (after name adjustment). The linkage table would contain two references giving the type and ID of the objects being linked. When querying such an anonymous table, the plug-ins can deduce its existence entirely from the type information (and knowledge of the table creation algorithm) and thus the same querying power can be obtained even without the explicit definition of the linking table (as in the example above). Queries from the C* level are not possible directly on the fields of such a linkage table because it does not appear in the ontology, however, this technique is preferably used when such queries would not necessarily make sense.

By using this simple expedient, a system is provided in which external RDBMS storage is created automatically from the ontology itself, and for which subsequent access and querying can be handled automatically based on knowledge of the type hierarchy. This has effectively eliminated the need for a SQL database administrator or database programming staff. Since the same approach can be adopted for every container that is a member of the federation, these same capabilities can be accomplished simultaneously for all containers in the federation. As a result, the creator of a system based on this technology can effectively ignore the whole database issue once the necessary container plug-ins have been defined and registered. This is an incredibly powerful capability, and allows the system to adapt in an automated manner to changes in ontology without the need to consider database impact, thus greatly increasing system flexibility and robustness to change. Indeed, whole new systems based on this technology can be created from scratch in a matter of hours, a capability has been up until now unheard of. Various other plug-in functions may also be implemented, which can be readily deduced from this description.

The process of assigning (or determining) the unique ID associated with instantiating a persistent reference resulting from mining a datum from an external source (invoked via the $UniqueID script as further described in the Collections Patent) deserves further examination since it is highly dependant on the type of the data involved and because it further illustrates the systems ability to deal with such real-world quirks. In the simple federation described above, the implementation of the $UniqueID script for Datum (from which all other types will by default inherit) might be similar to that given below:

```
static EngErr PTS_AssignUniqueID(                    // $UniqueID script
registered with Datum
        ET_TypeDBHdl        aTypeDBHdl,       // I:Type DB handle
(NULL to default)
        ET_TypeID           typeID,           // I:Type ID
        charPtr             fieldName,        // I:Field name/path (else
NULL)
        charPtr             action,           // I:The script action
being invoked
        charPtr             script,           // I:The script text
        anonPtr             dataPtr,          // I:Type data pointer
        ET_CollectionHdl    aCollection,      // I:The collection handle
        ET_Offset           offset,           // I:Collection element
reference
        int32               options,          // I:Various logical
options
        ET_TypeID           fromWho,          // I:Type ID, 0 for field
or unknown
        va_list             ap                // I:va_list for additional
parameters
                  )                           // R:0 for success, else
error #
{
  ET_UniqueID          uniqueID;
  TC_GetUniqueID(aCollection,0,offset,&uniqueID);
  TC_GetCStringFieldValue(aCollection,0,0,offset,name,
sizeof(name),"name");
  elemTypeID = TC_GetTypeID(aCollection,0,offset);
  TM_BreakUniqueID(uniqueID,&localID,&sys);
  if ( localID ) return 0;                    // we've already got an
ID,we're done!
  scrubbedStrPtr = mangle name according to SQL name mangling
  algorithm force scrubbedStrPtr to upper case
  sprintf(filterText, kStartQueryBlock
  kRelationalDB ":upper(name) = '%s'"
        kEndQueryBlock, scrubbedStrPtr);      // Create the filter
criteria
  hitList = construct hit list of matches
  count = # hits in hitList;                  // how many hits did we
                                              get
  // Should issue a warning or dialog if more than one hit here
  if (hitList && hitList[0]._id)
  {
    uniqueID = TM_MakeUniqueID(hitList[0]._id,hitList[0]._system);
    existingElemTypeID = hitList[0]._type;
    exists = TRUE;
  }
  if (!uniqueID.id)
    uniqueID = TM_MakeUniqueID(DB_GetNextLocalUniqueID( ),0);
  if (!TC_HasDirtyFlags(aCollection, 0, 0, offset))
    call TC_EstablishEmptyDirtyState(aCollection,0,0,offset,NO) )
  TC_SetUniqueID(aCollection,0,offset,uniqueID);// set the id
  return err;
}
```

This is a simple algorithm and merely queries the external RDBMS to determine if an item of the same name already exists and if so uses it, otherwise it creates a new ID and uses that. Suppose that the item involved is of type "Place". In this case, it would be helpful to be more careful when determining the unique ID because place names (such as cities) can be repeated all over the world (indeed there may be multiple cities or towns with the same within any given country). In this case, a more specific $UniqueID script could be registered with the type Place (the ancestral type of all places such as cities, towns, villages etc.) that might appear more like the algorithm given below:

```
static EngErr PTS_AssignPlaceUniqueID(          // $UniqueID script
registered with Place
        ET_TypeDBHdl      aTypeDBHdl,      // I:Type DB handle (NULL
to default)
```

-continued

```
            ET_TypeID          typeID,          // I:Type ID
            charPtr            fieldName,       // I:Field name/path (else
NULL)
            charPtr            action,          // I:The script action
being invoked
            charPtr            script,          // I:The script text
            anonPtr            dataPtr,         // I:Type data pointer
            ET_CollectionHdl   aCollection,     // I:The collection handle
            ET_Offset          offset,          // I:Collection element
reference
            int32              options,         // I:Various logical
options
            ET_TypeID          fromWho,         // I:Type ID, 0 for field
or unknown
            va_list            ap               // I:va_list for additional
parameters
                    )                           // R:0 for success, else
error #
{
   ET_UniqueID      uniqueID;
   TC_GetUniqueID(aCollection,0,offset,&uniqueID);
   TC_GetCStringFieldValue(aCollection,0,0,offset,name,sizeof(name),"name")
;
   TC_GetCStringFieldValue(aCollection,0,0,offset,thisPlace,128,
"placeType");
   TC_GetFieldValue(aCollection,0,0,offset,&thisLon,"location.longitude");
   TC_GetFieldValue(aCollection,0,0,offset,&thisLat,"location.latitude");
   elemTypeID = TC_GetTypeID(aCollection,0,offset);
   pT = TM_IsTypeProxy(elemTypeID);
   if ( pT ) elemTypeID = pT;
   TM_BreakUniqueID(uniqueID,&localID,NULL);
   if ( localID ) return 0;                     // we've already got an
ID,we're done!
   scrubbedStrPtr = mangle name according to SQL name mangling algorithm
   force scrubbedStrPtr to upper case
   sprintf(filterText, kStartQueryBlock kRelationalDB ":upper(name) = '%s'"
            kEndQueryBlock, scrubbedStrPtr);
   sprintf(fieldList,"placeType,location,country");
   tmpCollection = fetch all matching items to a collection
   TC_Count(tmpCollection,kValuedNodesOnly,rootElem,&count);
   // if we got one or more we need further study to see if it is in fact
this place
   // a place is unique if the place type, latitude and longitude are the
same
   placeTypeId = TM_KeyTypeToTypeID('PLCE',NULL);
   pplaceTypeId = TM_KeyTypeToTypeID('POPP',NULL);
   if (count)
   {
      anElem =0;
      while (tmpCollection && TC_Visit(tmpCollection,kRecursiveOperation +
                              kValuedNodesOnly,0,&anElem,false))
      {
         if ( TM_TypesAreCompatible(NULL, TC_GetTypeID( tmpCollection, 0,
anElem)
           ,pplaceTypeId) &&
TM_TypesAreCompatible(NULL,elemTypeID,pplaceTypeId) )
         {                                      // both populated places,
check country
            TC_GetFieldValue(tmpCollection,0,0,anElem,&prf1,"country");
            TC_GetFieldValue(aCollection,0,0,offset,&prf2,"country");
            if (strcmp(prf1.name,prf2.name) )   // different country!
               continue;
   TC_GetCStringFieldValue(tmpCollection,0,0,anElem,&placeType,128,"placeType
");
            if (!strcmp(thisPlace,placeType))   // same type
            {
               if (
TC_IsFieldEmpty(tmpCollection,0,0,anElem,"location.longitude") )
               {                                // this is the same place!
                  TC_GetUniqueID(tmpCollection,0,anElem,&uniqueID);
                  TM_BreakUniqueID(uniqueID,&localID,NULL);
                  existingElemTypeID =
TC_GetTypeID(tmpCollection,0,anElem);
                  exists = (existingElemTypeID != 0);
                  break;
               } else
               {
                  TC_GetFieldValue(tmpCollection, 0, 0, anElem, &longitude,
                              "location.longitude");
```

-continued

```
                    if (ABS(thisLon – longitude) < 0.01)
                    {                                       // at similar longitude
                      TC__GetFieldValue(tmpCollection, 0,0, anElem,
&latitude,
                                        "location.latitude");
                      if (ABS(thisLat – latitude) < 0.01)
                      {                                     // and similar latitude!
                        TC__GetUniqueID(tmpCollection,0,anElem,&uniqueID);
                        TM__BreakUniqueID(uniqueID,&localID,NULL);
                        existingElemTypeID =
TC__GetTypeID(tmpCollection,0,anElem);
                        exists = (existingElemTypeID != 0);
                        break;
                      }
                    }
                  }
                }
              }
            }
          }
  if ( !localID )
    uniqueID = TM__MakeUniqueID(DB__GetNextLocalUniqueID( ),0);
  else
    uniqueID = TM__MakeUniqueID(localID,0);
  if (!TC__HasDirtyFlags(aCollection, 0, 0, offset))
    call TC__EstablishEmptyDirtyState(aCollection,0,0,offset,NO) )
  TC__SetUniqueID(aCollection,0,offset,uniqueID);// set the id
  return err;
}
```

This more sophisticated algorithm for determining place unique IDs attempts to compare the country fields of the Place with known places of the same name. If this does not distinguish the places, the algorithm then compares the place type, latitude and longitude, to further discriminate. Obviously many other strategies are possible and completely customizable within this framework and this example is provided for illustration purposes only. The algorithm for a person name, for example, would be completely different, perhaps based on age, address, employer and many other factors.

It is clear from the discussion above that a query-building interface can be constructed that through knowledge of the types hierarchy (ontology) alone, together with registration of the necessary plug-ins by the various containers, can generate the UI portions necessary to express the queries that are supported by that plug-in. A generic query-building interface, therefore, need only list the fields of the type selected for query and, once a given field is chosen as part of a query, it can display the UI necessary to specify the query. Thereafter, using plug-in functions, the query-building interface can generate the necessary query in the native language of the container involved for that field.

Referring now to FIG. 2, a sample query-building user interface (UI) is shown. In this sample, the user is in the process of choosing the ontological type that he wishes to query. Note that the top few levels of one possible ontological hierarchy 210, 215, 220 are visible in the menus as the user makes his selection. A sample ontology is discussed in more detail below. The UI shown is one of many possibly querying interfaces and indeed is not that used in the preferred embodiment but has been chosen because it clearly illustrates the connections between containers and queries.

Referring now to FIG. 3, a sample user interface providing access to the fields within the type "country" is shown. Having selected Country from the query-building UI illustrated in FIG. 2, the user may then chose any of the fields of the type country 310 on which he wishes to query. In this example, the user has picked the field 'dateEntered' 320 which is a field that was inherited by Country from the base persistent type Datum. Once the field 320 has been selected, the querying interface can determine which member of the container federation is responsible for handling that field (not shown). Through registered plug-in functions, the querying language can determine the querying operations supported for that type. In this case, since the field is a date (which, in this example, is handled by the RDBMS container), the querying environment can determine that the available query operations 330 are those appropriate to a date.

Referring now to FIG. 4, a sample user interface providing access to a free format text field within the type "country" is shown. In this figure, the user has chosen a field supported by the inverted text file container. Specifically, the field "notes-.sourceNotes" has been chosen (which again is inherited from Datum) and thus the available querying operators 410 (as registered by the text container) are those that are more appropriate to querying a free format text field.

Referring now to FIG. 5, a sample user interface providing access to a fixed sized text field within the type "country" is shown. In this figure, the user has chosen the field "geography.landAreaUnits" 510, which is a fixed sized text field of Country. Again, in the above illustration, this field is supported by the RDBMS container so the UI displays the querying operations 520 normally associated with text queries in a relational database.

The above discussion illustrated how container specific storage could be created from the ontology, how to query and retrieve data from individual containers in the federation, and how the user interface and the queries themselves can be generated directly from the ontology specification without requiring custom code (other than an application independent set of container plug-ins). The other aspects necessary to create a completely abstracted federated container environment relate to three issues: 1) how to distribute queries between the containers, 2) how to determine what queries are possible, and 3) how to reassemble query results returned from individual containers back into a complete record within a collection as defined by the ontology. The portion of the system of this invention that relates to defining individual containers, the querying languages that are native to them, and how to construct (both in UI terms and in functional terms) correct and meaningful queries to be sent to these containers, is hereinafter known as MitoQuest™. The portion of the system that relates to distributing (federating) queries to various containers and combining the results from those containers into a single unified whole, is hereinafter known as MitoPlex™. The federated querying system of this invention thus adopts a two-layer approach: the lower layer (MitoQuest™) relates to container specific querying, the upper layer (MitoPlex™) relates to distributing queries between containers and re-combining the results returned by them. Each will be described further below (in addition to the patent application referenced herein).

Each container, as a result of a container specify query, constructs and returns a hit-list of results that indicate exactly which items match the container specific query given. Hit lists are zero terminated lists that, in this example, are constructed from the type ET_Hit, which is defined as follows:

```
typedef struct ET_Hit              // list of query hits returned by a server
{
    OSType      _system;           // system tag
    unsInt64    _id;               // local unique item ID
    ET_TypeID   _type;             // type ID
    int32       _relevance;        // relevance value 0..100
} ET_Hit;
```

As can be seen, an individual hit specifies not only the globally unique ID of the item that matched, but also the specific type involved and the relevance of the hit to the query. The specific type involved may be a descendant of the type queried since any query applied to a type is automatically applied to all its descendants since the descendants "inherit" every field of the type specified and thus can support the query given. In this embodiment, relevance is encoded as an integer number between 0 and 100 (i.e., a percentage) and its computation is a container specific matter. For example, this could be calculated by plug-in functions within the server(s) associated with the container. It should be noted that the type ET_Hit is also the parent type of all proxy types (as further discussed in the Types Patent) meaning that all proxy types contain sufficient information to obtain the full set of item data if required.

When constructing a multi-container query in MitoPlex™, the individual results (hit lists) are combined and re-assembled via the standard logical operators as follows:

AND—For a hit to be valid, it must occur in the hit list for the container specific query occurring before the AND operator and also in the hit list for the container specific query that follows the AND.

OR—For a hit to be valid, it must occur in either the hit list before the operator, or the one after the operator (or both).

AND THEN—This operator has the same net effect as the AND operator but the hit-list from before the operator is passed to the container executing the query that follows the operator along with the query itself. This allows the second container to locally perform any pruning implied by the hit list passed before returning its results. This operator therefore allows control over the order of execution of queries and allows explicit optimization of performance based on anticipated results. For example if one specified a mixed container query of the fomm "[RDBMS:date is today] AND THEN [TEXT:text contains "military"]" it is clear that the final query can be performed far quicker than the effect of performing the two queries separately and then recombining the results since the first query pre-prunes the results to only those occurring on a single day and since the system may contain millions of distinct items where the text contains "military". For obvious reasons, this approach is considerably more efficient.

AND {THEN} NOT—This operator implies that to remain valid, a hit must occur in the hit-list for the query specified before the operator but not in the hit-list for the query after the operator.

Additional logical operators allow one to specify the maximum number of hits to be returned, the required relevance for a hit to be considered, and many other parameters could also be formulated. As can be seen, the basic operations involved in the query combination process involve logical pruning operations between hit lists resulting from MitoQuest™ queries. Some of the functions provided to support these processes may be exported via a public API as follows:

```
Boolean DB_NextMatchInHitList (            // Obtain the next match in
a hit list
            ET_Hit*       aMatchValue,     // I:Hit value to match
            ET_HitList    *aHitList,       // IO:Pointer into hit list
            int32         options          // I: options as for
DB_PruneHitList( )
                          );               // R:TRUE if match
found,else FALSE
Boolean DB_BelongsInHitList    (           // Should hit be added to a
hit list?
            ET_Hit*       aHit,            // I:Candidate hit
            ET_HitList    aPruneList,      // I:Pruning hit list, zero
ID term.
            int32         options          // I:pruning options word
                          );               // R:TRUE to add hit, FALSE
otherwise
ET_HitList DB_PruneHitList      (          // prunes two hit lists
            ET_HitList    aHitList,        // I:Input hit list, zero
ID terminated
            ET_HitList    aPruneList,      // I:Pruning hit list, zero
ID term.
            int32         options,         // I:pruning options word
            int32         maxHits          // I:Maximum # hits to
return (or 0)
                          );               // R:Resultant hit list, 0
ID term.
```

In the code above, the function DB_NextMatchInHitList( ) would return the next match according to specified sorting criteria within the hit list given. The matching options are identical to those for DB_PruneHitList( ). The function DB_BelongsInHitList( ) can be used to determine if a given candidate hit should be added to a hit list being built up according to the specified pruning options. This function may be used in cases where the search engine returns partial hit sets in order to avoid creating unnecessarily large hit lists only to have them later pruned. The function DB_PruneHitList( ) can be used to prune/combine two hit lists according to the specified pruning options. Note that by exchanging the list that is passed as the first parameter and the list that is passed as the second parameter, it is possible to obtain all possible behaviors implied by legal combinations of the MitoPlex™ AND, OR, and NOT operators. Either or both input hit lists may be NULL which means that this routine can be used to simply limit the maximum number of hits in a hit list or alternatively to simply sort it. In the preferred embodiment, the following pruning options are provided:

kLimitToPruneList—limit returned hits to those in prune list (same as MitoPlex™ AND)

kExclusiveOfPruneList—remove prune list from 'hits' found (same as MitoPlex™ AND NOT)

kCombineWithPruneList—add the two hit lists together (default—same as MitoPlex™ OR)

The following options can be used to control sorting of the resultant hit list:

kSortByTypeID—sort resultant hit list by type ID kSortByUniqueID—sort resultant hit list by unique ID kSortByRelevance—sort resultant hit list by relevance kSortInIncreasingOrder—Sort in increasing order In addition to performing these logical operations on hit lists, MitoPlex™ supports the specification of registered named MitoQuest™ functions in place of explicit MitoQuest™ queries. For example, if the container on one side of an operator indicates that it can execute the named function on the other side, then the MitoPlex™ layer, instead of separately launching the named function and then combining results, can pass it to the container involved in the other query so that it may be evaluated locally. The use of these 'server-based' multi-container queries is extremely useful in tuning system performance. In the preferred embodiment of the system based on this invention, virtually all containers can locally support interpretation of any query designed for every other container (since they are all implemented on the same substrate) and thus all queries can be executed in parallel with maximum efficiency and with pruning occurring in-line within the container query process. This approach completely eliminates any overhead from the federation process. Further details of this technique are discussed in related patent applications that have been incorporated herein.

It is clear from the discussion above that the distribution of compound multi-container queries to the members of the container federation is a relatively simple process of identifying the containers involved and launching each of the queries in parallel to the server(s) that will execute it. Another optimization approach taken by the MitoPlex™ layer is to identify whether two distinct MitoQuest™ queries involved in a full MitoPlex™ query relate to the same container. In such a case, the system identifies the logic connecting the results from each of these queries (via the AND, OR, NOT etc. operators that connect them) and then attempts to re-formulate the query into another form that allows the logical combinations to instead be performed at each container. In the preferred embodiment, the system performs this step by combining the separate queries for that container into a single larger query combined by a container supplied logical operator. The hit-list combination logic in the MitoPlex™ layer is then altered to reflect the logical re-arrangements that have occurred. Once again, all this behavior is possible by abstract logic in the MitoPlex™ layer that has no specific dependency on any given registered container but is simply able to perform these manipulations by virtue of the plug-in functions registered for each container. These registered plug-in functions inform the MitoPlex™ and MitoQuest™ layers what functionality the container can support and how to invoke it. This approach is therefore completely open-ended and customizable to any set of containers and the functionality they support. Examples of other container functionality might be an image server that supports such querying behaviors as 'looks like', a sound/speech server with querying operations such as 'sounds like', a map server with standard GIS operations, etc. All of these can be integrated and queried in a coordinated manner through the system described herein.

The next issue to address is the manner in which the present invention auto-generates and handles the user interface necessary to display and interact with the information defined in the ontology. At the lowest level, all compound structures eventually resolve into a set of simple building-block types that are supported by the underlying machine architecture. The same is true of any type defined as part of an ontology and so the first requirement for auto-generating user interface based on ontological specifications is a GUI framework with a set of 'controls' that can be used to represent the various low level building blocks. This is not difficult to achieve with any modern GUI framework. The following images and descriptive text illustrate just one possible set of such basic building blocks and how they map to the low level type utilized within the ontology:

Referring now to FIG. 6A, an example of how a short text field or numeric field (such as those handled by the RDBMS container described above) might be displayed in a control group.

Referring now to FIG. 6B, one method for displaying a date in a control group is shown. In this Figure, the date is actually being shown in a control that is capable of displaying dates in multiple calendar systems. For example, the circle shown on the control could be displayed in yellow to indicate the current calendar is Gregorian. Referring now to FIG. 6C, an example of an Islamic Hijjrah calendar being displayed is provided. The UI layout can be chosen to include the calendar display option, for example.

Referring now to FIG. 7A, the illustrated control group is an example of how one might display and interact with a persistent reference field ('#'). The text portion 705 of the grouping displays the name field of the reference, in this case 'InsuregencyAndTerrorism', while the list icon 710 allows the user to pop up a menu of the available values (see the 'members' field discussion under ET_PersistentRef above), and the jagged arrow icon 715 allows the user to immediately navigate to (hyperlink to) the item being referenced.

Referring now to FIG. 7 B, 7B provides an example of one way that a collection reference field ('@@') might be displayed in an auto-generated user interface. In this case the field involved is the 'related' field within the notes field of Datum. Note also that the collection in this case is hierarchical and that the data has been organized and can be navigated according to the ontology.

Referring now to FIG. 8,one possible method for displaying variable sized text fields (referenced via the char @ construct) is shown. Note that in this example, automatic UI hyperlink generation has been turned on and thus any known item within the text (in this case the names of the countries) is automatically hyperlinked and can be used for navigation simply by clicking on it (illustrated as an underline). This hyperlinking capability will be discussed further in later patents but the display for that capability may be implemented in any number of ways, including the manner in which hyperlinks are displayed by web browsers.

Referring now to FIG. 9, this figure illustrates the manner in which an image reference (Picture @picture) field could be displayed in an auto-generated user interface.

Many other basic building blocks are possible and each can of course be registered with the system via plug-ins in a manner very similar to that described above. In all cases, the human-readable label associated with the control group is generated automatically from the field name with which the control group is associated by use of the function TM_CleanFieldName( ) described in the Types Patent. Because the system code that is generating and handling the user interface in this manner has full knowledge of the type being displayed and can access the data associated with all fields within using the APIs described previously, it is clear how it is also possible to automatically generate a user interface that is capable of displaying and allowing data entry of all types and fields defined in the ontology. The only drawback is the fact that user interfaces laid out in this manner may not always look 'professional' because more information is required in order to group and arrange the layout of the various elements in a way that makes sense to the user and is organized logically. The system of this invention overcomes this limitation by extracting the necessary additional information from the ontological type definition itself. To illustrate this behavior, a listing is provided in Appendix A that gives the pseudo-code ontological type definition for the type Country (which inherits from Entity and thereby from Datum described above) in the example ontology.

As can be seem from the listing above, the ontology creator has chosen to break down the many fields of information available for a country into a set of introductory fields followed by number of top-level sub-structures as follows:

geography—Information relating to the country's geography people—Information relating to the country's people government—Information relating to the country's government economy—Information about the country's economy communications—Information on communications capabilities transport—Transport related information military—Information about the country's military forces medical—Medical information education—Education related information issues—Current and past issues for the country involved Because the code that generates the UI has access to this information, it can match the logical grouping made in the ontology.

Referring now to FIG. 10, a sample screen shot of one possible display of the Country record in the same UI layout theme described above (most data omitted) is provided. In the illustrated layout the first page of the country display shows the initial fields given for country in addition to the basic fields inherited from the outermost level of the Datum definition. The user is in the process of pulling down the 'page' navigation menu 1020 which has been dynamically built to match the ontology definition for Country given above. In addition, this menu contains entries 1010 for the notes subfield within Datum (the ancestral type) as well as entries for the fields 1030 that country inherits from its other ancestral types. In the first page, the UI layout algorithm in this example has organized the fields as two columns in order to make best use of the space available given the fields to be displayed. Since UI layout is registered with the environment, it is possible to have many different layout strategies and appearances (known as themes) and these things are configurable for each user according to user preferences.

Referring now to FIG. 11, a sample embodiment of the geography page within Country is shown. Presumably, the user has reached this page using the page navigation menu 1020 described above. In this case, the UI does not have sufficient space to display all fields of geography on a single page, so for this theme it has chosen to provide numbered page navigation buttons 1110, 11120, 1130 to allow the user to select the remaining portions of the geography structure content. Once again, different themes can use different strategies to handle this issue. The theme actually being shown in this example is a Macintosh OS-9 appearance and the layout algorithms associated with this theme are relatively primitive compared to others.

Referring now to FIG. 12, a sample embodiment of the second sub-page of the geography page within country is shown. As shown, the natural resources collection field 1210 is displayed as a navigable list within which the user may immediately navigate to the item displayed simply by double-clicking on the relevant list row. More advanced themes in the system of this invention take additional measures to make better use of the available space and to improve the appearance of the user interface. For example, the size of the fields used to display variable sized text may be adjusted so that the fields are just large enough to hold the amount of text present for any given record. This avoids the large areas of white space that can be seen in FIG. 12 and gives the appearance of a custom UI for each and every record displayed. As the window itself is resized, the UI layout is re-computed dynamically and a new appearance is established on-the-fly to make best use of the new window dimensions. Other tactics include varying the number of columns on each page depending on the information to be displayed, packing small numeric fields two to a column, use of disclosure tabs compact content and have it pop-up as the mouse moves over the tab concerned, etc. The possibilities are limited only by the imagination of the person registering the plug-ins. To achieve this flexibility, the UI layout essentially treats each field to be displayed as a variable sized rectangle that through a standard interface can negotiate to change size, move position or re-group itself within the UI. The code of the UI layout module allows all the UI components to compete for available UI space with the result being the final layout for a given ontological item. Clearly the matter of handling user entry into fields and its updating to persistent storage is relatively straightforward given the complete knowledge of the field context and the environment that is available in this system.

Referring now to FIG. 13, an example of one part of a high-level ontology targeted at intelligence is shown. This ontology has been chosen to facilitate the extraction of meaning from world events; it does not necessarily correspond to any functional, physical or logical breakdown chosen for other purposes. This is only an example and in no way is such ontology mandated by the system of this invention. Indeed, the very ability of the system to dynamically adapt to any user-defined ontology is one of the key benefits of the present invention. The example is given only to put some of the concepts discussed previously in context, and to illustrate the power of the ontological approach in achieving data organization for the purposes of extracting meaning and knowledge. For simplicity, much detail has been omitted. The key to developing an efficient ontology is to categorize things according to the semantics associated with a given type. Computability must be independent of any concept of a 'database' and thus it is essential that these types automatically drive (and conceal) the structure of any relational or other databases used to contain the fields described. In this way, the types can be used by any and all code without direct reliance on or knowledge of a particular implementation.

Datum 1301—the ancestral type of all persistent storage.

Actor 1302—actors 1302 participate in events 1303, perform actions 1305 on stages 1304 and can be observed 1306.

Entity 1308—Any 'unique' actor 1302 that has motives and/or behaviors, i.e., that is not passive Country 1315—a country 1315 is a unique kind of meta-organization with semantics of its own, in particular it defines the top level stage1304 within which events 1303 occur (stages 1304 may of course be nested)

Organization 1316—an organization 1316 (probably hierarchical)

Person 1317—a person 1317

SystemUser 1325—a person 1317 who is a user of the system

Widget 1318—an executable item (someone put it there for a purpose/motive!)

Object 1309—A passive non-unique actor 1302, i.e., a thing with no inherent drives or motives Equipment 1319—An object 1309 that performs some useful function that can be described and which by so doing increases the range of actions 1305 available to an Entity 1308.

Artifact 1320—An object 1309 that has no significant utility, but is nonetheless of value for some purpose.

Stage 1304—This is the platform or environment where events 1303 occur, often a physical location. Stages 1304 are more that just a place. The nature and history of a stage 1304 determines to a large extent the behavior and actions 1305 of the Actors 1302 within it. What makes sense in one stage 1304 may not make sense in another.

Action—actions 1305 are the forces that Actors 1302 exert on each other during an event 1303. All actions 1305 act to move the actor(s) 1302 involved within a multi-dimensional space whose axes are the various motivations that an Entity 1308 can have (greed, power, etc.). By identifying the effect of a given type of action 1304 along these axes, and, by assigning entities 1308'drives' along each motivational axis and strategies to achieve those drives, we can model behavior.

Observation—an observation 1306 is a measurement of something about a Datum 1301, a set of data or an event 1303. Observations 1306 come from sources 1307.

General 1310—A general observation 1301 not specifically tied to a given datum 1301.

Report 1321—a report 1321 is a (partial) description from some perspective generally relating to an Event 1303.

Story 1326—a news story describing an event 1303.

Image 1327—a still image of an event 1303.

Sound 1329—a sound recording of an event 1303.

Video 1328—a video of an event 1303.

Map 1330—a map of an event 1303, stage 1304, or entity 1308.

Regarding 1311—an observation regarding a particular datum 1301.

Note 1322—a descriptive text note relating to the datum 1301.

CrossRef 1323—an explicit one-way cross-reference indicating some kind of named 'relationship' exists between one datum 1301 and another, preferably also specifying 'weight' of the relationship.

Delta 1324—an incremental change to all or part of a datum 1301, this is how the effect of the time axis is handled (a delta 1324 of time or change in time).

Relating 1312—A bi-directional link connecting two or more data together with additional information relating to the link.

Source 1307—A source is a logical source of observations 1306 or other Data.

Feed 1313—Most sources 1307 in the system consist of Client/Server servers that are receiving one or more streams of observations 1306 of a given type, that is; a newswire server is a source that outputs observations 1306 of type Story. In the preferred embodiment, feed sources 1313 are set up and allowed to run on a continuous basis.

Query 1314—sub-type of source 1307 that can be issued at any time, returning a collection of observations 1306 (or indeed any Datum 1301 derived type). The Query source type corresponds to one's normal interpretation of querying a database.

Event 1303—An event is the interactions of a set of actors 1302 on a stage 1304. Events 1303 must be reconstructed or predicted from the observations 1306 that describe them. It is the ability to predict events 1303 and then to adjust actions 1305 based on motives (not shown) and strategies that characterizes an entity 1308. It is the purpose of an intelligence system to discover, analyze and predict the occurrence of events 1303 and to present those results to a decision maker in order that he can take Actions 1305. The Actions 1305 of the decision maker then become a 'feed' to the system allowing the model for his strategies to be refined and thus used to better find opportunities for the beneficial application of those strategies occurring in the data stream impinging on the system.

Once the system designer has identified the ontology that is appropriate to allow the system to understand and manipulate the information it is designed to access (in the example above—understanding world events), the next step is to identify what sources of information, published or already acquired, are available to populate the various types defined in the system ontology. From these sources and given the nature of the problem to be solved, the system designed can then define the various fields to be contained in the ontology and the logical relationships between them. This process is expressed through the C* ontology definition and the examples above illustrate how this is done. At the same time, awareness of the desired user interface should be considered when building an ontology via the C* specifications. The final step is to implement any ontology-specific scripts and annotations as described in the Collections Patent. Once all this is done, all that is necessary is to auto-generate all storage tables necessary for the system as described and then begin the process of mining the selected sources into the system.

Having mined the information (a very rapid process), the system designer is free to evolve this ontology as dictated by actual use and by the needs of the system users. Because such changes are automatically and instantaneously reflected throughout the system, the system is now free to rapidly evolve without any of the constraints implied by the Bermuda Triangle problem experienced in the prior art. This software environment can be rapidly changed and extended, predominantly without any need for code modification, according to requirements, and without the fear of introducing new coding errors and bugs in the process. Indeed system modification and extension in this manner is possible by relatively unskilled (in software terms) customer staff themselves meaning that it no longer requires any involvement from the original system developer. Moreover, this system can, through the ontology, unify data from a wide variety of different and incompatible sources and databases into a single whole wherein the data is unified and searchable without consideration of source. These two capabilities have for years been the holy grail of all software development processes, but neither has been achieved—until now.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

Appendix 7

A SYSTEM AND METHOD FOR MINING DATA

BACKGROUND OF THE INVENTION

The data ingestion and conversion process is generally known as data mining, and the creation of robust systems to handle this problem is the subject of much research, and has spawned the creation of many specialized languages (e.g., Perl) intended to make this process easier. Unfortunately, while there have been some advances, the truth of the matter is that none of these 'mining' languages really provides anything more than a string manipulation library embedded into the language syntax itself. In other words, such languages are nothing more than shorthand for the equivalent operations written as a series of calls to a powerful subroutine library. A prerequisite for any complex data processing application, specifically a system capable of processing and analyzing disparate data sources, is a system that can convert the structured, semi-structured, and un-structured information sources into their equivalent representation in the target ontology, thereby unifying all sources and allowing cross-source analysis.

For example, in a current generation data-extraction script, the code involved in the extraction basically works its way through the text from beginning to end trying to recognize delimiting tokens and once having done so to extract any text within the delimiters and then assign it to the output data structure. When there is a one-to-one match between source data and target representation, this is a simple and effective strategy. As we widen the gap between the two, however, such as by introducing multiple inconsistent sources, increasing the complexity of the source, nesting information in the source to multiple levels, cross referencing arbitrarily to other items within the source, and distributing and interspersing the information necessary to determine an output item within a source, the situation rapidly becomes completely unmanageable by this technique, and highly vulnerable to the slightest change in source format or target data model. This mismatch is at the heart of all problems involving the need for multiple different systems to intercommunicate meaningful information, and makes conventional attempts to mine such information prohibitively expensive to create and maintain. Unfortunately for conventional mining techniques, much of the most valuable information that might be used to create truly intelligent systems comes from publishers of various types. Publishing houses make their money from the information that they aggregate, and thus are not in the least bit interested in making such information available in a form that is susceptible to standard data mining techniques. Furthermore, most publishers deliberately introduce inconsistencies and errors into their data in order both to detect intellectual property rights violations by others, and to make automated extraction as difficult as possible. Each publisher, and indeed each title from any given publisher, uses different formats, and has an arrangement that is custom tailored to the needs of whatever the publication is. The result is that we are faced with a variety of source formats on CD-ROMs, databases, web sites, and other legacy systems that completely stymie standard techniques for acquisition and integration. Very few truly useful sources are available in a nice neat tagged form such as XML and thus to rely on markup languages such as XML to aid in data extraction is a woefully inadequate approach in real-world situations.

One of the basic problems that makes the extraction process difficult is that the control-flow based program that is doing the extraction has no connection to the data itself (which is simply input) and must therefore invest huge amounts of effort extracting and keeping track of its 'state' in order to know what it should do with information at any given time. What is needed, then, is a system in which the content of the data itself actually determines the order of execution of statements in the mining language and automatically keeps track of the current state. In such a system, whenever an action was required of the extraction code, the data would 'tell' it to take that action, and all of the complexity would melt away. Assuming such a system is further tied to a target system ontology, the mining problem would become quite simple. Ideally, such a solution would tie the mining process to compiler theory, since that is most powerful formalized framework available for mapping source textual content into defined actions and state in a rigorous and extensible manner. It would also be desirable to have an interpreted language that is tied to the target ontology (totally different from the source format), and for which the order of statement execution could be driven by source data content

SUMMARY OF INVENTION

The system of this invention takes the data mining process to a whole new level of power and versatility by recognizing that, at the core of our past failings in this area, lies the fact that conventional control-flow based programming languages are simply not suited to the desired system, and must be replaced at the fundamental level a more flexible approach to software system generation. There are two important characteristics of the present invention that help create this paradigm shift. The first is that, in the preferred embodiment, the system of the present invention includes a system ontology such that the types and fields of the ontology can be directly manipulated and assigned within the language without the need for explicit declarations. For example, to assign a value to a field called "notes.sourceNotes" of a type, the present invention would only require the statement "notes.sourceNotes=". An ontology is an explicit formal specification of how to represent the objects, concepts and other entities that are assumed to exist in some area of interest and the relationships that hold among them. The second, and one of the most fundamental characteristics, is that the present invention gives up on the idea of a control-flow based programming language (i.e., one where the order of execution of statements is determined by the order of those statements within the program) in order to dramatically simplify the extraction of data from a source. In other words, the present invention represents a radical departure from all existing "control" notions in programming.

The present invention, hereinafter referred to as MitoMine™, is a generic data extraction capability that produces a strongly-typed ontology defined collection referencing (and cross referencing) all extracted records. The input to the mining process tends to be some form of text file delimited into a set of possibly dissimilar records. Mitomine contains parser routines and post processing functions, known as 'munchers'. The parser routines can be accessed either via a batch mining process or as part of a running server process connected to a live source. Munchers can be registered on a per data-source basis in order to process the records produced, possibly writing them to an external database and/or a set of servers. The present invention embeds an interpreted ontology based language within a compiler/interpreter (for the source format) such that the statements of the embedded language are executed as a result of the source compiler 'recognizing' a given construct within the source and extracting the corresponding source content. In this way, the execution of the statements in the embedded program will occur in a sequence that is dictated wholly by the source content. This system and method therefore make it possible to bulk extract free-form data from such sources as CD-ROMs, the web etc. and have the resultant structured data loaded into an ontology based system.

In the preferred embodiment, a MitoMine™ parser is defined using three basic types of information:

1) A named source-specific lexical analyzer specification
2) A named BNF specification for parsing the source
3) A set of predefined plug-in functions capable of interpreting the source information via C** statements.

Other improvements and extensions to this system will be defined herein.

BRIEF DESCRIPTION OF THE FIGURES

[NONE]

DETAILED DESCRIPTION OF THE PREFERRED EMBODIMENT

The present invention is built upon this and, in the preferred embodiment, uses a number of other key technologies and concepts. For example, these following patent applications (which are expressly incorporated herein) disclose all the components necessary to build up a system capable of auto-generating all user interface, storage tables, and querying behaviors required in order to create a system directly from the specifications given in an ontology description language (ODL). These various building-block technologies have been previously described in the following patent applications:

1) Appendix 1—Memory Patent
2) Appendix 2—Lexical Patent
3) Appendix 3—Parser Patent
4) Appendix 4—Types Patent
5) Appendix 5—Collections Patent
6) Appendix 6—Ontology Patent In the Parser Patent, a system was described that permits execution of the statements in the embedded program in a sequence that is dictated wholly by the source content, in that the 'reverse polish' operators within that system are executed as the source parse reaches an appropriate state and, as further described in that patent, these operators are passed a plug-in hint string when invoked. In the preferred embodiment, the plug-in hint string will be the source for the interpreted ontology-based language and the plug-ins themselves will invoke an inner level parser in order to execute these statements. The Ontology Patent introduced an ontology based language that is an extension of the C language known as C*. This is the preferred ontology based language for the present invention. We will refer to the embedded form of this language as C**, the extra '*' symbol being intended to imply the additional level of indirection created by embedding the language within a source format interpreter. The output of a mining process will be a set of ontology defined types (see Types Patent) within a flat data-model collection (see Memory Patent and Collection Patent) suitable for instantiation to persistent storage and subsequent query and access via the ontology (see patent reference 6).

In the preferred embodiment, a MitoMine™ parser is defined using three basic types of information:

1) A named source-specific lexical analyzer specification

2) A named BNF specification for parsing the source

3) A set of predefined plug-in functions capable of interpreting the source information via C** statements.

The BNF format may be based upon any number of different BNF specifications. MitoMine™ provides the following additional built-in parser plug-ins which greatly facilitate the process of extracting unstructured data into run-time type manager records:

<@1:1>

<@1:2>

These two plug-ins delimit the start and end of an arbitrary possibly multi-lined string to be assigned to the field designated by the following call to <@1:5:fieldPath=$>. This is the method used to extract large arbitrary text fields. The token sequence for these plug-ins is always of the form <1:1><1:String><@1:2>, that is any text occurring after the appearance of the <@1:1> plug-in on the top of the parsing stack will be converted into a single string token (token # 1) which will be assigned on the next <@1:5> plug-in. The arbitrary text will be terminated by the occurrence of any terminal in the language (defined in the LEX specification) whose value is above 128. Thus the following snippet of BNF will cause the field 'pubName' to be assigned whatever text occurs between the token <PUBLICATION> and <VOLUME/ISSUE> in the input file:

```
<PUBLICATION> <@1:1> <1:String> <@1:2> <@1:5:pubName = $>
<VOLUME/ISSUE> <3:DecInt> <@1:5:volume = $>
```

In the preferred embodiment, when extracting these arbitrary text fields, all trailing and leading white space is removed from the string before assignment, and all occurrences of LINE_FEED are removed to yield a valid text string. The fact that tokens below 128 will not terminate the arbitrary text sequence is important in certain situations where a particular string is a terminal in the language and yet might also occur within such a text sequence where it should not be considered to have any special significance. All such tokens can be assigned token numbers below 128 in the LEX specification thus ensuring that no confusion arises. The occurrence of another <@1:1> or a <@1:4> plug-in causes any previous <1:String> text accumulated to be discarded. A <@1:5> causes execution of a C** statements that generally cause extracted information to be assigned to the specified field and then clears the record of the accumulation. If a plug-in hint consisting of a decimal number follows the <@1:1> as in <@1:1:4> that number specifies the maximum number of lines of input that will be consumed by the plug-in (four in this example). This is a useful means to handle input where the line number or count is significant.

<@1:3>

In the preferred embodiment, the occurrence of this plug-in indicates that the extraction of a particular record initiated by the <@1:4> plug-in is complete and should be added to the collection of records extracted.

<@1:4:typeName>

In the preferred embodiment, the occurrence of the plug-in above indicates that the extraction of a new record of the type specified by the 'typeName' string is to begin. The "type-name" will preferably match a known type manager type either defined elsewhere or within the additionally type definitions supplied as part of the parser specification.

<@1:5:C** assignment(s)>

In the preferred embodiment, the plug-in above is used to assign values to either a field or a register. Within the assigned expression, the previously extracted field value may be referred to as '$'. Fields may be expressed as a path to sub-fields of the structure to any depth using normal type manager path notation (same as for C). As an example, the field specifier "description[$aa].u.equip.specifications" refers to a field within the parent structure that is within an array of unions. The symbol '$aa' is a register designator. There are 26*26 registers 'baa' to '$zz' which may be used to hold the results of calculations necessary to compute field values. A single character register designator may also be used instead thus '$a' is the same as '$aa', '$b' is the same as '$ba' etc. Register names may optionally be followed by a text string (no spaces) in order to improve readability (as in $aa:myIndex) but this text string is ignored by the C** interpreter. The use of registers to store extracted information and context is key to handling the distributed nature of information in published sources. In the example above, '$a' is being used as an index into the array of 'description' fields. To increment this index a "<200 1:5:$a=$a+1>" plug-in call would be inserted in the appropriate part of the BNF (presumably after extraction of an entire 'description' element). All registers are initially set to zero (integer) when the parse begins, thereafter their value is entirely determined by the <@1:5> plug-ins that occur during the extraction process. If a register is assigned a real or string value, it adopts that type automatically until a value of another type is assigned to it. Expressions may include calls to functions (of the form $FuncName), which provide a convenient means of processing the inputs extracted into certain data types for assignment. These functions provide capabilities comparable to the string processing libraries commonly found with older generation data mining capabilities.

When assigning values to fields, the <@1:5> plug-in performs intelligent type conversions, for example:

1) If the token is a <1:String> and the field is a 'charHdl', a handle is created and assigned to the field. Similarly for a 'charPtr'. If the field is a fixed length character array, the string is copied into it. If it won't fit, a bounds error is flagged. If the field is already non-empty (regardless of type) then the <@1:5> plugin appends any new text to the end of the field value (if possible). Note that registers do not append automatically unless you use the syntax $a=$a+"string".
2) If the field is numeric, appropriate type conversions from the extracted value occur. Range checking could be automatic. Multiple assignments may be separated by semi-colons. The full syntax supported within the 'assignment' string is defined by the system BNF language "MitoMine" (described below).

Note that because the order of commutative operator (e.g., "+") evaluation is guaranteed to be left-to-right, multiple non-parenthesized string concatenation operations can be safely expressed as a single statement as in:

fieldname="Hello"+$FirstCapOnly($a)+"do you like"+$b+"\n"

The <@1:5> plug-in may also be used to support limited conditional statements which may be performed using the 'if' and 'ifelse' keywords. The effect of the 'if' is to conditionally skip the next element of the production that immediately follows the <@ 1:5> containing the 'if' (there can be only one statement within an 'if' or 'ifelse' block). For example:

<@1:5: if(1=0)><@1:4:typeName> would cause the <@ 1:4> plug-in to be discarded without interpretation. Similarly:

<@1:5:ifelse(1=0)><@1:4:typeName1><@1:4:type-Name2> causes execution of the second of the two <@1:4> plug-ins while:

<@1:5:ifelse(0=0)><@1:5:$a=$a+1; $b=1><@1:5:$a=$a=1; $b=0> causes execution of the first block to increment $a and assign $b to 1.

More significantly, since it is possible to discard any element from the production in this manner, the prudent use of conditional <@1:5> evaluation can be used to modify the recognized syntax of the language. Consider the following production:

myProduction::=<@1:5:ifelse ($a>=0)> positive_prod negative_prod

In this example, the contents of register '$a' is determining which of two possible productions will get evaluated next. This can be a very powerful tool for solving non-context-free language ambiguities (normally intractable to this kind of parser) by remembering the context in one of the registers and then resolving the problem later when it occurs. The results of misusing this capability can be very confusing and the reader is referred to the incorporated materials of the Parser Patent for additional details. That having been said, the following simplified guidelines should help to ensure correctness:

For any production of the form:

prod ::<@1:5:ifelse (expression)> thenClause elseClause

Ensure:

1) FIRST(thenClause)=FIRST(elseClause)
2) Either both thenClause and elseClause are NULLABLE, or neither is
3) If elseClause is not NULLABLE, and if necessary (depending on other occurrences of thenClause), include a production elsewhere {that may never be executed} to ensure that FOLLOW(thenClause) includes FOLLOW(elseClause)

For any production of the form:

prod ::=prevElement <@1:5:if (expression)> thenClause nextElement

Ensure that if thenClause is not NULLABLE, and if necessary (depending on other occurrences of nextElement), include a production elsewhere {that may never be executed} to ensure that FIRST(nextElement) is entirely contained within FOLLOW(prevElement).

Note that all plug-ins may contain multiple lines of text by use of the <cbnt> symbol (see Parser patent). This may be required in the case where a <@1:5> statement exceeds the space available on a single line (e.g., many parameters to a function). The maximum size of any given plug-in text in the preferred embodiment is 8 KB.

The present invention also permits the specification of the language specific parser to include any user dialogs and warnings that might be required for the parser concerned, any additional type definitions that might be required as part of parser operation, and any custom annotations and scripts (see Collections Patent) that might be necessary.

Within the <@1:5> plug-in, in addition to supporting conditionals, additive, multiplicative and assignment operators, this package preferably provides a number of built-in functions that may be useful in manipulating extracted values in order to convert them to a form suitable for assignment to typed fields. These functions are loosely equivalent to the string processing library of conventional mining languages. Function handlers may be registered (via a registry API—see Parser Patent for further details) to provide additional built in functions. In the built-in function descriptions below, for example, the type of a given parameter is indicated between square brackets. The meaning of these symbols in this example is as follows:

[I]—Integer value (64 bit)

[F]—Floating point value (double)

[S]—String value

The following is a partial list of predefined built-in functions that have been found to be useful in different data mining situations. New functions may be added to this list and it is expected that use of the system will often include the step of adding new functions. In such a case, if a feature is not provided, it can be implemented and registered as part of any particular parser definition. On the other hand, none of the features listed below are required meaning that a much smaller set of functions could also be used. In the preferred embodiment, however, the following functions (or ones having similar functionality) would be available.

1) [F] $Date( )

get current date/time into a date-double

2) [F] $StringToDate([S] dateString,[S] calendar)

convert "dateString" to date/time double, current date if date string format invalid. The currently supported calendar values are "G"—Gregorian, "J"—Julian etc. Note that in the Gregorian calendar you may specify the date string in a wide variety of formats, in any other calendar it must be in the following format: "yyyy:mm:dd [hh:mm[:ss] [AM/PM]]"

3) [S] $TextAfter([S] srcStr,[S] delimStr)

Return the string portion after the specified delimiter sequence. Returns " " if not found.

4) [S] $TextBefore([S] srcStr[S] delimStr)

Return the string portion before the specified delimiter sequence. Returns " " if not found.

5) [S] $TextBetween([S] srcStr,[S] startStr,[S] endStr)

Return the string portion between the specified delimiter sequences. Returns " " if not found.

6) [I] $Integer([S] aString)

Convert the specified string to an integer (decimal or hex)

7) [F] $Real([S] aString)

Convert the specified string to a real number

6) [I] $IntegerWithin([S] aString,[I] n)

Extract the n'th integer (decimal or hex, n=1 . . . ) within the specified arbitrary string 7) [F] $RealWithin([S] aString,[I] n)

Extract the n'th real (n=1 . . . ) within the specified arbitrary string

8) [S] $StripMarkup([S] aString)

Strip any Markup language tags out of a string to yield plain text.

9) [S] $SourceName( )

Inserts the current value of 'languageName'

10) [S] $SetPersRefInfo([S] aString)

This function allows you to append to the contents of the 'stringH' field of a persistent reference field rather than assigning to the name. The function result is equal to 'aString' but the next assignment made by the parser will be to the 'stringH' sub-field, not the 'name' sub-field.

11) [S] $FirstCapOnly([S] aString)

Converts a series of words in upper/lower case such that each word starts with an upper case character and all subsequent characters are lower case.

12) [S] $TextNotAfter([S] srcStr,[S] delimStr)

Similar in operation to $TextBefore( ) except if 'delimStr' is not found, the original string is returned un-altered.

13) [S] $TextNotBefore([S] srcStr[S] delimStr)

Similar in operation to $TextAfter( ) except if 'delimStr' is not found, the original string is returned un-altered.

14) [S] $TextNotBetween([S] srcStr,[S] startStr,[S] endStr)

Returns what remains after removing the string portion between the specified delimiter sequences (and the delimiter sequences themselves). If the sequence is not found, the original string is returned un-altered.

15) [S] $TruncateText([S] srcStr,[I] numChars)

Truncated the source string to the specified number of characters.

16) [S] $TextBeforeNumber([S] srcStr)

This function is similar in operation to $TextBefore( ) but the 'delimStr' is taken to be the first numeric digit encountered.

17) [S] $TextWithout([S] srcStr,[S] sequence)

This function removes all occurrences of the specified sequence from the source string.

18) [S] $WordNumber([S] srcStr,[I] number)

This function gets the specified word (starting from 1) from the source string. If 'number' is negative, the function counts backward from the last word in the source string.

19) [S] $Ask([S] promptStr)

This function prompts the user using the specified string and allows him to enter a textual response which is returned as the function result.

20) [S] $TextWithoutBlock([S] srcStr,[S] startDelim,[S] endDelim)

This function removes all occurrences of the delimited text block (including delimiters) from the source string.

21) [S] $ReplaceSequence([S] srcStr,[S] sequence,[S] nuSequence)

This function replaces all occurrences of the target sequence by the sequence 'nuSequence' within the given string.

22) [S] $AppendIfNotPreseat([S] srcStr,[S] endDelim)

This function determines if 'srcStr' ends in 'endDelim' and if not appends 'endDelim' to 'srcStr' returning the result.

23) [S] $ProperNameFilter([S] srcStr,[I] wordMax,[S] delim)

This function performs the following processing (in order) designed to facilitate the removal of extraneous strings of text from 'delim' separated lists of proper names (i.e., capitalized first letter words):

a) if the first non-white character in a 'delim' bounded block is not upper case, remove the entire string up to and including the trailing occurrence of 'delim' (or end of string).

b) for any 'delim' bounded block, strip off all trailing words that start with lower case letters.

c) if more than 'wordMax' words beginning with a lower case letter occur consecutively between two occurrences of 'delim', terminate the block at the point where the consecutive words occur.

24) [S] $Sprintf([S] formatStr, . . . )

This function performs a C language sprintf) function, returning the generated string as its result.

25) [S] $ShiftChars([S] srcStr,[I] delta)

This function shifts the character encoding of all elements of 'srcStr' by the amount designated in 'delta' returning the shifted string as a result. This functionality can be useful for example when converting between upper and lower case.

26) [S] $FlipChars([S] srcStr)

This function reverses the order of all characters in 'srcStr'.

27) [S] $ReplaceBlockDelims([S] srcStr,[S] startDelim,[S] endDelim,[S] nuStartDelim,[S] nuEndDelim,[I] occurrence,[I] reverse)

This function replaces the start and end delimiters of one or more delimited blocks of text by the new delimiters specified. If 'occurrence' is zero, all blocks found are processed, otherwise just the block specified (starting from 1). If 'reverse' is non-zero (i.e., 1), this function first locates the ending delimiter and then works backwards looking for the start delimiter. Often if the start delimiter is something common like a space character (e.g., looking for the last word of a sentence), the results of this may be quite different from those obtained using 'reverse'=0.

28) [S] $RemoveIfFollows([S] srcStr,[S] endDelim)

This function determines if 'srcStr' ends in 'endDelim' and if so removes 'endDelim' from 'srcStr' returning the result.

29) [S] $RemoveIfStarts([S] srcStr,[S] startDelim)

This function determines if 'srcStr' starts with 'startDelim' and if so removes 'startDelim' from 'srcStr' returning the result.

30) [S] $PrependIfNotPresent([S] srcStr[S] startDelim)

This function determines if 'srcStr' starts with 'startDelim' and if not prepends 'startDelim' to 'srcStr' returning the result.

31) [S] $NoLowerCaseWords([S] srcStr)

This function eliminates all words beginning with lower case letters from 'srcStr' returning the result.

32) [S] $ReplaceBlocks([S] srcStr,[S] startDelim,[S] endDelim,[I] occurrence,[S] nuSequence)

This function replaces one or all blocks delimited by the specified delimiter sequences with the replacement sequence specified. If 'occurrence' is zero, all blocks are replaced, otherwise the occurrence is a one-based index to the block to replace.

33) [S] $AppendIfNotFollows([S] srcStr,[S] endDelim)

This function determines if 'srcStr' ends in 'endDelim' and if not appends 'endDelim' to 'srcStr' returning the result.

34) [I] $WordCount([S] srcStr)

This function counts the number of words in the source string, returning the numeric result.

35) [S] $PreserveParagraphs([S] srcStr)

This function eliminates all line termination characters (replacing them by spaces) in the source string other than those that represent paragraph breaks. Source text has often been formatted to fit into a fixed page width (e.g., 80 characters) and since we wish the captured text to re-size to fit whatever display area is used, it is often necessary to eliminate the explicit line formatting from large chunks of text using this function. A paragraph is identified by a line termination immediately followed by a tab or space character (also works with spaces for right justified scripts), all other explicit line formatting is eliminated. The resulting string is returned.

36) [I] $StringSetIndex([S] srcStr,[I] ignoreCase,[S] setStr1 . . . [S] setStrN)

This function compares 'srcStr' to each of the elements in the set of possible match strings supplied, returning the index (starting from 1) of the match string found, or zero if no match is found. If 'ignoreCase' is non-zero, the comparisons are case insensitive, otherwise they are exact.

37) [S] $IndexStringSet([I] index,[S] setStr1 . . . [S] setStrN)

This function selects a specific string from a given set of strings by index (1-based), returning as a result the selected string. If the index specified is out of range, an empty string is returned.

38) [S] $ReplaceChars([S] srcStr,[S] char,[S] nuChar)

This function replaces all occurrences of 'char' in the string by 'nuChar' returning the modified string as a result.

39) [S] $Sentence([S] srcstr,[I] index)

This function extracts the designated sentence (indexing starts from 0) from the string, returning as a result the sentence. If the index specified is negative, the index counts backwards from the end (i.e., −1 is the last sentence etc.). A sentence is identified by any sequence of text terminated by a period.

40) [S] $FindHyperlink([S] srcStr,[S] domain, [I] index)

This function will extract the index'th hyperlink in the hyperlink domain specified by 'domain' that exists in 'srcStr' (if any) and return as a result the extracted hyperlink name. This technique can be used to recognize known things (e.g., city or people names) in an arbitrary block of text. If no matching hyperlink is found, the function result will be an empty string.

41) [S] $AssignRefType([S] aString)

This function allows you to assign directly to the typeID sub-field of a persistent reference field rather than assigning to the name. The function result is equal to 'aString' but the next assignment made by the parser will be to the typeID sub-field 'aString' is assumed to be a valid type name), not the 'name' sub-field.

42) [I] $RecordCount( )

This function returns the number of records created so far during the current mining process.

43) [S] $Exit([S] aReason)

Calling this function causes the current parsing run to exit cleanly, possibly displaying a reason for the exit (to the console) as specified in the 'aReason' string (NULL if no reason given).

44) [1] $MaxRecords( )

This function returns the maximum number of records to be extracted for this run. This value can either be set by calling $SetMaxRecords( ) or it may be set by external code calling MN_SetMaxRecords( ).

45) [I] $SetMaxRecords([I] max)

This function sets the maximum number of records to be extracted for this run. See $MaxRecords( ) for details.

46) [I] $FieldSize([S] fieldName)

This function returns the size in bytes of the field specified in the currently active type record as set by the preceding <@1:4:typeName> operator. Remember that variable sized string fields (i.e., char @fieldName) and similar will return a size of sizeof(Ptr), not the size of the string within it.

47) [I] $TextContains([S] srcText[S] subString)

This function returns 0 if the 'srcText' does not contain 'subString', otherwise it returns the character index within 'srcText' where 'subString' starts +1.

48) [I] $ZapRegisters([S] minReg,[S] maxReg)

This function empties the contents of all registers starting from 'minReg' and ending on 'maxReg'. The parameters are simply the string equivalent of the register name (e.g., "$aa"). When processing multiple records, the use of $ZapRegisters( ) is often more convenient than explicit register assignments to ensure that all the desired registers start out empty as record processing begins. The result is the count of the number of non-empty registers that were zapped.

49) [1] $CRCString([S] srcText)

This function performs a 32-bit CRC similar to ANSI X3.66 on the text string supplied, returning the integer CRC result. This is can be useful when you want to turn an arbitrary (i.e., non-alphanumeric) string into a form that is (probably!) unique for name generating or discriminating purposes.

Note that parameters to routines may be either constants (of integer, real or string type), field specifiers referring to fields within the current record being extracted, registers, $ (the currently extracted field value), or evaluated expressions which may include embedded calls to other functions (built-in or otherwise). This essentially creates a complete programming language for the extraction of data into typed structures and collections. The C** programming language provided by the <@1:5> plug-ins differs from a conventional programming language in that the order of execution of the statements is determined by the BNF for the language and the contents of the data file being parsed. In the preferred embodiment, the MitoMine™ parser is capable of recognizing and evaluating the following token types:

3—DecInt—syntax as for a C strtoul( ) call but ignores embedded commas.

4—Real—real—as for C strtod( )

5—Real—real scientific format—as for C strtod( )

The plug-in 5 MitoMine™ parser, in addition to recognizing registers, $, $function names, and type field specifications, can also preferably recognize and assign the following token types:

2—character constant (as for C)

7—Hex integer (C format)

3—decimal integer (as for C strtoul)

10—octal integer (as for strtoul)

4—real (as for strtod)

5—real with exponent (as for strtod)

12—string constant (as for C)

Character constants can be a maximum of 8 characters long, during input, they are not sign extended. The following custom parser options would preferably be supported:

kTraceAssignments (0x00010000)—Produces a trace of all <@1:5> assignments on the console kpLineTrace (0x00020000)—Produces a line trace on the console kTraceTokens (0x00040000)—Produces a trace of each token recognized These options may be specified for a given parser language by adding the corresponding hex value to the parser options line. For example, the specification below would set kTraceAssignments+kpLineTrace options in addition to those supported by the basic parse package:

=0x30000+kPreserveBNFsymbols+kBeGreedyParser

The lexical analyzer options line can also be used to specify additional white-space and delimiter characters to the lexical analyzer as a comma separated list. For example the specification below would cause the characters 'a' and 'b' to be treated as whitespace (see LX_AddWhiteSpace) and the characters 'Y' and 'Z' to be treated as delimiters (see LX_AddDelimiter).

=kNoCaseStates+whitespace(a,b)+delimiter(Y,Z)

Appendix A provides a sample of the BNF and LEX specifications that define the syntax of the <1:5> plug-in (i.e., C) within MitoMine™ (see Parser Patent for further details). Note that most of the functionality of C is already provided by the predefined plug-in functions (plug-in 0) supplied by the basic parser package. A sample implementation of the <@1:5> plug-in one and a sample implementation of a corresponding resolver function are also provided.

As described previously, the lexical and BNF specifications for the outermost parser vary depending on the source being processed (example given below), however the outer parser also has a single standard plug-in and resolver. A sample implementation of the standard plug-in one and a sample implementation of a corresponding resolver function are also provided in Appendix A.

The listing below gives the API interface to the MitoMine™ capability for the preferred embodiment although other forms are obviously possible. Appendix A provides the sample pseudo code for the API interface.

In the preferred embodiment, a function, hereinafter called MN_MakeParser( ), initializes an instance of the MitoMine™ and returns a handle to the parser database which is required by all subsequent calls. A 'parserType' parameter could be provided to select a particular parsing language to be loaded (see PS_LoadBNF) and used.

In the preferred embodiment, a function, hereinafter called MN_SetRecordAdder( ) determines how (or if) records once parsed are added to the collection. The default record adder creates a set of named lists where each list is named after the record type it contains.

In the preferred embodiment, a function, hereinafter called MN_SetMineFunc( ), sets the custom mine function handler for a MitoMine™ parser. Additional functions could also be defined over and above those provided by MitoMine™ within the <@1:5: . . . > plugin context. A sample mine function handler follows:

```
static Boolean myFunc   (                              // custom function handler
        ET_ParseHdl      aParseDB,                     //IO:handle to parser DB
        int32            aContextID                    //I:context
                       )                               // R:TRUE for success
{
  p = (myContextPtr)aContextID;                        // get our context pointer
  opCount = PS_GetOpCount(aParseDB,TOP);               // get # of operands
  tokp = PS_GetToken(aParseDB,opCount);                // get fn name
  for ( i = 0 ; i < opCount ; i++ )
    if ( !PS_EvalIdent(aParseDB,i) )                   // eval all elements on stack
    {
      res = NO;
      goto BadExit;
    }
  if ( !US_strcmp(tokp,"$myFuncName") )                // function name
  {
    -- check operand count and type
    -- implement function
    -- set resulting value into stack 'opCount' e.g.:
        PS_SetiValue(aParseDB,opCount,result);
  } else if ( !US_strcmp(tokp,"$another function") )
```

In the preferred embodiment, a function, hereinafter called MN_SetMaxRecords( ), sets the maximum number of records to be mined for a MitoMine™ parser. This is the number returned by the built-in function $GetMaxRecords( ). If the maximum number of records is not set (i.e., is zero), all records are mined until the input file(s) is exhausted.

In the preferred embodiment, a function, hereinafter called MN_SetMineLifeFn( ), sets the MitoMine™ line processing function for a given MitoMine™ parser. A typical line processing function might appear as follows:

```
static void myLineFn   (                    // Built-in debugging mine-line
                                            fn
    ET_ParseHdl     aParseDB,               // I:Parser DB
    int32           aContextID,             // I:Context
    int32           lineNum,                // I:Current line number
    charPtr         lineBuff,               // IO:Current line buffer
    charPtr         aMineLineParam          // I:String parameter to function
                    )                       // R:void
```

These functions can be used to perform all kinds of different useful functions such as altering the input stream before the parse sees it, adjusting parser debugging settings, etc. The 'aMineLineParam' parameter above is an arbitrary string and can be formatted any way you wish in order to transfer the necessary information to the line processing function. The current value of this parameter is set using MN_SetMineLineParam( ).

In the preferred embodiment, a function, hereinafter called MN_SetMineLineParam( ), sets the string parameter to a MitoMine™ line processing function.

In the preferred embodiment, two functions, hereinafter called MN_SetParseTypeDB( ) and MN_GetParseType DB( ), can be used to associate a type DB (probably obtained using MN_GetMineLanguageTypeDB) with a MitoMine™ parser. This is preferable so that the plug-ins associated with the extraction process can determine type information for the structures unique to the language. In the preferred embodiment, the function MN_GetParseTypeDB( ) would return the current setting of the parser type DB.

In the preferred embodiment, a function, hereinafter called MN_SetFilePath( ), sets the current file path associated with a MitoMine™ parser.

In the preferred embodiment, a function, hereinafter called MN_GetFilePath( ), gets the current file path associated with a MitoMine™ parser.

In the preferred embodiment, a function, hereinafter called MN_SetCustomContext( ), may be used to get the custom context value associated with a given MitoMine™ parser. Because MitoMine™ itself uses the parser context (see PS_SetContextID), it provides this alternative API to allow custom context to be associated with a parser.

In the preferred embodiment, a function, hereinafter called MN_GetCustomContext( ), may be used to get the custom context value associated with a given MitoMine™ parser. Because MitoMine™ itself uses the parser context (see PS_SetContextID), it provides this alternative API to allow custom context to be associated with a parser.

In the preferred embodiment, a function, hereinafter called MN_GetParseCollection( ), returns the collection object associated with a parser. MN_SetParseCollection( ) allows this value to be altered. By calling MN_SetParse Collection( . . . ,NULL) it is possible to detach a collection from the parser in cases where you wish the collection to survive the parser teardown process.

In the preferred embodiment, a function, hereinafter called MN_SetParseCollection( ), returns the collection object associated with a parser. MN_SetParseCollection( ) allows this value to be altered. By calling MN_SetParse Collection( . . . ,NULL) it is possible to detach a collection from the parser. This would be useful in cases where it is preferable to permit the collection to survive the parser teardown process.

In the preferred embodiment, a function, hereinafter called MN_GetMineLanguageTypeDB( ), returns a typeDB handle to the type DB describing the structures utilized by the specified mine language. If the specified typeDB already exists, it is simply returned, otherwise a new type DB is created by loading the type definitions from the designated MitoMine™ type specification file.

In the preferred embodiment, a function, hereinafter called MN_KillParser( ), disposes of the Parser database created by MN_MakeParser( ). A matching call to MN_KillParser( ) must exist for every call to MN_MakeParser( ). This call would also invoke MN_CleanupRecords( ) for the associated collection.

In the preferred embodiment, a function, hereinafter called MN_Parse( ), invokes the MitoMine™ parser to process the designated file. The function is passed a parser database created by a call to MN_MakeParser( ). When all calls to MN_Parse( ) are complete, the parser database must be disposed using MN_KillParser( ).

In the preferred embodiment, a function, hereinafter called MN_RunMitoMine( ), creates the selected MitoMine™ parser on the contents of a string handle. An parameter could also be passed to the MN_MakeParser( ) call and can thus be used to specify various debugging options.

In the preferred embodiment, a function, hereinafter called MN_CleanupRecords( ), cleans up all memory associated with the set of data records created by a call to MN_RunMitoMine( ).

In the preferred embodiment, a function, hereinafter called MN_RegisterMineMuncher( ), can be used to register by name a function to be invoked to post process the set of records created after a successful MitoMine™ run. The name of the registered Muncher function would preferably match that of the mining language (see MN_Parse for details). A typical mine-muncher function might appear as follows:

```
static ET_Collection.Hdl myMuncher(                      // My Mine Muncher function
        ET_MineScanRecPtr     scanP,                      // IO:Scanning context record
        ET_CollectionHdl      theRecords,                 // I:Collection of parsed records
        char                  typeDBcode,                 // I:The typeDB code
        charPtr               parserType,                 // I:The parser type/language name
        ET_Offset             root,                       // I:Root element designator
        charPtr               customString                // I:Avail pass cstm strig to muncher
                              )                           // R:The final collection
```

The 'scanP' parameter is the same 'scanP' passed to the file filter function and can thus be used to communicate between file filters and the muncher or alternatively to clean up any leftovers from the file filters within the 'muncher'. Custom 'muncher' functions can be used to perform a wide variety of complex tasks, indeed the MitoMine™ approach has been used successfully to extract binary (non-textual) information from very complex sources, such as encoded database files, by using this technique.

In the preferred embodiment, a function, hereinafter called MN_DeRegisterMineMuncher( ), de-registers a previously registered mine muncher function.

In the preferred embodiment, a function, hereinafter called MN_InvokeMineMuncher( ), invokes the registered 'muncher' function for the records output by a run of MitoMine (see MN_RunMitoMine). If no function is registered, the records and all associated memory are simply disposed using MN_CleanupRecords( ).

In the preferred embodiment, a function, hereinafter called MN_RegisterFileFilter( ), can be used to register by name a file filter function to be invoked to process files during a MitoMine™ run. If no file filter is registered, files are treated as straight text files, otherwise the file must be loaded and pre/post processed by the file filter. A typical file filter function might appear as follows:

```
static EngErr myFileFilter  (                // Scan files and mine if appropr
    HFileInfo               *aCatalogRec,    // IO:The catalog search record
    int32Ptr                flags,           // IO:available for flag use
    ET_MineScanRecPtr       scanP            // IO:Scanning context record
                            )                // R:zero for success, else error #
```

In the preferred embodiment, a function, hereinafter called MN_ListFileFilters( ), obtains a string list of all know MitoMine™ file filter functions.

In order to illustrate how MitoMine™ is used to extract information from a given source and map it into its ontological equivalent, we will use the example of the ontological definition of the Country record pulled from the CIA World Fact book. The extract provided in Appendix B is a portion of the first record of data for the country Afghanistan taken from the 1998 edition of this CD-ROM. The format of the information in this case appears to be a variant of SGML, but it is clear that this approach applies equally to almost any input format. The lexical analyzer and BNF specification for the parser to extract this source into a sample ontology are also provided in Appendix B. The BNF necessary to extract country information into a sample ontology is one of the most complex scripts thus far encountered in MitoMine™ applications due to the large amount of information that is being extracted from this source and preserved in the ontology. Because this script is so complex, it probably best illustrates a less than ideal data-mining scenario but also demonstrates use of a large number of different built-in mining functions. Some of the results of running the extraction script below can be seen in the Ontology patent relating to auto-generated UI.

Note that in the BNF provided in Appendix B, a number of distinct ontological items are created, not just a country. The BNF starts out by creating a "Publication" record that identifies the source of the data injected, it also creates a "Government" record, which is descended from Organization. The Government record is associated with the country and forms the top level of the description of the government/organization of that country (of which the military branches created later are a part). In addition, other records could be created and associated with the country, for example the "opt_figure" production is assigning a variety of information to the 'stringH' field of the "mapImage" field that describes a persistent reference to the file that contains the map image. When the data produced by this parse is written to persistent storage, this image file is also copied to the image server and through the link created, can be recalled and displayed whenever the country is displayed (as is further demonstrated in the UI examples of the Ontology Patent). In fact, as a result of extracting a single country record, perhaps 50-100 records of different types are created by this script and associated in some way with the country including government personnel, international organizations, resources, population records, images, cities and ports, neighboring countries, treaties, notes, etc. Thus it is clear that what was flat, un-related information in the source has been converted to richly interconnected, highly computable and usable ontological information after the extraction completes. This same behavior is repeated for all the diverse sources that are mined into any given system the information from all such sources becomes cross-correlated and therefore infinitely more useful that it was in its separate, isolated form. The power of this approach over conventional data mining technologies is clear.

The foregoing description of the preferred embodiments of the invention has been presented for the purposes of illustration and description. For example, although described with respect to the C* programming language, any programming language that includes the appropriate extensions could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

Appendix 8

SYSTEM AND METHOD FOR NAVIGATING DATA

BACKGROUND OF THE INVENTION

A user interface is only as good as the focus that it provides. Digital information environments, such as the World Wide Web, are designed to capture and lead the focus of the person using them. This is often based on the agenda of the person creating the web page and most frequently that agenda is to gamer advertising dollars. Thus, the problem of searching for the answer to something on the web only to be forced to focus on irrelevant web sites is a common experience. In such a scenario, a user often fails to find what they were looking for, often forgetting what they were looking for in the first place. This effect occurs because the digital domain is not constrained by the same relevance falloff law that constrains the analog world. Each navigation step may be arbitrarily large, and the human mind is poorly equipped to maintain focus, and thus the search for meaning or relevance in this environment is very difficult. Nowhere is this problem more inherent than in the use of hyperlinks.

In any large collection of disparate data, effective navigation becomes critical. For example, on the Internet the approach taken to navigation was to implement embedded "hyperlinks" which transition the user's focus to the URL referenced in the hyperlink. This works effectively, but is a manual, restrictive, and error prone business. The web-site designer must manually insert the chosen hyperlink to the URL, thereby enforcing his perspective on the user, rather than the perspective of the user. Worse yet, URLs change continuously and the referencing link then becomes out of date and useless. What is needed, then, is the ability to define and enable/disable hyperlink domains on a per-user basis based on the information and world-view that he, or the organization of which he is a member, brings to the problem the user is researching. In other words, in addition to conventional hyperlinks, which reveal the focus of others, what is needed is a user-centric, organization-centric, and domain-centric hyperlinks that are automatically applied to every bit of textual data present in the system or displayed to the user.

SUMMARY OF INVENTION

The present invention provides such a system. The present invention provides a dynamic hyper-linking architecture under the control of each user, not under the control of the information source. The present invention includes synchronous and asynchronous, inter-thread function calls, including support for function overrides in a threaded scope dependent manner. The present invention also supports broadcast (multiple call) call configurations and run-time examination of function registries. In the preferred embodiment, the system comprises the following:

A threaded environment providing the following abilities:
- a) Association of arbitrary data, in this case function registries, with threads;
- b) Hierarchical nesting of thread contexts with corresponding UI context relationships;
- c) Ability to pass 'events' containing messages between threads;
- d) Environment supplied transparent invocation of certain events;
- e) Ability to 'look-up' threads based on a unique thread/widget ID;

A series of function registries associated with each context in the system, including a global registry whose scope encloses that of all others. Within these registries, using API calls, functions can be registered by name (as a text string) by specifying the ancestral scope at which the registration should occur; and In the preferred embodiment, an API that permits execution of functions by name that internally searches the relevant thread's registries in an order determined by gradually widening scope (as defined by the threaded environment) and which causes the necessary functions to be executed, with the parameters supplied by the caller, either in the calling context ('near') by direct call, or in the registering context ('far') by call in response to an appropriate event. A 'reply' function may also be specified which allows function results to be returned to the calling context in a synchronous or asynchronous manner.

Furthermore, the present invention provides a system for implementing threaded type-dependant asynchronous invocation of a set of named logical actions in thread dependant, scoped, manner including support for overriding the invoked functionality within any scope, passing of arbitrary parameters from invoker to invoked, type ancestry dependant inheritance of invocation behaviors (including scope dependency) based on a threaded symbolic registry scheme such as described above. Finally, a hyperlinking system uses these features to dynamically modify a user interface such that any text in a user interface can be hyperlinked to one or more sets of types data using hyperlink dictionaries that may be user defined or global. Additionally, clicking on such a hyperlink can invoke one or more functions (as described above) based on the scope of the functions permitting display of wide ranging data and media types.

It is anticipated that further modifications and extensions will also be provided. For example, the system could be extended to support the ability through API calls to associate arbitrary data and logical flags with registered functions. Additionally, they system could be extended to support the ability to inhibit/enable functions in the registry(s) by scope through described API calls.

BRIEF DESCRIPTION OF THE FIGURES

[None]

DETAILED DESCRIPTION OF THE PREFERRED EMBODIMENT

The technology described herein preferably takes advantage of a number of other key technologies and concepts. Ideally, the reader would be familiar with the technology described in the patent applications listed below in order to fully understand breadth and uniqueness of the present invention. For these reasons, the following technologies, which have been previously described in the following related patent applications, have been fully incorporated herein:

1) Appendix 1—"Lexical Patent"
2) Appendix 2—"Memory patent"
3) Appendix 3—"Types Patent"
4) Appendix 4—"Ontology patent"

It is important to understand that the invention described herein can be added to any information accessed by the user regardless of source, internal or external. While its application will be described with reference to web pages for simplicity, this is but one example of its application and should not be construed as a limit to the scope of the present invention. The present invention directly addresses the loss-of-focus issue described above by allowing the user to define and modify his or her own hyper-linking environment and allows all of the knowledge of the user or the user's organization to be used to analyze and modify the appearance of the information being displayed. The architecture, within which the user performs his daily activities, and the user interface (UI) it presents, provides and automates this facility. More specifically, when a hyperlink is clicked, the architecture identifies the nature, type and location of the datum to which that hyperlink refers. Once the datum type has been retrieved, the architecture automatically launches the appropriate display behaviors to show the target datum to the user in the most appropriate manner, which in many cases will be context dependant.

The present invention is built up in three layers. The first layer (as exemplified by the API calls starting with OC_) is targeted at the more general problem of symbolically invoking functionality within a complex threaded environment in a manner that permits both local and remote synchronous and asynchronous function invocation and customization of the actual functionality invoked in a context sensitive and scope dependant manner. The second layer (as exemplified by the API calls starting with DB_) ties this capability to a type-dependent, ontology-based invocation system. The third layer provides the capabilities required to handle and display ontology-centric hyperlinks.

Threaded Symbolic Function Calls

The first layer provides functionality that permits threaded, scope dependant symbolic function invocation. Specifically, the first layer allows function calls to be made between and across threads in a symbolic, possibly asynchronous manner. Throughout this discussion, threads will be referred to as 'widgets' where each widget in the system has a unique widget ID that can be used to reference it.

As an initial matter, it is helpful to describe the preferred thread architecture of the substrate within which the functionality described herein is intended to run, and which confers the ability to represent nested scope. Other substrate architectures are possible provided that they support at least some portion of the scope behaviors described herein. The need for scope dependant configuration of invoked functionality, and its complete divorcing from the consideration of the invoker, permits large complex systems to be easily assembled out of flexible adaptable building blocks. This is a problem that is poorly handled by more conventional approaches such as object-oriented programming, for example. While such approaches could be used, this is not the preferred approach.

The following description refers to compiled, executable code as 'atomic widgets'. Atomic widgets may be combined and nested within higher-level widgets (that generally do not contain executable code) and are referred to as 'compound widgets'. Collectively, atomic widgets and compound widgets will be referred to as 'widgets'. In addition to logical nesting within compounds, the present invention also provides a corresponding layout of widgets within the user interface (UI) implied by such nesting. Compound and atomic widgets may be combined into higher-level compound widgets to an arbitrary number of levels. In the preferred embodiment, widgets can be grouped into loadable and executable 'applications', comprised of one or more (possibly nested) widgets, which are known as 'views'. Generally, there will be one or more windows within the user interface that correspond to a given view. Views in turn can be combined into logical groups of views known as view packs. Further, any widget within a view or view pack may cause the launching of another view or view pack, and the launch dependency between these various views in the system is tracked and utilized as part of determining 'ancestry'. Thus, we have the concept of a scope or ancestry chain for any given widget context running in the system that contains some or all of the elements depicted below:

Global Environment context
- View Pack
- View
  - Launched View [Pack]—may be nested to any # of levels
    - View
      - Compound Widget—may be nested to any # of levels
        - Atomic Widget Because there is a close match between UI window layout and the logical nesting of widgets described above, this ancestry chain closely matches the perceived visual context of any given widget. This approach permits use of the scope defined by the ancestor chain to configure the behaviors and resultant appearance of invoked functions into the context from which they are invoked. For simplicity, the current widget's scope will be defined to be zero on a signed number line. Increasing widget ancestry can then be referenced as +1 for the parent, +2 the grandparent etc. This positive incrementing continues until the nesting within a given view is exhausted. The ancestry is also defined in the opposite direction. For example, switches to −1 (local view scope) and increases in the negative direction with −2 being view pack scope, −3 launching view scope (if any), and so on in the negative direction until the chain runs out. Finally, global environment scope within which all other scopes are defined can be reference using the constant −32768.

In the preferred embodiment, the implementation of symbolic function registries in the present invention utilizes string lists (as described in the Memory Patent) to store the information passed on the call to OC_RegisterFunction( ). Each scope node discussed above may have such a registry associated with it if any functions have been registered. A such, the present invention access these registries and looks for registered function in expanding scope order during a call to OC_CallSymbolicFunc( ). The basic scope logic is implemented by the internal function OC_SymbolicFuncLoc( ) the pseudo-code for which is given below:

```
static ET_StringList OC_SymbolicFuncLoc(                    // obtain function
address list
            int32              aWidgetID,                   // I:Widget ID(0 =
current)
            int32              *aScopeID,                   // O:scope widget ID
            int32Hdl           *index,                      // O:~0 term. match
index list
            charPtr            aFuncName,                   // I:symbolic
function name
            int32              options,                     // I:various logical
options
            int32              aMatchWidgetID,              // I:matching widget
ID,or 0
            ET_SymbolicFunc    aMatchFuncAddr               // I:Matching fn.
address or NULL
                         )                                  // R:String List or
NULL
{
  if ( aWidgetID == kGlobalSCOPE )
    scopeWP = 0;
  else
  {
    scopeWP = convert aWidgetID & aMatchWidgetID to reference
    vh = view handle of scopeWP
  }
  myIndex = −1;
  if ( aWidgetID != kGlobalSCOPE )
    while ( !ctr && scopeWP )                               // search widget's
```

-continued

```
ancestry chain
    {
        if ( aScopeID ) *aScopeID = scopeWP->widgetID;
        sL = scopeWP function registry;
        if ( sL )
        {
            do
            {
                myIndex = search sL for name specified
                if ( name found )
                {
                    if ( !(options & kIncludeSuppressed) )
                        if ( function suppressed )            // check ! supressed
                            continue;
                    extract all required values
                    add myIndex to *index array
                }
            } while (myIndex >= 0);
        }
        if ( !ctr )
        {
            scopeWP = parent widget of scopeWP
            if ( !scopeWP )                                   // ran out of
widgets!
            {
                if ( in a view pack )                         // now work through
views...
                    scopeWP = view widget of prime view of pack
                else if ( this view was launched by another )
                {
                    scopeWP = view widget of the launcher
                } else scopeWP = 0;
            }
        }
    }
  if ( !ctr && !(options & kNoGlobalSearch) )                 // try the global
registry...
  {
    if ( aScopeID ) *aScopeID = 0;
    sL = global registry
    myIndex = −1;
    if ( sL )
    {
        do
        {
            myIndex = search sL for name specified
            if ( name found )
            {
                if ( !(options & kIncludeSuppressed) )
                    if ( function suppressed )                // check ! supressed
                        continue;
                extract all required values
                add myIndex to *index array
            }
        } while (myIndex >= 0);
    }
  }
  if ( !ctr )
    sL = NULL;
  return sL;
}
```

In this embodiment, the function above returns a string list containing all matching functions registered at the relevant scope. From this information, the implementation of most routines in the function registry API can be deduced. For example, one implementation of the function OC_CallSymbolicFunction( ) is as follows:

```
Boolean OC_CallSymbolicFunction(                                 // call a symbolic
function
                charPtr              aFuncName,                  // I:symbolic
function name
                void                 *aFuncParameter,            // I:parameter (or
NULL if N/A)
                ET_SymbolicReply     aReplyFunc,                 // I:Address of reply
```

-continued

```
fn. or NULL
                  int32              aMatchWidgetID,   // I:Matching widget
ID or 0
                  ET__SymbolicFunc   aMatchFuncAddr,   // I:Matching fn.
address or NULL
                  int32              options           // I:Various logical
options
                                )                      // R:TRUE for success
{
  sL = OC__SymbolicFuncLoc(0,NULL,&index,aFuncName,...);
  if ( !sL || !index ) return NO;
  i = count the matches returned
  if ( !i ) return NO;                                 // no functions found
  ofP = NULL;
  for ( i-- ; i >= 0 ; i-- )                           // call fn. for every
element
  {
    wid = 0;
    sP = get function address
    if ( sF )
    {
      wid = get widget ID
      farFunc = near or far call?;
      id = current widget ID
      if ( wid == id )                                 // both widget IDs
the same
        farFunc = NO;
      if ( farFunc )                                   // call far in
original context
      {
        ffP = (OC__FarFuncDescPtr)allocate heap pointer
        ffP->func = sF;
        if ( ofP ) ofP->nextFunc = ffP;                // build up a doubly
linked list             ffP->prevFunc = ofP;
        ffP->options = options;
        strcpy(ffP->name,aFuncName);
        ofP = ffP;
        ffP->reply = aReplyFunc;
        ffP->aFuncParameter = aFuncParameter;
        post wake message to registerer's context referencing ffP
        aFarFunc = YES;
      } else                                           // near functions
called here
      {
        (sF)(aFuncName,aFuncParameter,id,options);// call it 'near'
        if ( aReplyFunc )                              // call the reply fn.
          (aReplyFunc)(aFuncName,aFuncParameter,id,options);
      }
    }
  }
  if ( !aFarFunc && aFuncParameter && !(options & kNoParameterDelete) )
    dispose of (aFuncParameter);                       // if no far funcs,
delete
  return YES;
}
```

In the wake event handler for a far function, the logic may be implemented is as follows:

```
static void OC__FarFunkWake   (                        // far function
wake handler
        ET__NfyRecordPtr        theWakeEvent           // I:The wake
event record
                              )                        // R:void
{
  ffP = (OC__FarFuncDescPtr)extract from theWakeEvent
  if ( !ffP ) return;
  lastGuy = !ffP->nextFunc && !ffP->prevFunc;          // are we the last
function?
  if ( ffP->func )
    (ffP->func)(ffP->name,ffP->aFuncParameter,...);    // call symbolic
function
  if ( lastGuy && !ffP->reply && ffP->aFuncParameter &&
      !(ffP->options & kNoParameterDelete) )
```

-continued

```
    dispose of(ffP->aFuncParameter);                   // de-allocate if
no reply
  if ( ffP->reply )
  {
    ffP->func = ffP->reply;
    ffP->reply = NULL;
    post wake message back to caller's context referencing ffP
  } else
  {                                                    // remove from
linked list
    if ( ffP->nextFunc ) ffP->nextFunc->prevFunc = ffP->prevFunc;
    if ( ffP->prevFunc ) ffP->prevFunc->nextFunc = ffP->nextFunc;
    dispose of(ffP);
  }
}
```

The code above is simply one embodiment of a process for achieving this result. Namely, retrieving functions registered at a given scope and calling the symbolic function as appropriate. As explained above, this functional layer provides threaded asynchronous function calling behavior.

Threaded Type Dependant Invocation

In the preferred embodiment, the symbolic function capability described is extended to a type and ID dependent form suitable for use in an abstract type-dependent invocation scheme. This approach would preferably use a run time accessible type system (a methodology for "typing" data) and corresponding system ontology. In the preferred embodiment, the run time accessible types system is the types system described in the Types Patent and the system ontology is the ontological framework described in the Ontology patent. Other embodiments, however, could also be used to used.

With a types system and ontology in place, the type-less symbolic functions can be extended to a strongly typed action dependant form by taking advantage of the fact that function names are strings. Specifically, by adding a type dependent wrapper layer (the DB_calls described below), type names and unique ID numbers can be converted into unique symbolic function names by using the C programming language sprintf( ) function. For example, the internal symbolic name for an invoker for the action "myAction", on the type "MyType" having unique ID number "1234" would be "myActionMyType1234". This form corresponds to what is internally registered by the function DB_OverrideForTypeAndItem( ). The corresponding form for DB_OverrideForType( ) would be "myActionMyType". Implementation of the other DB_Override . . . ( ) style functions in the API follows directly from this approach. Using the definition of the invocation record type ET_DBInvokeRec (given below), the basic logic for the function invocation function (DB_Invoke( )) could be implemented as follows:

```
ET_ViewHdl DB_Invoke          (                      // Invoke by type and action
            OSType             aDataType,            // I:Key Data type
            charPtr            actionName,           // I:Action name or NULL
            ET_DBInvokeRecPtr  iR,                   // IO:The invoker record
            int32              options               // I:Various logical options
                              )                      // R:non-zero for success, or NULL
{
  dT = aDataType;
  if ( !iR->dataType )
    iR->dataType = aDataType;
  if ( aDataType )
  {
    dp = resolve data type(aDataType);               // check we know the data type
    while ( !dp )                                    // nothing specific try ancestors
    {
     tid = TM_KeyTypeToTypeID(dT,NULL);              // get ancestral key type
     if ( tid )
       tid = TM_GetParentTypeID(NULL,tid);
     if ( !tid )
       return NULL;
     dT = TM_GetTypeKeyType(NULL,tid);
     dp = resolve data type(dT);
    }
    iR->options |= kIsClientServerInvokation;
    aDataType = dT;
  }
  if ( !actionName )
```

-continued

```
  {
    if ( !iR->action[0] )
     strcpy(iR->action,"Display");
    actionName = iR->action;
  } else
    strcpy(iR->action,actionName);
  stillLoop = YES;
  while ( stillLoop )
  {
    stillLoop = NO;
    strcpy(fullName,actionName);                        // first look for desired form
    if ( dp && !iR->dataItemType[0] )
     strcpy(iR->dataItemType,dp->name);
    strcat(fullName,(dp) ? dp->name : iR->dataItemType);
    strcpy(nameWithID,fullName);                        // form is 'DisplayMyDataTypeName'
    sprintf(tmp,"%lld",iR->anItemID.id);
    strcat(nameWithID,tmp);                             // name and ID override ?
    if ( !(options & kNoNameAndIdOverride) && resolve fn. )
    {                                                   // check for supression
     if ( OC_WidgetIDtoAncestorSpec(0,aScopeID,&ancestorSpec) )
     {
       if ( !DB_OverridesForTypeAndItemDisabled(aDataType,...) )
        idOverrideOK =
        OC_CallSymbolicFunction(namewithID, ...);
     }
    }
    if ( !idOverrideOK )
    {                                                   // no name and ID override...
     if ( !(options & kNoNameOverride) && resolve fullName )
     {                                                  // discard the ID part
       if ( OC_CallSymbolicFunction(fullName,iR,...) )
        return (ET_ViewHdl)~0;
     } else if ( aDataType )
     {
       dT = aDataType;
       vIf = DB_DoesInvokerExist(dT,actionName);
       if ( !vIf )
       {
        tid = TM_KeyTypeToTypeID(dT,NULL);
        if ( tid )                                      // try climbing for ancestors
          tid = TM_GetParentTypeID(NULL,tid);
        if ( tid )
        {
          aDataType = TM_GetTypeKeyType(NULL,tid);
          if ( aDataType)
          {
           dp = DB_ResolveDataType(aDataType,NO);
           while ( !dp )                               // up again!
           {
             tid = TM_KeyTypeToTypeID(aDataType,NULL);
             if ( tid )
              tid = TM_GetParentTypeID(NULL,tid);
             if ( !tid )
              return NULL;
             aDataType = TM_GetTypeKeyType(NULL,tid);
             dp = DB_ResolveDataType(aDataType,NO);
           }
           if ( dp )
             stillLoop = YES;                           // climb up and try again...
          }
        }
       } else
        return (vIf)(iR);
     }
    } else
     return (ET_ViewHdl)~0;
  }
  return NULL;
}
```

Hyperlinks

Given the type dependant, threaded invocation methodology described above, the next step is to implement the user-centric hyperlink capability. As an initial matter, the present invention uses a flexible dictionary system that can be used to build up lists of hyperlink targets and to rapidly look up the information necessary to invoke those targets when clicked on. The lexical analysis capability described in the Lexical Patent is the preferred system used to implement such a flexible dictionary system. Again, other lexical analyzer or dictionary system could also be used. In the context of hyperlinking, these dictionaries, which are implemented as lexical analyzer DBs, will be referred to as hyperlink domains. Given the lexical analyzer capabilities, adding an item to a domain (as in DB_AddToDomainDictionary) can be achieved by calling LX_Add( ) with the token string being the name involved and the token number being the corresponding unique ID. Persistence of these domains can be achieved by loading and saving the domain recognizer to/from a file placed within a hierarchical directory tree whose structure matches that of the underlying system ontology. Furthermore, looking up hyperlinks (as in DB_IsHyperlinkTarget) can be achieved by making a call to LX_Lex( ) (or a corresponding functional call). In the preferred embodiment, hyperlink domains can also be placed into active/inactive status. This can be most easily achieved by loading the corresponding lexical DBs into a linked list of such recognizers in memory on the local machine. The implementation of all hyperlink routines in the API below uses these calls to perform the functions described below.

The final component used by the present invention to support dynamic hyperlinks is a GUI framework that supports a multi-styled text display component. In other words, the hyperlink code (see PU_NotifyHyperlinkChange) implemented by the user environment must be able to examine the text in a control, and should a hyperlink phrase be found, must be able to alter the style of that portion of the text so that it is displayed appropriately for a hyperlink in the UI. This capability is supported by most non-trivial GUI frameworks (such as internet browsers) and is well-known to those skilled in the art. By combining a framework that permits alteration of text styles to indicate hyperlinks and in which the environment supplied calls DB_Invoke( ) (which is tied to a system ontology) whenever the user clicks on any text that has been altered in this manner, we have a complete user-centric type and scope dependant hyperlink system.

API Definitions

The API descriptions that follow give a sample embodiment of one basic public API that could be used by the present invention. This API is intended to be illustrative of the kinds of calls required and is by not intended to set forth any required implementation or otherwise exhaust the possible implementations. An API listing is also provided in Appendix A.

In the preferred embodiment, the function OC_RegisterFunction( ) registers a function by symbolic name for a given scope, so that it can be invoked from any other widget within that scope. The primary use of this functionality is to create a hyperlink registry to allow widgets to jump to other named locations without having to actually know where the location is or what the function it is calling actually does. In the preferred embodiment, the function registry is hierarchical with a registry potentially being attached to every ancestral level of the widget (including the widget itself). In this manner, it is possible to override the meaning of a function ("whoKnowsWhat") for an individual widget, a compound widget, a view, a view pack, or globally for the environment. This provides a great deal of flexibility in defining links between widgets and also allows certain functions to be overridden locally so that code that uses them can be modified without modifying the code itself. Preferably, functions specified as 'kFarFunction' are actually called in the context of the widget that registered them, not in that of the caller. On the other hand, 'near' functions are called in the context of the widget that makes the OC_CallSymbolicFunction( ) call. A typical symbolic function prototype might appear as follows:

```
void mySymbolicFunc   (                     // Symbolic function
         charPtr              aFuncName,    // I:Symbolic function name
         void                 *aParameter,  // IO:Parameter/Reply area (or
NULL)
         int32                widgetID,     // I:Widget ID of caller
         int32                options    // I:Various logical options
                      )                     // R:void
```

Preferably, any widget registering a function will de-register it at the functions terminate entry point. Otherwise, there is the possibility that the function may be called after the widget itself is dead. In the preferred embodiment, a routine, such as OC_DeRegisterAllFuncs( ), can be called to deregister any and all functions registered by a given widget regardless of the scope for which they were registered. An ancestorSpec of 'kViewPackSCOPE' is equivalent to 'kLocalViewSCOPE' if the calling widget is not within a view pack. When writing a 'kNearFunction' function, the near functions are called in the context of the widget that makes the OC_CallSymbolicFunction( ) call. In general the data associated with the installing widget may not be reliable and is it not safe to assume anything about the calling widget unless what the function requires/assumes in the 'aFuncDesc' parameter passed to this function is clearly described. A set of options, such as the 'kDistinguishFuncPtrs' options, can be used to allow multiple registrations of a given function name within the same widget but using distinct function addresses. Alternatively, only a single function 'funcName' can be registered for any given widget. For low-level libraries, when registering global type functions (e.g., "LanguageChange"), it is often helpful to distinguish registrations by different libraries.

In the preferred embodiment, the function OC_DeRegisterFunction( ), can be used to remove a registered function from the function registry for the scope specified. If the function was not found at the specified scope, this function returns FALSE (and preferably does not log an error).

In the preferred embodiment, the function OC_DisableFunction( ) can be used to disable a registered function from the function registry for the scope specified. If the function was not found at the specified scope, this function returns FALSE (and does not log an error). Once disabled, the function will not be called until a corresponding OC_EnableFunction( ) call is made (for the same scope but not necessarily by the same widget). In the preferred embodiment, the function OC_EnableFunction( ) can be used to enable a registered function from in function registry for the scope specified if it has been previously disabled by a call to OC_DisableFunction( ). If the function was not found at the specified scope, this function returns FALSE (and does not log an error). Since functions can be enabled and disabled by any widget within the scope, this mechanism serves as a convenient means of controlling function calls without having to add logic to the caller. In the preferred embodiment, the function OC_FunctionIsDisabled( ) allows you to determine is a specified function has been disabled for the selected scope. Similar functions could also be provided that enable or disable a function based on other factors, such as the time of day or date.

In the preferred embodiment, the function OC_DeRegisterAllFuncs( ) can be use d to remove all functions registered by the current widget (at any scope) from the function registry. If functions are removed successfully, TRUE is returned, otherwise FALSE is returned.

In the preferred embodiment, the function OC_CallSymbolicFunction( ) can be used to call a symbolic function from the symbolic function registry. Note that the result of this call reflects only whether the specified function could be found, not the result of actually calling it. In order to obtain a result back from a symbolic function (near or far), the address of a reply function (of type ET_SymbolicReply) must be provided which will be called in the same widget context as the OC_CallSymbolicFunction( ) call, and will be passed the 'aFuncParameter' value originally supplied (and also passed to the symbolic function). The parameter, if used, would be a pointer to a heap allocated block in the preferred embodiment. This approach allows the symbolic function to modify the value at that address, and allows the reply function (if specified) to examine the modified location to determine the result and then take whatever additional steps are necessary in the context of the original caller. In the preferred embodiment, the wrapping code possesses, dispossesses, and deletes the allocation (if used) according to the following rules:

1) If 'aReplyFunc' is specified, the allocation will be disposed of using KILL_PTR( ) after the reply function has been invoked.
2) If 'aReplyFunc' is not specified, the allocation will be disposed of using KILL_PTR( ) after the symbolic function has been invoked in the context of the registering widget for a 'far' function, or the calling widget for a 'near' function.

Far symbolic functions are actually called from within the event loop of the registering widget so those functions are responsible for causing the main loop of the widget to react (if required) either by posting an event/message, or other in-widget communications mechanisms. In particular, if the symbolic function needs to do something which might potentially cause the widget to be re-scheduled (such as UI operations or communication), it should preferably cause this to occur in the main widget loop, not do it itself.

Near symbolic functions are called immediately in the callers context and unlike far functions do not return to the caller until the function, and if specified, the reply function, have both been executed. If multiple different widgets have registered for the same symbolic function name at the effective scope, then every widget/function will be called (near and/or far) in succession when 'aMatchWidgetID' is 0. This approach would permit broadcast type operations, for example. In the preferred embodiment, if any registration under the same name has occurred with a tighter scope, then the widget having the tighter scope will be called thereby suppressing all calls at the looser scope.

When multiple calls are made in this manner, all called functions share the identical 'aFuncParameter' storage, which is disposed when the last invoked function/reply completes. In the preferred embodiment, a number of options bits are reserved to allow the type of parameter passed in 'aFuncParameter' to be specified in those cases where a function accepts multiple parameter types. These definitions preferably have a one-for-one correspondence with the data type definitions for the options word. Some of the parameters that could be used include:

kSymbParamTypeInvRec—parameter is an ET_DBInvokeRecPtr kSymbParamTypeInteger—parameter is a pointer to a long kSymbParamTypeString—parameter is a C string pointer In one embodiment, the 'kNoParameterDelete' suppresses all possession, dispossession, and deletion of the 'aReplyFunc' value. This may be appropriate if the memory is to stay permanently owned by one widget, or if 'aFuncParameter' does not actually represent a heap pointer.

In the preferred embodiment, the function OC_CountSymbolicFunctions( ) can be used to count the number of widgets that are registered for a given symbolic function name at the effective scope. There are certain applications of symbolic functions that operate as a broadcast mechanism whereby multiple widgets register for a given symbolic function at a specified scope and all are called/invoked when the OC_CallSymbolicFunction( ) call occurs. In most cases, the caller does not care how many functions are actually being triggered. In the event that it does, however, it may count the number and use the widget ID array returned by this function to pass to the 'matchWidgetID' parameter of other functions in order to select just a single instance (rather than all or just the first depending on the implementation). The number of widgets registered for a function at an effective scope is returned. In the preferred embodiment, to specify a search of the global registry only, use '*aWidgetID'=kGlobalSCOPE on entry. '*aScopeID' (if specified) will be 0 on exit if the function was found in the global registry. The caller will dispose of the array returned in 'widgetIDs' when no longer required.

In the preferred embodiment, the function OC_ResolveSymbolicFunction( ) can be used to determine if a given symbolic function exists, and if it does, the address of the function. The widget itself would not normally call the function (except by using OC_CallSymbolicFunction( )) because many such functions are designed to be called in the context of the widget that registered them and fail if called from elsewhere. If the function pointer is not returned, then the function will return NULL. In this embodiment, to specify a search of the global registry only, use '*aWidgetID'=kGlobalSCOPE on entry. '*aScopeID' (if specified) will be 0 on exit if the function was found in the global registry.

In the preferred embodiment, the function OC_SetSymbolicFuncData( ), can be called to attach data (or information) of a specified type to a registered symbolic function. A typical use of this function would be to attach an icon or picture to a function so that any function that is going to invoke the symbolic function can display the icon or picture associated with the function/destination. There are many other uses of this capability including communicating through the content of the data handle. The primary purpose of the ability for a sufficiently smart 'caller', however, is to establish certain information about the 'callee' before the call is made. If data is allocated and attached to a registered function, it must be deallocated at the time the function is de-registered. If an attempt is made to set function data from a widget other than the one that registered the function, it will fail. If operation is successful (meaning the registered widget was able to set function data), 0 is returned, otherwise an error number is returned.

In the preferred embodiment, the function OC_GetSymbolicFuncData( ) can be used to obtain the data (and its type) attached to a registered symbolic function. This information is associated with the function by the widget that registered it using OC_SetSymbolicFuncData( ). The purpose of this data is to allow callers to obtain additional information about the function, without actually having to call it. If the 'aDataHandle' and 'aDataType' values come back as zero, there is no data associated with the function. Error numbers are preferably returned in the case of failure. The handle returned belongs to the widget that registered the symbolic function so any caller would preferably not de-allocate it or modify the contents (unless that is it's purpose).

In the preferred embodiment, the function OC_SetSymbolicFuncFlags( ) can be called to set the flags word associated with a symbolic function. Unlike the data associated with a symbolic function, the flags word can be altered by any widget within the scope. When setting the flags, it may be helpful to get the current flag settings using OC_GetSymbolicFuncFlags( ), alter only those bits of interest, then set the flags using OC_SetSyrnbolicFuncFlags( ). Failure to follow this protocol may result in confusion in cases where multiple widgets are manipulating the flags. In the preferred embodiment, the function OC_GetSymbolicFuncFlags( ) obtains the flags word associated with a registered symbolic function. This information is associated with the function by the widget that registered it using OC_SetSymbolicFuncFlags( ). The purpose of this data is to allow callers to obtain additional information about the function, without actually having to call it.

In the preferred embodiment, the function OC_GetSymbolicFuncDesc( ) can be used to obtain the descriptive text (if any) associated with a registered symbolic function. If no description was supplied, the returned string contains "???". If descriptive text is not found, NULL is returned. In all other cases, a descriptive text handle is returned. The caller should dispose of the handle returned when no longer required.

In the preferred embodiment, the function OC_ListSymbolicFunctions( ) can be used to return an alphabetized, <CR> separated list of all registered symbolic function names for the specified scope preferably, the entries in the list have the format "www functionName" where 'www' is the widget ID of the widget that registered the function. To obtain the function description, the function OC_GetSymbolicFuncDesc( ) can be called and passed the 'www' and 'functionName' values. This function would returns a function list, or NULL if the list is empty. The caller should dispose of the handle returned when no longer required.

In the preferred embodiment, the function OC_WidgetIDtoAncestorSpec( ) can be used to convert a widget ID to the corresponding ancestor spec. If the widget ID is not ancestral to the calling widget, the function returns FALSE. In the preferred embodiment, the function OC_AncestorSpecToWidgetID( ) can be called to return the widget pointer corresponding to the ancestor specified relative to a given widget ID. The symbolic function registry uses this type of ancestor specification. In the preferred embodiment, the function OC_LowestCommonAncestor( ) returns the widget ID for the lowest common ancestor of the two widget IDs supplied (if it exists).

In the preferred embodiment, the function DB_DefineHyperlinkDomain( ) allows a hyperlink domain to be defined. The automatic hyperlinking facility assumes that hyperlink targets can be broken down first by data type (see DB_DefineDataType) and then within a given data type (People for example), as a set of groups or domains where each domain has a 'dictionary' (which is actually a lexical analyzer DB—see LX_MakeDB in the Lexical Patent incorporated herein) which contains a list of all target members that fall into that domain. In the example of the data type 'people', possible domains might be things such as politicians, military personnel, or company staff. It is permissible that a given target (or person) be a member of any number of domains, providing that the person is unique within any given domain, or if not unique, is referenced by a different name for each multiple occurrence (e.g., 'F16' and 'Falcon' might refer to the same target). Domains may be either system domains, meaning that the domain is common to all users of the system and are maintained by the system administrator, or they may be user domains, meaning that the domains are unique to each user of the system. If multiple domains recognize a given target, the first one to fire (which will be the last one to be activated) takes precedence regardless of the system or user attribute. Firing order can be controlled, if desired, by ensuring the preferred domain is activated after that of the domain over which it is preferred. In general, active system domains are loaded before user domains during startup, which normally has the effect of giving user domains precedence over system domains. Again, however, this precedence can be altered as desired. The effect of a hyperlink click is to invoke the "hyperlinkAction" action (the default if none is specified is "Display") for the data type of the domain which recognized the target. This means that hyperlinking is subject to all the same overriding and redirecting behaviors available via the DB_Invoke( ) function. This is useful because hyperlinks can be locally redirected when appropriate (with nested scope) while still following the default link if no override is found.

Once defined, a domain preferably becomes permanently known due to the fact that a domain dictionary file is created in the appropriate folder. The way to remove a domain is to call DB_UnDefineHyperlinkDomain( ). Defining a domain that is already known or for which a domain dictionary file already exists, has no effect (this function returns TRUE with no action). Domains may also be organized into hierarchies by specifying the hierarchy path as a series of ancestral domains separated by colons (e.g., "animals:mammals: people"). This feature allows whole sub-trees to be activated or de-activated at once and allows flexibility in organizing domains according to any desired breakdown. Since a folder hierarchy is created to reflect the domain specification, it is important to ensure that all fields of a domain name meet the naming criteria for the underlying file system. In the preferred embodiment, all necessary ancestral folders will be created automatically when the domain is defined so it is not necessary to explicitly create the tree in a top down manner. To avoid confusion, domain names should be unique. Furthermore, it is not desirable to define a system and user domain name of the same name, nor is it desirable to have a domain name of a different 'aDataType' with the same name.

In the preferred embodiment, the function DB_AddToDomainDictionary( ) can be used to add a new target to the specified active hyperlink domain dictionary, thereby making it available as a hyperlink destination. To add targets to an inactive domain, it is best to temporarily activate (but not compact) the domain first. The most efficient way to add a series of targets to a given domain is to first ensure the domain is active (and not compacted), then add the targets (specifying the 'kNoSaveDomainToFile' option), and finally save the domain by making a call without the 'kNoSaveDomainToFile' option and NULL specified for 'aTargetName'. Lastly, the domain should be deactivated if it was not originally active. Preferably, this logic is handled automatically within a domain populator function as called via DB_CallDomain- Populator( ). For correct operation, hyperlink targets MUST start with an alphanumeric character, not a delimiter or white-space. Alphanumeric characters may be in an alternate language as well as English so hyperlinks can operate in any language or script system.

In the preferred embodiment, the function DB_SubFromDomainDictionary( ) can be used to remove a target from the specified active hyperlink domain dictionary, thereby making it unavailable as a hyperlink destination. To remove targets from an inactive domain, the domain should be temporarily activated (but not compacted) first. If a series of targets to a given domain will be removed, the domain should be activated (or ensure the domain is active and not compacted), then calls made to remove the targets (specifying the 'kNoSaveDomainToFile' option), and the domain saved by making a call without the 'kNoSaveDomainToFile' option and NULL specified for 'aTargetName'. Lastly, the domain should be de-activate if it was not originally active.

In the preferred embodiment, the function DB_NotifyHyperlinkChange( ) should be called whenever some kind of change is made to the hyperlink dictionaries that requires the UI to be refreshed in order to determine again which hyperlinks are available. In the preferred use of this hyperlink API, this function does not need to be explicitly called since the calls are made automatically as appropriate.

In the preferred embodiment, the function DB_IsHyperlinkTarget( ) can be used to determine if a given string is a hyperlink target and, if so, what the data type, domain name, action, and unique ID are for that target. This function may be used to perform different hyperlinks using DB_Invoke( ) while specifying additional options or parameters based on detailed knowledge of the target, domain, or data type involved. Normally, DB_HyperlinkToTarget( ) would be used to explicitly invoke a hyperlink via some mechanism other than the automatic hyperlinking behavior provided for all text controls in the system. By using this function (followed by a call to DB_Invoke or DB_HyperlinkToTarget), it is possible to hyperlink to targets that are not in active domains. On input, if 'aDataType' is NULL or non-NULL with a value of zero, this is taken to imply that any key data type is acceptable, otherwise the value of '*aDataType' is used to restrict the search to only those active domains of the data type specified. On output, if 'aDataType' is non-NULL, it will hold the value of the key data type for which the target was found, or zero if not found. Additionally, on input, if 'aDomainName' is NULL, or non-NULL with a string value of " ", this is taken to imply that any active domain name is acceptable, otherwise the value of the string pointed to by '*aDomainName' is taken to be a domain name in/below in which to look to the exclusion of all others. On output, if 'aDomainName' is non-NULL, the contents of the buffer to which the parameter value points will be replaced by the domain name in which the target was found (or an empty string if not found). Note that 'aDomainName' may be a partial path in which case the search for targets is restricted to all active domains below that path. In this embodiment, if and only if 'aDataType' and 'aDomainName' are specified explicitly, inactive domains will also be examined using this function. In all other cases, only active domains are considered. Because the contents of 'numChars' is set to the actual number of characters consumed when scanning for the target (found or otherwise), the string pointed to by 'aTargetName' can be an arbitrarily long sequence of text which is scanned for possible targets by successive calls. This is exactly what the function DB_FindNextHyperlinkInText( ) does. In such a case, the end of the string being scanned can be detected by the fact that 'numChars' will be zero. When skipping over characters, this function can also use a multilingual call to determine where alphanumeric strings begin and end. This means that hyperlinks can be either in English or the alternate language. It also means that when making a series of calls for a larger string, any trailing white-space and delimiters will be skipped such that only string elements that start with an alphanumeric character and are preceded by either a delimiter or white-space will actually be examined as potential targets. By making this simplification, the process of scanning a large block of text is greatly simplified and significantly optimized for speed. For this reason, hyperlink target name strings would preferably not begin with white-space or delimiters. Note that if 'maxChar' is specified (rather than defaulting it to zero), this routine will continue to scan until it reaches the 'maxChar' character position. This means that the text string supplied may contain embedded nulls.

In the preferred embodiment, the function DB_HyperlinkToTarget( ) can be used to find a hyperlink to the specified target. Since hyperlink handling is automatically supported for any and all text controls within the system, this function would only be used to invoke a hyperlink jump by some other mechanism. If data type and domain name are both specified explicitly, this function could also be used to hyperlink to a target that is not in an active domain (although this may be slower than a call for an active domain due to the need to temporarily load the domain dictionary).

In the preferred embodiment, the function DB_IsKnownDomain( ) can be used to determine if the specified domain is known or not. A domain is known if the domain dictionary file for the domain exists (even if the dictionary is empty). A domain does not have to be active to be known, however, the corresponding data type would preferably be defined. For a non-leaf domain, the value of 'isAutoActivate' will always be FALSE.

In the preferred embodiment, the function DB_IsActiveDomain( ) can be used to determine if the specified domain is active or not. Inactive domains are not automatically used when looking for targets.

In the preferred embodiment, the function DB_ActivateDomain( ) can be used to activate the specified domain. Activating a domain causes the domain dictionary to be loaded into memory and to be used automatically whenever any text within a text control is scanned for potential hyperlinks. In other words, all targets in the domain become potential hyperlinks. If the domain dictionary is compacted when it is activated, the dictionary will occupy significantly less memory. It is preferably not to add or remove targets from a compacted dictionary. A non-leaf domain may also be specified (domain name path ends in ':') in which case all leaf domains within (to any level) will be activated. In the preferred embodiment, the function DB_DeActivateDomain( ) can be used to deactivate a specified domain. Deactivating a domain causes the domain dictionary to be removed from memory thus preventing any targets within the domain from being used as automatic hyperlinks. If a domain has been designated in the optional hyperlinking administration window as 'auto activate' then deactivating it will have only a momentary effect since it will be re-activated almost immediately as a result of the auto-activation process.

In the preferred embodiment, the function DB_GetDomainAction( ) can be used to return the invoker action associated with the specified hyperlink domain. This action is used when calling DB_Invoke( ) during the hyperlinking process. The specified domain need not be active to discover its action.

In the preferred embodiment, the function DB_SetDomainAutoFlags( ) can be used to control whether the specified hyperlink domain is auto-activated during environment initialization. By designating a domain as auto-activating, all hyperlinks in that domain will be immediately available as soon as the application runs. For such domains, the 'autoCompact' flag can also be used to determine if the domain should be compacted when it is auto-activated.

In the preferred embodiment, the function DB_SpecifyDomainPopulator( ) can be used to specify a domain populator function to be used to fill out the dictionary associated with a domain. It is often the case that hyperlink domains correspond to entries in an external database of some kind. In the preferred embodiment, a populator function would perform a query(s) on that database to obtain the set of all targets in the domain and then loop adding the targets to the domain using DB_AddToDomainDictionary( ). The hyperlink configuration view allows the invocation of the populator function for any given domain as well as configuration of which domains are to be active at any given time. At the time the domain populator is called, the domain itself will preferably have been made active (temporarily if appropriate) and the domain dictionary in memory will be empty. If the domain populator function returns FALSE, the domain dictionary in memory will be discarded and replaced (if appropriate) with the dictionary from the domain dictionary file. During all calls from within a domain populator function, the save to file behavior of DB_AddToDomainDictionary( ) is automatically inhibited for this reason. A typical domain populator function might appear as follows:

```
EngErr myDomainPopulator     (                        // my domain populator
          ET_TypeID          aTypeID,                 // I:Data type for the domain
          charPtr            aDomainName,             // I:Domain name
          charPtr            populatorDescription,    // I:Populator description
          long               aParam                   // I: custom parameter or 0
                             )                        // R:0 for success,else error #
```

In the preferred embodiment, the function DB_CallDomainPopulator( ) can be used to call the hyperlink domain populator function (if there is one), passing an arbitrary parameter. When populator functions are called from within the standard hyperlink configuration UI, this parameter will be zero.

In the preferred embodiment, the function DB_UseDefaultDomainPopulator( ) can be used to specify the use of the generic hyperlink domain populator provided for persistent data types derived from the key type 'DTUM' (i.e., Datum).

In the preferred embodiment, the function DB_FindNextHyperlinkInText( ) can be used to scan a block of text looking for hyperlink targets within it. In the preferred embodiment, the function is called with both 'aDataType' and 'aDomainName' set to zero, which causes it to utilize all active hyperlink domain dictionaries to scan the text looking for a match. The data type may be restricted or a partial hyperlink domain specified. In particular, if the data type is specified and a full or partial domain name is given, this function will also find targets in any inactive hyperlink domains specified. See DB_IsHyperlinkTarget( ) for details on restricting the hyperlink search. This function forms the basis of the automatic hyperlinking capability provided by the UI encapsulation layer whereby all text in a text control is scanned and hyperlinks inserted (by turning the target word/phrase blue and underlining it, for example) and handled when clicked on by the UI layer. This function will return successive hyperlinks on each call until there are no more hyperlinks left in the text at which time it will return FALSE. The value of '*context' should be set to zero to start the scanning process, otherwise the value should be preserved between successive calls to this function.

In the preferred embodiment, the function DB_ListKnownDomains( ) can be used to return a hierarchical Lex DB containing all known system or user hyperlink domains. The resulting Lex DB may be used either to recognize domain names, or it may be used to process/list the domains using the facilities provided by LX_List( ) and the associated functions such as LX_PruneList( ) and LX_Save/RestoreList Context( ). The LexDB returned by this function includes the data type name prefix in the domain paths. Calls to other functions in this API do not contain this prefix for the 'aDomainName' parameter.

In the preferred embodiment, the function DB_ListActions( ) can be used to return an alphabetized, carriage return (<nl>) separated list of all the invoker actions supported for a given key data type. The list is repeatedly initialized until the tables are exhausted at which time the next symbol is listed and displayed. NULL is returned in case of an error. The list of actions returned may include actions for which there is not actually an invoker function (see DB_DefineInvoker) but for which symbolic overrides have been defined. The routine DB_DoesInvokerExist( ) can be used to determine if this is the case.

In the preferred embodiment, the function DB_DataTypeToName( ) can be used to return the full symbolic name of the specified key data type. In the preferred embodiment, the function DB_NameToDataType( ) returns the key data type given a full symbolic name, type name, or an alternate name. In the preferred embodiment, the function DB_OSTypeToString( ) can be used to convert a long to display as a character string. The normal application would be for use with OSTypes.

In the preferred embodiment, the function DB_OverrideForTypeAndItemExists( ) can be used to determine if an override exists for the specified key data type and item ID and, if so, the scope relative to the asking widget. This information can be used to determine if it is possible to display a given type within a particular calling context.

In the preferred embodiment, the function DB_OverrideForTypeAndItem( ) can be called in order to register to handle a given action for a specified key data type and a unique ID of that type. This capability can be used to cause re-mapping of the view invoked on a DB_Invoke( ) call for an desired scope. This is particularly useful in ensuring that if data for a given item is already being displayed, another view is not launched but instead the existing view is simply brought forward. All items of a given type can be re-directed using DB_OverrideForType( ). In the preferred embodiment, the function DB_Invoke( ) will first check for a specific override and then for a general one. In the preferred embodiment, the function DB_UndoOverrideForTypeAndItem( ) can be used to remove an override registered using DB_OverrideForTypeAndItem( ). If no such override exists, the function will do nothing.

In the preferred embodiment, the function DB_DisableOverrideForTypeAndItem( ) can be used to suppress overrides for a given key data type, ID, and scope. The suppression remains in effect until a call to DB_EnableOverrideForTypeAndItem( ) is made. Any widget may remove the suppression, not just the one registering it. When called with 'anItemID' of zero, this function disables all ID based overrides for the type and scope. This disable is in addition to any ID specific disables that may be in effect, and can be removed by passing 'anItemID' of zero to DB_EnableOverrideForTypeAnd Item( ). In the preferred embodiment, the function DB_EnableOverrideForTypeAndItem( ) can be used to remove any suppression for a given type, ID, and scope registered by DB_DisableOverrideForTypeAndItem( ).

In the preferred embodiment, the function DB_OverrideForType( ) can be called in order to register to handle a given action for a specified key data type. This capability can be used to cause re-mapping of the view invoked on a DB_Invoke( ) call for an desired scope. Note that you can re-direct specific items of a given key data type using DB_OverrideForTypeAndItem( ). In the preferred embodiment, the function DB_Invoke( ) will first check for a specific override and then for a general one. In the preferred embodiment, the function DB_UndoOverrideForType( ) removes an override registered using DB_OverrideForType( ). If no such override exists, the function will do nothing.

In the preferred embodiment, the function DB_DisableOverrideForType( ) can be used to suppress overrides for a given type and scope. The suppression remains in effect until a call to DB_EnableOverrideForType( ) is made. Any widget may remove the suppression, not just the one registering it. In the preferred embodiment, the function DB_EnableOverrideForType( ) may be called to remove any suppression for a given key data type and scope registered by DB_DisableOverrideForType( ). In the preferred embodiment, the function DB_OverridesForTypeDisabled( ) can be called to determine if overrides for a given key data type and scope have been suppressed.

In the preferred embodiment, the function DB_OverridesForTypeAndItemDisabled( ) can be used to determine if overrides for a given key data type, ID and scope have been suppressed.

In the preferred embodiment, the function DB_OverrideForTypeExists( ) can be used to determine if an override exists for the specified key data type, and if so with what scope relative to the asking widget. This information can be used to determine if it is possible to display a given type within a particular calling context. Even though an override exists, it may have been disabled. Preferably, DB_OverridesForTypeAndItemDisabled( ) is used to determine if this is the case.

In the preferred embodiment, the function DB_DefineInvoker( ) can be used to define the view invoker function that should be called when an attempt is made to perform a specified invoker action on a given key data type. For example, the 'actionName' parameter might be "Display", in which case any subsequent call to DB_Invoke( ) for the action "Display" will result in the specified invoker function being called. The invoker function is responsible to instantiating or launching the view necessary to perform the requested action for the specified data type. Custom named invoker actions may be defined for each different data type as appropriate. In the preferred embodiment, certain predefined action types are defined and would preferably be supported by a given key data type (by defining the necessary invokers) wherever possible:

- "Display" The invoker should display the selected data item as appropriate, but may not allow editing. This action is required for IP notification to be effective in this embodiment.
- "Edit" The invoker should display and allow edit/update of the data item.
- "Select" The invoker should display a list of items and notify the caller of any selection made by the user.
- "Print" The invoker should print the selected item in the appropriate format (may not be a view launch).
- "Info" Display information associated with the type (in a widget modal window, NOT actually a view launch). This action is required to place a "Show Info" button in the pending views window for this type in this embodiment.

If 'anInvokerFn' is NULL, this function can be used to define an action type to Database such that the available actions for the type can be returned on a subsequent DB_ListActions( ) call or used in action overrides. Whenever an override is registered for a defined type (i.e., from a call to DB_DefineDataType), the corresponding action is automatically registered for the type using this function. In this way, it is possible to determine the full set of actions (whether invoker based or via symbolic overrides) for a type using DB_ListActions( ). Any type manager type that is descended from a type manager type that is also a key data type will inherit the invokers and actions of the key type. In the preferred embodiment, the function DB_UnDefineInvoker( ) can be used to remove the existing definition of an invoker function for the specified key data type and action, presumably in preparation for defining a replacement function using DB_DefineInvoker( ). If invoker is removed, TRUE is returned, otherwise FALSE is returned. In the preferred embodiment, the function DB_DoesInvokerExist( ) can be used to determine if an invoker function exists for the specified key data type and action. An invoker function address is returned, if it exists; otherwise NULL.

In the preferred embodiment, the function DB_Invoke( ) can be used to call the registered invoker function for the key data type and action specified. The result is normally to instantiate or launch another view. It is also possible, however, that the function will execute entirely within the original caller's widget context. Examples of such invokers might be "Print" or "Info". This function, and the 'ET_DBInvokeRec' record that it uses, could also be used for other launcher/launchee situations even if the implementation below varies. In all cases, the 'anItemID' field of 'iR' would preferably be filled out with a unique item number that can be used by the invoked function to determine which item of a set of items is required. The caller, depending on the situation and depending upon whether the caller has already fetched the information necessary to accomplish the invocation, may also fill out other fields. In order to provide sufficient flexibility to allow general use, this routine will preferably accept an 'aDataType' value of zero as meaning that there is no true data type corresponding to this invocation, but nonetheless the routine DB_Invoke( ) is being used. In this case, it is preferably that the 'dataItemType' field of the 'iR' record contains a string describing the data type involved (e.g., "My data type"). DB_Invoke( ) will take this string, concatenate it to the 'actionName' string (for example "DisplayMy data type"), and check for the presence of a registered symbolic function with that name (see OC_RegisterSymbolicFunction( )). If such a function is found, it will be invoked.

Within this symbolic function, any action necessary to accomplish the actual invocation can be performed. The same symbolic function override capability exists for true data types, i.e., if a function "DisplayNewswire" exists for the data type whose name is 'Newswire' then it will be called in preference to the registered invoker function for 'Newswire'. This feature allows registration of invoker overrides at various scopes in order to re-direct the behavior. This feature is also what allows DB_Invoke( ) to be used as a universal invocation method (see description above). In the preferred embodiment, the functions DB_OverrideForTypeAndItem( ) and DB_OverrideForType( ) are provided to allow a convenient means of overriding (using symbolic functions) the function invoked for either a specific item ID and data type (see DB_OverrideForTypeAndItem) or a specific data type regardless of ID (see DB_OverrideForType). In the described embodiment, the 'iR' parameter must be a pointer allocated in the heap, it cannot be a stack variable. If a result (or an error) is returned, the original caller is responsible for disposing of 'iR'. In the preferred embodiment, if the 'actionName' parameter is NULL, this function attempts to invoke the "Display" action (assuming an invoker for "Display" has been defined).

In the preferred embodiment, the function PU_CursorToHyperlink( ) can be called by the environment within the widget context during idle time. This function can be used to determine what hyperlink, if any, the cursor/mouse is currently over provided that it is called within the appropriate widget context. By doing this, the environment knows when a user clicks on a hyperlink within some text and can automatically invoke the link as necessary. In systems including drag-and-drop, this mechanism is extended to automatically follow any hyperlink over which the user hovers while executing a drag so that the user can use the hyperlink mechanism as part of the navigation process during drag-and-drop operations.

In the preferred embodiment, the function PU_NotifyHyperlinkChange( ) can be called automatically by the environment in order to ensure that all text controls display the correct hyperlinks within them (see DB_NotifyHyperlinkChange). In the preferred embodiment, the function scans all widget contexts, and all windows within those widgets looking for text controls. The function then examines the text within those controls for possible hyperlinks (see DB_FindNextHyperlinkInText) and if one is found, alters the style run for the text portion that represents the hyperlink to the appearance necessary to indicate to the user that a hyperlink is present. This means that any UI displayed by the system will always show whatever hyperlinks exist for the currently active domains and this appearance will be dynamically updated should any change occur in the users hyperlinking configuration. This feature enables a truly dynamic and "real time" hyperlinking system.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. Finally, although described with reference to "Internet" terms such as hyperlinking, this invention could be applied to content from any number of different environments. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

Appendix 9

A SYSTEM AND METHOD FOR REAL TIME INTERFACE TRANSLATION

BACKGROUND OF THE INVENTION

The process of 'localizing' a software application (i.e., changing it to display its user interface in another language other than English) has historically been a very expensive and time-consuming business. So much so that the majority of software programs are never localized to any other language. An industry has sprung up to try to help companies localize their software by providing localization experts and target language speakers. These services are expensive and require the disclosure of sensitive trade secrets, such as source code, to third parties. In the last five years of so, the operating system manufacturers and programming language designers have made some steps towards trying to alleviate these problems. In all such cases, however, the basic approach is to have all user interface strings come from a 'resource' that is loaded from a different location depending on the language that is being used by the program. In this way, as long as the programmer always obtains text from this source through the mechanism provided, the code written should operate equally well in another language provided that all of the corresponding resources are available in that language. This approach, while an improvement over the previous situation, still has many shortcomings.

One problem with this approach is that it forces all code to be written from the outset with localization in mind. The programmer is no longer free to simply add or alter the text content of the user interface and certainly cannot use a string constant in the program source code. Because there is a natural tendency for programmers to use such content, however, it will often happen regardless of localization policies. The result of this approach to localization is that the program becomes unreadable, since it is very difficult to see by examining the code what is being 'said'. Another problem with this approach is its limited ability to handle variable strings (i.e, those strings in which a portion of the string, such as the time, varies while the rest is constant). Yet another negative in this approach, regardless of the particular flavor (since all are basically similar), is that when strings are read back from the user interface elements (e.g., the name of a button), the strings can no longer be assumed to be in English and thus code that manipulates the UI cannot perform simple operations like checking if the button name is "OK" but must instead find a localization agnostic way to achieve this simple operation.

The end result of all these shortcomings is that designing a program for localization takes a lot of work and discipline, makes the code base obscure and highly dependant on the localization metaphor, and denies to programmers the simplifying model that their application is running only in English. What is needed then is another approach to localization that does not require any special calls from the programmer, does not deny the use of simple English string constants, is platform and language independent, and maintains the ability to read back English from the elements of the UI.

SUMMARY OF THE INVENTION

The present invention provides a localization system that is completely platform independent, requires no support from the underlying language or operating system, meets all of the goals listed above, and also provides some other significant benefits not possible with traditional resource based approaches. In the preferred embodiment, the only time text is localized is as the text is actually drawn to the screen, it is not even localized within the building blocks (controls, windows etc.) of the graphical user interface (GUI) environment being used. Initially, the GUI environment makes a call for the translation immediately prior to rendering the interface on screen. This callback can be facilitated via a single entry point in the "draw string" call which is generally made to the underlying OS by the GUI environment. The dictionaries for a given GUI are built up automatically at the time of rendering and do not need to be predefined or set up. The key to this approach is the ability to very rapidly look up English language strings in a number of translation dictionaries so that the strings can be translated in real-time and on-the-fly. In one embodiment, the dynamic and fast inverted file dictionary used for this purpose is the lexical analyzer functionality described in Appendix 1 combined with the "string list" capability described in Appendix 2. Alternatively, the "string list" capability, or indeed any rapid string lookup facility, will suffice.

The primary components of this invention are:

- A lookup mapping between text fonts in English (e.g., Courier, Geneva etc.) and the corresponding font to be used in a foreign language. Often there is a 'bilingual' font, which is one whose character encodings can display both English text and foreign text (usually for 8-bit encodings these characters have the most significant bit set for non-English characters).
- A set of dictionaries mapping English phrases into the corresponding phrase in another language as expressed in the text encoding for the mapped font selected for that language.
- Preferably, a GUI environment that is capable of making a callback whenever it is about to write a string to the interface. Alternately, one can 'patch' the DrawString( ) call of the underlying OS (which will be used by virtually any GUI environment) so that the GUI environment can be trapped when it draws and caused to translate. This patching approach, while practical, is less desirable and provides less control over some of the more exotic features described below. The parameters to the DrawString( ) callback (or patch) must include the English string to be drawn (modified on translation), the bounding rectangle into which the string will be drawn (may be modified), the font characteristics (font, size, style etc. may be modified), and the text justification (may be modified).

BRIEF DESCRIPTION OF THE DRAWINGS

FIG. 1 illustrates the callback translation algorithm of the present invention;

FIG. 2 illustrates a sample screen for selecting the language to be used to display the GUI;

FIG. 3 illustrates a sample screen that has been translated from English to Arabic.

DETAILED DESCRIPTION OF THE PREFERRED EMBODIMENT(S)

Appendix A (attached) provides a sample C language Application Programming Interface (API) to the translation facility of this invention.

A key difference with conventional approaches and the present invention is that the dictionaries of the present invention need not be pre-defined but can instead be created dynamically at the time of rendering. Referring now to FIG. 1, the "callback" translation process is illustrated. when a program is running in foreign language 'X' and it makes a call 110 to render the string "the cat sat on the mat" in that language, the callback looks 120 for a translation of this phrase and if not found 130, adds 135 the phrase to the dictionary of phrases that need to be translated. If found 140, the phrase associated with the string in the dictionary of phrases is rendered 145 by the program. This means that the dictionary creation happens automatically as a result of program execution without regard to where the string itself came from. This also means that the programmer is free to use English string constants in his code while being assured that such constants will translate just like any other strings. This is a huge simplification of the programming model. The preferred way to dynamically build dictionaries and rapidly look up large numbers of phrases being drawn to the UI in these dictionaries, is to use the lexical analyzer facility described in Appendix 1 in combination with the "string list" capability described in Appendix 2. Alternatively, almost any sufficiently rapid string lookup capability will suffice. The approach described in the preferred embodiment (i.e., to use dynamic lexical analyzer and string list construction) is both fast and capable of very large dynamic dictionary building.

The lexical analyzer and string list tables that make up the "inverted file" dictionary lookup are saved between runs into files, and each dictionary is named based on the context of its use. There may be any number of distinct dictionaries in the system depending on how may different subsystems make calls back into the translation API and for what purposes. The primary routines involved in this dictionary construction and reference process (in addition to the DrawString( ) callback) are XL_GetString( ), XL_vSprintfCatHdl( ), XL_SprintfCatHdl( ), XL_GetDictionary( ), XL_SaveDictionary( ), and XL_FlushDictionaries( ).

The routine XL_GetDictionary( ) returns a reference to a named source (English) or target (other language) dictionary. If the dictionary is not currently in memory, it is loaded. If it does not exist, it is created (empty) as is the corresponding dictionary file. A programmer can use this function to explicitly force pre-loading of a dictionary before use. Alternatively, automatic saving may be suppressed, the handle to the source dictionary obtained and then a save can be forced by the routine. This is most useful when it is expected that many words will be added to the dictionary at once as this approach optimizes the process so that only a single save is required. Referring now to FIG. 1, pseudo code for this routine is provided. In this example, if the current language is English and 0 is passed for 'aLanguage', this function will return NULL since there is no target dictionary for English. To obtain the source dictionary, 'IcAmericanEnglish' (in this example, the language from which all others are translations) must be passed explicitly. If a dictionary has already been referenced and is thus loaded into memory cache, it is simply returned.

XL_SaveDictionary( ) saves a dictionary to the corresponding dictionary file. This action is normally automatic unless dictionary saves are suppressed (using the option described above). In such a case, the dictionary reference will need to be passed using this routine in order to "force" a save after all additions have been made.

Another routine is provided, XL_FlushDictionaries( ), which forces any un-saved dictionary changes to be flushed to file. This would be most applicable when automatic saves have been suppressed.

Another routine is provided, XL_GetDictionary( ), which provides basic dictionary building operations. For each dictionary(ies) involved, the routine looks up the English language phrase in that dictionary, and if not found, adds the phrase to the target dictionary (and the source if not found there). This process is illustrated in FIG. 1.

In the preferred embodiment, this invention maintains a list of those languages that are supported and the corresponding language name and language code (which is basically a lookup index into the various tables required to support the language). A parameter, 'aLanguage', corresponds to the index necessary to locate the language concerned in the supported language tables. Two special cases are defined. A language code of 'kCurrentLanguage=0' is interpreted to mean the language currently in effect (saved in a global). Most if not all calls to the translation facility will specify a language code of zero, which will cause the result to automatically track the language the user has selected. This language may be changed as the program is running which will result in the immediate and dynamic translation of the UI into the newly selected language. This is a far more powerful capability than most localization approaches which tend to work only in one language. Indeed, it is so useful to be able to dynamically flip languages that language code 'kAlternateLanguage' is special case to mean the 'alternate language' which is a user configurable preference (saved in a global). This improvement reflects the fact that most users of foreign languages may still need to flip dynamically back and forth between that language and English as part of their normal workflow. As a result, any application built to work in conjunction with this translation methodology can provide a user with the ability to flip the language used to render the UI "on the fly".

For any supported language, this methodology also provides certain basic mapping tables indexed by language code. These are as follows:

- A sort order mapping. This maps each character encoding for the language into their corresponding lexical sort order. This is used so that list sorting in the UI occurs properly. Access to this capability from the UI and code is via the routines, in this embodiment XL_strcmp( ), XL_strncmp( ), XL_strcmpNC (case insensitive), and XL_strncmpNC(case insensitive). These functions are essentially identical to the standard C libraries of the same name but utilize the language code to select the necessary sort order mapping table.
- A list of additional punctuation characters specific to the target language.
- A table mapping language code index for such things as language name, script system (e.g., Roman, Cyrillic etc.), sort order mapping table, and punctuation character list.
- A table encoding for each character in the language knowledge of whether that character is a letter, number, etc. These characteristics provide language dependant capabilities identical to those provided for English by the standard ANSI C library functions. In the illustrated embodiment, these capabilities can be accessed via the following functions: XL_isalnum( ), XL_isalpha( ), XL_iscntrl( ), XL_isdigit( ), XL_isgraph( ), XL_islower( ), XL_isprint( ), XL_spunct( ), XL_isspace( ), XL_isupper( ), XL_isxdigit( ), and XL_isdiacritic( ). The last routine is applicable only to non-Roman script systems and has no ANSI correlate. This routine determines if the character involved is in fact a diacritical mark (e.g., the French circumflex accent) and not a basic character in the alphabet. Diacriticals are crucial in constructing some non-Roman script languages such as Arabic.
- A pair of tables mapping upper and lower case characters to the alternate case equivalent (if relevant in the script system concerned). These mappings could also be accessed by separate routines, XL_tolower( ) and XL_toupper( ), which are language dependant versions of the ASCI C equivalents.

In the preferred embodiment, a number of API routines are also provided that can be readily implemented as simple operations on these mapping tables and are not further described herein.

The key algorithm of this invention is the routine XL_GetString( ). This routine, as illustrated in FIG. 1 above, translates an English String to another supported language. If the translation cannot be performed, the English string is copied over unmodified and the function returns FALSE. Otherwise the 'xlatedStr' output will contain a pointer to the translated output string. In the case that a translation cannot be made, the un-translatable string is added to the specified dictionary (which is updated/saved). This means that at a later time, either a person or a separately automated process can enter the necessary translation in the target language into the dictionary. Alternatively, the dictionary can be exported as a glossary containing a series of English strings together with the translated string on each line where the two parts are tab delimited. Such glossaries can be bulk translated by language experts and then re-imported to form the corresponding runtime dictionaries.

The details of this import/export process can be readily deduced by application of the other API functions described herein. If a dictionary selection string is set to NULL, the function XL_GetString( ) will attempt to find a translation in all available dictionaries, starting with the last one in the list and ending with the standard built in dictionary. By starting with the last dictionary on the list, custom dictionaries to be used to override a standard dictionary. In this NULL case, the English string associated with a failed translation will be written to the standard dictionary and saved. In addition to simple translation of strings, this function can perform complete sprintf( )-like functionality including the independent translation of each substitution sequence once it has been substituted.

The present invention is also capable of re-mapping the substitutions to a different order within the output string in order to account for the different grammar of other languages. To illustrate this, assume that the call below that requests a translation of a dynamic English string into the equivalent Arabic:

```
XL_GetString(    NULL,kArabic,&resultStr,
        "Schrodinger's cat %s has %5.3f lives left out of %d",
        kDoSprintfTranslate,catName,livesLeft,9);
```

and that in the Arabic standard dictionary, the translation of the string above contains: " . . . arabic1 . . . %2 . . . arabic2 . . . %0 . . . arabic3 . . . %1". In this case, the number and type of the substitution specifiers must exactly match the number in the English string, however, the order may be different (to account for different word ordering between languages). In this example, the correct re-ordering operations are performed by substituting the specifier '%' in the translated string followed by a decimal number (which gives the zero based index of the corresponding substitution string in the original English string). This process allows the translation capability to easily handle variable strings without causing undue dictionary clutter, and is yet another advantage of the translation scheme of this invention. This capability is not supported by other existing translation schemes. Substitutions that cannot be translated will be made in English into the foreign string. Numeric values are translated into the appropriate foreign symbols when appropriate (e.g., Arabic) unless suppressed using 'kNoNumericTranslate' option.

Referring now to Appendix A, the pseudo code for the algorithm involved in XL_GetString( ) is provided. The routines XL_vSprintfCatHdl( ) and XL_SprintfCatHdl( ) are merely specialized forms of calls to XL_GetString( ), which both call, and are provided primarily as a convenience.

The process of looking up and mapping the strings detailed in the algorithm above is based on the routine LX_Lex( ) which yields a string list offset (ET_Offset—Appendix 2) to the translated string, while adding strings to the dictionary is essentially a call to LX_Add( ). Both lexical functions are fully described in that application, which is expressly incorporated herein.

Another algorithm involved in the preferred embodiment of this invention is the DrawString( ) callback that makes the actual transformation prior to rendering to the screen. The pseudo code for this function as provided in Appendix A (depending on GUI support level). This callback first determines the current language selected (via a global) and the font and other settings passed in on the call from the GUI framework. In one embodiment, the callback could include logic associated with text justification and font mapping, which can be implemented in any number of ways that would be obvious to those skilled in the art. In the preferred embodiment, the callback would also include two other calls. The first is a call to XL_GetString( ) to make the actual translation (explained above). The second call is to a routine, hereinafter called UI_ShrinkToFit( ). This function will attempt to modify a string's drawing attributes to get it to fit within a specified rectangle. This function will condense, and/or modify the text style, and/or shrink the text down to a size that fits within the bounding rectangle. The font size lower limit is 6 points. In the end the text will have its Font size and Font Style manipulated to get as much of the text in the text rectangle. In the preferred embodiment, the function will also return the fixed number of pixels that would be required to adjust the rectangle to keep the text centered vertically. This routine would be particularly useful if the translated string contained a vastly different number of characters than did the original and thus may no longer fit comfortably in the bounding rectangle originally specified on the screen. Since the bounding rectangle of the text cannot be grown without the risk of it clobbering other aspects of the GUI, this routine is responsible for making whatever adjustments are necessary to accommodate the new text into the space originally laid out for the English control text. In many cases, this routine will reduce the font size which may in turn result in text that is not vertically centered. In such a case, this 'fix' amount would be returned by UI_ShrinkToFit( ) and used to adjust the bounding rectangle in order to keep the text centered.

The exact details of this shrinking process depend on the underlying font support of the native operating system. The basic approach, however, is to loop attempting successive modifications to the font rendering characteristics until the text can be made to fit including (in order) adjusting:

a) The number of lines of text displayed (including use of word wrapping)

b) The bounding box itself (within clipping limits)

c) The text style may be changed to 'condensed' d) Other style attributes such as 'bold', 'outline', 'shadow' etc. may be stripped off e) The font size may be reduced gradually down to a 6-point lower limit.

Referring now to FIG. 2, an "Error Browser" window is illustrated running in English and the user is in the process of selecting the Arabic language from the language selector menu. FIG. 6 illustrates the appearance of the same window after translation into Arabic. As FIG. 3 illustrates, no translation for the English phrase "Browser" 310 was found (nor for the titles of the columns 320 in the top list) in the dictionaries and thus these strings 310, 320 are still displayed in the original English (see the algorithm for the DrawString described above). If the user subsequently added a translation for these phrases then these strings also would be translated in future window invocations. Note also that in addition to translating the window text, the UI has been flipped automatically from left to right. This is because Arabic is a right-to-left script and thus window layouts should be reversed for natural operation in this script. This tie-in to the window layout has not been discussed above since the mechanism for achieving this is highly dependant on the GUI environment in use; however, the ability to make these dynamic GUI layout changes is another key advantage of the JIT translation approach because any such operations can simply be added to the rendering process (described above). Note also that the Arabic font used in certain buttons 330, 340 (e.g., "Search" and "Sort") has been reduced in size from that in the English equivalent and also un-bolded (while maintaining text centering in the control). This is because the corresponding Arabic text would not fit in the available control text area in the original size and style. Again this process is accomplished within the routine UI_ShrinkToFit( ) as described above. As part of the translation process, the justification of the strings has also been flipped from left/right to the opposite thus ensuring that in the translated window, the labels adjacent to the field boxes now correctly butt up against the controls after the UI has been flipped. Finally, note that many of the buttons and labels end in punctuation 350, 360 (e.g., ' . . . ,' and ':'). The DrawString( ) callback is designed to strip off this punctuation and then re-append it in translated form after the main body of the text has been translated. This reduces clutter in the dictionaries by avoiding the need to have two translations for a given string, one with punctuation, and one without.

The foregoing description of the preferred embodiments of the invention has been presented for the purposes of illustration and description. For example, although described with respect to English, any language could be used as the "base" language from which the dictionaries are generated. This term should not be narrowly construed to only apply to English based translation as the method and system could be used to convert between any two languages. Additionally, the claimed system and method should not be limited to text based translation. This invention could be applied to any system in which one or more pieces of information being communicated over a medium (a "token"), such as text strings, sound waves and images, could be translated into a "foreign" language. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

Appendix 10

SYSTEM AND METHOD FOR CREATING A DISTRIBUTED NETWORK ARCHITECTURE

INVENTOR: JOHN FAIRWEATHER

BACKGROUND OF THE INVENTION

Current solutions to solving the distributed information problem fall into two main classes: the client/server approach and the peer-to-peer approach. In a client/server system, there is generally a large powerful central server, usually a relational database, to which a set of clients talks in order to fetch, update, and query information. Such a network architecture can be viewed as a star with the clients forming the edges of the star and the large central server the center. The current state of the art in this field adds limited ability to distribute the central database to multiple server machines with perhaps the most sophisticated form being the “Information Warehouse” or “Corporate Information Factory” (CIF) approach described in the book “Corporate Information Factory” by W. H Inmon, Claudia Imhoff, and Ryan Sousa. Unfortunately, the CIF approach falls far short of what is necessary to handle more sophisticated systems such as those required for intelligence purposes, for example.

The peer-to-peer approach overcomes many of the limitations of the centralized system by allowing many machines on a network to cooperate as peers, however it does this by removing the concept of the specialized server, which limits its applicability in the area of intelligence systems, where the need for powerful distributed clusters of machines operating as a single logical ‘server’ for the purposes of processing an incoming ‘feed’ remains. Furthermore, neither approach addresses the needs of multimedia data and the consequent storage and ‘streaming’ demands that it places on the server architecture. Once the purpose of a system is broadened to acquisition of unstructured, non-tagged, time-variant, multimedia information (much of which is designed specifically to prevent easy capture and normalization by non-recipient systems), a totally different approach is required. In this arena, many entrenched notions of information science and database methodology must be discarded to permit the problem to be addressed. We shall call systems that attempt to address this level of problem, ‘Unconstrained Systems’ (UCS). An unconstrained system is one in which the source(s) of data have no explicit or implicit knowledge of, or interest in, facilitating the capture and subsequent processing of that data by the system.

What is needed, then, is an architecture that embodies concepts from both the client/server and the peer-to-peer approach, but which is modified to reflect the unique needs of a distributed multimedia intelligence system.

SUMMARY OF INVENTION

The present invention provides a network architecture that embodies the best of both of these approaches while still providing robust support for multimedia distribution. The invention is comprised of the following components:

a) A customizable (preferably via registered plug-ins) multi-threaded and distributed server implementation containing a main server thread 210,one or more built-in threads for monitoring incoming ‘feeds’ and instantiating the resultant data into the system, and one or more threads for handling incoming client requests. This server implementation can be extended in a hierarchical manner so that each server has a ‘drone’ server (to any number of levels) which transparently operate as part of the logical server cluster and which are tasked by the main server machine. All communication between clients, servers, and drones occurs via a standard protocol, such as TCP/IP, so that the logical server cluster, including associated mass storage, can be physically distributed over a wide area b) A tightly integrated mass storage (MSS) framework that is cognizant of the arrangement of server machines in the cluster and the storage devices to which they are attached, and which is capable of controlling one or more possibly heterogeneous connected robotic autoloader systems in order to ensure that whenever any machine of the cluster requires information stored on a robot, the media that contains the information is automatically mounted into a drive that is connected to that machine. In the preferred embodiment, automatic creation of archive media and its migration from cache to robotic storage is tightly integrated with the server architecture, and the mass storage system may be extended to support new mass storage devices by defining device drivers that map the logical operations performed by the MSS onto the physical commands necessary to implement them for a given device.

c) A standardized framework for defining data types at a binary level and for associating those data types with one or more server clusters on the network such that the mapping between data types and the servers that must be addressed to obtain the corresponding data can be made automatically from anywhere in the environment.

d) A standardized framework for defining and executing queries on servers, for distributing portions of those queries to the servers involved, and for reassembling the results of such distributed queries into a unified “hit list” for the client, including the ability to save and execute these queries on a continuous basis against any new information acquired from the feed.

A number of extensions and enhancements are also disclosed but given this architecture; any number of additional improvements and permutations would be obvious to those skilled in the art. For example, the system could include an ‘output’ folder into which the multimedia portion of any data acquired by the server is placed and which serves as the framework within which the server builds up batches of information to be migrated to the mass storage subsystem as appropriate.

BRIEF DESCRIPTION OF THE DRAWINGS

FIG. 1 illustrates a basic configuration of an intelligence system.

FIG. 2 illustrates a sample structure of a server in the mass storage system architecture (MSS) of the present invention.

FIG. 3 shows a sample screen shot illustrating a typical set of server windows.

FIG. 4 illustrates a sample image showing the results of clicking on the button.

FIG. 5 illustrates a sample client/server status window.

FIG. 6 illustrates a sample embodiment of a master server (in this case, a video server) and a cluster of drone machines.

DETAILED DESCRIPTION OF THE PREFERRED EMBODIMENT(S)

The descriptions given below may refer to a number of other key technologies and concepts, with which the reader is assumed to be familiar, and will be helpful to fully appreciate the material presented herein. These various building-block technologies have been previously described in the following patent applications (which have been expressly incorporated herein):

1) Appendix 1—Types Patent
2) Appendix 2—Collections Patent
3) Appendix 3—Ontology Patent
4) Appendix 4—MitoMine Patent Referring now to FIG. 1, a basic configuration of an intelligence system is illustrated. Digital data of diverse types flows through the (distributed) intake pipe 110 and some small quantity is extracted, normalized, and transferred into the system environment 120 and persistent storage 130. Once in the environment 120, the data is available for analysis and intelligence purposes. Any intercepted data that is not sampled as it passes the environment intake port, is lost.

Because of the vast amounts of data that will be acquired and stored, a layered mass storage system (MSS) architecture is provided wherein data initially arrives in a (distributed) cache and is then automatically and transparently migrated onto deep storage media. In the preferred embodiment, the ability to interface to, and control, heterogeneous robotic mass storage farms is provided. In such a system, all data remains on-line or, if archived data is requested, the system must be able to cause the appropriate robot to load it. Because the migration, media, and retrieval process is dependant on not only the data type involved but also on the physical distribution of the servers, as well as other factors, the MSS architecture is intimately tied to the server framework provided by the UCS. The system also advantageously uses the fact that, in most cases, the number of accesses to a given datum tends to follow an exponential decay with its age. Thus recent data, which is accessed far more heavily, will often reside in the cache. Archival data, on the other hand, migrates over time to the robot farm. Because older data may become the subject of intense interest, however, the MSS architecture also transparently handles the temporary migration of this data back into cache.

The environment also supports the ability to customize migration strategies on a per-server basis to support other approaches, perhaps based on frequency of access, item content, or other considerations. Because on-line storage is costly, the system has been adapted to use and access low cost random-access media (such as CDs and DVDs) and is also capable of smoothly migrating to newer, denser, media as it becomes available. Manual media loading by an operator is also provided transparently by the system when necessary (such as when truly massive amounts of data or being requested). The system provides this functionality by routing media load requests to an operator station(s) and can guide to the operator through the loading (and un-loading) sequence. It is anticipated access time increases as data moves deeper and deeper into the archive, however, the primary goal of this system is to permit transparent access to data no matter where it is stored. Again, in the preferred embodiment, robots are loaded with blank media, connected and configured, and then left alone to automatically become part of the archive over time.

Given the scale of the problem, in the preferred embodiment, even individual servers are implemented as distributed clusters. The environment also provides extensive support for the re-configuration of any system parameter that might change.

Before going further, it is important to understand what is meant by a "server" and a "client" in such a system. In conventional client/server architectures, a server is essentially a huge repository for storing, searching, and retrieving data. Clients tend to be applications or veneers that access or supply server data in order to implement the required system functionality. In this architecture, servers must sample from the torrent of data going though the (virtual) intake pipe. Thus it is clear that, unlike the standard model, the servers in this system will automatically create and source new normalized data gleaned from the intake pipe and then examine that data to see if it may be of interest to one or more users. For these reasons, every server has a built in client capable of sampling data in the pipe and instantiating it into the server and the rest of persistent storage as necessary. Thus, the present system discards use of the standard 'server' and instead uses server-client pair(s).

In the preferred embodiment, since each server will specialize in a different kind of multimedia or ontological data, and because the handling of each and every multimedia type cannot be defined beforehand, the basic behaviors of a server (e.g., talking to a client, access to storage, etc.) are provided by the architecture. In the event that it is desirable to customize server behaviors, the server calls a plug-in API that allows system programmers to define these behaviors. For example, certain specialized servers may have to interface directly to legacy or specialized external systems and will have to seamlessly (and invisibly) utilize the capabilities of those external systems while still providing behaviors and an interface to the rest of the environment. An example of such an external system might be a face, voice, or fingerprint recognition system. Furthermore, new servers may be brought on line to the system at any time and must be able to be found and used by the rest of the system as they are added. While this discussion has referenced "servers" throughout, there is no reason (and the system supports) use of a 'client' machine that can declare its intent to 'serve' data into the environment. Indeed, in a large community of analysts, this ability is essential if analysts are to be able to build on and reference the work of others. Thus every client is also potentially a server. The only remaining distinction between a mostly-server and a mostly-client is that a server tends to source a lot more data on an on-going basis than does a client. Finally, the present architecture permits application code running within the system to remain unaware of the existence of such things as a relational database or servers in general thereby permitting many "general utility" applications. As this description makes clear, this UCS architecture is more like a peer-to-peer network than it is a classic client/server model.

Referring now to FIG. 2, a diagram illustrating a sample structure of a server in the mass storage system architecture (MSS) of the present invention is shown. The construction of a single machine server within the architecture of this invention will first be described and then this approach will be generalized to the distributed case. The server itself consists of three types of processes (threads), the "Main server thread 210" 210, the "Favorite Flunky" 220, and one or more standard flunkies 230, 235. The main server thread 210 is responsible for receiving 211 and routing 212 client requests 205 and otherwise coordinating the activities of all processes within the server. The favorite flunky 220 is primarily responsible for monitoring the stream of data arriving from the data feed 221, interpreting its contents, and writing 222 the data into server storage 240, 250 where it may be accessed 241, 251 by other flunkies 235 in response to client requests 211. In the preferred embodiment, the standard flunky processes 230, 235 are created on an "as needed" basis, and are responsible for handling client requests (as routed 212 by the main server thread 210), and transmitting 231, 236 the results back to the client processes 205. The maximum number of standard flunkies 230, 235 within a server will thus be equal to the maximum number of simultaneous client requests 205 that the server has experienced because the main server thread 210 will only create a new flunky thread when all currently available flunky threads 230, 235 are already busy. When a client request 205 completes, the flunky thread 230, 235 responsible for handling it is entered into a list (not shown) of available threads so that it can be re-tasked by the main server thread 210 when the next client request 205 arrives. The favorite flunky 220 is also utilized by the main server thread 210 to accomplish various other housekeeping or batch tasks in order to insure that the main server thread 210 remains responsive to new client requests 205 coming in. There is therefore communication 213 and close coordination between the activity of the favorite flunky 220 and the needs of the main server thread 210. It is for this same reason that the main server thread 210 would preferably pass off all client requests 205 to the standard flunkies 230 , 235 since the main server thread 210 cannot know how long the processing of the client request 205 will take.

In the preferred embodiment, the server package provides support for up to 5 distinct directories (not all of which may be required for a particular server) that may be used by servers (or registered server plug-ins) for distinct purposes as follows:

Input Folder—This is the directory where incoming multimedia data arrives from the feed (or elsewhere). The input folder may be hierarchical (i.e., contain folders within it to any level), and when any item is moved from the input folder to the output folder, the corresponding portion of the folder hierarchy will be replicated there thus allowing multimedia data to be organized based either on feed(s) or on any other system chosen by the client processes (see API below). The favorite flunky's primary task is to monitor the input folder for any sign of change or new files, and when such occurs, to process whatever is new as determined by the registered plug-ins.

Output Folder—The output folder is the place where all the multimedia data arriving at the input folder is moved once it has been ingested by the favorite flunky 220. Its structure may be hierarchical as determined by the input folder structure. It is within the output folder, which is essentially a multimedia cache 250 in the case of servers with associated robotic mass storage, where the various MSS media 'chunk' images are built up prior to being sent to be moved to (or otherwise stored in) mass storage.

Aliases Folder—The aliases folder provides the ability for a server to 'pull' information from sources or feeds on other machines, rather than the more conventional 'push' feed architecture provided by the input folder. An alias may be created and placed into the aliases folder (either manually or through the API) which will cause the favorite flunky 220 to remotely mount the corresponding disk and directory from another machine on the network and, if anything new is found therein, to copy it over to the input folder and optionally delete the original. This means, for example, that users can drop files into a directory in their local machine and they will be fetched and processed in a scheduled manner by the server using the alias mechanism. Like the input and output folders, this folder may be hierarchical, and any hierarchy will be reflected as the data is moved to subsequent folders of the server during processing.

Rejects Folder—If an error occurs during the process of data in the input folder by the favorite flunky 220, the data file(s), instead of being moved to the output folder, will be moved to the reject folder. The purpose is to allow system operators to examine such rejected material and determine why it was rejected. If the reason for the rejection can be corrected (perhaps by altering the data mining script used for ingestion), then the reject files can be dragged back into the input folder where they will then be processed correctly thus avoiding data loss.

Collections Folder—This folder contains the extracted ontological data (see Ontology Patent), which is referred to in a server context as the 'descriptors', for the items extracted from the feed. This folder contains collections often organized in a directory hierarchy that matches the system ontology. These collections are referred to in a server context as the server database 240. The server performs many functions, especially in terms of querying, by performing operations on the database 240. For this reason, it is only necessary to retrieve material from mass storage when the full multimedia content is requested by the client (e.g., movie playback). For certain server types that do not relate directly to the ontology, a simplified database based on the ET_StringList type may optionally be used.

For further clarification, Appendix A provides sample code illustrating the processing of incoming events and performance of scheduled tasks by the main server thread 210. Appendix A also provides sample code for the command receipt and response process performed by the favorite flunky 220.

Referring now to FIG. 3, a sample screen shot illustrating a typical set of server windows 310, 320, 330, 340, 350, 360, 370 is shown. This figure shows a typical set of server windows 310, 320, 330, 340, 350, 360, 370 running on a single machine (although servers would often run on different machines). In the preferred embodiment, all servers created in this framework would essentially look the same, the only difference(s) between them being the nature of the plug-ins that have been registered on the server in order to customize the server behavior for the data type concerned.

The server window 310 has been expanded to show the contents of a typical server activity log 311 and also indicates the use of the 'picon' feature, in this case the last image fetched from the Image server 310 was of the flag of Afghanistan so this flag is displayed in the picon area 312. Other servers may display different things in this area, depending on the nature of the "picon maker" plug-in registered. In this server window, a button 313 is provided such that clicking on this button 313 causes the server's maintenance window to be displayed.

Referring now to FIG. 4, a sample image showing the results of clicking on the button 313 is shown. The pop-up menu 411 of the maintenance window 410 allows the user to choose from one of a number of registered logical 'pages' containing information and allowing operations that relate to a particular class of maintenance actions on the server 310. The maintenance window API (see below) allows the registration of a set of maintenance 'buttons' with any defined page. In the illustrated case, the page mapped to the pop-up menu 411 is "Server Items." In the preferred embodiment, a text area 412 is provided which provides description/help information for the button whenever an input device, such as a mouse, is over the button concerned. In the illustrated embodiment, the server maintenance window 410 also includes a "server items" area 413. In this case, the server items area 413 provides unique item ID along with the time the item was captured by the system and the path in the output folder where the file containing the multimedia content of the item has been placed. For example, the list in this case indicates that the images are from an output folder titled "WorldFactBook" and that they are part of archive batch "@0001" (see below for details). If the items had already been archived to robotic storage, the path could be modified to reflect this fact. Three maintenance pages are pre-defined by the server implementation itself:

Server Items—This page preferably allows examination of, and operations on, any item in the server.

Archive items—This page preferably permits examination of the state of any archive 'batch' and operations thereon. The process of building up a batch, sending it to be burned, moving it to robotic storage, and then purging the original from the output folder, may be quite complex in some instances, and a number of maintenance actions may be required should anything go wrong in this sequence.

Archive Devices—This page preferably allows direct control over the robotic storage devices attached to the server. For example one could move media within and between robots, initiate re-calibration of the robot contents, etc. Again the number of possibilities here is quite large and varies from one robot type to another. For this reason, the present invention provides an open-ended registry for robotic maintenance actions. The need for tight integration of robotic storage activity and the state information held in the server is clear.

The dispatching of incoming requests from clients to the standard flunkies that will handle them occurs in the communications handler associated with the main server thread 210, that is it is asynchronous to thread operation and occurs essentially at interrupt level. There are a huge number of possible client commands that must be routed in this manner (see API below). The processing performed in this context for any given command is essentially as follows:

```
    case kCommandType:
        ip = server status record
        fp = SV_FindFreeFlunky(ip);            // find/make flunky to
handle cmd
        copy client parameters to flunky buffer area
        if ( command was proxy routed )
            strip of proxy routing tag in flunky buffer area
        issue command to flunky
        break;
Where:
int32 SV_FindFreeFlunky        (              // find/create a free
flunky
            ET_CSStatePtr           ip        // IO:Pointer to IP
Server Status
                               )              // R:Index for the
flunky selected
{
    for ( i = 0 ; i < max simultaneous users ; i++ )
    {                                         // scan all our flunky
records
        fp = &flunky[i]
        if ( flunky is free )
        {
            return i;
        } else if ( !fp->flags )              // uninitialized record,
use it
        {
            fp = create a new flunky and flunky buffer area
            return i;
        }
    }
    log "too many simultaneous users!" error
    return error
}
```

A sample list of the major commands that are preferably supported by the architecture are as follows:

```
#define  kCStrigger           'csTR'   // Trigger an IP (server->client)
#define  kCSabort             'csAB'   // aborted server command (server-
>client)
#define  kCSoneItem           'csI1'   // data for single item requested
(server->client)
#define  kCSitemChunk         'csIn'   // data for chunk of items (server-
>client)
#define  kCSitemResponse      'csRs'   // respose data for a command
(server->client)
#define  kCSforwardCmd        'csFW'   // Forward a client command server-
>server)
#define  kCSAcknowledge       'csAK'   // Acknowledge
#define  kCSCollectionCmd     'csCO'   // collection command (client-
>server)
#define  kCSunload            'csUL'   // unload an IP (client->server)
#define  kCSstart             'csGO'   // start a server (client->server)
#define  kCSstop              'csOF'   // stop a server (client->server)
#define  kCSload              'csLD'   // load an IP (client->server)
#define  kCSfetch             'csFT'   // fetch an IP (client->server)
#define  kCSkill              'csKL'   // kill all IPs for this machine
(client->server)
#define  kCSuserCmd           'csUS'   // user defined command (client-
>server)
#define  kCSgetPreviewList    'csPL'   // get an IP item preview list
(client->server)
#define  kCSwakeServer        'csWK'   // wake server to scan inputs
(client->server)
#define  kCSgetFileBasedItem  'csFI'   // get a file-based item (client-
>server)
```

-continued

```
#define kCSputFileBasedItem      'csFP'  // put a file-based item to input
(client->server)
#define kCSarchiveCmd            'csAC'  // archive user defined command
(client->server)
#define kCSfetchChunkID          'csFC'  // fetch archive chunk ID for ID
(client->server)
#define kCSgetServerStatus       'csST'  // Fetch server status (client-
>server)
#define kCSgetNextSequenceID     'csNI'  // Get next ID in server sequence
(client->server)
#define kCSisServerRunning       'csRS'  // Check if the server is running
(client->server)
#define kCSdeclareEvent          'csDE'  // Declare an event has occured
(client->server)
#define kCSacquireDBlock         'csLK'  // acquire a DB lock (drone->master)
#define kCSreleaseDBlock         'csUK'  // release a DB lock (drone->master)
#define kCSsendDroneStatus       'csDS'  // send drone status to master
(drone->master)
#define kCSdoesIDexist           'csIX'  // Does an item ID exist (client-
>server)
#define kCScueItemFile           'csQF'  // Cue Item File (client->server)
#define kCSCountServerItems      'csCI'  // Count items in the server DB
(client->server)
#define kCSAddressToDrone        'csAD'  // Convert IP address to drone ID
(client->server)
#define kCSDroneToAddress        'csDA'  // Convert drone ID to IP address
(client->server)
#define kCSStandardQuery         'csSQ'  // Standard Query (MitoQuest ™)
(client->server)
#define kCSClientStatusMessage   'csMG'  // Display client status message
(client->server)
```

Two of the commands above deserve further discussion here. The 'kCSCollectionCmd' is a collection command that enables all servers in this architecture to inherently support the full suite of server-based collection operations as described in the Collections Patent. This means that all data residing in the server collections is available for transparent use by any client without the need to be aware of the server communications process.

The 'kCSuserCmd' allows the open-ended definition of server-specific custom commands ('kCSarchiveCmd' performs the same function for archive related commands). This mechanism enables the customization of the basic set of server operations in order to support the features and operations that are specific to any particular data or server type. This functionality is preferably invoked in the client via CL_CallCustomFunc( )—see API description below. In the embodiment described below, this capability is used by registering a custom function handler (described below) that packs up the parameters passed to the function into a command block. This command block is sent to the server and the results are "un-packed" by the server as required by the caller. The custom function handler on the client side is registered (via CL_SpecifyCallBack) using the selector 'kFnCustomFuncHdlr'. On the server side, the corresponding server plug-in is registered using 'kFnCustomCmdHdlr'. Each of these are further described below. Within the custom command handler in the server, the pseudo code logic is essentially as follows:

```
static EngErr myServerSideFn(              // custom command
handler
          long       aUserCommand,         // I:Command type
          void       *buffer,              // I:The client supplied
data buffer
          charPtr    anIdentifyingName,// I:Identifying Text
```

-continued

```
string
          Boolean    wantReply             // I:TRUE if client
wants a reply
          )                                // R:Zero for success,
else error #
{
  err = 0;
  cmd = (my command record*)buffer;
  switch ( aUserCommand )
  {
    case command type 1:
      extract command parameters from cmd
      perform the custom command
      if ( wantReply )
      {
        rply = (my reply record*)allocate buffer
        siz = sizeof (allocated buffer)
        fill in rply record with results
      }
      break;
    case command type 2:
      ... etc.
    default:
      report "unknown command error"
      break;
  }
  if ( rply )
  {
    SV_SetReply(sp,...,rply,siz);          // send reply back to
the client
    Dispose of(rply);
  }
  return err;
}
```

Thus, in addition to all the logical plug-ins supported for the basic server functionality, this invention allows full control and extension of the functionality of the server itself (in addition to the client). This is in marked contrast to conventional client/server architectures that do not support this level of server customization.

The following is a partial list of the standard logical plug-ins that are supported by the client/server architecture of this invention and a brief description of their purpose. Some callbacks are required but most are optional depending on the nature of a particular server and data type. These logical callbacks are sufficient to implement most kinds of multimedia servers without the need to resort to custom functions. In general, for any given server type, only a very small number of the possible callbacks defined below will be registered, since the server infrastructure provides default behaviors that in most cases perform what is necessary given the standardized environment in which the system operates. Optional callbacks are marked with a '*' below:

Referring now to FIG. 5, a sample of a client/server status window 500 is shown.

kFnDBrecInit—If additional initialization for a newly allocated (and zeroed) descriptor record is required, this function may be used to accomplish this. An example might be when descriptors sent to the client have a different format to those used internally by the server plug-ins. In such a case, this function would allow those fields that are valid for the client to be set up from the true descriptor.

kFnDBrecTerm—If additional termination or memory disposal is required for a descriptor record over and above simply de-allocating the descriptor memory (for example if the descriptor contains references to other memory allocated), this function may be used to accomplish this in order to avoid memory leaks.

| SELECTOR | FN. TYPEDEF | NAME | DESCRIPTION |
|---|---|---|---|
| kFnStatus | ET_IPserverStatus | aStatusFn* | get srvr status kFnDBrecInit |
| kFnDBrecInit | ET_IPdbsRecInitTerm | aDBSrecInitFn* | init db descriptor record |
| kFnDBrecTerm | ET_IPdbsRecInitTerm | aDBSrecTermFn* | clean-up/term DBS record |
| kFnFileDelete | ET_IPfileDeleter | aFileDeleteFn* | delete file fr input fldr |
| kFnIDgetter | ET_DBSidGetter | aDBSidGetterFn | get unique ID fr db recrd |
| kFnDBSattacher | ET_DBSattacher | aDBSattachFn | attach data to db record |
| kFnDBSadder | ET_IPdbsAdder | aDBadderFn* | add item to the database |
| kFnFileProcessor | ET_IPfileProcesser | aFileProcesserFn* | process file in input fldr |
| kFnFileTypeChecker | ET_IsItemFileFn | aFileTypeCheckFn* | check if file of req type |
| kFnCustomCmdHdlr | ET_CustomCmdFn | aCustomCmdFn* | Srvr call on rcpt of cmnd |
| kFnCustomFuncHdlr | ET_CustomFuncFn | aCustomFuncFn* | Clnt call process cust fns |
| kFnPiconMaker | ET_HandleToPicon | aPiconMakerFn* | convert item data handle |
| kFnDBSfetcher | ET_DBSfetcher | aDBSfetchFn | get ET_DBInvokeRec fields |
| kFnExprEvaluator | ET_ExprEvaluate | anExprEvalFn* | evaluate an IP expression |
| kFnFilePathMover | ET_DBSFilemover | aDBSFileUpdateFn* | update data item file path |
| kFnArchiveGetter | ET_ArchiveGetter | anArchiveGetterFn* | get archv creat fldr path |
| kFnArchiveCopier | ET_ArchiveCopier | anArchiveCopierFn* | copy file to an archive |
| kFnArchiveStarter | ET_ArchiveStarter | anArchiveStartFn* | kick-off archive procss |
| kFnArchiveEnder | ET_ArchiveEnder | anArchiveEndFn* | clean up after archiv proc |
| kFnArchivePoller | ET_ArchivePoller | anArchivePollFn* | archiv process complete? |
| kFnNetCopyResponder | ET_NetCopyResponder | aNetCopyRespFn* | srvr copy file over ntwrk |
| kFnNetCopyStarter | ET_NetCopyStarter | aNetCopyStartFn* | init ntwk file cpy at clnt |
| kFnNetCopyIdler | ET_NetCopyIdler | aNetCopyIdleFn* | sust ntwk file cpy at clnt |
| kFnNetCopyEnder | ET_NetCopyEnder | aNetCopyEndFn* | clean up aftr ntwork copy |
| kFnOpAliasResolver | ET_AliasResolver | anAliasResolverFn* | reslve alias' in outpt pth |
| kFnOpAliasModifier | ET_AliasModifier | anAliasModifierFn* | mod/cust alias' on archive |
| kFnArchiveRecIniter | ET_ArchiveRecIniter | anArchiveRecIniterFn* | init/archiv db record |
| kFnCustomArchiveCmdHdlr | ET_CustomCmdFn | aCustomArchiveCmdFn* | cust arch comnd srvr call |
| kFnCustomArchiveFuncHdlr | ET_CustomFuncFn | aCustomArchiveFuncFn* | process cust arch fns clt |
| kFnItemInfoGetter | ET_ItemInfoGetter | anItemInfoGetterFn* | get info related to item |
| kFnArchiveInfoGetter | ET_ItemInfoGetter | anArchiveInfoGetterFn* | get arch chnk/dev info |
| kFnArchiveLUNGetter | ET_ArchiveLUNGetter | anArchiveLUNGetterFn* | get list of archive LUNs |
| kFnRepartitionNfyer | ET_RepartitionNfyer | aRepartitionNfyerFn* | notify repartn begin/end |
| kFnDBRecGutsClone | ET_DBRecGutsCloneFn | aDBRecGutsClonerFn* | clone non-flat desc attchs |
| kFnServerIdler | ET_ServerIdler | aServerIdleFn* | call when server is idle |
| kFnFilePutRouter | ET_FilePutRouter | åFilePutRouterFn* | route input fls to drones |
| kFnFileGetRouter | ET_FileGetRouter | aFileGetRouterFn* | rte don't care fl fetches |
| kFnBusyCounter | ET_BusyCounter | aBusyCounterFn* | bus/# clnts load in server |
| kFnQueryHandler | ET_QueryHandler | aQueryHandlerFn* | handle standard queries |
| kFnClientWiper | ET_ClientWiper | aClientWipeFn* | call when clnts strt/stop |

kFnStatus—In the preferred embodiment, this function may be used to add additional status information over and above that provided internally by the server environment. For certain specialized servers, additional information may be required in order to fully understand the state of the server. In addition, this plug-in may utilize additional custom option flags in order to return information that may be used functionally by a client for special purposes. Normally status information is simply displayed in the Client/Server Status window and allows a user to determine the status of the system servers.

kFnFileDelete—In many cases, the information relating to a particular item coming from a feed may span multiple files. For example, many newswire feeds produce a separate file containing the meta-data relating to the story content which is held in a text file. The file processing function (see below) can access this additional information. When the server has processed the file and wishes to delete it from the input folder, this function (if present) may be called in order to clean up any other files that are associated with the item and which the server itself is not aware of.

kFnIDgetter—This function is used by the server code to extract the unique ID value from a descriptor record. Since descriptor record structure is normally opaque to the server architecture itself, this function is required in order to determine the ID to which a descriptor refers.

kFnDBSattacher—Many descriptor records contain opaque references to the multimedia content that is associated with the item (for example, the image for an image server) and this multimedia information is packaged up and sent automatically to the client on request. Since descriptor records are opaque to the framework, however, this function is required in order to attach the reference back to the descriptor on the client side.

kFnDBSadder—If an external database, unknown to the server architecture itself, is associated with a given server, this routine can be used to cause the necessary information to be written to that external database at the same time that the server itself adds the item to its own database. This allows external databases (such as relational databases) to be kept in synchronization with the activity of the server. This may be critical in cases where the system is being interfaced to other external systems via the external DB.

kFnFileProcessor—Once a file in the input folder has been identified as being of the correct type for processing by the server, this function may be called in order to actually process the contents of the file in order to extract whatever information is pertinent and make it available to the server. As is well-known to those in the art, the specific processing performed on a file tends to be different for each kind of server and is heavily dependant on the form of the information being processed.

kFnFileTypeChecker—When scanning the input folder for new input, the server may call this function for each file in the folder(s) in order to determine if the file should be processed by the server, ignored, or rejected. In cases where multiple files are required to process a new input, this function would preferably handle this by indicating that the file(s) should be ignored until all required members of the file set have arrived. This behavior is common in commercial feed situations where the arrival of all files relating to a given item may be spread over a considerable time.

kFnCustomCmdHdlr—This is the client side of the custom command functionality described above.

kFnCustomFuncHdlr—This is the server side of the custom command functionality described above.

kFnPiconMaker—This function can be used to create a 'picon' to be shown in the server window 312 whenever a particular item is processed or retrieved by the server. The image shown in the Image Server window 310 is one example, however many server types can usefully display such images such as video servers, map servers, etc.

kFnDBSfetcher—When invoking a client side user interface to display/edit an item of a given type, the system may call this function in order to fill out the fields of the invocation record with the necessary information for the item concerned, passing it the preview data obtained from the server. The additional fields required to invoke a handler for different types may vary and, in the preferred embodiment, it is this function's responsibility to ensure that all necessary fields are filled out.

kFnExprEvaluator—This function may be called by the server in order to evaluate a given "interest profile" against any new item that has been processed. Because the querying functionality available for a particular type may be quite different than that for others (e.g., in an image server "looks like", in a sound server "sounds like"), this functionality would ideally be registered via this mechanism. In this way, the server, through the MitoQuest™ querying interface, is able to respond to and evaluate type specific queries, not only as part of interest profile processing but also within the generalized querying framework.

kFnFilePathMover—This function may be used to take whatever additional actions (if any) are required whenever the server moves the physical location of a multimedia file from one place to another.

kFnArchiveGetter—This function can be used to determine the network/file path to which the files of a newly created archive batch should be copied. This function is normally registered by the Logical MSS layer and need not be specified unless custom behavior not supported by the Logical MSS layer is required.

kFnArchiveCopier—This function can be used to perform the actual copying of archive chunks to the designated path in preparation for archive burning. This function is normally registered by the Logical MSS layer and need not be specified unless custom behavior not supported by the Logical MSS layer is required.

kFnArchiveStarter—This function can be used to start burning of an archive chunk. This function is normally registered by the Logical MSS layer and need not be specified unless custom behavior not supported by the Logical MSS layer is required. Media burning devices (such as CD-ROMs) frequently require dedicated machines and scripting of commercial software to burn. Also, the burning process may cause the machine involved to lose the ability to communicate for some time. All this logic is supported by the Logical MSS layer via its own registry API (described below).

kEnArchiveEnder—This function can be used to complete the burning of an archive chunk, to handle the transfer of that chunk to the roboticautoloader selected, and to initial flushing of the original data from the output folder cache. This function is normally registered by the Logical MSS layer and need not be specified unless custom behavior not supported by the Logical MSS layer is required.

kFnArchivePoller—This function can be used to poll for archive burn completion. This function is normally registered by the Logical MSS layer and need not be specified unless custom behavior not supported by the Logical MSS layer is required.

kFnNetCopyResponder—The communications model used by the client/server facility for copying multimedia files across the network to/from clients consists of the client calling a 'copy starter' function and then entering a loop calling a 'copy idler' until the transfer is complete at which time the 'copy ender' function is called. At the server end, the 'copy responder' function is responsible for transferring the data. Normally all of these functions are pre-defined by the client/server environment and no additional registration is required. For specialized media types (e.g., video), however, the associated server may wish to override the default suite in order to take advantage of other more appropriate techniques (e.g., video streaming).

kFnNetCopyStarter—See the discussion for 'kFnNetCopyResponder' kFnNetCopyIdler—See the discussion for 'kFnNetCopyResponder' kFnNetCopyEnder—See the discussion for 'kFnNetCopyResponder' kFnOpAliasResolver—When a multimedia item has been moved to robotic storage, an 'alias' file is left in its place within the output folder. This alias file contains all information necessary to allow the server to mount the storage if required and copy the file contents to the client as desired. This function is preferably registered by the Logical MSS layer and need not be specified unless custom behavior not supported by the Logical MSS layer is required.

kFnOpAliasModifier—This function can be used to modify the alias file associated with accessing multimedia data held on robotic storage devices. This function is normally registered by the Logical MSS layer and need not be specified unless custom behavior not supported by the Logical MSS layer is required.

kFnArchiveRecIniter—This function can be used to initialize an archive database descriptor record for a given archive batch. This function is preferably registered by the Logical MSS layer and need not be specified unless custom behavior not supported by the Logical MSS layer is required.

kFnCustomArchiveCmdHdlr—This function provides the server side of the archive custom command capability discussed above. This function is preferably registered by the Logical MSS layer and need not be specified unless custom behavior not supported by the Logical MSS layer is required.

kFnCustomArchiveFuncHdlr—This function provides the client side of the archive custom command capability discussed above. This function is preferably registered by the Logical MSS layer and need not be specified unless custom behavior not supported by the Logical MSS layer is required.

kFnItemInfoGetter—This function can be used to supply additional textual information relating to a given item in the server (as displayed in the "Server Items" maintenance window page).

kFnArchiveLUNGetter—This function can be used to obtain a series of lines of text giving the Logical Unit Number (LUN) information for all the archive devices available for a given server. This function is preferably registered by the Logical MSS layer and need not be specified unless custom behavior not supported by the Logical MSS layer is required.

kFnRepartitionNfyer—This function can be used to take whatever action is required in response to repartitioning of the server output folder. It is often the case that during the life of a server, the mass storage media in the attached robotic storage may be changed (for example upgrading from CD-ROM to DVD) in order to increase capacity or improve performance. When this occurs, the server output folder would preferably be re-partitioned (initiated from the maintenance window). The re-partitioning process involves the steps of retrieving all the batches from the old robotic media to cache, reconstructing a new batch based on the parameters of the new storage device (which probably involves re-allocating the contents of multiple batches to a new batch set), and then re-burning a new copy of the data and moving it to the new storage device. This function can be used to notify external systems of what is going on in cases where this is required.

kFnDBRecGutsClone—This function can be used to perform any special processing required when the contents of a database descriptor record is replicated. If the descriptor is 'flat', this is probably not required, however, in the case where the descriptor contains references to other memory, these external allocations must be cloned also and the new descriptor set up to reference the new allocations.

kFnServerIdler—Many types of servers require regular idle processes to be run and this function can be used to define the activity to be performed during the idling process.

kFnFilePutRouter—When transferring files from a client to the server for processing, in the case of a distributed server cluster, a default algorithm is used to choose which server drone should be selected to handle the new task. The default selection criteria is preferably based (at least in part) on how busy each of the available drones is at the time. If custom routing is required then this function can be used to achieve that as well. Because all server communication occurs via the IP protocols, servers themselves may be widely distributed physically and may have different network bandwidths available to access them. In such cases, it is often preferable to register custom get and put routers.

kFnFileGetRouter—This router function is the converse of the file put router described above. That is it can be used to override the default algorithm used to select a drone to handle the transfer. For example in a distributed video server, it may be advisable to stream from a machine that is physically closer to the client. Defining these algorithms requires consideration and examination of the connectivity state of the robotic storage (if present) to determine which machines have access to the actual data involved.

kFnBusyCounter—Preferably, a server determines how many of its flunkies are busy by examining which ones are still in the process of executing a client command. In certain rare circumstances, however, this may not be appropriate and this function can be used to obtain a more accurate measure. An example occurs in the case of a video server, which is using an external video streaming package (e.g., QuickTime Streaming Server) in order to actually stream the video to the clients. In this case, the load on the machine is actually a function of the number and bandwidth of the streams being sent by the streaming package and so a custom 'kFnBusyCounter' would be used to determine this in order that routing of new streaming tasks would go to the most appropriate drone. This is another mechanism that can be used to impact task routing over and above that provided by the routers described above.

knQueryHandler—This function can be used to process standard server queries originating from MitoPlex™ (see patent ref. 3).

kFnClientWiper—This function can be used to perform whatever resource de-allocation and cleanup is required whenever a server client quits or first registers. This is only necessary if resources outside those manipulated directly by the server and its plug-ins are involved.

Another opportunity for customizing of the standard server behaviors occurs when the server is first created via the CL_DefineDataType( ) API call. One of the parameters to this function is a 'tweak' record that is defined in the preferred embodiment as follows:

```
typedef struct ET__IPserverTweakRec                    // record for tweaking
server parameters
{
   int32          serverOptions;                       // logical options for
server
   short          serverIconID;                        // Icon ID for server view
   short          filesPerAliasFetch;                  // files fetched per alias
scan
   int32          NeedProgressBar;                     // use progress bar for
more items
   int32          MaxItems;                            // max # of items sent
   int32          MaxSimultaneousUsers;                // maximum # of
simultaneous users
   int32          CheckTime;                           // Scanning interval for
new inputs
   int32          LoadIncrement;                       // time between load
updates
   int32          ItemChunkSize;                       // # of items in chunk sent
from server
   int32          IPServerTimeout;                     // Timeout for server on
client
   int32          ClientRecvBufferSize;                // size of client item
receive buffer
   int32          ServerRecvBufferSize;                // size of server request
buffer
   int32          IPClientTimeout;                     // Client timeout on server
   int32          favFlunkyStackSize;                  // Stack size for favorite
flunky
   int32          flunkyStackSize;                     // Stack size for other
flunkies
   unsLong        minHeapMemory;                       // Minimum heap for server
to run
   OSType         startThisServerBeforeMe;             // Control server startup
order
   unsLong        idlerInterval;                       // ticks between idler
calls
   unsLong        textBackupInterval;                  // text backup interval
} ET__IPserverTweakRec;
Where defined server options are:
#define kServerScansInputFld            0x00000010    // automated scanning of
input folder
#define kServerScansAliases             0x00000020    // automated capture via
alias folder
#define kServerAutoStart                0x00000040    // server should start
automatically
#define kServerHasTimeHistory           0x00000080    // server has a time
history field
#define kAliasesCanAlsoBeToClumps       0x00000100    // aliases can also be to
clump files
#define kSendDescWithPreview            0x00000200    // send descriptor with
preview
#define kDontCreateOutputFiles          0x00000400    // server does not create
output files
#define kArchiveOutputFolder            0x00000800    // archive output folder
#define kServerStaysInFgnd              0x00001000    // don't automatically move
to background
#define kServerDataIsDistributed        0x00002000    // the server's data is
distributed
#define kUseDefaultArchiveSuite         0x00004000    // use the default
archiving suite
#define kUseArchiveItemsPage            0x00008000    // use the default archive
items page
#define kUseArchiveDevicesPage          0x00010000    // use the default archive
devices page
#define kServerIPsHaveTideMark          0x00020000    // server retroactively
evaluates IPs
#define kServerHasNoDatabase            0x00040000    // This server has no
database
#define kDontOptimizeIPexprs            0x00080000    // Evaluate every IP
expression
#define kPullByCommonPrefix             0x00100000    // aliase fetches grouped
by prefix
#define kNoAutoWindowShow               0x00200000    // Don't show the server
when started
```

By setting up the various fields in the tweak record prior to creating the server, a wide variety of different server behaviors can be customized to the needs of a particular server type. In a similar manner, the parameters of the archiving subsystem associated with a server can be customized via an archive tweak record. An example follows:

```
typedef struct ET_ArchiveTweak
{
  unsLong        archiveBlockSize;                  // Block size of the
archive volume
  unsLong        archiveChunkSize;                  // number of blocks on the
archive volume
  int32          sizeOfArchiveDesc;                 // size of archive DB
desriptor record
  unsLong        mountTimeoutInTicks;               // disk mount timeout
  char           configString[STRINGBUFFSIZE];      // archive configuration
string
  char           droneList[STRINGBUFFSIZE];         // list of drone machines
} ET_ArchiveTweak;
```

The descriptions above have referred to the process of creating archive 'batches' for multimedia content and the means whereby those batches are transferred to mass storage. Whenever a server processes an input feed, two types of information result. The first type of information is descriptive information relating to the item itself, when it was captured, where it came from, etc. This information, as discussed above, finishes up in the server database and is the primary means whereby the server can be queried as to its content. Descriptive information like this tends to be relatively small in volume (no more than Gigabytes) and thus is easily handled on the local disk(s) associated with the server. The other type of information is termed multimedia information examples being images, video, maps, sounds, etc. This information is generally encoded in specialized formats and requires specialized software to interpret it. In addition, multimedia information tends to be vastly larger than the descriptive information that goes with it. In this case, the server's job is to transparently handle two diverse access and storage requirements of these two types of information so that when presented to clients, they are unified. Because of the unique requirements of multimedia data it becomes necessary to tightly integrate a sophisticated mass storage system with every stage of server operation and to allow the operation of that mass storage system to be configured on a per-data-type basis. The present invention provides this integration by creating batches of multimedia data that can be archived to mass storage while remaining accessible to the server as a whole. A batch is a set of multimedia items, possibly distributed throughout the hierarchical server directory, whose total size is just less than the storage size defined for the archival media associated with the robotic storage attached to the server. Possible archival media include hard disks, CD-ROMs, optical disks, tapes, DVDs, etc. Each of these media types has a fixed storage capacity, known as the chunk size. The process of building up an archive batch in the output folder involves accumulating the total size of all files that are part of the batch until they add up to enough to warrant the batch being moved to an archive media device. When a batch reaches this stage, it is transferred to an archive location, usually the disk of another machine associated with the server cluster, and then burning or writing of the batch is initiated. Assuming the storage media is a CD-ROM, then the burning process would involve inserting a blank CD-ROM into a CD burner associated with the burning machine and then scripting a commercial CD writing program to actually burn the CD with the contents of the information held in the archive image. When burning is complete, the CD-ROM is removed and preferably placed into the robotic storage device associated with the server. At this point, the media is verified and then the original data for the batch is deleted. More specifically, each file so deleted is replaced by an alias to the location of the archive material in the robot/media. This means that when the server subsequently tries to access the file, it encounters an alias instead and automatically initiates loading of the corresponding media in the robot to a drive associated with the server so that it can be accessed and sent to the client.

In the preferred embodiment, the entire archiving operation occurs automatically (without the need for real time human intervention). This means that in the preferred embodiment, the writer(s) associated with a server as well as the readers are connected to a number of different media devices, all of which are within the robot (so that they can be automatically loaded and un-loaded). Most robotic autoloaders allow a variable number of drives to be installed within them and the connection to each of these drives to be made to any of a number of external computers via SCSI, firewire, USB, or any other logical connection permitting structured communications. The computers that form this cluster (other than the main server machine itself—the master) are referred to herein as drones. In large installations, the drones themselves may have drones and this tree can be repeated to any number of levels. To simplify management of the drones, it is often the case that each such computer is running an identical copy of the environment, including a server for the data type involved. Control over the autoloaders themselves is generally provided via a serial connection, a SCSI connection, or more recently via an Internet/network link. Thus an archiving server tends to be a cluster of machines (possibly physically distributed) all associated with one or more (possibly dissimilar) robots each of which is under the direct or indirect control of the master machine of the cluster.

Referring now to FIG. 6, a sample embodiment of a master server 610 (in this case, a video server) and a cluster of drone machines 615, 620, 625, 630, 635, 640, 645 is shown. In the preferred embodiment, each drone machine 615, 620, 625, 630, 635, 640, 645 has an associated cache area that can store data. When the server 610 chooses a drone which will, for example, stream video to a client 601, 602, 603, not only must it consider which drones 615, 620, 625, 630, 635, 640, 645 are busy and which are not, but also which drones are connected to drives that a robot can control (615, 620, 625, 630, 635) and contain the media for the batch being requested. Additionally, the data required may already be stored in the cache associated with any one of the server's drones and wherever possible access to the data in cache is preferable to accessing it from mass storage. The process of streaming a video thus becomes as follows:

1) Select the drone 615, 620, 625, 630, 635, 640, 645 that will perform the task.
2) Command the associated robot to mount the disk in a drive connected to the selected drone.
3) Command the selected drone to begin streaming from the disk (optionally simultaneously caching).
4) When the stream is done, the disk becomes 'free' and can be dismounted by the robot to make room for another if required.

Similar logical sequences are required for burning media and many other actions that the server needs to perform. The very tight integration between the server state and database(s) and the mass storage implementation is a key benefit of the present invention as it addresses the kinds of problems that occur in large scale systems, such as the distributed video server depicted in FIG. 6.

The mass storage issues described above are just one aspect of the more general problem of creating distributed server clusters that is addressed by this architecture. Even in the absence of mass storage issues, distribution of server functionality across a set of drones may be desirable for performance reasons alone. Consequently in the API descriptions below and in the underlying server implementation, the concept of distribution via the server-drone mechanism is inherent. In a distributed server, the drone servers perform a similar function to the server flunkies described in the single server discussion above and the logic to implement server distribution across the drones is in many ways similar to that described for flunkies. Each drone server is identical to the single server described above, the only difference being that clients of the cluster cannot directly initiate communication with a drone, they must go through the master server in order to have a drone allocated to them. Thereafter, the drone server and the client communicate directly to accomplish the desired task much like the behavior of individual server flunkies. Many of the built-in server commands and functions listed above are associated purely with the business of coordinating activity between drones and the master server.

Another aspect provided by the present invention is the use of "Interest Profiles". As mentioned at the outset, the present server architecture is continuously acquiring new inputs from one or more feeds and examining items extracted from those feeds to see if they are of interest to any of the server clients. In such a case, a client would preferably be notified that a match has been detected so that the client can take whatever action is appropriate. The mechanism for performing this continuous monitoring on behalf of the clients is the interest profile. An interest profile consists of a standard format MitoQuest™ query (see the Ontology Patent materials incorporated herein) that is applied to each new item as it is acquired rather than searching on all available data. The logic associated with executing these queries within the context of the favorite flunky has been given above. In the preferred embodiment, when clients start up (or when a new interest profile is defined), the client registers all interest profiles/queries defined by the current user with the appropriate server(s) so that while the server is running it has a list of all interest profiles that must be checked against each new item. While startup and interest profile creation are the preferred way of triggering the registration function, many other events could also be defined to trigger the registration process. In the preferred embodiment, when the processing of a new input item completes successfully, the server instructs the favorite flunky to iterate through this list, testing the item just acquired against each query in the list. If a match is found, the server sends a notification to the corresponding client machine indicating that a hit has occurred. On the client machine, the user is notified (either audibly, visibly, or as otherwise dictated by the client) that such a hit has occurred. By taking the appropriate action in the user interface, the data corresponding to the hit can be immediately displayed. Because there may be commonality between the interest profiles defined by different users, the server framework may also be programmed to include logic for eliminating multiple executions of queries that are wholly or partially identical and this behavior can considerably reduce the load implied by interest profile processing. Since most users may be busy doing something else, and will only access data from the server if it matches their profiles, the processing of interest profiles may represent the majority of the computational load on any given server. Because of the heavy loads created by interest profile(s), there is often a need to distribute the process of one or more interest profiles on any given server over multiple drones so that each drone may independently process a part of the incoming feed and execute the associated interest profiles without the need to involve other machines. In addition to registering interest profiles when new items are added to a server, the present invention also permits registration of an "Event", which may be one of many different logical events that relate to the data type involved. For example, users may also register interest profiles on server behavior such as when items are updated, deleted, or even read. This capability has many implications in the monitoring of system usage either for tuning or security purposes.

While it has been stated that the environment being described is in many ways similar to a peer-to-peer architecture, the discussion so far has described the invention purely in terms of servers and clients. In the preferred embodiment, every client machine also has an automatic (preferably invisible) server that is run whenever the client software is active. This server is available to other machines, including servers, to allow them to query and interact with the client. One of the key behaviors provided by this built-in client—server is support for 'publishing' collections that exist in the client machine (see the Collection Patent materials that have been incorporated herein). This built-in server also allows the client to act as a server to any other machine on the network for one or more data types. This is identical to the behavior of machines in a peer-to-peer network except that it is implemented in this case as a special case where the client has a built-in server. In the preferred embodiment, there is in fact no difference whatsoever between the architectural software running in client machines and that running in servers. Indeed, the only difference between the two is caused by system configurations that cause certain machines to initiate as servers and others as clients. This exact match between the software running on the client and that running on the server in a data management framework is unique to this invention and provides extreme flexibility as the network can be rapidly reconfigured.

Client Functionality

The API function list given below illustrates the basic publicly accessible calls available to a client process to support operations within this architecture. As described previously this API can be extended (or truncated) as required for a given server type by use of custom functions or extension of the functions provided below. For additional clarification, the pseudo code associated with the API function list below is provided in Appendix B.

The function CL_GetServerClass( ) may be used to convert a ClientServer data type (an OSType e.g., 'FAKE') to the corresponding server type used when sending to the server. To do this, it switches the four characters in place such that the client type is the mirror image of the server type (i.e., for a client type 'FAKE', server type is 'EKAF'). This distinction is made in order to avoid the possibility of client and server events getting confused in cases where both the client and the server reside on the same machine. Events sent from the client to the server must use the server class, those from the server to the client use the unaltered data type.

The function CL_DoesItemExist( ) can be used to ask a server if a given Item ID exists in its database.

The function CL_DisplayMessageOnServer( ) can be used to display a simple one-line message on the status window of the server. Clients should use this to indicate the problem that caused them to fail to execute a given server request The function CL_GetServerLocation( ) can be used to get the server location (IP address) for a given data type. Returns TRUE for success, otherwise FALSE.

The function CL_DroneToLocation( ) can be used to get the drone location (IP address) for a given server and drone data type. Preferably the function returns TRUE for success, otherwise FALSE The function CL_LocationToDrone( ) can be used to determine if a given server type has a drone server (not necessarily running) at the IP address specified.

The function CL_ClrServerAddress( ) can be used to clear the server address for a given server data type. Preferably, this function is used when a communications error occurs with that server so that the system will continue to attempt to re-establish communication with the server until it returns. TRUE is returned for success, otherwise FALSE. In addition, this routine may be explicitly called before attempting to send a command to a server if it is suspected that the server may have gone off line for any reason. Making this explicit call will force a check before attempting to send any further server commands.

The function CL_SetDefaultNetCopy( ) can be used to specify the default (non-isochronous) file data transfer callback functions to be used by ClientServer when transferring files across the network from server to client in response to a CL_FetchItemFile( ) call. These defaults can be overridden on a per server/data-type basis by calling CL_SpecifyCallBack( ) for the data type concerned. The purpose of this API function is to allow the ClientServer architecture to be modified to utilize whatever file transfer protocols may be most appropriate for the environment and data type concerned. If no alternatives are specified by CL_SpecifyCallBack( ) for a given data type, the default transfer suite specified in this call will be used. The file transfer suite is defined as an abstract set of four procedures that are called by ClientServer as follows:

ET_NetCopyStarter—In the preferred embodiment, this function, called in the client, is passed two strings. The first is the fully expanded file path to the local disk where the output file is to be copied. This file may already exist or the file itself may not yet be created. This function would preferably perform whatever actions are necessary to set-up the transfer at the client end, returning whatever parameters are required by the responder function in the server in the output string parameter. A sample embodiment of a copy starter function is as follows:

```
EngErr myCopyStarter      (                         // network copy starter fn (client)
       charPtr                 outputFilePath,      // I:lcl output file path to be used
    charPtr                  paramBuff,             // O:Outpt param bffr
    long                     *context               // O:Context value (if required)
                          )                         // R:0 for success, else error #
```

ET_NetCopyIdler—In the preferred embodiment, this function, called in the client, is passed the same two strings as the copy starter function, the purpose of this function is to take whatever actions are necessary to sustain the transfer or abort it if it fails. When the copy process is complete (passed or failed) this function would preferably return TRUE in 'allDone', otherwise it should return FALSE in order to request additional calls. The idler function would also preferably be implemented to carefully use the processor time as it will be called regularly by the calling code until such time as it returns TRUE. The idler is not called if the starter function returns an error. If the idler function wishes to pass information to the 'Ender' function, it can do so by modifying the paramBuff buffer contents or the context record. The file transfer process actually completes, not when the idler returns TRUE, but when the ClientServer response is returned from the server. This means that the idler does not need to support the 'allDone' parameter if it does not want to. It also means that the transmission may abort for reasons other than a true response from the idler, so the 'ender' function must account for this. A sample embodiment is provided below:

```
EngErr myCopyIdler       (                         // network copy idler fn (client)
    charPtr                  outputFilePath,       // I:Lcl output file path to be used
    charPtr                  paramBuff,            // O:Output parameter buffer
    Boolean                  *allDone,             // O:TRUE to indicate copy completion
    long                     *context              // IO:Context value (if required)
    ET__FileNameModifier     fNameModFn            // I:Fn modify fle names - uniqueness
                         )                         // R:0 for success, else error #
```

ET_NetCopyEnder—In the preferred embodiment, this function is called in the client and is passed the same two strings as the copy starter function. The purpose of this function is to take whatever actions are necessary to tear down and clean up a transfer process (either passed or failed). A sample embodiment is provided below:

```
EngErr myCopyEnder      (                   // network copy ender fn (client)
    charPtr             outputFilePath,     // I:Lcl output file path to be used
    charPtr             paramBuff,          // O:Output parameter buffer
    long                *context            // IO:Context value (if required)
                        )                   // R:0 for success, else error #
```

ET_NetCopyResponder—In the preferred embodiment, this function is called by the server and is passed the contents of the paramBuff string created by the ET_NetCopyStarter called by the client and the local file path on the server for the item ID specified in the CL_FetchItemFile( ) call. The responder is preferably called within one of the flunkies of a standard server and as such can maintain control until completion. Once again, in the present invention, this function would manage its processor use so that other server activities can continue simultaneously. A sample embodiment is provided below:

```
EngErr myCopyResponder  (                   // network copy responder fn (srvr)
    charPtr             sourceFilePath,     // I:Locl source file path to be used
    charPtr             paramBuff           // I:Parameter buffer from in client
                        )                   // R:0 for success, else error #
```

In the preferred embodiment, the function CL_GetDefaultNetCopy( ) returns the address of the registered default net copy routines. This might be used by custom data type net copy functions that wish to use the basic capability but then add additional features in a wrapper layer.

In the preferred embodiment, the function CL_AddResourceToFile( ) adds the database descriptor structure as a resource to the file in place. A database descriptor record is created and the registered function to initialize a record is called. The file name is extracted from the source string and the item is copied to the name given. The local descriptor is disposed. This function could be used to pre-assign database descriptors to an item that will subsequently be put in the input folder. This might be performed when simultaneously creating other references to the item which contains a database ID, and must be kept consistent.

In the preferred embodiment, the function CL_GetResourceFromFile( ) recovers the database descriptor resource from a file recovered from a server. It is the opposite of CL_AddResourceToFile( ).

In the preferred embodiment, the function CL_PutInItemInputFolder( ) takes a file full path name and a database descriptor pointer (whatever that may be) and copies the specified file to the used server input directory, adding the database descriptor structure as a resource to the file as it does so. During the process, a temporary file of the same name is created in the temporary directory. Preferably, the name and path of the output file are conveyed to the caller and the handle is saved to the requested temporary file name so that the resource can be added before the copy process (to avoid server interference before completion of process). On completion, the temporary files are deleted.

In the preferred embodiment, the function CL_PutHInItemInputFolder( ) performs a similar function to CL_PutInItemInputFolder( ) except the data for the item is passed in as a handle, not in the form of an existing file. It is often more convenient to have the ClientServer package create the file to be sent automatically.

In the preferred embodiment, the function CL_AddItemUsingServerAlias( ) takes a file full path name and an database descriptor pointer (whatever that may be) and copies the specified file to the used server input directory, adding the database descriptor structure as a resource to the file as it does so. During the process, a temporary file of the same name is created in the temporary directory. The name and path of the output file are conveyed to the caller and the handle is saved to the requested temporary file name so that the resource can be added before the copy process (to avoid server interference before completion of process). On completion, the temporary files are deleted.

In the preferred embodiment, the function CL_GetServerStatus( ) checks to see if the server for a given data type is running. It preferably returns 0 if the server is running else the system error. This function could also be used to check to see if the used server disks are mounted on the client side (if used). In the preferred embodiment, the optionFlags argument has bits for getting the used information as follows: bit kIsServerRunning: if 1 check to see if server is running. If running, bit is CLEARED else it is set to 1 bit kIsDiskMounted: if 1 check to see if necessary server disks are mounted. If mounted, bit is CLEARED else it is set to 1 bit kListServerProblems:if 1 check for any problems that might impede use. If problems, bit is CLEARED else it is set to 1. If a problems exist, a description would preferably be placed in the 'explanation' buffer. For example, the following could be used: bit kGetServerSummaryText: if 1 produce textual server status summary. If supported, bit is CLEARED else it is set to 1. Additional bit masks could also be defined to determine other status information about a particular server.

In the preferred embodiment, the function CL_IsServerLocal( ) returns TRUE if the current machine is the same as that designated as the server machine for the specified type. This means that the server is running on the local copy of the environment. If the server can run on that machine, TRUE is returned, otherwise, FALSE is returned.

In the preferred embodiment, the function CL_DataTypeHasServer( ) returns TRUE if specified data type has an associated server, FALSE otherwise.

In the preferred embodiment, the function CL_GetNextIDFromServer( ) returns the next unique ID in the sequence for a given server.

In the preferred embodiment, the function CL_GetTimeoutTicks( ) given an options word as passed to CL_SendServerCommand( ), this routine returns the time in ticks for the associated communications timeout period. There are three possible values, short, normal, and long. Short and long timeouts can also be obtained by specifying options, such as 'kShortCommsTimeout' and 'kLongCommsTimeout' options respectively.

In the preferred embodiment, the function CL_SendServerCommand( ) is used to send commands from an client to a server for a given data type. Initially it verfies the server that is communicating. The caller's data is preferably added to the host and an Interest Profile fetch/load/unload may be requested. If the operation is successful, a 0 is returned, otherwise an error is returned.

In the preferred embodiment, the function CL_RelayCommandToDrone( ) is identical to CL_SendServerCommand( ) but allows commands to be relayed/routed to a specified drone. Unless implementing specialized protocols or engaging in an extended 'session', there is generally no need to such direct request as the system automatically handled such routing (as described above). In the preferred embodiment, the function CL_CallCustomFunc( ) allows any registered custom client function to be called and the appropriate parameters passed/returned. By accessing functionality for a given data type through this mechanism, it becomes possible to remove the requirement for linking the library associated with the type directly to the calling code. This allows calling code to be designed so that if a given data type/library is installed, it will use it (see CL_DoesTypeExist), otherwise it will not. In either case however, the calling code can be built and linked without needing the library to be present. This is a key benefit provided by modular systems. Most often the custom functions will amount to preparing a record to be passed to the data type server using the CL_SendServerCommand( ) function; however, they could also be local functions and need not communicate with the server. Any 'aCommand' values supported by a given type would preferably be defined as char constants (e.g., 'cmdl') so that they are easy to recognize in server error messages etc. Furthermore, these values will preferably correspond one-for-one with a 'command type' to be sent to the server so as to simplify things; the custom server commands and the function designators could also be treated as a single constant 'set'. Libraries may wish to declare macros for each custom function call in order to ensure that the correct number of arguments is passed. In order to process custom functions, a type would preferably define a custom function handler. A sample API is provided below:

```
EngErr myCustomFunc        (                    //cstm clnt fn handler
for type 'Crud'
        long               aCommand,            //I: custom command/fn
to implement
        OSType             aDataType,           // I: Must be 'Crud' in
this case
        int32              options,             // I: Various logical
options
        va_list*           ap                   // I: Var arg ptr
                           )                    // R: Zero for success,
else error #
{
    switch ( aCommand )
    {
        case 'cmd1':                            // params: int32 i1,
charPtr s1, etc.
            i1 = va_arg(*ap,int32);
            s1 = va_arg(*ap,charPtr);
            d1 = va_arg(*ap,double);
            ... etc.
        case 'cmd2':
    }
}
```

In the example above, the calls to va_start( ) and va_end( ) occur within CL_CallCustomFunc( ) and are not used in myCustomFunc. The routine CL_vCallCustomFunc can be used to pass a variable argument list through from the caller to the registered custom client function for the type specified. In this latter case, the calling code is responsible for calling va_start( ) and va_end( ).

In the preferred embodiment, the function CL_CallCustomFunc( ) allows a registered custom client function to be called and the appropriate parameters passed/returned. See CL_vCallCustomFunc( ) for details.

In the preferred embodiment, the function CL_NeedServerComms( ) invokes all initialization functions registered using CL SetIPinitTermCall( ). CL_xDumpServerComms disconnects from server communications with the specified data type. The routine is preferably called when the IP notifier widget receives its first command. It may also be called by any other widget that uses direct access to server commands. Finally, the handler records and buffer are de-allocated and dispossessed.

In the preferred embodiment, the function CL_DumpServerComms( ) invokes all termination functions registered using CL_SetIPinitTermCall( ). It is preferably called when the IP notifier widget terminates. It may also be called prior to termination by any other widget that has called CL_NeedServerComms for the same data type.

In the preferred embodiment, the function CL_SetInitTermCall( ) allows other libraries to register functions to call whenever the IP notifier (or any other widget) uses access to the server for a given data type.

In the preferred embodiment, the function CL_ClrInitTermCall( ) allows other libraries to remove initialization/termination functions registered with CL_SetIPinitTemmCall( ).

In the preferred embodiment, the function CL_DefineIP( ) defines/creates/updates an Interest Profile record. First, the function verifies the data type and then checks the record size and adjusts it accordingly. Ultimately, the IPs files will be updated and the result is returned. Preferably, the result will be zero for success, and an error code otherwise.

In the preferred embodiment, the function CL_GetIPlistHdr( ) returns the first IP in the IP list, NULL if there is none. By use of repeated calls to CL_GetIPfield, each element in the IP list will be examined.

In the preferred embodiment, the function CL_UnDefineIP( ) deallocates/disposes of an Interest Profile record. The Interest Profile is removed from the server and the link is disposed of. Any associated managers (such as a notifier widget and/or Data Type manager) are informed and the IP name is removed from the recognizer and the IPs file is updated In the preferred embodiment, the function CL_RegisterIP( ) registers an Interest Profile by name. When an interest profile is 'registered', it becomes known to the environment's IP notifier view/widget. This causes the IP to be loaded into the server and handles the display of any hits that occur for the IP by posting them to the pending views window and the view menu itself. Once an IP has been registered in this fashion, it effectively becomes the property of the IP notifier widget; the widget or code making the registration will preferably not de-register or undefine the IP concerned. This is true even on termination unless for some reason the IP hits can no longer be properly processed when the original registering widget is no longer running. Other than this case, the environment's IP notifier preferably takes over all responsibility for handling and disposing of a registered interest profile.

In the preferred embodiment, the function CL_DeRegisterIP( ) deregisters an Interest Profile by name to prevent subsequent accesses via CL_ResolveIP( ). Initially, the routine checks to verify the IP record. It then informs the widget notifier and Data Type manager and updates the IPs files.

In the preferred embodiment, the function CL_Resolve IP( ) resolves an Interest Profile registry name into the corresponding IP record pointer. In the preferred embodiment, the function returns the Interest Profile pointer or NULL for an error.

In the preferred embodiment, the function CL_GetIP field( ) allows various fields of an Interest Profile record to be retrieved. Zero is returned for success or an error otherwise. The field to be obtained is specified by the 'fieldSelector' parameter, while the 'fieldValue' parameter would be a pointer to a variable or buffer that is appropriate to the field being recovered. An example embodiment of such a field follows:

| SELECTOR | VALUE TYPE | DESCRIPTION |
|---|---|---|
| kIPoptionsFLD | int32 | Value passed in for 'options' when the IP was defined |
| kIPeventTypFLD | int32 | 32 bit event mask |
| kIPdataTypFLD | OSType | The ClientServer data type for this IP |
| kIPurgencyFLD | char | The urgency level for the IP |
| kIPvoiceIndexFLD | char | The voice index to be used when speaking IP name etc. |
| kIPiconIdFLD | short | Icon ID used in Pending Views window to ID this IP |
| kIPcontextFLD | void* | value passed for 'context' when the IP was created |
| kIPnameFLD | char[256] | The name of the IP |
| kIPexpressionFLD | charHdl* | MitoQuest ™ expr. defining the IP match criteria |
| kIPmachineNamFLD | char[256] | machine name IP belongs to (rel for srvrs only) |
| kIPuserNamFLD | char[256] | user name IP belongs to (rel for servers only) |
| kIPnextIPFLD | ET__IPRecordPtr* | Address of the next IP in the IP list |

In the preferred embodiment, the function CL_GetDataTypeOptions( ) obtains the options specified when a data type was created using CL_DefineDataType( ). In the preferred embodiment, the function CL_FetchItemPreviews( ), when given an array of 'database descriptor records' for a particular client/server data type, retrieves the 'preview' data associated with those records (if available) and attaches it to the records. For example, if the data type were an image, the 'preview' data might be a picon of the image whereas if the data type was text, the preview might be the text itself. Some data types may not have preview data. This function can also be used to obtain the database descriptor records (for those servers that support this) by using the 'kWantDescRecs' option. In this case, only the 'unique ID' field of the descriptor records needs to be set up prior to the call, the entire descriptor will be filled in from the server (optionally also with the preview data). This function serves the dual purpose of associating preview data with existing descriptor records, or of initializing empty descriptor records (other than ID) and optionally the associated preview data. Zero is returned for success, otherwise error number is returned.

In the preferred embodiment, the function CL_IsFileCached( ) determines if a file is already cached locally and if so returns the file path in the cache.

In the preferred embodiment, the function CL_AddFileToCache( ) adds an arbitrarily named file, to the internal database of files that are in the local ClientServer file cache. This function is preferably called automatically by CL_FetchItemFile( ), in which case the file names will conform to the syntax returned by CL_GetCacheFilePath( ). If the file is being moved by some other means, however, this function can be called after the file has been moved in order for the moved file to subsequently be recognized as cached. In this latter case, the file name can be arbitrary. If a subsequent call attempts to access the file at the location specified and it is no longer there, CL_FetchItemFile( ) will re-fetch the file from the server and delete the missing file from the database of cached files, adding the new one.

In the preferred embodiment, the function CL_AddDataToCache( ) adds an arbitrarily memory resident data handle, to the internal database of files that are in the local Client-Server file cache. This mechanism is intended to allow the ClientServer cache to be used to store additional data types that do not have a corresponding CLientServer server associated with them. To make use of the facility, a unique data type and an item ID within that type must be supplied. This function takes the data handle supplied and saves if to a path within the cache that is constructed based on the data type and ID. Items saved in this manner can be manipulated using the other ClientServer cache functions in this package. The only difference is that since there is no corresponding server, only items in the cache will actually be accessible.

In the preferred embodiment, the function CL_ScanCacheForNewFiles( ) scans the cache all folders (recursively) referenced from the main cache folder looking for "CachedFileDB" files. When it finds one, it opens it and attempts to add and files referenced by it to the main "CachedFileDB" file of the cache folder. What this means is that to add a previously saved cache to the current one (e.g., burned onto a CD-ROM and then referenced via an alias in the main cache), all that is required is invocation of this function. In the preferred embodiment, this function is called automatically following system startup and can also be initiated from the Administration window after a new alias has been added to the cache. This makes it relatively trivial to augment a machine's cache with additional cached files.

In the preferred embodiment, the function CL_PurgeCache( ) is called regularly by the environment. If it discovers that the disk(s) containing the cache folder is becoming full, it purges old files from the cache until disk utilization falls below acceptable limits. This routine could be called explicitly to ensure a certain amount of free disk space. Files are purged starting with the oldest and file purges could be further limited by other limits. For example, this function could be implemented such that files less than 2 hours old are not purged unless the purge ratio is set to 100 %.

In the preferred embodiment, the function CL_DeleteFileFromCache( ) deletes a file from the ClientServer file cache and removes its entry from the cache database. The file may be specified either by DataType and itemID or by file path. For obvious reasons, the former is considerably more efficient.

In the preferred embodiment, the function CL_GetCacheFilePath( ) returns the file path that CL_FetchItemFile( )

would use to cache the corresponding data if it were requested. This function could be used in the event that the file is placed into the cache by some other means while still permitting retrieval by CL_FetchItem( ).

In the preferred embodiment, the function CL_CueItemFile( ) causes a server to take whatever action is necessary to cue a file for subsequent playback, this could include mounting the corresponding archive 'chunk' in the server (or one of its drones). The main purpose of the 'cue' command is to allow clients to predict that an item file may be requested by the user and thus begin the process of loading it in order to save time should a subsequent file fetch be issued. In the preferred embodiment, unless the 'aNetworkFilePath' parameter is set to non-NULL, the cue command returns immediately. By setting 'aNetworkFilePath' non-NULL, the caller will wait until the cue operation is complete at which time the full network path where the file was placed is known. Since servers are free to move media that is not currently in use in the preferred embodiment, the path returned should only be considered valid for a short period of time (i.e., seconds). Otherwise, the path should be verified again by issuing a fresh 'cue' command.

In the preferred embodiment, the function CL_FetchItemFile( ) can be used to move the contents of a file-based item to a local file. It returns zero for success, otherwise an error number.

In the preferred embodiment, the function CL_DefineEventType( ) allows the names and bit masks for data specific server events to be defined to the server so that Interest Profiles and searches can be specified in terms of these events. Certain event types are predefined by the standard server package, notably:

'kMatchItemAdd'—"Add" triggered when a new item is added to the data set

'kMatchItemWrite'—"Write" triggered when an existing item is written to

'kMatchItemDelete'—"Delete" triggered when an item is deleted

'kMatchItemRead'—"Read" triggered when an item is read/accessed

Additional data specific actions can be defined using this function and then used in creating Interest Profiles. The caller supplies a textual description for the event (such as those in quotes above) together with a bit mask specifying which bit (0 . . . 23) is to be used to specify and check this condition. By making a series of such calls, a complete description of all available event types for a given server and data type can be defined. TRUE is returned for success and FALSE otherwise.

In the preferred embodiment, the function CL_MaskToEventType( ) translates an (single bit) event type mask associated with a ClientServer data type into the corresponding descriptive string. Only the lowest bit set in the mask is extracted. The association between these bit masks and the corresponding event type is made by calling CL_DefineEventType( ). TRUE is returned for success, otherwise FALSE is returned.

In the preferred embodiment, the function CL_EventTypeToMask( ) translates a descriptive event type string to the corresponding mask for a given ClientServer data type. A search is performed for the exact match to the string. The association between the bit masks and the corresponding event type is made by calling CL_DefineEventType( ). Success returns TRUE, otherwise FALSE is returned.

In the preferred embodiment, the function CL_List Events( ) returns an alphabetized, carriage return (<nl>) separated list of all the IP event types supported by the server for given data type. Initially the data type is verified. Once a string list is obtained, it is sorted alphabetically. The descriptive field is extracted and the string list unsorted. NULL is returned for an error, otherwise handle to event type list.

In the preferred embodiment, the function CL_GetServerItemCount( ) returns the count of the number of items for a given server.

In the preferred embodiment, the function CL_DeclareEvent( ) can be called either within a server or from a client in order to declare that a specific event has occurred for the data type concerned. The effect of making such a declaration is to request the server to check all interest profiles to evaluate if any of them should trigger as a result of the declaration and if so to inform any interested clients (as described above). Interest profiles can be defined based on the action that the interest profile is interested in. One such action is "Add" which occurs automatically when a server adds an item to the server database. In the preferred embodiment, predefined actions such as "Add" do not use explicit calls to CL_DeclareEvent( ) since these are made automatically by ClientServer code.

In the preferred embodiment, the function CL_SpecifyCallBack( ) can be used to specify one of the various callback functions used by the ClientServer architecture. See the description above for a full list of the possible call-backs that can be registered and their purposes.

In the preferred embodiment, the function CL_ObtainCallBack( ) can be used to obtain the address of one of the various callback functions used by the ClientServer architecture. Some callbacks are used, others are optional depending on the nature of a particular server and data type. See CL_SpecifyCallBack( ) for details.

In the preferred embodiment, the function CL_DefineDataType( ) allows the data type and server information for a particular server data type to be defined. Using this information, this function is able to construct appropriate dialogs, determine server state, and communicate with the server both as part of Interest Profiles and also for retrieving data of the type given. Initially, data type verification is performed and subsequently the new record is added to the linked list and tweaking parameters are handled. A string list is created for the event types and all the tags are set equal to the first field. The value TRUE is returned for success, otherwise FALSE is returned.

In the preferred embodiment, the function CL_StandardHitListQuery( ) can be used to issue a query command (kCSStandardQuery) for the express purpose of obtaining a standard hit list from a specified server or from multiple servers. The hit list obtained is in the form of a standard hit list (of type ET_HitList). Preferably this function is invoked invisibly via the MitoPlex™ API, however, it could also be used to allow more specialized direct uses.

Server Functionality

The API listing below gives the basic suite of public calls available for customizing code that is running within a server or which is manipulating server state directly. Most of these calls will fail if invoked outside the context of a server or one of its drones/flunkies. Again, while the following is the preferred embodiment, any number of different or related API calls could also be provided. For additional clarity, Appendix B includes a sample pseudo code embodiment of the header files associated with such functions (which are described below).

In the preferred embodiment, the function SV_ShowFlunkyWindows( ) ensures all flunky windows are showing.

In the preferred embodiment, the function SV_WidgetModalEnter( ) and SV_WidgetModalLeave( ) are called as a widget modal window is show or hidden. These function allow the client server package to take certain specialized actions in the case where the widget modal belongs to a flunky of a standard server. More specifically, in the preferred embodiment, the action taken is to register a symbolic function so that the widget modal will always be re-shown when the main server window is brought forwards. This function prevents loss of such a window when clicking on another widget.

In the preferred embodiment, the function SV_ServerInitComplete( ) allows flunky threads within a server to determine if the main server thread has completed initialization yet. It is often important to ensure that no other activity occurs before the main thread has established a consistent logical environment within which such activity can take place.

In the preferred embodiment, the function SV_AllServerInitsComplete( ) allows code in any context to determine if all servers in the current machine have completed their startup sequence. If there are no local servers, this routine returns true immediately.

In the preferred embodiment, the function SV_SetArchiveSuite( ) is used to specify the default suite of functions to be used for archiving. In the preferred embodiment of this function, a standard archiving software suite is registered using this function so that individual servers need not consider the requirements of archiving other than to set the necessary option. Specialized archive suites could also be registered on a particular server.

In the preferred embodiment, the function SV_PutInItemRejectFolder( ) takes a file path and moves the specified file to the Reject directory, optionally deleting the source file. The file name is extracted from the source string and concatenated to the directory where the file's existence is verified.

In the preferred embodiment, the function SV_GetServerFolder( ) can be used to obtain the full file path to one of the four server folders. Return Zero for success, otherwise error number.

In the preferred embodiment, the function SV_GetArchiveTweakRecord( ) returns a pointer to the archive tweak record for a given server type. The result is a pointer to the archive tweak record, or NULL in the case of an error.

In the preferred embodiment, the function SV_GetTweakRecord( ) returns a pointer to the tweak record (the tweak record should not change when the server is running) for a given server type. The result is a pointer to the tweak record, or NULL in the case of an error.

In the preferred embodiment, the function SV_GetCurrentBatchDetails( ) is used to obtain details of the batch currently being processed by a given server. This function is preferably called from within server plugin.

Given the size of the resource and data forks of a file and the block size for the target device, SV_GetBlocks( ) returns the number of blocks that will be consumed by the file on that device.

In the preferred embodiment, the function SV_FetchArchiveChunkID( ) fetches the archive 'chunk' ID associated with a given item in the server. For example if the server archiving device includes a CD-ROM based device, the chunk ID would be a unique (within this server) reference to the particular CD-ROM on which the item resides. The chunk ID value returned can be utilized in subsequent archive specific server commands.

In the preferred embodiment, the function SV_Index2FolderName( ) creates a base 36 folder name string encoded into 5 characters as follows "@XXXX" where each 'X' character can be 'A' to 'Z' or '0' to '9'. In the preferred embodiment, the function SV_FolderName2Index( ) can be used to convert these folder names back to a numeric value. The reason for such a function is avoid limits on the number of output folders that can be created by the ClientServer package. If a decimal encoding were used, only 10,000 output/archive folders would be allowed. By using base 36 encoding, the number is nearly 1.7 million. Again, additional or modified encoding schemes could also be used depending upon the application.

In the preferred embodiment, the function SV_FolderName2Index( ) creates a base 36 folder name string encoded into 5 characters as follows "@XXXX" where each 'X' character can be 'A' to 'Z' or '0' to '9'. In the preferred embodiment, the function SV_FolderName2 Index( ) can be used to convert these folder names back to a numberic value. The rationale for this approach is set forth above.

In the preferred embodiment, the function SV_DefineDroneType( ) is used to define a 'drone' data type. A 'drone' data type is a data type for which the server is not usually directly addressed but is associated with a primary data type server. This is similar to the way that flunkies are associated with a server. Preferably, drone servers are treated exactly like primary server flunkies except that drones servers often reside on another machine. This may be necessary if the task being assigned is very computationally intensive or if the drone is being used to access and deliver data from storage devices that are actually connected to the drone machine, not the prime. As an example, a video server might consist of a single prime server with a number of drones, each capable of sustaining a certain number of streams direct to the original clients, but all of which are actually accessed via requests to the prime. In actual operation, the primary server can assign a task to one of its own flunkies, which in turn can re-assign the task to a drone server, hanging up until the drone sends a completion message. A complete API would also preferably provided for server plugins in order to search and assign available drones of a primary server. In theory, drone servers themselves could have drones.

In the preferred embodiment, the function SV_CountDrones( ) returns a count of the number drone servers/data types that are associated with a given master type.

In the preferred embodiment, the function SV_GetDroneType( ) returns the drone type corresponding to a given index within the drone types list of a given master data type.

In the preferred embodiment, the function SV_IsAssociatedDroneType( ) returns true if the specified drone type is associated with the current server, false otherwise.

In the preferred embodiment, the function SV_FindLeastBusyDrones( ) returns the least busy drone(s) out of a list of drones.

In the preferred embodiment, the function SV_GetStatusWord( ) returns the status word corresponding either to a server itself, or to a given index within the drone types list of a given master data type. Servers can declare their 'status', which in the preferred embodiment is a 16-bit flag word, by calling SV_DeclareStatus( ). In the case of drones, this status is relayed to the master where it can be examined using this routine. This feature is intended to support applications where various drones of a server may go in and out of certain 'states' that need to be communicated to plugins in the master (e.g., routers etc.). The preferred use of the status word is as an array of bits where a server would update any state bit individually. An example follows:

```
status = SV_GetStatusWord(myDataType,-1)        // get current status
SV_DeclareStatus(status | aNewStatusBit)        // set the bit we're concerned with
```

In the preferred embodiment, the function SV_DeclareStatus( ) sets the contents of a servers status word. See SV_GetStatusWord( ) for additional details.

In the preferred embodiment, the function SV_MakeServerView( ) adds an instance of the built in 'IP Server' widget to a view. This widget preferably provides multi-user server capabilities for a particular data type, including support for notification of clients based on the triggering of interest profiles. Initially the data type is verified. The server view is created in such a way that it cannot be halted other than by software termination. The return value is the launch code of the created view or 0 for error.

In the preferred embodiment, the function SV_ArchiveThisFile( ) returns TRUE if the specified file in the server output folder should be archived, FALSE if not. For non archiving servers, the result is always FALSE. For archiving servers, the result may be FALSE in cases where archiving has been turned off, such as be using SV_SetFolderArchiveEnb( ) for some folder ancestral to the file.

In the preferred embodiment, the function SV_InitiateBatchScan( ) initiates an output folder scan for the purpose of sending the files in the specified batch to a burn device.

In the preferred embodiment, the function SV_PerformArchiveBurn( ), through various registered archiving callbacks, performs an archive burn sequence for the batch ID specified.

In the preferred embodiment, the function SV_GetStatePtr( ) can be called from any context to discover the local server state pointer for a given data type. This is not the preferred methodology other than rare cases.

In the preferred embodiment, the function SV_GetClientOptions( ), when called from within a server flunky, returns the options specified on the current command at the time of the call to CL_SendServerCommand( ). In addition to the standard options bits for this function, the preferred embodiment also provides eight custom option bits (starting from 'kCustomCmdOption1') that can be used to pass parameters to custom command functions in the server, for example. This function is intended to allow retrieval of these options.

In the preferred embodiment, the function SV_GetDatabasePtr( ) can be called from within a standard server and gets the database record pointer address associated with the specified server. This pointer may be used by ClientServer callbacks in order to make calls to the Database API to manipulate the ClientServer database directly.

In the preferred embodiment, the function SV_GetArchiveDBPtr( ) can be called from within a standard server and gets the database record pointer address associated with the archive for a specified server. This pointer may be used by ClientServer callbacks in order to make calls to the Database API to manipulate the ClientServer archive database directly. If the server does not support archiving, the return value will be NULL.

In the preferred embodiment, the function SV_AddArchiveBatchID( ) can be called within an archiving server (or its plugins) to add a new archive batch to the archive DB and return its batchID.

In the preferred embodiment, the function SV_SetFolderArchiveEnb( ) can be used to enable/disable archiving for a specified server output sub-folder (and any folder hierarchy it contains). The routine (as presently implemented) is only valid when called from within a standard server or one of its flunkies. In certain situations, especially those where a server output sub-folder contains a limited set or may be subject to frequent updates, it is often desirable to turn off archiving for that portion of the server hierarchy since, once archived, updating of the content may no longer be possible (depending on the nature of the archive device such as 'write once' devices).

In the preferred embodiment, the function SV_SetupMessage( ) can be used by standard server callback functions, and internal environment code, to display messages both in the momentary activity display in the server window, and also in the time history display (if that option is enabled). If the 'log' parameter is true, the string is added to the time history window, otherwise it is not. This is useful when code displays status messages that you do not wish recorded as well as exception condition messages that you do. In the preferred embodiment, this function behaves just as an 'sprintf'; that is, string substitution parameters may be specified as "normal" (up to a total message size of 256 characters). The flunky index and state pointer parameters necessary for this call may also be obtained by calling SV_GetStatePtr( ). In the preferred embodiment, if the 'kServerHasTimeHistory' option is not selected when the server is created, the time history information is not recorded but all strings are still displayed to the momentary display (such as in the server window).

In the preferred embodiment, the function SV_Ping Client( ) can be called from within a server context and will look for the current client widget, on the appropriate machine, for the calling flunky. If the client machine or widget cannot be found, this function returns FALSE, otherwise it returns TRUE. No actual communication with the client widget occurs; rather, its presence is simply sensed. In cases where a server flunky may stay connected to a client for long periods of time and where there may be no obvious activity from the client, it is wise to ping the client on some regular basis (e.g., once a minute) so that if the client has actually gone away, the server process can be aborted and any allocated resources released.

In the preferred embodiment, the function SV_AutoPingClient( ) causes the client associated with a flunky to be auto-pinged at the specified interval. If the client goes away, the specified wake handler will be called so that the flunky can take whatever action is appropriate to tear down allocated client resources.

In the preferred embodiment, the function SV_SetPicon( ) displays (or erases) a new picon in the server picon window.

In the preferred embodiment, the function SV_SendToClient( ) can be called within an non-favorite flunky of a server in order to send a message to the client that caused the flunky to be instantiated. This permits client notification of the progress of a request etc. A reply to this message will generally not be returned from the client unless the reply is handled in another flunky. In other words, in the preferred embodiment, this is a one-way communication scheme.

In the preferred embodiment, the function SV_ForwardCommand( ) can be called from within a flunky of an existing server to forward a command received unmodified to another server. This mechanism allows one server to server as a router to other servers since the command is sent by 'proxy' and thus the reply goes back to the originating client, not to the caller of SV_ForwardCommand( ). Commands can be re-routed multiple times using this proxy mechanism thus allowing the creation of large networks of servers where the topography of a particular server cluster is hidden from external clients via a 'router' server. The ability to re-route commands by proxy (in conjunction with the server 'drone' mechanism) is important to the creation of servers that are implemented as a 'cluster' of machines all of which appear as a single logical server.

In the preferred embodiment, the function SV_PrepareFileForXfer( ) can be called to prepare a file for transfer to a client without actually doing the transfer. If files are being transmitted to the client by some other means, this function could be called to ensure the file is available/mounted before you begin the transfer. In the preferred embodiment, this function can be called either in the master server or a drone and in the former case may route the original command to the selected drone (returning −1). For these reasons, the code that calls this function would preferably appear in both the drone and main server custom command functions.

In the preferred embodiment, the function SV_ReplaceCommand( ) can be called prior to a call to SV_ForwardCommand( ) in order to alter the actual command that is being forwarded. The original command is disposed and replaced by the new command supplied, a subsequent call to SV_ForwardCommand( ) will cause the new command to be forwarded. Parameters are identical to CL_SendServerCommand( ) except for the first two and the fact that 'aDataType' is not supplied since it is implicitly the data type of the enclosing server.

In the preferred embodiment, the function SV_GetOptions( ) is only valid within the context of a ClientServer server or it's flunkies and callbacks. SV_GetOptions( ) returns the options parameter specified when the server way created (See SV_MakeServerView), SV_SetOptions( ) allows the options to be dynamically modified.

In the preferred embodiment, the function SV_Set Options( ) is only valid within the context of a ClientServer server or it's flunkies and callbacks. SV_GetOptions( ) returns the options parameter specified when the server way created (See SV_MakeServerView), SV_SetOptions( ) allows the options to be dynamically modified.

In the preferred embodiment, the function SV_GetContext( ) returns the value of the server context field set by a prior call to SV_SetContext( ). In general, if server flunkies or callbacks need a global context record, a server function will be registered (using SV_SetIPinitTermCall) in order to create the context when the first widget within the server is created. Similarly, another function is preferably registered to terminate the allocation. Thereafter, any subsequent callback code may obtain the context by calling SV_GetStatePtr( ) to obtain the server state pointer, and then SV_GetContext to obtain the context value. The value of the context field is returned.

In the preferred embodiment, the function SV_Set Context( ) sets the value of the context field within a server state record. This context value may be obtained from any flunky or callback function by calling SV_GetContext( ).

In the preferred embodiment, the function SV_GetArchiveContext( ) returns the context value associated with the archiving process for a given server. A separate context location provided for archiving (in addition the that provided by SV_GetContext) in order to ensure that the normal context location is still available for custom use by each server independent of the archiving software registered for that server.

In the preferred embodiment, the function SV_SetArchiveContext( ) sets the value of the context field within a server state record. This context value may be obtained from any flunky or callback function by calling SV_GetContext( ).

Calls to SV_SetReply( ) are preferably made within a custom command handler callback function (ET_CustomCmdFn) for a ClientServer server. In the preferred embodiment, the function is used to set a pointer to a block of data to be returned to the client as the reply. If the 'wantReply' parameter to the ET_CustomCmdFn function is FALSE, SV_SetReply should not be called since the reply data will simply be discarded. Replies may be passed back to the client either synchronously or asynchronously and each reply is uniquely tagged using a value supplied by the original caller. In the preferred embodiment, the buffer supplied will be duplicated and attached to internal server structures so that it may be a local variable. Its size may be anything from a single byte up to the maximum size of the client receive buffer. The return value for success is Zero, otherwise an error number is returned.

In the preferred embodiment, the function SV_SetItemListReply( ) may be called from a server callback function. Its purpose is to cause the reply event from a custom server command to be an item list (see SV_RequestItemsList( )). This call will fail if the client did not specify that it was anticipating an items list reply by setting the 'kResponseIsItemList' option. The item list sent will consist of a series of descriptor records as defined by the data type involved, however, if necessary, the item list will be sent as a series of 'chunks' of items which are automatically reconstructed at the other end into a contiguous list. This mechanism should be used in any case where the number of items resulting from a callback function is unknown and might possibly overflow the client receive buffer if an attempt to send them as a normal reply record were made. By using this scheme, it is possible to keep the size of the reply buffer that must be allocated by each client to a reasonable value even if hundreds or thousands of items may be sent in response to a given command. The client end code (presumably in a custom function procedure), issues the appropriate command with the 'kResponseIsItemList' option set, the data appearing in the reply record will consist simply of a handle to the item list. The 'aMarkupFn' parameter may be used to specify a function that is called for each descriptor/data item in the list (after it has been recovered but before it has been sent). This function is passed the 'aMarkupContext' to allow it to establish context, its purpose is presumably to alter the descriptor or data record being sent in whatever way might be appropriate given the context of the call. Thus, if there is additional information to be inserted into the descriptor record or data for this command type, the 'aMarkupFn' function can be used to do so.

In the preferred embodiment, the function SV_DontWaitForMe( ) can be called from a server flunky when that flunky is engaged in some lengthy action which should not inhibit normal operation of the 'favorite flunky' (which is responsible for acquiring and processing new input from the input folder). In the preferred embodiment, the default behavior of the invention is to inhibit activity by the favorite flunky whenever there is any outstanding activity for other flunkies. This is based on assumption that providing rapid responses to client requests is more important than it is to acquire new items for the server database. Note that if a flunky calls this function, the server will not wait for that flunky when being 'stopped'. The same is true when the environment is 'Quit' so if this causes a problem for the flunky, it should either not call this function, or should register a termination function in order to perform the necessary cleanup.

In the preferred embodiment, the function SV_GetClientLocation( ) can be called from a server flunky (other than the favorite flunky) or callback code invoked from such a server flunky. In the preferred embodiment, the function returns the network path of the client machine that the flunky is currently handling.

In the preferred embodiment, the function SV_GetOutputFilePath( ) can only be called from within a standard server. It gets the partial output file path (if any) for a given item ID. In order to construct the full file path, this partial path must be appended to the output folder base path which may be obtained using SV_GetServerFolder( ).

In the preferred embodiment, the function SV_DefineMaintenancePage( ) can only be called from within a standard server. Using the 'book' API, this routine allows the names, handler functions, etc. for custom views/pages in the server maintenance (or wrench) window to be specified to the ClientServer package. In order to add a new page to the maintenance window, its name must be specified and an appropriate handler function supplied. The ClientServer itself registers one page called "Server Items" which allows limited examination of and control over the state of the items contained in the server. In addition, if archiving is enabled, an "Archive Items" page is automatically registered, which allows examination and manipulation of the 'chunks' of storage (e.g., CD-ROMs) that make up an archive. The "Server Items" and "Archive Items" pages are supported by additional ClientServer APIs which allow servers and archive suites to register iconic buttons and the corresponding action functions so that it is possible to provide all the basic server manipulation functionality without having to explicitly write any UI code. Often, archive suites will also register an "Archive Devices" page, which allows explicit access to, and control over the autoloader device(s). Other custom server types may wish to register a "Server Status" page which can be used to display additional status over and above that provided by the standard window. Other uses of the maintenance window for purposes unique to a particular custom server are envisaged. TRUE is returned for success and FALSE otherwise. A typical maintenance page handler might appear as follows:

```
Boolean myMaintPageHdlr   (
        ET_CSStatePtr       ip,             // I:Server state
pointer
        charptr             pageName,       // I:name of the page to
be handled
        ET_UIEventPtr       anEvent,        // I:UI event/msg to be
handled
        short               action,         // I:Action (see notes)
        ET_ControlRef       aControlH       // I:Control handle for
page                                    )               // R:TRUE
if the event was handled
{
    if ( action == kHandleUIevent )
        switch ( anEvent->messageType )
        {
            case kEventMsg:                 // Raw event received
                ...
                break;
            case kWindowMsg:                // Window or control hit
                switch ( anEvent->controlLabel )
                    ...
                break;
        }
    else
        ...
    return YES;
}
```

Only one view/page is visible in the maintenance window at any given time. When the user clicks on the 'wrench' control in the server main view, the maintenance floating window would be shown. In the preferred embodiment, control label numbers below 100 are reserved exclusively for ClientServer use within the maintenance window. The title of the view control you supply must match the 'pageName' parameter exactly and the view's dimensions must be 408h*168v. In the preferred embodiment, the function SV_GetActiveMaintPage( ) allows you to obtain the maintenance page that is currently active (if any).

In the preferred embodiment, the function SV_GetPageRegistry( ) gets the page registry for the maintenance window. The ClientServer maintenance page capability supports the ability to create an arbitrary ET_StringList registry associated with each page of the maintenance window. This capability is available for custom use, however, in the case of the built in maintenance pages (i.e., "Server Items" and "Archive Items"), the registry is used to register custom buttons, icons and action functions associated with the page. See SV_DefineItemPageButton( ) for details. When the maintenance page is destroyed, the corresponding ET StringList that makes up the registry is also deleted. The string list is automatically set to be the context value for the book page, i.e., it will be passed to any page handler in the context field, replacing any value set in the UI_DefineBookPage( ) call. ClientServer initially sets the context value to zero when creating a page via SV_DefineMaintenancePage( ).

In the preferred embodiment, the function SV_DefineItemPageButton( ) is associated with the predefined "Server Items" and usually with the "Archive Items" pages in the server maintenance window. It utilizes the registries (see SV_GetPageRegistry) associated with these pages to store the details of a series of buttons that are displayed whenever a given item in the list of server/archive items is selected. For other maintenance pages, the registry may be used for other purposes and calls to this routine may not succeed. This routine inserts entries into the ET_StringList (using the kStdDelimiter delimiter) where the field contents are as follows: "buttonName" kStdDelimiter "buttonHelp" kStdDelimiter "buttonType" kStdDelimiter "buttonData" kStdDelimiter "buttonHandler" You may recover any of this information later using SV_GetItemPageButton( ). In particular, you should ensure that during termination of your page, you dispose of any memory associated with the 'buttonData' handle since this is not automatic. You generally define the possible set of buttons for a page on the 'kInitializePage' call to the page handler, and dispose of the button data on the 'kTerminatePage' call.

In the preferred embodiment, the function SV_GetItemPageButton( ) recovers the information for a button associated with a maintenance window registry. See SV_DefineItemPageButton( ) for details.

In the preferred embodiment, the function SV_GetFavoriteFlunkyID( ) can be called from anywhere within the context of a server 'cluster' and returns the widget ID of the favorite flunky of the cluster. This allows code running in other flunkies or the main widget (especially in maintenance pages) to issue commands to the favorite flunky using wake events. In this manner the maintenance page code can cause lengthy operations to occur in the favorite flunky context thus avoiding hanging up the server itself.

In the preferred embodiment, the function SV_CustomCommandFavFlunky( ) is used to issue a command to the favorite flunky of a ClientServer server while ensuring that commands do not overrun the flunky and maintaining all necessary server states. This function can be used within a ClientServer server cluster.

In the preferred embodiment, the function SV_CustomCommandFlunky( ) can be used to issue a custom command call to any available flunky (other than the favorite flunky) of a ClientServer server. This function can be used within a ClientServer server cluster. The call is asynchronous and no reply is anticipated. This routine would preferably only be used for commands that are synthesized internally to the server, not for relaying commands originating from a client. The purpose of using this routine (rather than creating a separate non-server flunky explicitly) is that any flunkies created in this manner become part of the server accounting for how many 'clients' it is busy handling. This behavior may be necessary if the original command handler must complete and reply to the client but the processing of the clients command is not yet fully complete.

In the preferred embodiment, the function SV_GetDefaultQueryFunc( ) returns the address of the default query handler function provided by the server package. For example, in cases where a custom query handler function has been registered for a server, it could perform code similar to the following:

```
{
    if ( queryText starts with custom flag sequence (e.g., "SQL:")
            or 'funcName' is our special type )
    hitList = perform the custom query using whatever method is
    applicable
    else
        qFn = SV_GetDefaultQueryFunc( )
        hitList = qFn(...)
    return hitList
}
```

Alternatively, the standard query could be allowed to execute and modify the resultant hit list.

Logical Mass Storage Functionality

Although the server API allows the direct registration of all plug-ins necessary to handle robotic mass storage, in the preferred embodiment the Logical Mass Storage layer also provides these plug-ins for an archiving server. This is primarily because the complexity of actually implementing mass storage correctly means that a higher level, simpler API is required that performs all the MSS functions and requires only the registration of a number of 'driver' plug-ins in order to allow control of a new robot or media type. A number of support functions are provided to make the definition of new robotic drivers a relatively easy process. To do this, the abstraction defines a robotic storage device to be comprised of a number of standardized components, and the registered driver maps the actual robotic arrangement into this logical model. In the preferred embodiment, a storage robot is logically (though not necessarily physically) comprised of the following:

Media Slots—Each robot has some number of slots into which media can be placed and from which the media can be retrieved. Slots may be either empty or full depending on whether they contain media at the time or not. If media exists in a slot, it may be either blank (i.e., not yet written) or not. Many robots divide slots into a set of shelves and thus the driver must convert the logical slot number into an X,Y form in order to address the actual physical arrangement of slots within the machine.

Shelves—As mentioned above, media slots may be organized into groups or shelves. Some robots support the removal and re-insertion of an entire shelf containing many media items. In certain robots, media is held in caddies. In this case, the concept of a shelf is mapped to the caddy system and the robot may provide a separate import/export mechanism for caddies. Because of this, slots themselves have an additional logical state that they either 'exist' or they do not (i.e., the shelf that contains them has been removed).

Drives—Robots may contain some number of drives which may be divided into two types, 'writer' drives, i.e., those capable of burning new media, and 'reader' drives which are capable only of reading the burned media. Some drives may be both read and write capable.

Import/Export Slot—Most robots support some kind of mechanism for inserting and removing media to/from the robot, usually referred to as a 'mailbox'. Logically, the MSS system assumes the existence of an import/export slot in order to perform actions requiring the insertion or removal of media.

Transport—When media is moved from one location to another within the robot, some kind of transport device or 'picker' is used. Thus logically, media may be in the transport during the time it is being moved and thus the transport is unavailable for other moves until the media concerned leaves the transport.

Controller—In order to issue commands to the robot, the software 'talks' to a controller device that supports a command set allowing media movement of various types. Communication with the controller may be either by serial, SCSI, Internet, or any other logical communication means.

In the preferred embodiment, in order to logically refer to the various possible locations that media may be moved to/from, the logical MSS layer assigns the following numeric values to various locations which must be translated by the driver into the corresponding locations in the physical robot:

0-16383—Media Slot locations 16384-16384+256—Drive locations

32767—The transport

32766—The import/export slot

In this abstraction, to add a new robot type, the following plug-ins may be used:

| FN. TYPEDEF | cmdName | REQD | DESCRIPTION |
|---|---|---|---|
| ET_MSSChunkMover | "Move" | Y | Move chunk from one location to another |
| ET_MSSSlotIniter | "CheckSlotStatus" | Y | Phys chck if range of slots empty/full |
| ET_MSSRobotIniter | "InitRobot" | Y | Initialize each autoloader (robotNum) |
| ET_MSSReadyForImporter | "MailBoxLockUlock" | N | Prep for import/export of a chunk |
| ET_MSSSlotStatusFn | "IsEmptyElement" | Y | Is a drive or slot is empty or full? |

-continued

| FN. TYPEDEF | cmdName | REQD | DESCRIPTION |
|---|---|---|---|
| ET_MSSSlotStatusFn | "DoesElementExist" | N | Determine if a drive or slot exists |
| ET_MSSRobotIniter | "TermRobot" | N | Terminate each autoloader (robotNum) |
| ET_MSSShelfIO | "ImportExportShelf" | N | Eject/Restore entire contents of shelf |

Move—The move command is can be issued by the logical MSS layer in order to move media from one location to another. It is passed a logical source and destination address. The particular robotic driver translates the logical addresses to the corresponding physical addresses and then executes the move. In many cases, a single logical move command may translate to a series of physical moves in a particular robot. For example, a move from a slot to the import/export tray may equate to the sequence "move transport to slot, pick media, move transport to import export slot, place media".

CheckSlotStatus—Many robots have the ability to sense if a given slot or range of slots is empty or full. Some do this by moving the picker to each slot and attempting a pick. If the pick fails, the slot(s) is empty, otherwise it is full. Other robots maintain an internal map of slot status and this is used to respond to this command. In either case, this command can be issued by the logical MSS layer to obtain this status information.

InitRobot—This command is issued in order to initialize the state of the robot when the system first starts up. Many robots perform some form of initialization or calibration of picker position before they are ready to operate and if this is required, it should be invoked in the InitRobot call. Also, this call is the time when the driver first establishes communication with the controller and confirms that the robot is of the type expected and that it is operating correctly.

MailBoxLockUlock—This command can be issued to lock/un-lock the mailbox slot. In the preferred embodiment, the logic of the MSS layer is that the mailbox slot is preferably locked and that in order to insert/remove media from it must be temporarily un-locked and then re-locked when the transfer is complete. This logic is preferred because frequently in actual robotic implementations, the action of un-locking the mailbox may cause a physical obstruction to the picker mechanism and any attempt to move the picker while in this state may result in physical collision with the mailbox hardware. This same logic frequently exists for drives that are 'ejected' in that ejecting a drive usually means that the drive tray is sticking out (ready for media to be put on it) and this also will result in a physical collision if the picker is moved while the drive is in this state. For this reason, the logical MSS layer preferably maintains knowledge of the state of all drives and ensures that they are retracted before attempting a move in the robot.

IsEmptyElement—This command is similar to "CheckSlotStatus" above but requests that the robot physically verify the empty/full status of the slot. This is preferred in cases where the integrity of the logical MSS layer's map of slot contents, or that of the robot itself, may be suspect. This can occur when an operator physically opens the door of the robot and manually inserts or removes media. In this case, unless the media includes a tag or other form of ID, neither the robot nor the software has any way to be sure of what media is where in the robot. In this case, the software initiates a complete inventory for the slots and drives that is known as a "Cortical Wipe".

DoesElementExist—For robots that permit removal of entire shelves, it is usually the case that the robot has sensors that tell it which shelves are installed and which are not. This command is used to determine the existence of a slot based on this mechanism.

TermRobot—This command may be issued when the archiving software is shutting down and allows the driver to take whatever actions are necessary to bring the robotics to a stable state prior to shutdown. In the preferred embodiment, any communications path that was established to the robot controller would be torn down in the terminate call.

ImportExportShelf—In robots supporting the insertion/removal of entire shelves of media, this plug-in can be used to perform whatever specialized action is required to do this. If the robot is caddy based and provides an import/export device for caddies, this function would access and control this functionality.

To bring the discussion above more into focus, we will use some of the commercially available autoloaders to examine what is necessary to implement an actual robotic driver within this architecture. Many different autoloaders may be implemented in this architecture. The examples chosen are intended to illustrate the diversity of autoloader architectures, and the issues involved in implementing drivers for them:

The Pioneer P5004. This is a500 CD autoloader containing up to four drives that may be any mixture of readers and reader/writers. Media is grouped into five (removable) shelves of 100 CDs each arranged vertically. There is no import/export slot so this function must be accomplished by loading media to/from the picker mechanism itself which can be locked/unlocked to grip/release the media. Control of the P5004 is via SCSI.

The Cygnet InfiniDISC autoloader. This autoloader consists of a number of rotating carousels, each of which contains up to 250 CD/DVD disks. The InfiniDisc is comprised of a number of different 19" rack mountable modules that can be installed in various configurations in order to make up a complete system. In the InfiniDisc coordinate system, X refers to the slot number (1 . . . 250) and Y refers to the DSU number (0 . . . 11). Up to 25 racks of equipment may be serially daisy chained and controlled via a single serial port. All InfiniDISC commands must be prefixed by the rack number (A to Y) to which they are being addressed. The drives in the InfiniDisc are numbered such that the bottom most drive is tray 0 and tray numbers increase upwards. The possible modules are:

1) CU (Control Unit) This is a 2U module containing the robotics controller. This unit is connected via various connectors on the back of the module to all the other components in the rack in order to allow them to be controlled. Control is via a serial (RS422) link.

2) DU (Drive Unit) The drive unit is a 2U module containing two tray-loading CD/DVD drives. The DU is entirely controlled via SCSI.

3) DSU (Disk Storage Unit) The DSU is a 4U module that contains a rotating carousel holding up to 250 disks, each rack system can have up to 12 DSUs for a total of 3,000 disks per rack. The carousel is divided into 5 equal sections (to even out weight distribution) thus every time the slot number is incremented, it will spin one fifth the circumference of the carousel.

4) ATU (Arm Tower Unit) The ATU is a vertical disk carrier attached to the left side of the rack. Once a disk is picked from a DSU's extractor, it is vertically carried to any drive tray or vice-versa. No import/export slot is provided so this function is implemented by inserting/removing media from the ATU.

5) The rack. All modules are mounted in a standard 19" rack.

The TiltRac DVD-RAM DAU (Digital Archive Unit). This is nominally a 480 CD/DVD autoloader which may contain up to six drives and also provides a mail slot Control of this autoloader is via a serial link. The autoloader also supports a bar-code reader which may be used to verify media disk identity.

P-5004

The P-5004 driver is a SCSI driver and thus makes use of the standard SCSI command set defined for autoloader devices, which makes implementation of the driver relatively simple. The driver registers the following plug-ins:

Move—The DRM-5004 move function is recursive since logical moves often translate into a series of physical moves. The logic is as follows:

```
static EngErr P54_Move   (                       // P5004 Move command
          unsLong         robotNum,              // I: robot ID number
          unsLong         src,                   // I: source slot of
desired CD
          unsLong         dest,                  // I: destination slot for
CD
          int32           options                // I: various logical
options
                          )                      // R: zero for success,
else error code
{
  if ( !ML_IsRobotEnabled(robotNum) )
    return kRobotNotAvailable
  if ( src and dest are slots )
  {                                              // slot to slot move!
    err = P54_Move(robotNum,src,kMediaTransportElement,options);
    if ( !err )                                  // made it to the transport
    {
      err = P54_Move(robotNum,kMediaTransportElement,
      dest,options);
      if ( err )                                 // failure, put it back in
source
        err = P54_Move(robotNum,kMediaTransportElement,
        src,options);
    }
    return err;
  }
  if ( src is a drive )
  {
    err = ML_OpenCloseTray(driveDevice,YES,...);
  }
  if ( src == kMediaTransportElement )
    src = kMediaTransport;                       // translate these from
canonical form
  if ( src == kMediaImportExportElement )        // to SCSI defined value
    src = kMediaTransport;                       // !!! use the transport as
```

-continued

```
I/O slot
  if ( dest == kMediaTransportElement )
    dest = kMediaTransport;
  if ( dest == kMediaImportExportElement )
    dest = kMediaTransport;
  resultcode = issue the command to the robot
  if ( dest is a drive )
  {                                              // mount/retract the device
    err = ML_OpenCloseTray(driveDevice,NO,...);
  }
}
```

CheckSlotStatus—This function simply issues a SCSI slot check command for each slot in the range, allowing the user to abort the process (via a progress bar) at any time since it may be lengthy.

InitRobot—This function issues a SCSI "test unit ready" command and then a SCSI "inquiry" command to retrieve the unit identification and firmware version.

TermRobot—No action required.

MailBoxLockUlock—This function moves the transport to a mid position in the autoloader and allows media to be inserted/removed.

IsEmptyElement—Issues a SCSI "element status" command

ImportExportShelf—This function first disables the robot to ensure no other movement occurs during shelf removal, then prompts the user to perform the removal, then re-enables the robot.

InfiniDISC

The InfiniDISC is unusual in that the controller itself is directly capable of ejecting and retracting drive trays in addition to the ability to control drive tray position via SCSI commands issued by the drone that is physically attached to the drive (the normal mechanism). The state of the drive trays is critical in this architecture since the picker arm may easily collide with an incorrectly ejected drive tray. Communication with the controller is via serial commands. The logic used to translate logical slot numbers to physical X,Y addresses (IND_SlotToXY) is simply:

```
  aYvalue = (slot−1) / 250;              // DSU numbering starts from 0
  anXvalue = 1 + ((slot−1) % 250);       // each DSU holds 250 CDs in this
robot, slots start from 1
```

Move—The InfiniDISC move function is recursive since logical moves often translate into a series of physical moves.

CheckSlotStatus—This function takes advantage of the fact that each DSU in the InfiniDISC maintains a directory of the contents and thus this capability can be implemented simply by retrieving this directory and marking the slots empty/full as indicated by the directory. This is much faster than the more obvious approach of performing a series of attempted picks from the carousel.

InitRobot—This function issues a "system boot" command followed by an "Init System" command and then an "Inquiry" command to obtain the robot identification and firmware version.

TermRobot—No action required.

MailBoxLockUlock—No action required.

IsEmptyElement—Utilizes "CheckSlotStatus" above.

TiltRac DAU

In this autoloader, communication with the controller is via serial commands. The logic used to translate logical slot numbers to physical X,Y addresses (TL2_SlotToXY) is simply:

```
anXvalue = 1 + ((slot−1) / 60);    // each shelf holds 60 CDs in this robot
aYvalue = 1 + ((slot−1) % 60);     // numbering starts from 1 not 0
```

Move—The logic for this function is virtually identical to that given for the InfiniDISC above.

CheckSlotStatus—This function operates by attempting a pick from the slot, however, because the timeout on a failed pick could be considerable because the robot makes repeated attempts, this function first puts the robot into diagnostic mode so that only one attempt is made.

InitRobot—This function is similar to that for other drivers but because the DAU is capable of sensing installed drives and returning their number and location, this function makes a number of consistency checks to ensure that the installation of the actual robot matches that specified via the archive preferences.

TermRobot—There are two serial connections to be torn down here, one to the controller and the other to the bar-code reader (if present).

MailBoxLockUlock—Issues a mail-box lock/unlock command.

IsEmptyElement—Utilizes "CheckSlotStatus" above.

Exhibit C provides a listing of the basic API necessary to gain access to the functionality provided by the logical MSS layer.

The function ML_SetPlayerState( ) updates a player state.

The function ML_ResolveFunc( ) resolves a plug-in registry name into the corresponding function pointer or NULL for an error.

The functions ML_MarkSlotBlank( ),ML_MarkSlotNotBlank( ), and ML_IsSlotBlank( ) mark a slot as containing/not containing a blank media chunk. The function ML_IsSlotBlank( ) determines a slots status as far as blank media is concerned.

The functions ML_MarkSlotPresent( ),ML_MarkSlotAbsent( ),ML_IsSlotAbsent( ) mark a slot as being present/absent in/from the robot. Certain robot types allow slots or entire shelves (caddies?) to be removed at which time all slots within the shelf become unavailable. ML_IsSlotPresent( ) returns the state present/absent status of the slot.

The function ML_IsSlotPresent( ) marks a slot as being present/absent in/from the robot. Certain robot types allow slots or entire shelves (caddies?) to be removed at which time all slots within the shelf become unavailable. ML_IsSlotPresent( ) returns the state present/absent status of the slot.

The function ML_MarkSlotNotEmpty( ) marks a slot as occupied/empty. The function ML_IsSlotEmpty( ) determines if a slot is empty or not.

The function ML_MarkSlotEmpty( ) marks a slot as occupied/empty. The function ML_IsSlotEmpty( ) determines if a slot is empty or not.

The function ML_IsSlotEmpty( ) marks a slot as occupied/empty. The function ML_IsSlotEmpty( ) determines if a slot is empty or not.

The function ML_CanControlDrive( ) determines if a drive matching the options and drone specified exists and is controllable. If it does, the corresponding robot and drive number are returned.

The function ML_VolNametoBatchID( ) given a batch ID, set up the corresponding volume name and vice-versa. This function is only valid within a server/drone.

The function ML_CallMoveFunc( ) is a local function used to invoke registered move functions and update other stuff as necessary.

The function ML_GetArchiveContext( ) is a wrapper for CL_GetArchiveContext( ).

The function ML_RegisterGlobalFunc( ) registers a global (i.e., non-autoloader specific) logical function by name. Defined logical functions are as follows:

| FN. TYPEDEF | cmdName | REQD | DESCRIPTION |
|---|---|---|---|
| ET_MSSMediaTyper type | "PrintMediaType" | N | produces C strng w readble media |
| ET_MSSInitTermRobotTypes | "InitRobotTypes" | Y | called once to init avail robot types |
| ET_MSSInitTermRobotTypes | "TermRobotTypes" | Y | called once to term avail robot types |
| ET_MSSArchiveGetter | "GetAnArchive" | Y | get/reserve an archive partition |
| ET_MSSArchiveRelease | "DropAnArchive" | Y | Release attached burn stn for archive |
| ET_MSSArchiveKickOff | "KickOffArchive" | Y | Initiate the archiving process |

An examples of the function types above is provided below:

```
Boolean myReleaseArchive (                      // Release the attached burn station
  OSType        droneServerType,   // I:type for drone srvr to be used
  charPtr       volumeName,        // I:Name of the volume to grab
  unsLong       batchID            // I:Batch ID assoc w vol to release
)                                  // R:TRUE for success, FALSE otherwise
Boolean myGetAnArchive (                        // get/reserve an archive partition
  unsLong       batchID,           // I:the batch ID
  OSType        *droneType,        // O:Contains drone type for partitn
  charPtr       volName            // O:ptr to returned partition name
)                                  // R:TRUE for success, FALSE otherwise
```

A standard implementation of archive burning for common devices (such as CD-ROMs and DVDs) is registered internally so most of the plug-ins above will often not be required.

In the preferred embodiment, the function ML_RegisterFunc( ) registers a logical function by name for a given autoloader type. Defined logical functions are listed above.

In the preferred embodiment, the function ML_OpenCloseTray( ) uses the function UF_OpenCloseTray to Open/Close the media tray for a removeable drive without having to have the drive mounted or contain any media. In addition, this routine updates the robot->Players[ ].scsiXX fields of the archive context record to match the device information found as a result of finding a mounted volume in the device specified. This latter behavior should be unnecessary but may be useful in the event that the information matching SCSI devices to players is entered wrongly. In such a case, this function would correct such a problem.

In the preferred embodiment, the function ML_CurrentItemLocation( ) returns the server data type of the drone or master server in which the media 'chunk' associated with a given item in the server DB is currently loaded. If the item is not currently loaded or is on the local machine, this routine returns 0. This routine can only be called from within an archive plugin of a ClientServer server.

In the preferred embodiment, the function ML_SetDroneCallbacks( ) causes certain archiving callbacks to be altered for callbacks that instead send a request to the specified 'parent' server in order to control the autoloader. This is necessary in cases where a server is distributed over more than one machine and is controlled centrally by the parent server.

In the preferred embodiment, the function ML_GetCurrentBatchDetails( ) can be used to obtain details of the batch currently being processed by a given drone/master server. The only anticipated need for such information might be for use in implementing custom file put routers (see ClientServer).

If use of the default file get/put routers provided by the MSS layer in a distributed server is desired, the function ML_UseDefaultFileRouters( ) could be called during the definition of the server and drone callbacks. The default routers are data type independent and for data types with specialized needs ot may be desirable to provide alternative routers. A sample embodiment of a 'put' router algorithm is provided below:

1) Only route to drones that are currently running.

2) If any batch is already less than 90% without adding the current file and adding the incoming file (described by rrP) will make any batch be >90% complete (but not >100 %) then pick the least busy drone out of all drones meeting this criteria. If there is more than one least busy drone, pick at random from them.

3) If and only if (2) is not met, then if there are any drones available for which the current batch will not go over 100 % by adding the incoming file, pick the least busy drone from all drones meeting this criteria, if more than one such drone, pick at random from them.

4) Otherwise pick the least busy from all available drones, if more than one available drone, pick at random from them.

The goals of this algorithm are:

a) To ensure that batches are created that exceed the 90% media utilization criteria and are as close to 100 % as possible.

b) Once a batch reaches the 90% level, it will be burned in preference to adding to a less complete batch in order to ensure that batches do not all build up and then get flushed at around the same time thus overloading burner resources.

c) If it is possible to avoid burning a batch with less than 90% utilization, the system will do so by adding to an incomplete batch.

d) Wherever a choice exists after applying the rules above, pick the least busy drone (based on # of clients).

e) If a choice still exists pick at random.

The ClientServer file 'get' router plugin used to route file fetches from the server OUTPUT folder to the appropriate drone server. This function can be called in either the master or the drone servers whenever the marker value (see DB_GetMarkerValue) for an item is equal to ~0. In the master server call (which can be identified via the data type implied by the 'ip' parameter) the router function should select from the available active drone types to handle the request and return that type as the result, thus causing the request to be forwarded to the drone selected. In this case, any changes made to 'aFullFilePath' will have no effect. In the drone call (again identified by use of the 'ip' parameter), the router would preferably alter the 'aFullFilePath' value if necessary and then return zero as the result (implying no further forwarding is required). Alternatively further routing may be achieved by returning some other legal drone type. The default file 'get' router implements the following strategy:

1) If the media chunk for a given item is already mounted in one of the available drones or if the item is within the server output folder of such a drone, route to that drone.

2) Otherwise pick the least busy available drone (determined by current number of clients).

3) If more than one 'least busy' drone, pick at random from them.

In the preferred embodiment, the function ML_UnloadAllMedia( ) would return archived media chunks that are currently loaded in a drive back to their home slots and their status is updated to reflect the move. The function is preferably implemented as a custom command and is normally called from the test program. The function is a useful testing aid.

In the preferred embodiment, the function ML_EnbDisRobot( ) allows Enable/Disable of movement in a specified robot.

In the preferred embodiment, the function ML_EnbDisAllRobots( ) allows Enable/Disable of movement of all robots.

In the preferred embodiment, the function ML_IsRobotEnabled( ) determines if a given robot it enabled or not.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

Appendix 11

A SYSTEM AND METHOD FOR MANAGING DATAFLOWS

BACKGROUND OF THE INVENTION

For complex systems, such as those designed for multimedia intelligence and knowledge management applications, the current 'control flow' based design methods are totally unsuitable. Once a system is broadened to include acquisition of unstructured, non-tagged, time-variant, multimedia information (much of which is designed specifically to prevent easy capture and normalization by non-recipient systems), a totally different approach is required. In this arena, many entrenched notions of information science and database methodology must be discarded to permit the problem to be addressed. We shall call systems that attempt to address this level of problem, 'Unconstrained Systems' (UCS). An unconstrained system is one in which the source(s) of data have no explicit or implicit knowledge of, or interest in, facilitating the capture and subsequent processing of that data by the system. The most significant challenges that must be resolved with the UCS is based on the following realities:

a) Change is the norm. The incoming data formats and content will change. The needs and requirements of the users of the data will also change. This will be reflected not only in their demands of the UI to the system, but also in the data model and field set that is to be captured and stored by the system.

b) An unconstrained system usually only samples from the flow going through the information pipe. The UCS is neither the source nor the destination for that flow, but simply a monitoring station attached to the pipe capable of selectively extracting data from the pipe as it passes by.

c) In a truly unconstrained system, the information can only be monitored and the system may react to it—it cannot be controlled.

This loss of control over data is one of the most difficult challenges in the prior art. The prior art clearly suggests that software consists of a 'controlling' program that takes in inputs, performs certain predefined computations, and produces outputs. Nearly every installed system in the prior art complies with this approach. Yet it is obvious from the discussion above that this model can only hold true on a very localized level in a UCS. The flow of data through the system is really in control. It is illustrative to note that the only example of a truly massive software environment is the Internet itself. This success was achieved by defining a rigid set of protocols (IP, HTML etc.) and then allowing Darwinian-like and unplanned development of autonomous but compliant systems to develop on top of the substrate. A similar approach is required in the design of unconstrained systems.

In the traditional programming world, a programmer would begin by defining certain key algorithms and then identify all of the key inputs into the system. As such, the person or entity supplying the data is often asked to comply with very specific data input requirements impacting the format, length, field definitions, etc. The problem with this approach, however, is that predicting needed algorithms or approaches that are appropriate to solving the problem of 'understanding the world' is simply too complex. Once again, the conventional approach of defining processing and interface requirements, and then breaking down the problem into successively smaller and smaller sub-problems becomes unworkable. The most basic change that must be made, then, is to create an environment that operates according to data-flow rules, not those of a classic control-flow based system.

In spite of the prevalence of control based programming frameworks, various data-flow based software design and documentation techniques have been in usage for many years. In these techniques, the system design is broken into a number of distinct processes and the data that flows between them. This breakdown closely matches the perceptions of the actual system users/customers and thus is effective in communicating the architecture and requirements. Unfortunately, due to the lack of any suitable data-flow based substrate, even software designs created in this manner are invariably translated back into control-flow methods, or at best to message passing schemes, at implementation time. This translation begins a slippery slope that results in such software being of limited scope and largely inflexible to changes in the nature of the flow. This problem is at the root of why software systems are so expensive to create and maintain.

At the most fundamental operating system scheduling level, we need an environment where the presence of suitable data initiates program execution, not the other way round. More specifically, what is needed is a substrate through which data can flow and within which localized areas of control flow can be triggered by the presence of certain data. Additionally, such a system would ideally facilitate easy incorporation of new plug-in control flow based functions or routines and their interface to data flowing through the data-flow based substrate so that it will be possible for the system to 'evolve'. In essence, the users, knowingly or otherwise, must teach the system how they do what they do as a side effect of expressing their needs to it. No two analysts will agree completely on the meaning of a set of data, nor will they concur on the correct approach to extracting meaning from data in the first place. Because all such perspectives and techniques may have merit, the system must allow all to co-exist side by side, and to contribute, through a formalized substrate and protocol, to the meta-analysis that is the eventual system output.

SUMMARY OF INVENTION

The present system and method provide such a system. To implement a data-flow based system, three basic components must be created and integrated:

a) A data-flow based scheduling environment that balances the needs of data initiated program execution as a result of flows with other practical considerations such as user responsiveness, event driven invocation, user interface considerations, and the need to also support control-flow based paradigms where required.

b) A visual programming language, based on the flow of strongly-typed run-time accessible data and data collections between small control-flow based locally and network distributed functional building-blocks, known henceforth as widgets.

c) A formalized pin-based interface to allow access to data-flow contents from the executing code within the widgets.

The pins on the widgets include both pins used to control execution of a widget as well as pins used to receive data input from a data flow. The system and method further include a debugging environment that enables visual debugging of one or more widgets (or collections s widgets). Data control techniques include the concepts of "OR" and "AND" consumption thereby permitting either consumption immediately or only after all widget inputs have received the token. Additional extensions to this framework will also be described that relate to the environment, the programming language and the interface.

BRIEF DESCRIPTION OF THE FIGURES

FIG. 1 illustrates an example of a conditional statement.

FIG. 2 illustrates an example case statement using an atomic widget.

FIG. 3 illustrates a sample embodiment of a Widget Editing Mode (WEM) window 300.

FIG. 4 illustrates a full-featured icon-editor that allows alteration of the widget icon.

FIG. 5 illustrates a sample embodiment of a file menu 415 of the WEM.

FIG. 6 illustrates a sample Add menu 417 of the WEM.

FIG. 7 illustrates a sample Align menu 418 of the WEM.

FIG. 8 illustrates a sample Display menu of the WEM.

FIG. 9 illustrates a sample setup menu 421.

FIG. 10 illustrates a sample embodiment of the debug menu 422 of the WEM.

FIG. 11 illustrates a sample Pin information dialog 1100.

FIG. 12 illustrates a user in the process of choosing the type 1210 of a constant symbol in the WEM diagram within the type pop-up menu 1210 of the constant information window 1200.

FIG. 13 illustrates a dialog window 1300 generated in connection with selection of the view or widget information window in the setup menu 421.

FIG. 14 illustrates a simple calculator widget/view 1400.

FIG. 15 illustrates the structural components of the calculator widget/view 1400.

FIG. 16 illustrates an internal diagram of the calculator as it would appear in the preferred Widget Editing Mode window.

DETAILED DESCRIPTION OF THE PREFERRED EMBODIMENT

The system described herein may be used in conjunction with a number of other key technologies and concepts that represent the preferred embodiments of the present invention. These various building-block technologies have been previously described in the following patents attached hereto as Appendix 1, hereinafter referred to as "Memory Patent" and Appendix 2, hereinafter referred to as "Types Patent": As set forth above, the system is preferably comprised of the following components:

The present system and method provide such a system. To implement a data-flow based system, three basic components must be created and integrated:

a) A data-flow based scheduling environment that balances the needs of data initiated program execution as a result of flows with other practical considerations such as user responsiveness, event driven invocation, user interface considerations, and the need to also support control-flow based paradigms where required.

b) A visual programming language, based on the flow of strongly-typed run-time accessible data and data collections between small control-flow based locally and network distributed functional building-blocks, known henceforth as widgets.

c) A formalized pin-based interface to allow access to data-flow contents from the executing code within the widgets.

The requirements for and implementation of each of these required components will be addressed in the sections that follow. All of the structures defined and used below (widgets, pins, flows, constants, etc.) are preferably implemented within the flat memory model described in the Memory Patent and are contained within a loadable and executable memory allocation known as a 'view'. Only complete and correct views can be 'run' by the data-flow scheduler. There may be any number of different views in the system, and any number of instances of a given view.

As an initial matter, it is helpful to describe the "building blocks" involved in the present invention. A 'widget' is the fundamental building block of the system. A widget contains certain functionality encapsulated along with a definition of the inputs and outputs necessary to interface to that functionality. An atomic widget contains compiled code that generally cannot be either examined or altered within the framework of the environment. A compound widget contains an inner structure that defines any subordinate widgets that are required to implement the required functionality, together with the data flows between these contained widgets. In general compound widgets can be opened, examined, and altered by system users. Compound widgets may themselves be combined with other widgets (both atomic and compound) to yield higher-level compound widgets, to any arbitrary level of nesting. At the uppermost level, widgets are combined into 'views' that may be thought of as complete mini-applications that preferably include all necessary UI functionality.

It is the views, and the widgets that they contain, that are loaded into the environment at execution time. Thereafter, the widgets are scheduled and executed according to the control and data flows defined in the widgets themselves. Atomic widgets can be grouped into functionally related sets known as widget packs.

In the preferred embodiment, widget packs appear and are manipulated in the Widget Editing Mode (WEM) diagram as a single unit, but each of the members of the unit can be executed independently of the other members. The principal functional member of a widget pack (i.e., the 'do it' function) is known as the formal widget, all other widgets in the pack are degenerate (known as degenerate widgets). The pack metaphor is necessary to support asynchronous access to elements or attributes of the internal state of a logical functionality implemented by the pack. Without packs, data-flow is essentially a synchronous metaphor where widgets do not run until all necessary inputs have arrived. The support of 'exclusive' pins (described later) is another exception to this rule.

Compound and atomic widget inputs and outputs as displayed during WEM, are collectively referred to as pins. A formal pin is one that must be connected in order for the widget to operate correctly, a degenerate pin need only be connected if required in the particular use of the widget and may otherwise be left unconnected. Degenerate pins come in two varieties; those that assume a default value within the widget when unconnected (defaulted degenerate pins), and those that do not (un-defaulted degenerate pins).

A View has associated with it a specialized compound widget known as a view widget which contains a collection of atomic or compound widgets, each of which may have at most one user interface region known as a pane. These regions range from buttons, windows, controls, etc. to arbitrarily complex closed shapes. In addition to the view widget, a view contains the layout information that specifies the arrangement of display panes within the enclosing window. The entire view is enclosed in a view window. The system is capable of accessing and transferring between large numbers of different views both under menu control, and by use of suitable view change widgets. Like widgets, views may be shared between users or may be unique to a particular user. Like other widgets, view widgets may have data flow inputs and outputs, but in the case of views, these are physically mediated by network events/messages that are sent to or received from other views, either in the same workstation or another node on the network. A data-flow environment built on this metaphor is thus transparently distributed.

It is possible to execute a widget without making connections to any degenerate inputs or outputs that a widget contains; in this case the default values (if specified) will be used for the inputs, and the output(s) will be discarded. If no default is defined for a degenerate input, then within that widget, no tokens will appear from that input pin and hence any widgets connected to that input cannot become eligible for scheduling. Degenerate widgets I/O pins and the defaults associated with them can be explicitly overridden by connecting the inputs to an appropriate source/sink of the type required. Default values can be read and edited as part of the widget editing process. The interface provides a semi-automated and convenient method of resolving type conflicts and inserting the appropriate type conversion widgets. Type conversion widgets generally have many degenerate inputs and outputs, each of which will interface to a particular type. The interface is able to recognize type conversion widgets for what they are (via a dedicated flag), and when a type conflict occurs, searches all available type converters for those that meet the necessary input and output criteria. When all suitable type converters have been identified, the user is able to select the most appropriate from a list of all converters that meet the criteria.

Widget data-flow inputs and outputs can be connected to other data-flow inputs and outputs (of a compatible type) in widget editing mode (WEM) in order to define the required widget functionality. For example, a single widget data output can be connected to multiple data-flow inputs. When a multiple input connection is made to a single output, the interface allows the user to choose whether the output is consumed by the first widget that has all inputs available including the input in question (OR consumption logic), or whether it is only consumed when all connected widgets have run (AND consumption logic). Conversely, multiple widget outputs can be connected to a single widget input, in which case the input accepts and consume each widget output as it becomes available. This situation occurs commonly in user control panels where a number of buttons effect the state of a single widget/display. It is possible (though uncommon) for multiple widget outputs or sources to be connected to multiple widget inputs or sinks. This capability may be important for widget mediated load sharing across multiple server processes, for example.

Every widget has the potential to accept a single control flow input and to generate a single control flow output; these pins are degenerate (i.e., are ignored unless actually connected). In the preferred embodiment, control pins cannot have defaults associated with them. Like data-flow inputs and outputs, control-flow pins can be wired up to other control flow pins, but not to data flow pins (unless of Boolean type). Control flow wiring carries an implicit Boolean value indicating that the control flow criteria concerned has or has not been met. If the control flow condition has not been met, then control flow wiring carries the value false, and does not trigger any connected control flow inputs. If the condition has been met, the wiring carries a true value and triggers any connected control flow inputs. Unless explicitly altered within a widget definition, a widget's control flow output goes true immediately upon completion of execution of that widget, it goes false immediately after execution of the widget begins. If a widget's control flow input is connected, then execution of that widget cannot begin until the control flow signal to which it is connected is asserted. Normally, it is likely that compound widgets can be constructed entirely based on data flow programming and without the explicit use of control flow pins. However, there are a number of situations, especially those involving the synchronization of multiple server processes, which may require use of the control flow pins. The system also permits a tie between multiple control flow outputs and a given control flow input in which case the associated widget cannot begin execution until all data flow inputs are satisfied and, either the AND or the OR of all control inputs is asserted (depending on the type of control input used). Selection of either a control flow OR/AND for a widget control input is generally performed when connecting control flow signals. The system also supports connections between a single widget control flow output to multiple different control flow inputs. In this case, all widgets whose inputs are so connected cannot execute until the control flow output is asserted. Unlike data-flow connections, control flow signals are not 'consumed' by the receiving input pin, but remain asserted until source widget activity drives them false. This means that, in general, control flow signals can be multiply sourced and synced without the potential for confusion as to what will happen. In the preferred embodiment, all logical operations on the control flow signals are the responsibility of the engine/interface; this knowledge does not propagate into the widget itself. It is possible to connect a control flow signal or pin to any data flow signal of the system defined type Boolean; connection to any other data flow type is generally forbidden.

The degenerate widgets of a widget pack are capable of accepting and producing both formal and degenerate data flow I/O pins as well as the standard control flow pins. Individual members of a widget pack can be invoked independently of other members of the pack but all members of the pack share the same storage area; this storage area is allocated at the time the widget pack is instantiated (generally via the initialize entry point of the formal widget), and is passed by reference to each member of the pack as it is invoked by the engine. As with all other widget types, a degenerate widget of a widget pack only executes when all of its inputs become available. Degenerate widgets need not provide any entry points other than the 'execute' entry point, the engine invokes the entry points associated with the formal widget of the pack when using entry points other than execute. All widgets of a widget pack are stored together in a single file and for the purposes of copying and other activities using the WEM menus are treated as a single unit. It is generally not possible to treat a degenerate widget of a pack as if it were a fully defined atomic widget within the normal WEM environment.

Within a pack, the various members can communicate with each other via the data area and can also directly invoke other members of the pack. As a result, it is valid for degenerate widgets of a pack to contain nothing but outputs which are presumably produced when the internal state of the pack meets certain criteria.

A View can be thought of as a mini application, whose functionality is defined by the widgets it contains and the data flows between them. A view's appearance is most easily defined by superimposing the display components of all widgets in the view on a background that is an image. Views provide the framework within which it becomes possible to instantiate and execute the various atomic and compound widgets. No widget can execute unless it is either explicitly or implicitly contained in a view. Views are preferably stored in view definition files which may be accessed and initiated via the environment's view menu. Each view definition file contains as a minimum the following components:

A specialized compound widget (a view widget) associated with the view that defines the control and data flows between the widgets that make up the view Layout information describing the size of the view window, and the location, shape and size of all display and user interface components within that window an image that describes the background for the view.

Views may be in one of two states: active or inactive. An active view is one that is currently executing and has therefore loaded all contained widgets into the engine where they are currently executing. An inactive view contains no executing widgets and is not currently loaded into the widget engine. Every view has associated with it a window which may or may not be visible at any given time. For the purposes of this description, the view that is associated with the front window on the user's screen is known as the front view and only one view can be the front view at any given time. This would not necessarily be the case in alternative display environments that permit 2+ dimensional views, however. Unlike widgets, views are generally not nested within (in a visual sense) other views. A view is always the outermost component or container for a given user defined functionality and usually has no relation to the current screen position of any other view. Views also can be combined into groups called view packs and these views packs share a logical context much in the manner of widget packs.

As set forth above, a view has associated with it a compound widget defining the data and control flows between the display and functional widgets that go to make up the view. This compound widget is known as a view widget and is similar to any other compound widget. Because it is part of a view, however, its data flow I/O pins are connected to other views by means of network events. The majority of view widgets will have zero inputs and outputs. Certain specialized views, however, may be controlled from other views and such cases the controlling view will have data flow outputs while the controlled view will have corresponding data flow inputs. View outputs may also optionally include a target view and network node in order to route the event to the intended destination. If no such qualifiers are included, the event will be sent to any views in the local environment that contain inputs whose name and type exactly match that of the view output. If no such inputs exist, the data flow output is discarded. Unlike other widget types, a view widget is scheduled (or rescheduled) whenever any of its inputs becomes available. Internal scheduling of the view, however, may be suspended should other required inputs still be undefined.

Any component of a view widget may also have (one or more) panes associated with it. In such cases, the view causes a marquee or image of that pane to appear in the view layout window where it may be re-sized (within limits) and relocated as part of the view layout process. Panes are normally rectangular but it is possible to create and interact with panes that occupy any arbitrary closed region. A view may be comprised of many panes, each of which represents the display region of the widget responsible for interpreting or displaying the control/display that the pane relates to. For widgets whose appearance is fully determinable at layout time (e.g., named buttons), the final widget appearance is shown in the pane during view layout.

As described above, the WEM window provides the interface in which views and widgets may be edited, modified or displayed. For example, within the WEM window, the subordinate widgets and the data flow between them is displayed. In the preferred embodiment, colored lines that join the pins of widget icons/symbols to other pins in the diagram represent data flow. The color of the line can be used to convey type information. Wherever one or more lines in a WEM window is joined in terms of data or control flow, this is represented by a standard line junction symbol. By default, data-flow outputs are consumed when the widget associated with every connected input has been triggered. The user has the option to select that the output be consumed when the first widget that has a connected input is triggered. These two forms of signal consumption logic are referred to in this document as "OR consumption" (first triggered widget input consumes output) and "AND consumption" (output is only consumed when all widgets with triggered inputs have been run). Different forms of data flow output consumption logic may also be implemented by the scheduling engine. Control flow signals are never 'consumed'. They remain asserted until renewed widget activity causes them to go false. There is an implicit latch on every widget data input so that regardless of the consumption logic operating outside the widget, within the widget, the input may operate using either OR/AND Consumption, the default is AND Consumption. When multiple data-flow outputs are connected together to one or more data flow inputs, the same consumption logic applies to all connected widgets. During execution, a second output value will not be applied to the interconnect signal by the engine until any previous output has been consumed, thus forming an automatic queuing mechanism.

The representation of various standard programming constructs (such as the loop, switch, and conditional statement) are also supported within a WEM window. For example, the conditional statement (i.e., if then [else]) is provided by an atomic widget that accepts a string defining an arbitrary expression in terms of the widget inputs that resolves to a Boolean value either directly (because all inputs are Boolean), or as a result of use of a comparison operator within the expression. This atomic widget has two degenerate outputs which are automatically displayed when the widget is placed. The first corresponds to the YES condition, the second to the NO condition. The conditional widget only generates one or other degenerate outputs when it runs. As a result, any data flow connected to the un-generated output will not be executed. The conditional widget has a single formal input that accepts the Boolean expression, and a large number (up to 26) of degenerate inputs each of which will accept any scalar numeric value or a derived type. Each connected degenerate input can be referred to in the expression by its lower case letter or signal name. The figure below shows an example conditional statement:

Referring now to FIG. 1, an example of a conditional statement is shown. In this example, a compound conditional statement of the form: "if (a=b) && (c*d<e) then . . . else [if (a>0.3) then . . . else . . . ]" is provided. Because the outputs 110 ,115, 120, 125 of the conditional widgets are both degenerate, either the 'then' clause or the 'else' clause may be omitted simply by not connecting the corresponding output 110, 120. This gives the user the freedom to create any conditional statement that he wishes simply by combining simple 'if' blocks as desired. Note also that if the user simply wanted to connect a widget that did not expect a Boolean parameter as input to either the then or the else clause of a conditional widget, he can do so simply by connecting the Boolean output from the conditional widget to the control flow input of the widget required. This is because, in the preferred embodiment, control flow pins may be connected directly to dataflow signals of the system supplied type Boolean. Since control flow inputs are only triggered when a Boolean true value exists, any widget thus connected will only run when the appropriate clause is satisfied. In example illustrated in FIG. 1, the else clause of the first conditional widget 130 will produce no output unless the first condition is met when it will output a true value. This means that the expression "a && (b>0.3)" 140 is not required in the negative case since the widget 135 will not even run unless condition 130 is true.

The case or switch construct is provided by an atomic widget that takes as input two values. The first value is a comma-separated list of constant integer expressions (includes characters) or ranges, the second is an integer value to be evaluated against the list. The output of the case widget is a variable number of degenerate Boolean outputs (each of which preferably represents one of the case conditions being satisfied) and the first of which is always the default case (i.e., no other condition satisfied). Only one case widget output will be generated on any given execution of the widget, and as for the conditional widget, it outputs the Boolean value true. If no specified condition is met then an output will be produced on the default pin.

Referring now to FIG. 2, an example case statement using an atomic widget is shown. In this example, the case statement within the widget 210 evaluates the integer input 220 against 5 different values or ranges. Only one of the outputs 231, 232, 233, 234, 235 will be generated as a result of widget 210 execution. This is true even if more than one condition is met due to overlapping ranges. When ranges for a case widget overlap, only the first condition in the list to be satisfied will cause an output. First, in this case, would be represented by going from top to bottom among the outputs 231, 232, 234, 234, 235. Because case widget outputs behave identically to conditional widget outputs, they can be used to trigger other widgets via their control input pins in the same manner described above for the conditional widget. The interface preferably prevents the user from connecting different inputs of a downstream widget to signals that are directly or indirectly connected to different output pins of either a conditional or a case widget within the WEM window. This is because, since only one such pin can be triggered by definition, any downstream widget that relies on more than one such widget output, will by definition never execute. This condition is normally enforced by the block structure of standard programming languages but since, in a visual environment, this structure may not be so apparent, block structuring is preferably enforced by the WEM environment. In the visual environment, the outputs of a case widget may be automatically labeled with the case value. This feature is depicted in the diagram above with respect to outputs 231, 232, 233, 234, 235. The WEM interface is also capable of highlighting all widgets and connections that are 'downstream' of a given selection in the WEM diagram by special UI actions.

The WEM interface would also preferably prevent the user from connecting a data flow output of any widget (A) to any data flow input of a second widget (B) that either directly or indirectly is required to run in order for the widget (A) itself to become eligible to run. This requirement is made in order to prevent the user from accidentally setting up data flow diagrams that have hidden loops in them that mean they will not execute (or will always execute). Note that this requirement by itself makes it impossible to construct the 'loop' programming construct using pure data flow connections and widgets not expressly designed to implement loops. Loop constructs generally require the use of a variable to pass values from one loop iteration to the next. Once initialized, the variable value is always available and hence removes the possibility of creating a data flow input condition that cannot be satisfied. When a user attempts to create a data flow dependency loop in WEM mode, he is preferably warned of this fact and given the opportunity to create a variable that removes the disallowed dependency. In the event that a data or control flow input pin is multiply sourced, and one source is not dependent on execution of the widget concerned, then it is permissible to connect a downstream widget output to this widget input pin. There are a number of problems associated with loops that make them difficult, if not impossible to implement in a data flow design without enforcing block structuring (i.e., putting the loop body within a compound widget), these are:

- No data flow output can be tied back to a widget that appears earlier in the loop (including the same widget that produces the output) without creating a situation where neither widget can run because each depends on the other to trigger them (known as a deadly embrace).
- A data flow signal that comes from code lying outside the loop cannot be directly connected to a data flow input within the loop because the loop may execute many times and will therefore consume the input on the first pass and then hang up.
- A data flow output that comes from code lying inside a loop cannot be directly connected to a data flow input lying outside the loop because the loop may execute many times and will therefore produce a series of outputs which will either unintentionally trigger the widget outside the loop on each pass, or more likely, if the widget outside the loop requires other non-loop inputs, will have to be queued up waiting for access to the data flow signal. It is probable that such a behavior would overload any queuing mechanism provided by the engine to handle multiply connected outputs since such a queue only needs to be as big as the number of connected outputs.
- It is visually very difficult to display the loop concept at a single level so that it is immediately obvious what is, and what is not part of the loop.

For the reasons described above, loops are implemented by one or more system supplied compound widgets that provide a number of degenerate universal input and output pins for passing data of any type into and out of the loop body and which allow specification of the loop behavior.

A suggested set of widget scheduling rules to be enforced by the engine is given in the table below. Many of these rules appear throughout the text above but they are summarized and augmented here in order to make the full rule set more apparent. The term widget is used below to imply both atomic widgets and compound (or view) widgets. When a distinction is required, the particular widget type is explicitly stated. The term signal is used below to refer to either a control flow or a data flow. Where a distinction is required, the type of signal (control or data) is explicitly stated. The term token is used below to refer to a data flow signal to which a value has been written, but has not yet been consumed. A linear compound widget is defined as a one that does not include any explicit connection to the control flow output. A cyclic compound widget is defined as a one that includes an explicit connection to the control flow output and which therefore may include explicit loops. A descendant widget Z of an ancestral widget Y within an enclosing compound widget X is defined as any widget within the WEM diagram for X that either directly or indirectly depends on data or control flow outputs from Y in order to become eligible for scheduling. Z is a formal descendant widget of Y if the dependency between Y and Z is mediated by signals connected only to formal widget outputs. Z is a degenerate descendant widget of Y if the dependency between Y and Z is mediated by at least one signal connected to any intervening degenerate widget output. The various descendancy terms described above may also be applied to the data or control flow signals attached to the widget Y. A pure data flow signal is defined as one that is not attached to a variable or constant symbol. A pure descendant data flow is one that can be traced back to a given ancestor through pure data flow or control flow signals alone.

| Scheduling Rule |
| --- |
| A widget is eligible for scheduling only when all of its connected data flow inputs have a token associated with them. A view may be scheduled whenever any of its data flow inputs have a token associated with them but may subsequently 'hang up' should other inputs be required and still be undefined. |
| If a widget has an explicit connection to its control flow input pin, then that widget (and any widgets it contains) is only eligible for scheduling when the value of the control flow pin is set to TRUE. This applies even if the widget is compound and has already started execution. (i.e., you can single-step a compound widget to any nesting level simply by explicit control of the highest level control pin). |
| Execution of a linear compound widget (and all widgets called by it) completes when all of its connected output pins have data tokens associated with them (i.e., have been assigned a value). |
| Execution of a cyclic compound widget (and all widgets called by it) completes when the control output pin is driven TRUE by the control or data flows within the widget. The implementation may encapsulate this functionality so that for standard loops, the user is unaware of the control pin connection. |
| Once a widget has been scheduled for execution, it cannot again become eligible for scheduling until execution completes. |
| If a widget input is specified as 'only on update' then that widget only becomes eligible for scheduling each time a value is written to the data flow signal connected to that input. This applies even if that signal has an un-consumable token associated with it (see below). If multiple values are written to the input signal before the connected widget is scheduled, it is scheduled only once in response to the series of updates. |
| The following signals have tokens associated with them that cannot be consumed: |
| 1) Any signal that is connected to a variable symbol once that variable becomes valued. If that signal is also attached (within the compound widget) to a variable symbol, then the input value may be overwritten by subsequent widget action. Variable values once written, persist across multiple executions of the same widget in the same context |
| 2) Any signal that is connected to a constant symbol. |
| 3) Any signal that is directly connected to a widget control flow output. |
| 4) Any signal that is directly attached to a connected or defaulted data flow input of a compound widget. |
| A pure data flow that is specified as AND consumption logic (the default during construction), causes any tokens associated with that flow to be consumed only after all widgets that have input pins connected to that data flow have been scheduled and executed. If multiple widgets have input pins connected to the pure data flow signal in question, then each may be scheduled only once as a result of any given token appearing on the signal even if that token remains unconsumed. |
| A data flow that is specified as OR consumption logic (during construction), causes any tokens associated with that flow to be consumed by the first widget that has an input pin connected to that data flow, and which is scheduled and completes. |
| For a linear compound widget, the engine drives the control output pin FALSE at the time the widget is first scheduled, and TRUE when widget execution completes. |
| A trash can symbol will immediately consume any tokens associated with the data flow to which the trash can is attached (even if other widget input pins are also attached). Trash cans may not be attached to any signal which by definition cannot be consumed. |
| Within any compound widget X, once a widget Y has been scheduled and executed, it cannot become eligible for scheduling again while any unconsumed token remains on a pure descendant data flow signal. |
| Any widget whose output is attached to a multiply sourced pure data flow signal that currently has a token associated with it, can be scheduled and executed (but not completed); the engine will not write any new token(s) produced by that widget until the pre-existing token on the backed-up output data flow signal has been consumed, nor will the engine permit the control flow output to go TRUE until this is the case. Furthermore, the widget (and any widgets it contains) is no longer eligible for scheduling and execution regardless of tokens appearing on its inputs, until the engine has transferred its previous output tokens onto the relevant data flow signals. |
| If a widget Y within a compound widget X is identified as an 'as needed' widget (for example a dialog widget) then in addition to any other rules that might apply, that widget will not be scheduled or executed until its output is required in order to cause another widget within X to become eligible for scheduling. |
| Any widget Y within a compound widget X whose outputs are exclusively connected directly or indirectly to unconnected degenerate outputs of X (or to a trash can), will not be scheduled or executed regardless of tokens appearing on its inputs. Furthermore, the widget Y is not considered in any consumption logic applicable to signals connected to its input pins. To all intents and purposes Y is completely ignored in all scheduling activities related to X. This rule can be enforced at load time, it is not dynamic. |
| Any widget Y within a compound or view widget X, and which has zero connected inputs, never becomes eligible for scheduling or execution. To cause such a widget to execute, its control input pin must be driven true by connecting it either directly to the control input of X or to another Boolean signal within X. |
| Once any widget Y has been scheduled and executed within an enclosing widget X, it is automatically moved to the last position in the scheduling check sequence so that in addition to all scheduling rules outlined above, the widget Y is not even checked again for scheduling eligibility until every other widget with in X has been checked on a subsequent pass. |

-continued

| Scheduling Rule |
|---|
| All rules described above apply equally and simultaneously to every level of a view and the various subordinate compound widgets that it calls to any arbitrary level of nesting. Scheduling of the various components of each nested WEM diagram occurs independently of other levels except that each nested compound or atomic widget must complete before its output signals become available at the next higher (calling) level and thereby potentially cause one of the rules described above to be triggered at the higher level. |

While the illustrated widgets give the appearance of passing widget inputs by value, for efficiency reasons the implementation (wherever possible) passes widget inputs and outputs by reference, not by value. Pass by value is only required in cases where the widget input is overwritten within the widget itself (by use of a variable symbol), and the signal is not simultaneously attached to a formal widget output within the WEM diagram. Because of the scheduling rules described in the table above, the internal values of any inputs to a widget that are supplied by pure data flow connections cannot change during the period of execution of that widget. Preferably, inputs that are externally attached to a variable symbol may potentially change during widget execution.

While the table given above describes the rules that relate to scheduling and execution within a particular context, it is important to understand that simultaneously there may be many active views, all of which are being scheduled and executed. This gives rise to a number of considerations with regards to prioritization between the various views that are illustrated in the scheduling algorithm.

The scheduling algorithm forms the core of the system architecture in that all system functionality, at some level or another, is initiated as part of a view launched within the scheduling environment (referred to as the 'widget engine'). The WEM user interface, including widget building and view editing, can be thought of as a separate application from the scheduling process itself, and could be replaced with other user interfaces without changing the widget engine itself. The widget engine is a strongly-typed data flow interpreter which can read in and subsequently execute atomic and compound widgets together with the data structures that define their I/O needs and characteristics.

Referring now to FIG. 3, a sample embodiment of a Widget Editing Mode (WEM) window 300 is shown. In the illustrated example, the window 300 is a standard, titled, resizable window with scroll bars 305. The window 300 is used to define and edit data-flow functionality by connecting and configuring widgets 310. The two blocks 315, 320 connected by arrows to the edge of the window are the input and output bar of the compound widget being viewed. In this example, a single degenerate input 330 and single degenerate output pin 335 have been defined for this compound and connected to an embedded compound 310. In the preferred embodiment, this example could be created simply by clicking on the pin 330, dragging to the destination pin 340 it is to be connected to, and setting the type. The specialized pins 345, 350 at the top of the input 320 and output bars 315 are the control input pin 345 and control output pin 350 respectively. In the preferred embodiment, their type is always equivalent to 'Boolean'. As this diagram illustrates, the control output pin is wired to the constant 355, in this case true, which will enable the contents of the compound widget to run. The background widget 360 is a pre-supplied atomic widget serving the specialized purpose of defining the background visual appearance of the associated window. In this embodiment, the tool bar 370 provides (starting from the top):

- The arrow tool 371 is used as a toggle switch to turn options on/off, or it simply selects items.
- The lasso tool 372 can select freeform areas by clicking down and selecting the section.
- The hand 373 moves the entire contents of the WEM window in different directions.
- Label 374 can place a label on any element in the WEM window.
- The clipboard 375 is activated when information is copied or cut to the clipboard. Select it to use as a paste tool when clicked at the paste position.
- Click the widget tool 376 to insert a new compound widget.
- Click the variable input tool 377 to insert a variable.
- Click the constant input tool 378 to insert a constant.
- Use the lightening bolt tool 379 to delete elements in the window.
- Select the speaker 380 to set the volume.
- Window size boxes 381 allow enlarging of the window. The default setting is one white square. This setting will not allow the window to be enlarged further than a few inches. The available settings permit expansion of the window vertically, horizontally, or both ways.
- Grid tool 382 can be used to select to set the grid to which all data flow lines and objects snap in the window. It is possible to move a selected item from 1 to 8 pixels at a time.

Referring now to FIG. 4, a full-featured icon-editor that allows alteration of the widget icon is shown. In this example, the result of double-clicking on the icon 390 in the FIG. 3 is shown.

In the illustrated embodiment, a menu bar 410 is provided which provides an interface to a set of unique tools. Working across the menu bar at the top of the window (from left to right):

- The view-pack menu 411 allows navigation between various members of a view pack in order to allow single session editing of the entire pack/report.
- Once widgets are created within widgets, it is possible to move up or down the widget hierarchy with a up/down menu item 412.
- The view menu 413 allows navigation and selection of any view stored on disk.
- The widget menu 414 allows selection of any widget stored on disk
- The file menu 415 allows standard save/load type actions to/from disk A sample embodiment of a file menu 415 of the WEM is provided in FIG. 5.
- The Edit menu 416 is a standard Edit menu much like that found in any other application.
- The Add menu 417 allows new widgets to be chosen and added as well as allowing the addition of other objects in the WEM diagram. A sample Add menu 417 of the WEM is illustrated in FIG. 6. In this example, a compound widget is selected.

The Align menu 418 allows various aspects of the WEM diagram internal alignment to be configured. A sample Align menu 418 of the WEM is illustrated in FIG. 7. In this example, the flow selected is "Flow left->right".

The Display menu 419 allows various visual components of the WEM diagram and its contents to be configured as far as their appearance in the diagram is concerned. A sample Display menu of the WEM is illustrated in FIG. 8. In this example, the sub menu "VEM Options" is selected.

The Text menu 420 provides standard control over text appearance such as color, style, font, size, etc.

The Setup menu 421 allows access to a number of additional 'daughter' windows that can be used to examine and edit the details of the various types of objects in the WEM diagram. A sample setup menu 421 is illustrated in FIG. 9.

The Debug menu 422 is used primarily during run-time debugging of widget execution and allows examination of the state of all flows, widgets and pins and the tokens and data on them. A sample embodiment of the debug menu 422 of the WEM is provided in FIG. 10.

Referring now to FIG. 11, a sample Pin information dialog 1100 is shown. In the preferred embodiment, this dialog 1100 is generated in response to either double-clicking on a pin in the diagram or using the menu 421. Various aspects of the pin, including it's type (as preferably determined by the run-time type system) and any other logic associated with the pin and it's data-flow behavior can be set from this dialog.

Referring now to FIG. 12, a user in the process of choosing the type 1210 of a constant symbol in the WEM diagram within the type pop-up menu 1210 of the constant information window 1200 is shown. This further illustrates the connection between the types system provided by the substrate and the types of data on flows and pins.

Referring now to FIG. 13, a dialog window 1300 generated in connection with selection of the view or widget information window in the setup menu 421 is shown. As can be seen, the dialog window 1300 allows adjustment of a wide variety of different aspects that apply to the view or widget including file path, security settings, operation behavior, visual dimensions, behaviors, and limits, and a variety of configuration and documentation descriptors.

It is clear, then, that the illustrated WEM and visual language described above allow users of the system to express and specify analytical processes in terms of data flowing between a set of computational blocks. The visual language of the present invention preferably provides the following basic features:

a) The ability to pass strongly, typed data through flows between a set of interconnected computation blocks (hereafter called widgets). Types are preferably run-time definable and examinable by the widgets themselves.

b) Widgets with typed input and output pins. Input pins provide the ability to specify default values if unconnected.

c) The ability to add arbitrary compiled code snippets to the collection of available widgets, shareable between users of the system. Such compiled code widgets are referred to as 'atomic'.

d) After creating an algorithm by wiring together widgets into an enclosing or 'compound' widget using WEM, permitting the compound widget itself to be used as a building block for higher-level widgets. That is the language would preferably allow arbitrary nesting depth of compound widgets.

e) Because many widgets have associated UI, the graphical environment provides the ability to lay out the UI of various widgets appearing within the same window. In the preferred embodiment, within any atomic widget, an atomic GUI building environment is provided to allow layout of the atomic widget UI components. All such information is saved as part of the widget definition for sharing and later re-loading purposes.

f) Normal looping and conditional constructs are supported as are junctions and associated logic joining flows connected to multiple endpoints.

g) When scheduling, the existence of a data token on a flow must precipitate code execution on the connected flow-consumer widgets.

h) The language preferably supports the overt graphical specification of variables and constants that participate in the wiring.

i) Finally, in the preferred embodiment, a debugging means is provided, at run-time, to examine the contents and state of flows and the state of execution of all widgets involved.

At the same time the data-flow wiring for a new view or widget is defined, the visual appearance is created. The interface that allows this is called View Editing Mode (VEM). Referring now to FIG. 14, a simple calculator widget/view 1400 is shown. The figure displays the structure of the view 1400 of the calculator. Each section of this figure (such as the buttons, title bar, calculator display window) can be created separately, and the individual sections of the view result in the final view, which also may be created and edited in the View Editing Mode window.

Referring now to FIG. 15, an illustrated of the structural components of the calculator widget/view 1400 is shown. In this case, broken-down structure comprises:

Background 1510—The plain background of the calculator where the number keypad will be added;

View Layout 1520—The view layout (the keypad itself);

View 1530—The final view, including the background 1510 and view layout 1520, complete with 0.0 shown as the initial output on the display is shown.

Logically, something would need to be attached to the keys on the keypad to allow for performing calculations. Clicking the visually displayed numbers of the photograph of a calculator does not perform a function. These numbers would need to be attached to something that could actually read and manipulate them. In other words, a mere picture does nothing. Hence, once the drawing is done, the keys must be connected to an electronic device representing each individual key and its underlying meaning. This electronic equivalent, in our case, is known as a widget. Widgets are connected to the keys and act as valves that regulate the flow of electronic information. On the calculator, for instance, the widget for the 9 key would act as a valve for the constant valve 9; the plus sign (+) widget would act as the valve for the add operation. In the preferred embodiment, the VEM process allows the appearance of the calculator to be created. Once the physical appearance is complete, the internal connections must be made to enable arithmetic functions. Widgets, electronically connected to the numeric keypad of our calculator, display a different diagram, but are identical in performance to the calculator.

Referring now to FIG. 16, an internal diagram of the calculator as it would appear in the preferred Widget Editing Mode window is shown. This figure illustrates a view known as a view widget, which contains a collection of atomic or compound widgets, each of which may have at most one user interface region, or pane. It is in this window that users can make modifications using the WEM capabilities described above.

For explanation purposes, each individual column in the diagram is described and numbered as a single item. It is described in this fashion because each element within the column performs the same general function.

Column 1610 displays the input bar which has no connections in this case.

Column 1620 consists of numbered rectangles that represent the constants 0 to 9 displayed on the calculator.

Column 1630 consists of widgets that perform like valves, regulating the data flow or the flow of the constants 1620.

Column 1640 displays rectangles with visual operands such as the plus sign (+), the equal sign (=).

Column 1650 contains the widgets that perform like valves, regulating the flow of the constants.

The widget 1660 performs the sum.

Column 1670 includes the widgets that carry the sum to the total.

and that total is then sent to the output bar 1680.

The data-flow scheduling algorithm is the next important part of the system. The data-flow scheduling algorithm is described below by listing the algorithms for a series of recursively invoked functions. The global value "EG" is a complex structure containing various context and state information used by the environment and including the values utilized by the scheduling process.

The top level of the data-flow based scheduling algorithm is the routine SC_Scheduler( ) which is called in a continuous loop from the main thread of the environment. This routine arbitrates the scheduling of the various active views currently loaded into the environment. The principal task performed by this routine is to enforce the levels of scheduling priorities associated with the active views. To do this SC_Scheduler( ) makes use of a global active views scheduling structure which contains a set of list headers each of which points to the first element in a singularly linked list of active views having the same priority level. Because this routine locks the view being scheduled, any code operating in the main application thread that is called via this routine can be sure that pointers to structures within the current view will not become invalid during procedure execution. Code running in other threads must either lock the view, or save/restore pointers in a relative form to ensure correct pointer values across scheduling boundaries or heap movements. SC_Scheduler( ) (and everything it calls) assumes that the application thread is in a critical section (i.e., can't be pre-emptively disturbed). While there are outstanding events to be processed in any view, this routine alternates between scheduling the view at the top of the pending events list (and then rotating the list) and scheduling a view according to the normal view priority scheme. In this manner the system ensures that events are processed as rapidly as possible without allowing event intensive views to suppress all other scheduling. The same mechanism is repeated in SC_ScheduleView( ) to the normal tree walking algorithm.

```
void SC__Scheduler        (                          // data-flow
scheduler
          void
                          )                          // R:void
```

-continued

```
{
  bump the scheduler cycle count
  handle any pent-up interrupt level stuff after any slot
  j = rand( );                                        // breaks certain
deadly cycles!
  j = j | (1 << (kLowestEPriority+1));                // set backstop bit
  EG->Priority = find the first bit set in cycle count word j
  if ( EG->Priority > kLowestEPriority )
  {                                                   // run any
background tasks
    do whatever regular monitoring etc. environment wants to do
    return;                                           // at lowest priority
possible.
  }
  tmp = NULL;
  pnd = NULL;
  if ( !(EG->MitopiaFlags & kVeventBasedSlot) && EG->PendEvtHdr )
  {                                                   // do views with
events first
    pnd = tmp = EG->PendEvtHdr;
    EG->Priority = (*tmp)->dPriority;                 // set priority to
match view
    EG->MitopiaFlags |= kVeventBasedSlot;             // remember we did
an event slot
  } else                                              // alternate between
event and
  {                                                   // normal slots on
each pass
    EG->MitopiaFlags &= ~kVeventBasedSlot;            // just a plain kind
of slot
    tmp = EG->ActiveViews[EG->Priority][0];           // front active view
at priority
    pnd = 0;
  }
  SC__SetCurrentWidget(tmp,view widget(*tmp));        // set the chosen
view widget
  lock down the view (tmp) while we cruise around it and schedule below
  tmp = SC__ScheduleView(tmp,...);                    // schedule a single
view
  unlock the view (tmp) till the next time...
  rotate EG->ActiveViews[EG->Priority][0] to tail of list at priority
  if ( (EG->MitopiaFlags & kVeventBasedSlot) && EG->PendEvtHdr ==
  pnd && pnd)
  {                                                   // rotate pending list
also
    move pnd to tail of EG->PendEvtHdr list           // avoids greedy
event problems
  }
}
```

As can be seen from the algorithm above, scheduling within any given view is handled entirely by the routine SC_ScheduleView( ) once the view itself has been selected based on pending event lists and priority. This routine is called by SC_Scheduler( ) to give a scheduling slot to a particular view. In most cases this amounts simply to a call to SC_ScheduleNode( ) for the view widget, but in addition this routine must deal with the special rules associated with starting and stopping views and the propagation of their tokens. Note that an exception to the fair handling of scheduling slots is made for any widgets that are waiting for non-timer related events which have occurred, these are scheduled immediately in order to ensure that events get eaten ASAP. An example of the logic that could be used to perform this routine is provided in Appendix A.

The two main routines that are called by SC_ScheduleView( ) above are SC_ScheduleNode( ) and SC_ScheduleANode( ). Sc_ScheduleNode( ) is the primary function that is responsible for enforcing the rules of data-flow in the system. This routine is recursive and is responsible for implementing the depth first tree walking scheduler algorithm. In order to facilitate navigation around the various levels of the compound widgets that make up the hierarchy associated with a given view, SC_ScheduleNode( ) makes use of three basic structures: the widget descriptor record (type ET_Widget), the flow descriptor record (type ET_Flow), and the pin descriptor record (type ET_Pin). The following are the scheduler uses of the relevant fields in an ET_Widget record:

tokenHdr—This field contains the header into a dynamic list of active tokens associated with data or control flows inside a compound widget. tokenHdr=0 if the list is empty.

tokenTail—This field contains the tail (last element) of the tokenhdr list.

flowHdr—This field is the header into a static list of control and data flows inside a compound widget. FlowHdr=0 if the list is empty.

sWidgHdr—This field is the header into a list of widgets within the current compound widget. cWidgHdr=0 if the list is empty.

sWidgNext—This field contains the link elements for the list header by sWidgHdr for the surrounding compound widget (i.e., it points to the next widget in the enclosing widgets sWidgHdr list). sWidgNext=0 if no more elements in the list. The field sWidgPrev is the same but points in the reverse direction to sWidgNext.

flags—This field contains various logical flags indicating to the scheduler the state of the current widget. Of particular relevance is 'hasChildTokens' which indicates that at least one widget in the sWidgHdr list has active tokens associated with it. The flag 'hasTokens' indicates that the current widget itself has a non-empty tokenHdr list.

The following are the scheduler uses of the relevant fields in an ET_Flow record:

tokenLink—This field is the link to the next element in the tokenHdr list of the enclosing compound widget. tokenLink=0 if there are no more elements in the list.

flowLink—This field is the link to the next element in the flowHdr list of the enclosing compound widget. flowLink=0 if there are no more elements in the list.

value—This field contains a handle to the heap storage allocation for the actual data value associated with the flow (if allocated). In the case of a control flow, value=0 and the flow state is stored in one of the Flags field bits.

cIpinHdr—This field contains the header into a static list of contained widget input pins that are connected to the current flow. cIpinHdr=0 if the list is empty. Note that an input pin to compound widget may be in the connected input pin list for a flow within the widget that contains it's parent while also being in the connected output pin list of a flow internal to its parent.

cOpinHdr—This field contains the header into a static list of contained widget output pins that are connected to the current flow. cOpinHdr=0 if the list is empty. Note that an output pin of compound widget may be in the connected output pin list for a flow internal to its parent, while also being in the connected input pin list of a flow within the widget that contains it's parent.

flags—This field contains various logical flags indicating to the scheduler the state of the flow. 'is Controlflow' indicates that the flow is a control rather than a data flow. 'hasToken' indicates that the flow has a token associated with it. 'useORlogic' specifies OR rather than AND consumption logic. 'unConsumable' indicates that tokens associated with the flow cannot be consumed. 'hasBreakPoint' and 'hasWatchPoint' are used to initiate debugging activities.

The following are the scheduler uses of the relevant fields in an ET_Pin record:

cIpinLink—This field is the link to the next element in the cIpinHdr list of the connected flow. cIpinLink=0 if no more elements in the list.

cOpinLink—This field is the link to the next element in the cOpinHdr list of the connected flow. cOpinLink=0 if no more elements in the list.

parent—This field contains a reference to the widget record for the widget whose input/output pin this ET_Pin record describes.

During normal processing, the scheduler algorithm attempts to walk any given tree (view) in the environment's active views list and when it finds an active token that can potentially be consumed by running or resuming an atomic widget, it does so. The algorithm is predicated on the following facts:

The mission of the scheduling algorithm is to attempt to consume any active data flow tokens in the view, thereby completing the view.

Only atomic widgets actually do anything, so the algorithm must continue to walk the tree until it finds an atomic widget whose input is connected to an active data flow, and then execute it (if possible) in the hope that the widget will complete thereby consuming all outstanding tokens connected to it's inputs.

Many widgets produce more tokens on their outputs after consumption of the input tokens.

Because a widget (atomic or compound) only consumes tokens on its inputs when it completes, this means that all ancestral (i.e., enclosing) compound widgets of any atomic widget that has not yet completed, must also have unconsumed tokens on their inputs. This in turn means that the scheduler is guaranteed to find all outstanding tokens in a view, no matter how deeply they are nested, simply by looking at only those enclosing widgets. For each level in the tree that has outstanding tokens, the enclosing widgets will have outstanding tokens on their inputs as well. The result is that rather than having to examine every compound widget in a WEM diagram tree, or even every data flow in the WEM tree, the scheduler can be sure that by examining only what is connected to data flows with active tokens, it has examined every widget in the view that has the potential to execute. Within any given compound widget, this list is referred to as the token list. These lists are preferably arranged in a tree structure that can be traced all the way back to the view widget itself. At any given moment, there are vastly fewer active tokens within a view than there are either widgets or data flows. Hence, the efficiency of this algorithm greatly exceeds other tree traversal strategies.

Whenever an atomic widget consumes its input tokens, it does so by removing them from the token list of the enclosing compound widget. If this token list becomes empty then the compound widget itself has completed and the scheduler should therefore consume any tokens on it's inputs and generate the necessary output tokens in the parent WEM of the compound widget. This process continues all the way up the tree until the scheduler detects an empty tree at which time the view is complete.

The scheduler tree traversal algorithm is recursive, i.e., it calls itself repeatedly as it walks down the tree, starting at the view widget until it finds a leaf node (atomic widget) that can be scheduled. It then either starts or resumes that widget and when the widget completes, it returns back up the calling chain. As the algorithm climbs back up the path it rotates the token list for every level in the tree by moving the token that was at the front of the list (i.e., the one that determined which attached widget it chose in the downward path), to the back.

The effect of this repeated descent and ascent algorithm is to allocate sequential time slices, at any given level of the tree, to widgets that are as far apart as possible in the tree. This is designed to prevent undesirable bunching of time allocations to a given compound widget. Atomic widgets that are higher up in the tree will get more time slices than those that are further down. This is as it should be since higher up atomic widgets generally correspond to UI related displays and controls which must be as responsive as possible, and which will not actually be eligible to run unless the UI event on which they are waiting has occurred. One possible side effect of the algorithm is that at any given level, the smaller branches of an unbalanced tree get more scheduling slots than larger ones. A tree-balancing algorithm, if desired, could correct this behavior. This algorithm returns to the caller (SC_Scheduler) after a single descent and ascent. SC_Scheduler( ) itself then selects another view and priority group and repeats the process. Thus available CPU time slots are distributed over all views in the system according to priority. Widgets in many other views may be scheduled before SC_Scheduler( ) again returns to this view and performs another descent and ascent of this tree. Sample code for one embodiment of SC_ScheduleNode is provided in Appendix A.

The logic for SC_ScheduleANode (schedule atomic node) is broken out separately from SC_ScheduleNode( ) so that nodes that are atomic can be forcefully scheduled based on non-data-flow related events. Sample code for SC_ScheduleANode( ) is provided in Appendix A.

The routine SC_StartWidget( ) is responsible for checking that all the necessary conditions have been met for starting a particular widget. This routine is therefore responsible for enforcing the rules of data flow as well as the modifications to these rules described above. Once SC_StartWidget( ) has determined that a widget is eligible to run, it actually launches it using either SC_StartAWidget( ) or SC_StartCwidget( ) (depending on whether the widget is atomic or compound). If the widget concerned is ineligible to run for any reason, this routine returns FALSE otherwise it returns TRUE. This routine can also be called with the parameter 'JustCheckin' set to TRUE in which case it makes all necessary checks for eligibility (other than those for input availability) but does not actually cause the widget to be started. That is, it calls itself under certain circumstances in order to find out if widgets that are descendant from the current widgets (in terms of data flow, not hierarchy) have started or are ready to start. Sample code for this Algorithm is provided in Appendix A. This routine is recursive.

The function SC_StartAwidget( ) is called by SC_StartWidget( ) once it determines that all the necessary conditions have been met to actually initiate execution of an atomic widget. Initiating execution of an atomic widget involves creating a separate execution thread for that widget to run in. In order to maintain this separate thread, the thread manager software requires a separate stack area which the atomic widget will use once launched. Every atomic widget contains a stackSize field which gives the maximum size of stack that the widget anticipates will be required in order to execute. Because the atomic widget retains control of the CPU once the thread has been launched, the scheduler has no way of preventing erroneous widgets from stepping outside their stated stack allocation and thus corrupting the heap. It is therefore very important that widgets ensure that this does not occur. This routine can however detect that such an error has occurred after the fact and when widget execution completes, SC_StartAwidget( ) will report an appropriate error if stack debugging is enabled. The mechanism used is to place test patterns at various points within the allocated stack area, especially at the end point. When widget execution completes, these patterns will have been erased up to the deepest point that the widgets stack reached. If the test pattern at the end of the allocation has been overwritten then the widget is erroneous, otherwise the other test patterns may be used to determine actual stack requirements. Filling an area of heap with these test patterns consumes time and stack debugging should preferably be enabled only when developing new atomic widgets. Because a widgets initialization code may contain suspends, this routine may be re-entered a number of times for the same widget before initialization is complete. By returning a false for incomplete initialization and not setting the "kIsRunning" flag, we can be sure that SC_ScheduleNode( ) will keep calling us until done. Sample code for one embodiment of SC_StartAWidget is provided below:

```
Boolean SC__StartAwidget        (                    // Start atomic
widget execution
            ET__ViewHdl         aView,               // I:View handle
            ET__WidgetPtr       aWidP,               // I:widget record
pointer
            Boolean             InitializeOnly       // I:if TRUE, just
initialization
                                )                    // R:TRUE if started
{
  if ( aWidP->wThreadID )                            // thread was already
running
  {
    if ( !(FLAGS(aWidP) & kHasBeenInitialized) )     // resume/start
initialize
      SC__ResumeWidget(aView,aWidP,NO);              // Resume the
widget
  }
  if ( !((FLAGS(aWidP) & kHasBeenInitialized) || aWidP->wThreadID) )
  {                                                  // make a widget
thread
    aWidP->wThreadID = create new thread
    err = yield to thread(aView,&aWidP,kInitializeEntryPt...);
  }
  if ( !InitializeOnly && !(FLAGS(*aView) & kKillThisView) )
  {
    if ( !err && (FLAGS(aWidP) & kHasBeenInitialized) )
      err = yield to thread(aView,&aWidP,kExecuteEntryPt...);
  }
  return (err == 0 && (FLAGS(aWidP) & kHasBeenInitialized) );
}
```

The routine SC_StartCwidget( ) starts execution of a compound widget once all the necessary preconditions have been satisfied. Since there is no code associated with a compound widget, the process of starting one essentially consists of copying the tokens on the external input pins into the internal flows of the compound widget so that these may in turn stimulate contained widgets into execution. Sample code for one embodiment of SC_StartCWidget is provided below:

```
Boolean SC__StartCwidget        (                    // Start compound widget
execution
            ET__ViewHdl         aView,               // I:View handle
```

-continued

```
            ET_WidgetPtr              aWidP              // I:widget record
pointer
                                 )                       // R:TRUE if widget was
started
{
   oldFlags = FLAGS(aWidP);
   FLAGS(aWidP) |= kIsRunning + kHasBeenInitialized;     // set widget's init &
run flags
   for (all formal and degenerate inputs)
   {
      mask = get the masks for available inputs
      i = get count of number of pins of that type
      while ( i )                                        // for all pins of this
type
   {
      i--;
      pinName = i + 'A' or 'a';
      pin = get the pin concerned
      iflow = get the flow connected to it within the compound widg.
      xflow = get the flow connected to it outside the compound widg.
      if ( iflow )
      {
            SC_AddAToken(iflow);                         // add a token to
internal flow
            if ( iflow->value )                          // dispose of old data
(if any)
               TM_DisposeHandle(0, (anonHdl)iflow->value,...);
            if ( !xflow )                                // if pin input !
available
            {                                            // pin must have been
defaulted
               iflow->value = pin->pDefault;
            } else iflow->value = xflow->value;          // external to internal
copy
         }
      }
   }
   if ( ret ) SC_SpontaneousTokens(aWidP);               // generate spontaneous
tokens
   if ( aWidP == view widget(*EG->CurrentView) && !(oldFlags &
kHasBeenInitialized) )
   {                                                     // routine to init.
everything
      SC_InitializeCompoundAtomics(EG->CurrentView,aWidP);
   }
   return ret;
}
```

In the preferred embodiment, the routine SC_ResumeWidget( ) resumes execution of an atomic widget that has previously suspended by calling SC_Suspend( ) either directly or indirectly. This function assumes that all necessary conditions for execution have been checked at the time the widget was started and thus it does not need to repeat such checks. Resumption of an executing widget essentially consists of an explicit yield to the relevant thread. The only subtlety in SC_ResumeWidget( ) is its use to generate certain time based events (idle, tick, second) prior to resuming the thread if the specified time interval has elapsed and the widget is waiting for the time based event specified.

In the preferred embodiment, the routines SC_CheckCtrlStop( ) and SC_CheckCtrlStart( ) may be used to check a flow connected to a control pin to determine if it implies that a widget should be stopped/started. In the preferred embodiment, the routine SC_TimeToGobbleInputs( ) may be used by the scheduler to determine if it should schedule a given widget based on the state of it's input pins. The logic is complicated by the fact that 'exclusive' pins can cause widgets to fire even when only a subset of the inputs is available.

In the preferred embodiment, the routine SC_Trace2Inputs( ) can be used to check all the outputs of a given widget 'aWidP' to see if they directly or indirectly lead to completing the required inputs of a second widget 'cwidg'. The purpose of this is to implement the 'as needed' function whereby widgets that are marked as 'as needed' will only be scheduled by the environment when by running, their outputs might potentially cause another normal widget to become eligible to run. This is the behavior required of many UI type widgets such as dialogs. See SC_StartWidget( ) for usage.

In the preferred embodiment, the routine SC_StopCWidget( ) is called to complete execution of a compound widget. As for atomic widgets, completing compound widget execution involves propagating tokens onto the output flows. Since the output flows of the compound widget may be busy, there is a possibility that the token propagation routine (SC_PropagateTokens( )) may hang up. To simplify this problem, a separate temporary thread is created to perform the compound widget completion action thus allowing for the possibility of backup. Unlike conventional widget threads referenced from the wThreadID field of the widget record, the threads associated with completing compound widgets are torn down and re-cycled as soon as the token propagation is complete, also these threads only execute internal environment code, not widget code. Note that because the thread may back up, it may be resumed in SC_ScheduleNode( ) many times before completing.

In the preferred embodiment, the routine SC_SpontaneousTokens( ) is called whenever a compound widget is started by the scheduler, and is responsible for generating any spontaneously produced tokens contained within the WEM diagram for that widget. Spontaneously produced tokens are generally associated with constant symbols. Note that although flows with variable symbols attached have unconsumable tokens on them, these tokens are not generated until the flow is first written to, i.e., they are not spontaneous. This routine does not check for whether the output flow is busy and hang up waiting for it to be clear. This is because this is not possible given the fact that this routine is called during widget starting at which time all internal flows are by definition free. Anyway to do so would be fatal to the main thread. In the preferred embodiment, the routine SC_AddAToken( ) adds a token to an existing flow.

In the preferred embodiment, the routine SC_InitializeCompoundAtomics( ) is recursive and initializes all atomic widgets within the specified compound widget and any compound widgets it contains either by calling SC_StartAWidget( ) or by recursively calling itself as required.

Widget Pin Access API

The API definition below gives the basic public calls available to widgets/threads when accessing data on input pins and writing data to output pins. The API is intended to be illustrative only and is by no means complete. The header files for a sample API implementation is provided in Appendix B.

In the preferred embodiment, the function PC_NumIDataInputs( ) examines the Widget Input List contained in the specified (or defaulted) widget and returns the counts of the number of formal and degenerate input pins. In the preferred embodiment, the function PC_NumDataOutputs( ) examines the Widget Output List contained in the specified (or defaulted) widget and returns the counts of the number formal and degenerate output pins.

In the preferred embodiment, the function PC_GetDataInput( ) takes an input specifier ('A'<=char<='Z' or 'a'<=char<='z') and returns a handle to the storage value for that input or NULL if not found, or if the value of the connected flow is invalid. The handle returned by PC_GetDataInput( ) would preferably NEVER be de-allocated by widget code. The handle returned may be subject to relocation or resizing by the scheduler across any scheduling boundary.

In the preferred embodiment, the function PC_GetDataInputType( ) takes an input specifier ('A'<=char<='Z' or 'a'<=char<='z') and returns the type ID for that type. In the preferred embodiment, the function returns zero if the input was not found. The widget may use the returned type ID to obtain further information about the type using the routines provided by the type manager package. In the preferred embodiment, the function PC_GetDataOutputType( ) performs a similar function for output pins. In the preferred embodiment, the function PC_SetDataInputType( ) takes an input specifier ('A'<=char<='Z' or 'a'<=char<='z') and a type ID, and sets the type field of the corresponding pin to match the type ID. PC_SetDataOutputType( ) may be used to do the same for output pins.

In the preferred embodiment, the function PC_GetDataInputName( ) takes an input specifier ('A'<=char<='Z' or 'a'<=char<='z') and returns a handle to the name string for that input or NULL if not found or unnamed. The caller should dispose of the handle returned by this routine when the string is no longer required. In the preferred embodiment, the function PC_GetDataOutputName( ) is used for output pins.

In the preferred embodiment, the function PC_IsDataInputConnected( ) takes an input specifier ('A'<=char<='Z' or 'a'<=char<='z') and returns a Boolean indicating whether the input is connected or not. If the input does not exist, a FALSE is returned. Note that if the input is degenerate and PC_IsDataInputConnected( ) returns FALSE, the input may still have a default value assigned to it which can be retrieved using PC_GetDataInput( ). Thus the combination of a FALSE from PC_IsDataInputConnected( ) with a non-NULL result from PC_GetDataInput( ) uniquely defines a defaulted degenerate input. A TRUE from PC_IsDataInput Connected( ) together with a null result from PC_GetDataInput( ) indicates an invalid data flow connected to the input. This routine is provided in order to allow atomic widgets to implement the logic associated with degenerate input pins. Because formal inputs are by definition connected (enforced by WEM), this routine simply returns TRUE when called for formal inputs.

In the preferred embodiment, the function PC_IsDataOutputConnected( ) takes an output specifier ('A'<=char<='Z' or 'a'<=char<='z') and returns a Boolean indicating whether the output is connected or not. If the output does not exist, a FALSE is returned. This routine is provided in order to allow atomic widgets to implement the logic associated with degenerate output pins. Because formal outputs are by definition connected (enforced by WEM), this routine simply returns TRUE when called for formal outputs. In the preferred embodiment, the function PC_DoesOutputHaveToken( ) can be used to determine if a particular output exists for a widget and has an unconsumed token value already assigned, TRUE is returned in this case, otherwise FALSE.

In the preferred embodiment, the function PC_SetDataOutput( ) takes an output specifier ('A'<=char<='Z' or 'a'<=char<='z') and assigns a new value to it. The function preferably returns a Boolean indicating whether the assignment was completed successfully or not. The value is passed to PC_SetDataOutput( ) as a void pointer reference, together with an integer parameter specifying the size of the output object to be created. This routine copies the value into the output value handle in the heap, creating or resizing the handle as necessary. If the output flow already has a token associated with it, this function creates a temporary storage allocation to hold the value. The scheduler will copy any temporary storage values into the connected output data flow when widget execution is complete and the connected output flow becomes free to accept new tokens. Once the value has been copied, the original passed in via the 'data' parameter may be discarded. The only output of this function is the updated value in the heap and flag settings in the widget record.

In the preferred embodiment, the function PC_SetControlOutput( ) sets the value of the control output pin to either true or false. Most normal atomic widgets will not need to use this function since the environment will by default set the control output to false when the widget begins execution and true on completion. Only those widgets that are performing loops or synchronizing functions and whose control output is intended for modifying the normal scheduling sequence of the WEM diagram within which the widget resides will explicitly control this pin using PC_SetControlOutput( ). The effect of these values on the external WEM are:

TRUE—This will cause any externally connected widget to be eligible to run

FALSE—Any externally connected widget will be ineligible to run

Note that because control flow values change in the external WEM diagram immediately they are written (as opposed to data flows which change when the writing widget terminates), this routine must also perform the necessary logic to maintain the environment flow and token lists as a result of any value change. For data flows, the Scheduler performs this logic when an atomic widget completes.

In the preferred embodiment, the function PC_GetInputFlowName( ) takes an input specifier ('A'<=char<='Z' or 'a'<=char<='z') and returns a handle to the name of the flow in the surrounding WEM diagram that is connected to that input or NULL if not found. The caller should dispose of the handle returned by this routine when the string is no longer required. In the preferred embodiment, the function PC_GetInputFlowType( ) takes an input specifier ('A'<=char<='Z' or 'a'<=char<='z'> and returns the type ID for the flow connected to that pin. In the preferred embodiment, the function returns zero if the input was not found. The widget may use the returned type ID to obtain further information about the type using the routines provided by the type manager package. Note that the type of the flow and the type of the input pin are normally the same and hence a call to PC_GetDataInputType( ) would suffice, however certain widgets that accept a given parent type (e.g., scalar) may wish to examine the type of the flow actually connected in order to determine which descendant type was actually connected (e.g., double, int32 etc.).

In the preferred embodiment, the function PC_GetOutputFlowName( ) takes an output specifier ('A'<=char<='Z' or 'a'<=char<='z') and returns a handle to the name of the flow in the surrounding WEM diagram that is connected to that output or NULL if not found. The caller should dispose of the handle returned by this routine when the string is no longer required. In the preferred embodiment, the function PC_GetOutputFlowType( ) takes an output specifier ('A'<=char<='Z' or 'a'<=char<='z') and returns the type ID for the flow connected to that pin. In the preferred embodiment, the function returns zero if the output was not found. The widget may use the returned type ID to obtain further information about the type using the routines provided by the type manager package. Note that the type of the flow and the type of the output pin are normally the same and hence a call to PC_GetOutputType( ) would suffice.

In the preferred embodiment, the function PC_DoesInputExist( ) can be used to determine if a particular input exists for a widget, TRUE is returned if the input exists, otherwise FALSE. In the preferred embodiment, the function PC_DoesOutputExist( ) is similar for outputs.

In the preferred embodiment, the function PC_GetStaticDataInput( ) takes an input specifier ('A'<=char<='Z' or 'a'<=char<='z') and returns a handle to the storage value for that input or NULL if not found. Unlike the routine PC_GetDataInput( ), this routine will also search on flows that have no associated token for an attached constant object or defaulted output and return any value found. This means that this routine will operate at initialize time as well as execute time. This routine also has the ability to monitor changes on an input flow at run time that do not necessarily have a token associated with them. This often occurs when a widget has written a value onto a flow but has not yet completed and thus has posted no tokens. Use of this "tokenless" communication path is strongly discouraged except in exceptional circumstances. The handle returned by PC_GetDataInput* ( should NEVER be deallocated by widget code. The handle returned may be subject to relocation or resizing by the scheduler across any scheduling boundary, widgets should be careful not to de-reference the handle and use the de-reference value across such a boundary. Widgets should avoid "Locking" data handles where possible since this will reduce the schedulers ability to resize the handle in response to new data.

The foregoing description of the preferred embodiments of the invention has been presented for the purposes of illustration and description. For example, although described with respect to the C programming language, any language could be used to implement this system. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for facilitating meta-analysis of data captured for intelligence purposes using a computer network and implemented as an unconstrained system, the method comprising the steps of:

(a) establishing a distributed acquisition server architecture within the computer network responsive to a data-flow driven environment;

(b) sampling a plurality of streams of unstructured data by said distributed acquisition server architecture;

(c) converting said plurality of streams of unstructured data into a well described normalized form of binary data via a dedicated mining language tied to a current system ontology;

(d) storing said converted binary data in a memory system tied to said current system ontology within said computer network, wherein said memory system defines a plurality of persistent storage containers required to contain said converted binary data;

(e) directing said storing step with a memory management system which splits said converted binary data into an appropriate one of said plurality of persistent storage containers;

(f) executing one or more control and/or data-flow based programs, called widgets, on said converted binary data stored in said plurality of persistent storage containers, wherein execution of said one or more widgets begins when a matching set of data objects or tokens from said converted binary data appear on an input data-flow pin of said one or more widgets;

(g) producing a set of resultant data tokens on an output data-flow pin of said one or more widgets, wherein said set of resultant data tokens become part of said data-flow driven environment in said persistent storage containers or in a memory of a computer within the computer network;

(h) querying a registered search capability of one or more said plurality of persistent storage containers producing a list of hits;

(i) querying said list of hits with Boolean and other operators to specify logical combinations of said list of hits;

(j) displaying and interacting with said plurality of streams of unstructured data, said list of hits, and said logical combinations of said list of hits through a user interface on a display device within the computer network;

(k) forming collections of datums from said logical combinations of said list of hits through a memory collections system that forms and enables manipulation and exchange of said collections of datums both within a local computer as well as across the computer network;

(l) delivering said collections of datums for meta-analysis to a user accessing the computer network through said user interface; and (m) based upon said meta-analysis by said user, revising said querying steps (h) and (i) repeating steps (j), (k) and (l).

2. The method according to claim 1 wherein said establishing a distributed acquisition server architecture step (a) further comprises the steps of:

establishing one or more servers;

logically connecting to the one or more servers a mass storage system;

logically connecting to the one or more servers a types system for defining data types at a binary level; and logically connecting to the one or more servers a query system for executing data queries on the one or more servers mapped to the data type being queried.

3. The method according to claim 1 wherein said establishing a data-flow driven environment step (a) further comprises the steps of:

establishing a data-flow based scheduling environment for managing an execution of one or more control-flow based functional building blocks;

establishing a visual programming environment to build and control a flow of data collections between one or more of the building blocks within the scheduling environment;

establishing a pin-based application programming interface for accessing the contents from an executing code within the one or more building blocks through one or more widget input pins; and establishing a strongly-typed run-time discoverable types systems for defining types of the flow of data collections presented to the one or more widget input pins at run-time.

4. The method according to claim 1 wherein said converting step (c) via said dedicated mining language further comprises the steps of:

receiving a first source data for mining by the computer network;

parsing the first source data by the computer network;

creating, as a result of the parsing step, a first collection of records conformed to a structured target data model described by an ontology description language, storing the first collection of records conformed to the structured target data model in the memory system; and retrieving the first collection of records for the further processing by the computer network.

5. The method according to claim 1 wherein said converting step (c) via said current system ontology further comprises the steps of:

establishing an ontology description language, or ODL, wherein the ODL is derived by extensions to a standard computer programming base language as implemented using a types system;

registering a plurality of data containing with a collections system via a plug-in registry;

automatically generating and handling, with a database creation engine, one or more persistent storage tables necessary in the data containers that have been registered with the collections system, wherein the database creation engine uses specifications given in the ODL; and automatically generating, with a user interface creation engine using the ODL, a user interface that permits display, interaction with, and querying of the data residing in the persistent storage containers.

6. The method according to claim 1 wherein said converting step (c) further comprises:

processing said plurality of streams of unstructured data with a two-phase lexical analyzer yielding a plurality of tokens, wherein said processing by the two-phase lexical analyzer further comprises the steps of:

creating a first table in the memory, wherein the first table describes one or more single ocharacter transitions using records of a first type;

creating a second table in the memory, wherein the second table is an ordered series of records of a second type;

receiving a text input into the lexical analyzer;

searching the records in the first table for a matching record against each successive character of the text input;

if the matching record for the text input is found in the first table, outputting a token associated with the matching record;

responsive to a failure to find the matching record in the first table, searching the records in the second table from the beginning for the matching record against the each successive character of the text input, wherein the matching record is found when a current state of the lexical analyzer lies between an upper state bound and a lower state bound and the each successive character of the text input lies between an upper character bound and a lower character bound as specified in each said record being searched in the second table; and if the matching record is found in the second table, assigning a current state of the lexical analyzer a value of an ending state field of the matching record.

7. The method according to claim 6 wherein said processing step further comprises:

parsing said plurality of tokens through a predictive parser, wherein said parsing by the predictive parser further comprises the steps of:

specifying a specific source language syntax to be parsed to the predictive parser at run-time via a parser specification using a specification language describing not only parser productions in response to input tokens and syntax, but also one or more registered plug-in operators to be called at specified points in the parsing process determined by when said one or more registered plug-in operators are popped off a parser stack associated with the predictive parser;

converting the parser specification into one or more parser tables to drive operation of the predictive parser that is otherwise unmodified and source language independent;

calling by the predictive parser a registered resolver in order to obtain a series of tokens from an input token stream, passing a 'no action' mode parameter to indicate an input token request wherein the registered resolver may at any time it is called (regardless of the mode parameter), choose to alter either a subseiuent token stream returned, a state of the parser stack, or a state of an evaluation stack associated with the predictive parser; and when a one of the series of tokens has a value within a first defined range, pushing by the predictive parser the one of said series of tokens onto said evaluation stack as an un-resolved symbol referencing a text string of the one of the series of tokens.

8. The method according to claim 1 wherein said storing said converted binary data in a memory system step (d) further comprises steps of:

obtaining a reference to a block of physical memory from a standard operating system supplied heap allocation facility or other standard memory allocation scheme;

creating one or more memory structures to be stored within the block of physical memory, the memory structures each having a space allocated for a header and a data portion;

creating the header for said memory structures, wherein the header includes a field for linking to a next said memory structure in the block of physical memory based on a relative memory offset between a referencing header and a referenced header within the block of physical memory, and further wherein the header includes a field for identifying additional data structures unique to a particular type of said memory structure; and storing the header within a corresponding said memory structure.

9. The method according to claim 1 wherein said directing said storing step with a memory management system step (e) further comprises the steps of:

populating a plurality of databases with a binary type and field descriptions;

generating type databases with a run-time modifiable type compiler that is capable of either explicit API calls or by compilation of unmodified header files or individual type definitions in a standard programming language;

reading and writing the types with a complete Application Programming Interface suite for accessing the type information as well as full support for type relationships and inheritance, and type fields, given knowledge of a unique numeric type ID and a field name/path; and converting the type names to unique type IDs with a hashing process which may also incorporate a number of logical flags relating to the nature of the type.

10. The method according to claim 1 wherein said displaying step (j) through said user interface further comprises the step of:

translating in real-time tokens floin a base language to a foreign language, without requiring the tokens to be obtained through specialized Application Programming Interfaces ("APIs") from localized resources, by modifying the standard rendering chain to intercept all rendering calls for the tokens in the base language and invoking processing instructions necessary to perform the mapping to the foreign language.

11. The method according to claim 10 further comprising:

providing a dynamic hyper-linking architecture under the control of said user within said user interface, wherein said providing the dynamic hyper-linking architecture step further comprises the steps of:

providing a threaded environment;

associating arbitrary data with threads in the threaded environment, wherein the arbitrary data is function registries;

hierarchically nesting the thread contexts with corresponding user interface context relationships;

passing 'events' containing messages between the threads;

invoking transparently certain environment supplied events; and looking-up the threads based on a unique thread ID, wherein the dynamic hyper-linking architecture uses both the threaded environment and symbolic functions to dynamically create links to data and functions that are displayed and/or executed responsive to user selection of a link.

12. The method according to claim 1 wherein said forming step (k) through said memory collections system further comprises the steps of:

instantiating arbitrarily complex structures in a 'flat' data model within a single memory allocation;

defining and accessing binary strongly-typed data in a run-time type system;

encoding information in a set of 'containers' in a memory resident form, a file-based form, and a server-based form;

intepreting and executing all necessary collection manipulations remotely in a client/server environment tied to a types system;

providing a basic aggregation structure having at a minimum a 'parent,' 'child,' and 'sibling' links or equivalents; and attaching strongly typed data to a data attachment structure whose size may vary and which is associated with and possibly identical to a containing aggregation node in the collection.

13. A system for facilitating meta-analysis of data captured for intelligence purposes within a computer network, which is implemented as an unconstrained system, the system comprising:

a distributed acquisition server architecture within the computer network responsive to a data-flow driven environment;

a plurality of streams of unstructured data which are sampled by said distributed acquisition server architecture;

a dedicated mining language tied to a current system ontology for converting said plurality of streams of unstructured data into a well described normalized form of binary data;

a memory system tied to said current system ontology within said computer network for storing said converted binary data, wherein said memory system defines a plurality of persistent storage containers required to contain said converted binary data;

a memory management system for splitting and directing said converted binary data into an appropriate one of said plurality of persistent storage containers;

one or more control and/or data-flow based programs, called widgets, each said widget having at least one input data-flow pin and at least one output data-flow pin, wherein said one or more widgets are executed on said converted binary data stored in said plurality of persistent storage containers when a matching set of data objects or tokens from said converted binary data appear on said at least one input data-flow pin of said one or more widgets;

a set of resultant data tokens produced on said output data-flow pins of said one or more widgets, wherein said set of resultant data tokens become part of said data-flow driven environment in said persistent storage containers or in a memory of a computer within the computer network;

a user interface having a lower querying layer and an upper querying layer, wherein said lower querying layer queries one or more registered search capability for each of said plurality of persistent storage containers which produces a list of hits, and further wherein said upper querying layer queries said list of hits with Boolean and other operators to specify logical combinations of said list of hits;

a display device within the computer network for displaying and interacting with said plurality of streams of unstructured data, said list of hits, and said logical combinations of said list of hits through said user interface; and a memory collections system that forms collections of datums from said logical combinations of said list of hits and enables manipulation and exchange of said collections of datums both within a local computer as well as across the computer network, wherein a user accesses through said user interface said collections of datums for meta-analysis, and based upon said meta-analysis by said user, said user can revise said queries to refine said collections of datums.

14. The system according to claim 13, wherein said distributed acquisition server architecture further comprises:

one or more servers;

a mass storage system logically connected to the one or more servers;

a types system logically connected to the one or more servers for defining data types at a binary level; and a query system logically connected to the one or more servers for executing data queries on the one or more servers mapped to the data type being queried.

15. The system according to claim 13, wherein said data-flow driven environment further comprises:

a data-flow based scheduling environment for managing an execution of one or more control-flow based functional building blocks;

a visual programming environment to build and control a flow of data collections between one or more of the building blocks within the scheduling environment;

a pin-based application programming interface for accessing the contents from an executing code within the one or more building blocks through one or more widget input pins; and a strongly-typed run-time discoverable types system for defining types of the flow of data collections presented to the one or more widget input pins at run-time.

16. The system according to claim 13, wherein said dedicated mining language further comprises:

a first source data for mining by the computer network; a parser for parsing the first source data by the computer network, wherein the parser further comprises an outer parser having an embedded inner parser; and a first collection of records created by the parser that are conformed to a structured target data model described by an ontology description language;

wherein the first collection of records conformed to the structured target data model are stored in the memory system and may be retrieved for further processing by the computer net work.

17. The system according to claim 13, wherein said system ontology further comprises:

an ontology description language, or ODL, wherein the ODL is derived by extensions to a standard computer programming base language as implemented using a types system;

a plurality of data containers with a collections system registered via a plug-in registry;

a database creation engine wherein said database creation engine uses specifications given in the ODL to automatically generate and handle one or more persistent storage tables necessary in the data containers that have been registered with the collections system; and a user interface creation engine, wherein the user interface creation engine uses the ODL to automatically generate a user interface that permits display, interaction with, and querying of the data residing in the persistent storage in the one or more storage devices.

18. The system according to claim 13 further comprising:

a two-phase lexical analyzer for processing said plurality of streams of unstructured data yielding a plurality of tokens, wherein said two-phase lexical analyzer further comprises:

a first table created in the memory, wherein the first table describes one or more single character transitions using records of a first type;

a second table created in the memory, wherein the second table is an ordered series of records of a second type; and a text input received into the lexical analyzer;

wherein the records in the first table are searched for a matching record against each successive character of the text input, and if the matching record for the text input is found in the first table, a token associated with the matching record is output, and further wherein if a matching record in the first table is not found, the records in the second table are searched from the beginning for the matching record against the each successive character of the text input, wherein the matdhing record is found when a current state of the lexical analyzer lies between an upper state bound and a lower state bound and the each successive character of the text input lies between an upper character bound and a lower character bound as specified in each said record being searched in the second table, and if the matching record is found in the second table, a current state of the lexical analyzer is assigned a value of an ending state field of the matching record.

19. The system according to claim 18 further comprising:

a predictive parser for parsing said plurality of tokens, wherein said predictive parser further comprises:

an application programming interface, logically connected to the predictive parser, which permits registration and use of one or more plug-ins and one or more resolvers;

a means for choosing and specifying a source grammar to be parsed by the predictive parser, converting the source grammar to an equivalent one or more parsing tables, and logically connecting the one or more parsing tables to the predictive parser for parsing the complex language input;

a means for invoking by the predictive parser the one or more resolvers such that the complex language input is passed by the predictive parser through the one or more resolvers for tokenization into a token stream; and a means for invoking by the predictive parser the one or more plug-ins, which are logically connected to the one or more resolvers, wherein the one or more plug-ins interpret any reverse-polish operators embedded in the specified source grammar when exposed on a parser stack by said predictive parser.

20. The system according to claim 13, wherein said memory system further comprises:

a reference to a block of physical memory from a standard operating system supplied heap allocation facility or other standard memory allocation scheme;

one or more memory structures stored within the block of physical memory, the memory structures each having a space allocated for a header and a data portion; and one or more fields within the header for linking to the one or more memory structures that are related to a first memory structure within the block of physical memory, wherein the one or more fields are based on a relative memory offset between a referencing header and a referenced header within the block of physical memory.

21. The system according to claim 13, wherein said memory management system further comprises:

a plurality of databases populated with a binary type and field descriptions;

a compiler capable of accessing the one or more custom binary type and field description databases at run-time and generating or modifying the one or more custom binary type and field description databases;

a complete Application Programming Interface suite for reading and writing the types as well as full support for type relationships and inheritance, and type fields, given knowledge of a unique numeric type ID and a field name/path; and a hashing process, wherein the hashing process converts type names to unique numeric type IDs which may also incorporate a number of logical flags relating to the nature of the type.

22. The system according to claim 13, wherein said user interface translates in real-time tokens from a base language to a foreign language, without requiring the tokens to be obtained through specialized Application Programming Interfaces ("APIs") from localized resources, by modifying the standard rendering chain to intercept all rendering calls for the tokens in the base language and invoking processing instructions necessary to perform the mapping to the foreign language.

23. The system according to claim 22 further comprising:

a dynamic hyper-linking architecture within said user interface, wherein said dynamic hyper-linking architecture further comprises:

a threaded environment, wherein the threaded environment associates an arbitrary data with one or more threads, which when associated with a User Interface (UI) context are identified by unique thread identification numbers (IDs), and includes a hierarchical nesting of thread contexts with one or more corresponding UI context relationships;

wherein 'events' containing messages are passed between the threads, and certain environment supplied events are invoked transparently. wherein the threads are looked-up based on a unique thread ID and wherein the dynamic hyper-linking architecture uses both the threaded environment and symbolic functions to dynamically create links to data and functions that are displayed and/or executed responsive to user selection of a link.

24. The system according to claim 13, wherein said memory collections system further comprises:

a 'flat' data model for instantiating arbitrarily complex structures within a single memory allocation;

a run-time type system for defining and accessing binary strongly-typed data;

a set of 'containers' for encoding information in a memory resident form, a file-based form, and a server-based form:;

a client/server environment tied to a types system for interpreting and executing all necessary collection manipulations remotely;

a basic aggregation structure having at a minimum a 'parent,' 'child,' and 'sibling' links or equivalents; and a data attachment structure for attaching strongly typed data whose size may vary and which is associated with and possibly identical to a containing aggregation node in the collection.

* * * * *

UNITED STATES PATENT AND TRADEMARK OFFICE

CERTIFICATE OF CORRECTION

PATENT NO. : 7,685,083 B2
APPLICATION NO. : 11/484220
DATED : March 23, 2010
INVENTOR(S) : John Fairweather It is certified that error appears in the above-identified patent and that said Letters Patent is hereby corrected as shown below:

Column 17,
line 65, Add the phrase -- , now U.S. Patent No. 7,103,749. -- after the phrase "(page 47)".
line 66, Add the phrase -- , now U.S. Patent No. 7,328,430. -- after the phrase "(page 60)".
line 67, Add the phrase -- , now U.S. Patent No. 7,210,130. -- after the phrase "(page 81)".

Column 18,
line 1, Add the phrase -- , now U.S. Patent No. 7,158,984. -- after the phrase "(page 104)".
line 2, Add the phrase -- , now U.S. Patent No. 7,308,449. -- after the phrase "(page 132)".
line 3, Add the phrase -- , now U.S. Patent No. 7,240,330. -- after the phrase "(page 191)".
line 4, Add the phrase -- , now U.S. Patent No. 7,533,069, which is a continuation of U.S. Patent Application Publication 2003/0172053 A1, now abandoned. -- after the phrase "(page 230)".
line 5, Add the phrase -- , now U.S. Patent No. 7,555,755. -- after the phrase "(page 257)".
line 6, Add the phrase -- , now U.S. Patent No. 7,369,984. -- after the phrase "(page 289)".
line 8, Add the phrase -- , now U.S. Patent No. 7,143,087. -- after the phrase "(page 301)".
line 9, Add the phrase -- , now U.S. Patent No. 7,308,674. -- after the phrase "(page 362)".

Column 283,
line 56, Delete the word "containing" and replace with the word -- containers --.

Column 284,
line 8, Delete the word "ocharacter" and replace with the word -- character --.

Column 285,
line 35, Delete the word "floin" and replace with the word -- from --.

Column 288,
line 20, Delete the word "matdhing" and replace with the word -- matching --.

Signed and Sealed this

Fourth Day of May, 2010

David J. Kappos

David J. Kappos
*Director of the United States Patent and Trademark Office*

Column 290,
line 7, Delete the "." after the word "transparently" and replace with a -- , --.
line 21, Delete the ":" appearing after the word "form".